United States Patent
Christie et al.

(10) Patent No.: US 9,774,917 B1
(45) Date of Patent: Sep. 26, 2017

(54) CHANNEL BAR USER INTERFACE

(71) Applicant: Apple Inc., Cupertino, CA (US)

(72) Inventors: Gregory N. Christie, San Jose, CA (US); Alessandro Sabatelli, San Francisco, CA (US); William M. Bachman, San Jose, CA (US); Imran Chaudhri, San Francisco, CA (US); Jeffrey Robbin, Los Altos, CA (US); Jim Young, Livermore, CA (US); Joe Howard, San Jose, CA (US); Marcel Van Os, San Francisco, CA (US); Patrick L. Coffman, San Francisco, CA (US); Stephen O. Lemay, Palo Alto, CA (US); Jeffrey Ma, Redwood City, CA (US); Lynne Kress, San Jose, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 14/255,664

(22) Filed: Apr. 17, 2014

Related U.S. Application Data

(63) Continuation of application No. 14/102,270, filed on Dec. 10, 2013, now abandoned.
(Continued)

(51) Int. Cl.
*H04N 5/445* (2011.01)
*H04N 7/16* (2011.01)
(Continued)

(52) U.S. Cl.
CPC ..... *H04N 21/4823* (2013.01); *H04N 21/4383* (2013.01); *H04N 21/4622* (2013.01)

(58) Field of Classification Search
CPC .............................. H04N 21/27; H04N 21/47
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Bohn, D. (Jan. 6, 2014). "Rebooting webOS: how LG rethought the smart TV," located at: <http://www.theverge.com/2014/1/6/5279220/rebooting-webos-how-lg-rethought-the-smart-tv>, last visited: Feb. 24, 2014, seven pages.
(Continued)

*Primary Examiner* — Dominic D Saltarelli
(74) *Attorney, Agent, or Firm* — Morrison & Foerster LLP

(57) ABSTRACT

Systems and methods for a media content user interface. A media content provider includes storage for storing and serving video content to subscribers. The media content provider records and or otherwise stores video content from around the world. Subscribers are provided a user interface to the system that includes a channel bar. The channel bar is dynamically scoped responsive to interactions of a viewer with the system. Selectable elements within the channel bar provide direct access to related content regarding video content, such as television series information and cast information. In addition, the channel bar is operable in multiple modes. An EPG mode displays live video for multiple channels simultaneously. Themed modes permit channel bars that display content according to various themes which may be defined by a viewer, the provider, or both.

55 Claims, 45 Drawing Sheets

Related U.S. Application Data

(60) Provisional application No. 61/735,399, filed on Dec. 10, 2012, provisional application No. 61/800,486, filed on Mar. 15, 2013.

(51) Int. Cl.
*H04N 21/482* (2011.01)
*H04N 21/438* (2011.01)
*H04N 21/462* (2011.01)

(58) Field of Classification Search
USPC .................................................. 725/37–61
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,886,690 A * | 3/1999 | Pond .................. | H04N 5/44543 348/E5.105 |
| 6,028,600 A * | 2/2000 | Rosin ................. | H04N 5/44543 348/38 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2003/0005445 A1* | 1/2003 | Schein ............... | H04N 5/44543 725/51 |
| 2003/0088872 A1* | 5/2003 | Maissel .............. | G11B 27/002 725/46 |
| 2006/0197753 A1 | 9/2006 | Hotelling | |
| 2009/0322962 A1* | 12/2009 | Weeks ............... | H04N 7/17318 348/726 |
| 2010/0333143 A1 | 12/2010 | Civanlar et al. | |
| 2013/0024895 A1 | 1/2013 | Yong et al. | |
| 2013/0061234 A1 | 3/2013 | Piira et al. | |
| 2013/0132966 A1 | 5/2013 | Chanda et al. | |
| 2014/0278072 A1 | 9/2014 | Fino et al. | |

FOREIGN PATENT DOCUMENTS

| | | | |
|---|---|---|---|
| KR | 10-2011-0061811 A | | 6/2011 |
| WO | WO-2011/095693 A1 | | 8/2011 |
| WO | WO-2013/149128 A2 | | 10/2013 |
| WO | WO-2013/149128 A3 | | 10/2013 |
| WO | WO-2016/048308 A1 | | 3/2016 |
| WO | WO-2016/048310 A1 | | 3/2016 |

OTHER PUBLICATIONS

Grey, M. (Jun. 11, 2013). "Comcast's new X2 platform moves your DVR recordings from the box to the cloud," located at: <http://www.engadget.com/2013/06/11/comcast-x2-platform/> last visited: Feb. 24, 2014, fifteen pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed May 27, 2015, for PCT Application No. PCT/US2014/057280, filed Sep. 24, 2014, five pages.

International Search Report mailed May 28, 2015, for PCT Application No. PCT/US2014/057272, filed Sep. 24, 2014, five pages.

* cited by examiner

CHANNEL BAR USER INTERFACE

BACKGROUND OF THE INVENTION

Field of the Invention

This invention relates to multimedia systems, and more particularly, to delivery of media content.

Description of the Relevant Art

For many years, broadcast television was the sole provider of video content to viewer's homes across the globe. As time has passed, and particularly with the advent of the Internet, numerous other sources of video content have arisen. In addition to broadcast television, cable television and satellite based television providers have begun providing access to video on demand and other audio and video content. In addition, special purpose set-top boxes, such as that provided by Roku®, provided a gateway for viewer's to access other sources of video content not provided by their television service provider. With such boxes, viewers were able to connect to these other content providers in order to obtain desired video content. At present, there are countless video providers in the marketplace. In addition, music and other audio content is available through various communication channels. Many are subscription based services, and some provide free content. While the explosion of video content providers in the marketplace may seem a boon for viewer's, the large number of choices and providers complicates the viewing experience.

In view of the above, improved media content delivery systems, methods and mechanisms are desired.

SUMMARY OF EMBODIMENTS

Systems and methods for a television service are contemplated.

A media content delivery service is contemplated that includes a data store for storing and serving video content to subscribers. Such a data store may comprise one or more data stores, distributed storage, peer-to-peer based storage, cloud based storage or otherwise. In various embodiments, the media content provider is configured to continually record and or otherwise acquire media content from around the world for storage. Video and audio content stored in the data store will generally correspond to a large number of other content providers, such as cable television operators, Internet based content providers, television networks, and so on. The media content provider also maintains metadata regarding the video content in the data store. In addition to including information concerning the media content content itself—such as format, duration, compression particulars, and so on, the metadata also includes information that associates the video content with the other video content providers. For example, a stored episode of a series shown on the HBO network will be identifiable as corresponding to the HBO network.

Subscribers are provided a user interface to the system that includes a channel bar. In various embodiments, the channel bar is operable in multiple modes. An EPG mode displays live video for multiple channels simultaneously. Themed modes permit channel bars that display content according to various themes which may be defined by a viewer, the provider, or both.

In various embodiments, the channel bar includes multiple elements that corresponds to video content. Embodiments are contemplated in which live broadcast video is displayed as part of each element. Viewer input may be provided to indicate a change of channel bar is desired. Responsive to such input, a title of a next channel bar may be displayed. Successive titles of further channel bars may be displayed responsive to detecting further input requesting a channel bar change. Responsive to detecting the input has ceased, a channel bar corresponding to the last title shown is displayed.

In addition, the channel bar is dynamically scoped responsive to interactions of a viewer with the system. Changing the scope of the channel bar may include replacing a first element of the second channel bar with a plurality of elements which represent greater detail concerning the first element. Alternatively, multiple lower level elements may be replaced by higher level elements when changing the channel bar scope. Further, selectable elements within the channel bar provide direct access to related content regarding video content, such as television series information and cast information.

These and other embodiments are contemplated and will be appreciated upon reference to the following description and drawings.

Figure 1:
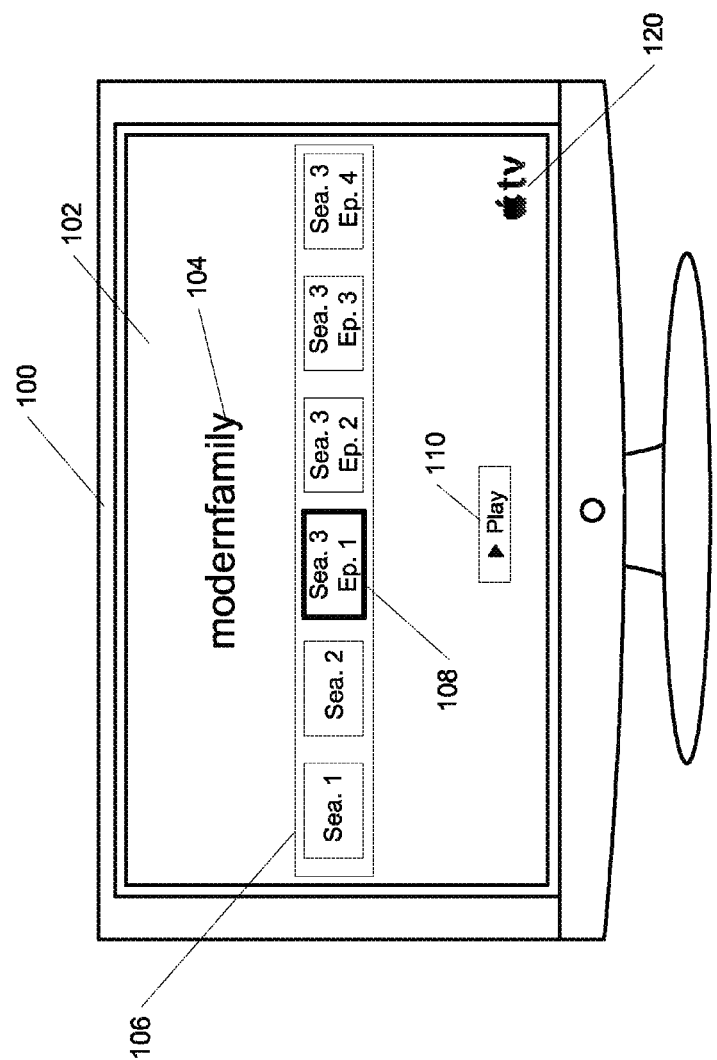
FIG. 1 depicts one embodiment of a video display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a television 100 and television display 102 is shown. In the example shown, the television display 102 is displaying video content related to a television show. In particular, the title 104 of a television show is depicted along with an episode bar 106 and play icon 110. In the embodiment shown, the content depicted by the display 102 is provided according to a subscription a viewer has with a television subscription service. In one embodiment, this television subscription service is an Apple TV® service indicated by the icon 120. In various embodiments, the title 104, bar 106, and icon 110 may be generated as an overlay on top of another image, such as a still picture, video content, animation, or otherwise. Such overlays may be produced by a set-top box, circuitry incorporated into the television 100 itself, or a provider of video content (e.g., the Apple TV service). In other embodiments, rather than an overlay, the title 104, bar 106, and/or 110 may be integrally generated as part of an image or video displayed on the display portion 102 of the television. As used herein, "overlay" is intended to include not only the generation of overlays on top of other content, by the content that is integrally generated as part of the video content as well.

As shown in the example, bar 106 includes six images which correspond to subject matter related to the show titled 104 above. As shown, subject matter corresponding to three seasons of the show ("modernfamily") are depicted. In particular, images corresponding to season 1 (Sea. 1), season 2 (Sea. 2), and season 3 (Sea. 3) are shown. For season 3, separate images are shown to correspond to particular episodes of season 3; namely, episodes 1-4 (Ep. 1-Ep. 4). In various embodiments, the images depicted within the bar 106 may be still images or video corresponding to the related season or episode, or otherwise.

Also shown in FIG. 1, one of the particular images 108 is indicated to have "focus". As is understood by those skilled in the art, "focus" generally refers to the selection of a graphical element on a display in order to display information related to the selected item, prepare the item for further selection in order to further traverse a graphical user interface, and so on. In this example, focus is illustrated by the use of a broader outline on image 108 than is used for the other images within bar 106. Numerous other alternative ways for indicating focus are known in the art, such as the use of different lighting, colors, animations, etc. All such alternatives are contemplated. Focus in this case may be used to identify a particular image within bar 106 which is intended as a target when the play icon 110 is selected by a user. In this manner, selecting play 110 while image 108 is selected (i.e., has focus) may result in episode 1 of season 3 of the modernfamily television series being played on the display 102.

While FIG. 1 depicts seasons and episodes of a television series available for viewing, what is not shown to the television viewer in this example is that the content corresponding to the images in bar 106 has been aggregated from multiple sources corresponding to multiple subscriptions. As used herein, subscriptions to these multiple services may be referred to as secondary subscriptions, while a subscription to the service corresponding to the display 102 (e.g., the Apple TV service) may be referred to as the primary subscription. In various embodiments, the primary subscription may be to Apple TV in which case Apple TV may be referred to as the "primary provider", and the other multiple service providers may be referred to as "secondary providers". It is noted that in some cases, a secondary provider may not provide all of the content to which it provides access. In some embodiments, a subscription with a secondary provider simply gives a viewer the right to access the data from a different provider. Various such alternatives are possible and are contemplated. In contrast to the scenario depicted in FIG. 1, in a typical scenario a viewer may have a subscription to a service such as the NETFLIX® service which provides television, movie, and other video content. When displaying available content for viewing, the NETFLIX service displays content available from NETFLIX. Alternatively, a service such as the TIVO® service may depict content available from multiple sources corresponding to multiple subscriptions. However, when accessing such content, the viewer accesses a particular service provider in order to obtain the desired content assuming the viewer has a subscription. In such a case, the TIVO service simply points the viewer to a service which provides content. The viewer than connects to that service to obtain content. In contrast to the above, not only does bar 106 in FIG. 1 identify content corresponding to multiple providers which may require multiple secondary subscriptions, all of the corresponding content has been aggregated by the provider of the service that corresponds to the primary subscription (e.g., Apple TV).

Figure 2:
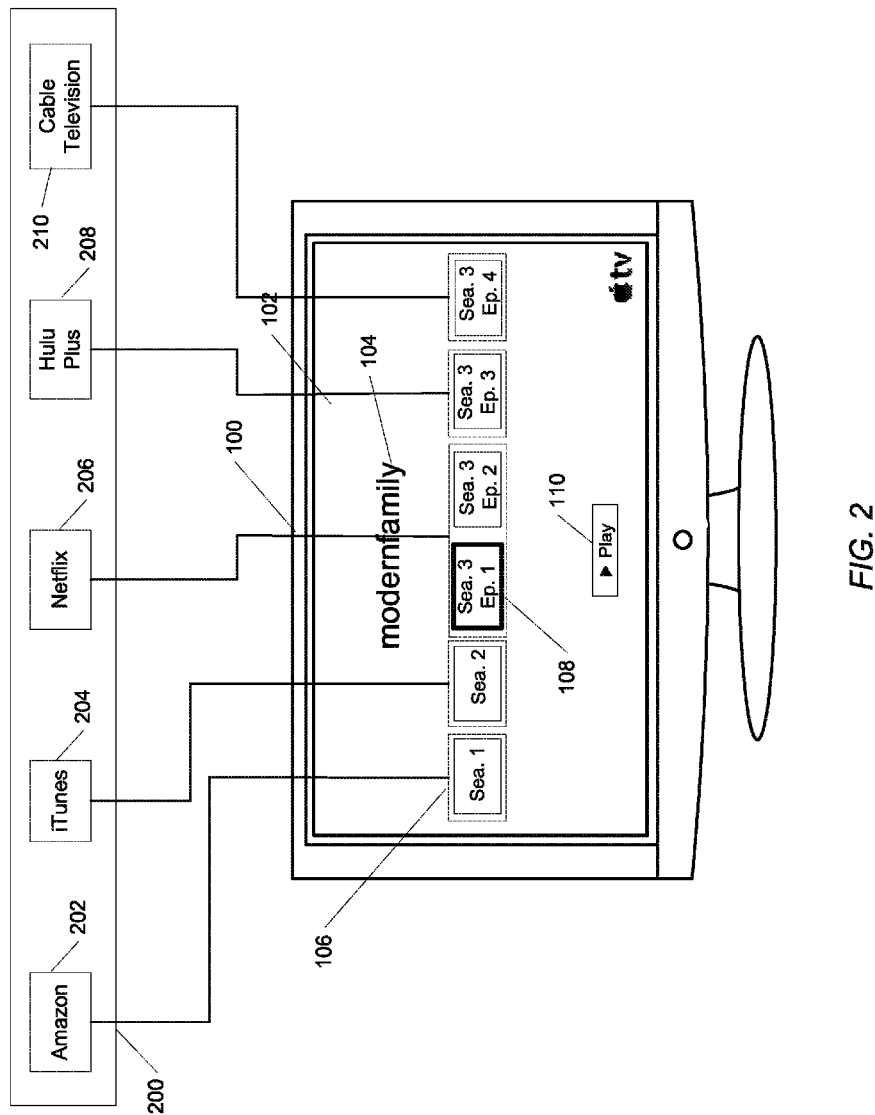
FIG. 2 depicts one embodiment of a video display and secondary sources.

For example, FIG. 2 illustrates the television 100 and display 102 of FIG. 1 with like items having identical reference numerals. FIG. 2 illustrates that the content identified within bar 106 corresponds to different subscription based services 200. For example, season 1 (Sea. 1) is available from the Amazon® service 202, season 2 (Sea. 2) is available from the Apple iTunes® service 204, episodes 1 and 2 of season 3 are available from the Netflix® service 206, episode 3 of season 3 is available from the Hulu Plus® service 208, and episode 4 of season 4 is available from a cable television service 210. In the example shown, a viewer of the display 102 has a subscription to a service provided by the source of the display 102. For example, the viewer may have a subscription to an Apple TV® service (the primary subscription). In various embodiments, the Apple TV service has recorded or otherwise obtained and aggregated content corresponding to all of the sources/providers shown in block 200. Such content may have been obtained directly from the providers themselves, or otherwise. In such an embodiment, whether the viewer selects to view episode 3 or episode 4 of season 3 (each of which corresponds to a different provider and subscription), or any of the other content shown in block 106, the content will be provided by the Apple TV service.

Figure 3:
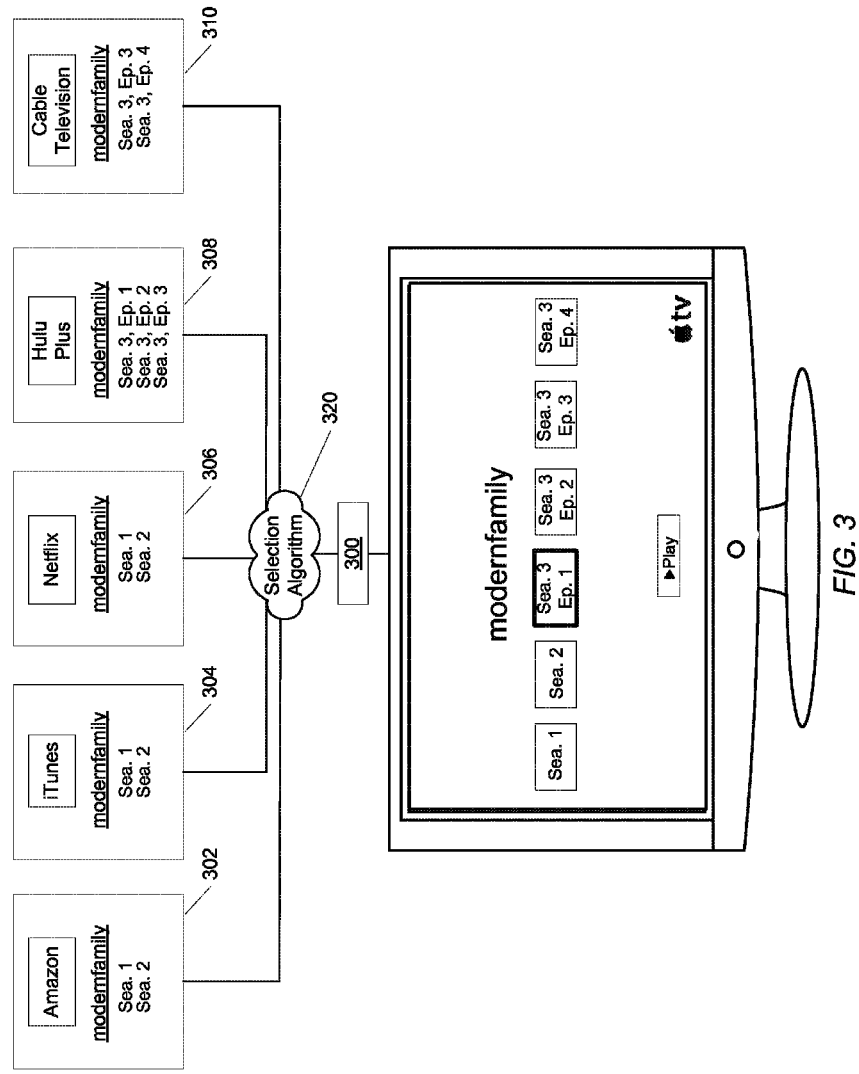
FIG. 3 depicts one embodiment of a video display and secondary sources.

FIG. 3 illustrates one embodiment in which a selection algorithm is used for determining what content is shown as available. Such an algorithm(s) may also be used to select particular content for display when multiple options are available. For example, as shown in FIG. 3, each of the services/providers (302, 204, 306, 308, 310) depict relevant content available corresponding to the modernfamily television series. As can be seen, there is significant duplication among the services in available content. As such, a selection algorithm 320 may be used to select from among the available content. Also, shown in this example is a set-top box 300 coupled to the television. In various embodiments, selection algorithm may include hardware and/or software based processes performed at a server(s) (now shown in FIG. 3), in the set-top box or television itself, at a content provider, or any combination thereof. For example, there may be multiple options available for the episode 1, season 3. This particular episode is available from both provider 308 and provider 310. In addition, each of these providers may have this particular episode available in high definition (HD), standard definition (SD). Other options may be available as well. Given the various options, selection of which to display as being available may be made. Alternatively, if selecting "play" by the viewer causes the episode to immediately begin playing automatically, then a selection algorithm may be needed to determine which is provided. Whichever option is selected, it will have been stored by the primary subscription service and provided by this primary subscription service (e.g., Apple TV) rather than one of the services/providers (302, 204, 306, 308, 310). Further details regarding the above mentioned selection algorithms will be discussed in greater detail below.

Figure 4:
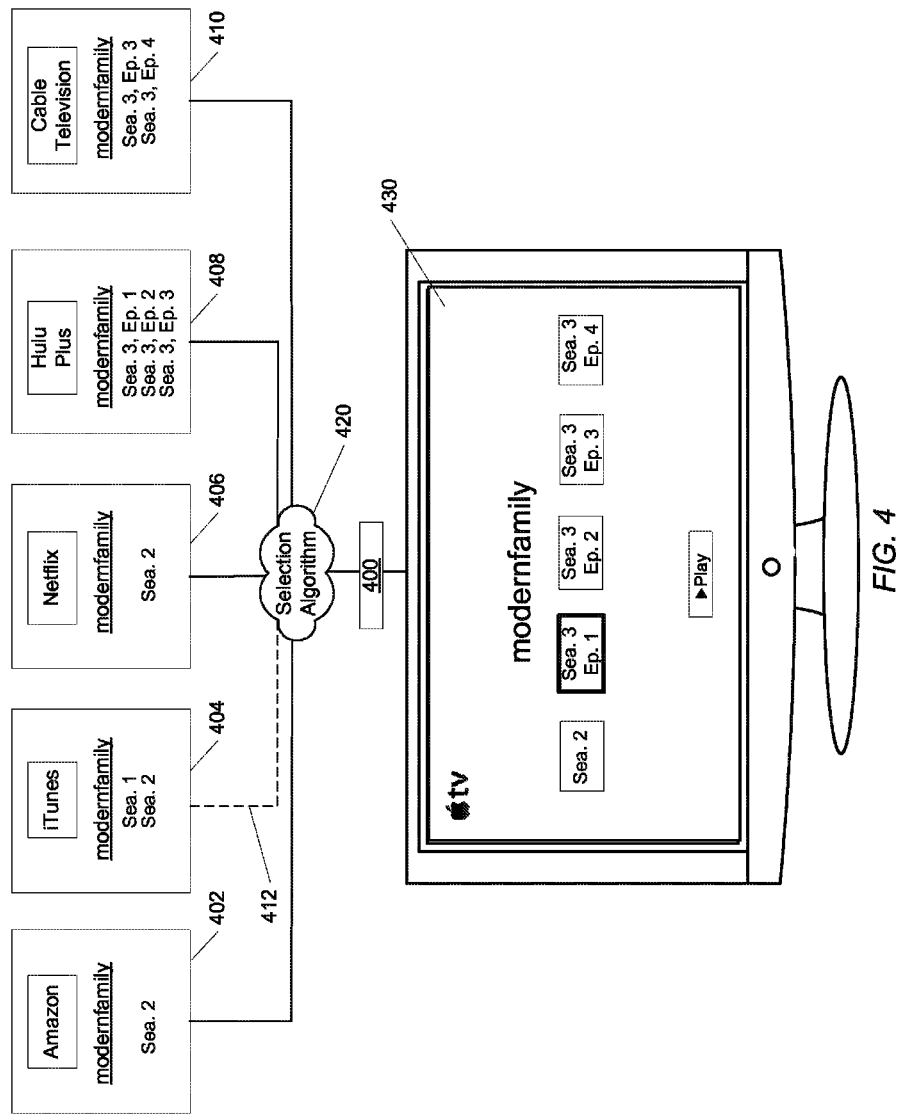
FIG. 4 depicts one embodiment of a video display and secondary sources.

In various embodiments, the content shown as being available in block 106 may also be based upon content that is available for viewing (irrespective of whether the viewer has a current subscription for the content), or content that is available based on the viewer's current subscription(s). The approach used to choose what is shown as being available may be programmable (e.g., based on user settings in a set-top box, based on a service provider's preferences, or otherwise) and may be a combination of the above approaches. FIG. 4 depicts an embodiment in which the content shown as being available is based on whether or not the viewer has a secondary subscription to an available service. In various embodiments, a viewer may be able to view and manage their various primary and secondary subscriptions using interfaces provided by the primary provider on the display. In the example shown in FIG. 4, providers 402-410, selection algorithm 420, set-top box 300 and display 430 are shown. Each of the providers 402-410 are shown coupled to the algorithm 420 by a line. In the embodiment shown, a line coupled from a provider 402-410 to the selection algorithm indicates that the primary subscription based service (Apple TV) provides content corresponding to the given provider (e.g., based on an agreement between the primary subscription service provider and the secondary subscription service provider). A solid line in this case is used to indicate that the viewer has a subscription to the corresponding provider/service and a dashed line indicates the viewer does not have a subscription to the provider/service.

Figure 5:
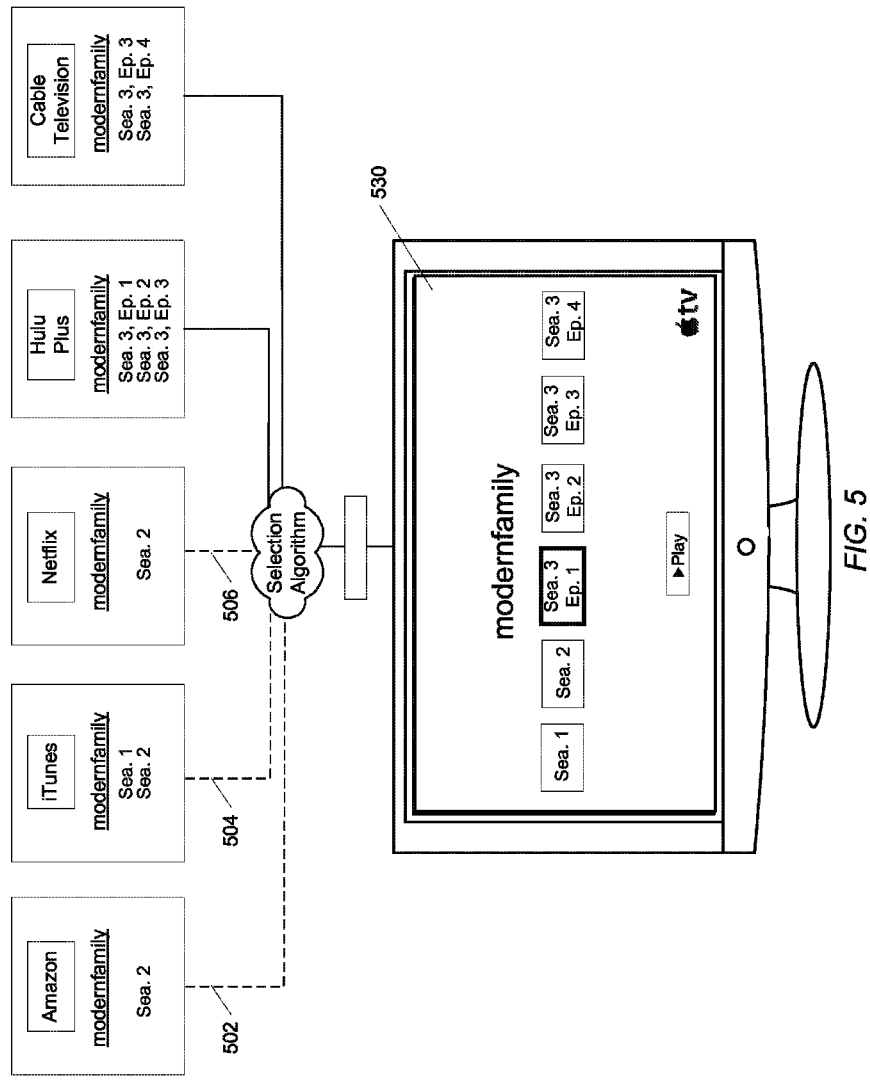
FIG. 5 depicts one embodiment of a video display and secondary sources.

As seen in FIG. 4, the iTunes service is the only provider of season 1 (Sea. 1) of the modernfamily television series. As shown by the dashed line 412, the viewer which corresponds to the subscription displayed on the display 430 does not have a currently valid subscription to this service. Consequently, season 1 (Sea. 1) does not show up as being available on the display 430. As an example, a viewer may not want content displayed when a subscription is not available in order to reduce the amount of content displayed. FIG. 5 illustrates the approach wherein content is shown to the viewer as being available irrespective of whether or not the viewer has a (secondary) subscription for the content. In the example of FIG. 5, lines 502, 504, and 506 show the viewer does not have a subscription to the Amazon, iTunes, or Netflix services. Nevertheless, all content is shown as being available to the viewer on the display 530. Having briefly described a television service with primary and secondary subscriptions, and the aggregation of all content by the primary subscription service, we now turn to a discussion of the system in general.

Figure 6:
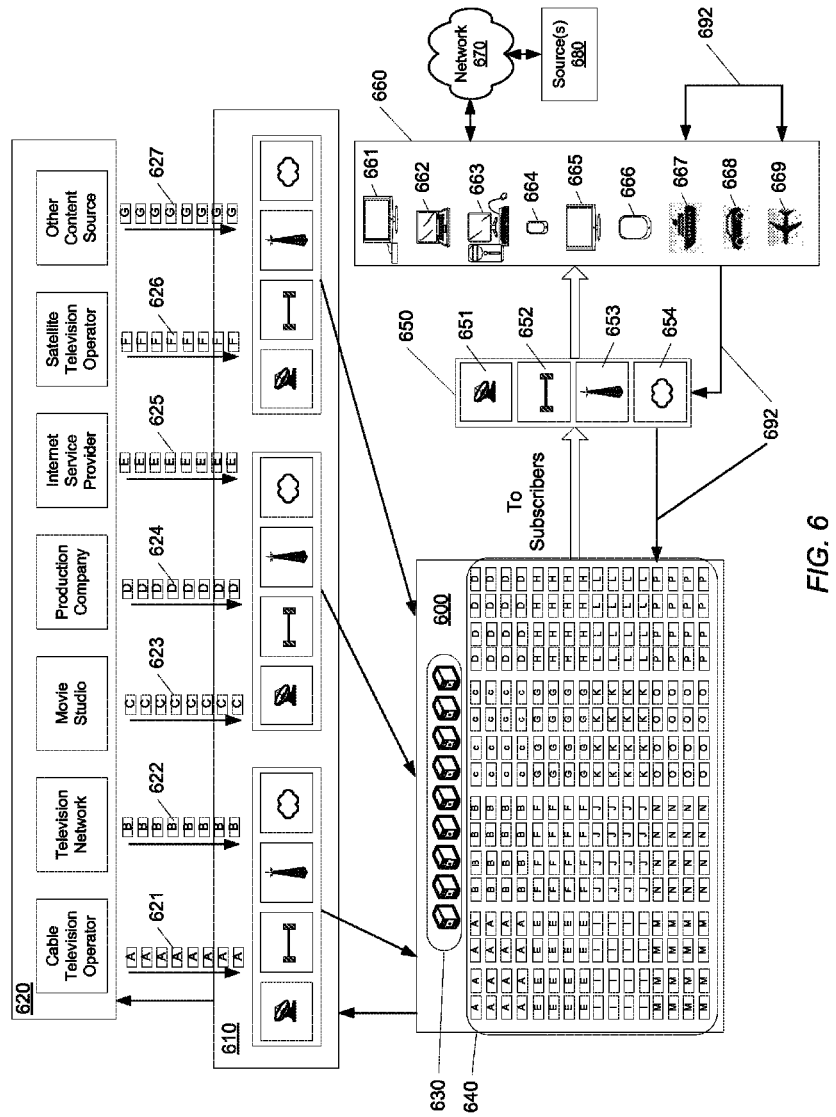
FIG. 6 depicts one embodiment of a portion of a television system.

FIG. 6 illustrates one embodiment of a system corresponding to the above description. In the embodiment shown, a "server farm" 600 is shown that includes a large number of servers 630 and an immense data store 640. In various embodiments, the server farm 600 corresponds to a cloud based service whereby content and services are delivered over a network such as the Internet. Also shown are multiple content providers 620 coupled to the server farm 600 via multiple communication pathways 610. In various embodiments, providers 620 may include subscription based providers which provide paid and/or free content. In various embodiments, the purchase of an application (app) may provide access to particular content. For example, the purchase of a major league baseball app may provide access to content related to major league baseball. In a sense, the purchase of the app effectively serves as a subscription. The application may then be executable (e.g., by the set-top box) to provide an enhanced viewing experience for baseball related viewing. Server farm 600 is also shown coupled to convey content to subscribers 660 via multiple pathways 650. Transmission pathways 650 may include satellite based transmission 651, cable based systems 652, terrestrial or broadband radio service (BRS) based systems 653, the Internet and/or other networks 654, a combination of these systems, or some other appropriate system of transmission. In the embodiment shown, providers 620 includes cable television operators, television networks, movie studios, production companies, Internet service providers, satellite television operators, and other providers/sources of content. In various embodiments, one or more of the providers 620 corresponds to a subscription based service whereby subscribers are entitled to gain access to video content.

Also shown in FIG. 6 is the conveyance of content 621-627 by each of the providers 620 via one or more pathways 610 to server farm 600. It is noted that while the term server farm—singular—is used, in various embodiments the server farm 600 is in fact multiple farms which are distributed as will be discussed shortly. Similar to pathways 650, pathways 610 may include any of a variety of transmission media and may include a variety of transmission protocols. Content 621-627 may generally include video content and related metadata which describes the content and/or other particular regarding the content. Such other particulars may include information regarding licensing related information, subscriber information, pricing information, or otherwise. For ease of illustration, the content 621-627 is shown with a corresponding designation A-G which serves to indicate the content corresponds to a given provider. For example, content 621 which is conveyed by a Cable Television Operator includes the designation "A". Corresponding data within the server farm 600 data store 640 includes the designation "A" as well. In various embodiments, designation "A" for data within data store 640 may serve to indicate that a subscription to the Cable Television Operator includes access to this data. It is noted that such designations for use in relation to data within the data store 640 will form part of the metadata maintained by the server farm 600. While content within the data store 640 is shown with a given designation for ease of illustration, in various embodiments particular data in the data farm 600 may be associated with multiple providers 620 and multiple subscriptions. Accordingly, particular content such as an episode of a television show would be associated with multiple providers 620 and metadata maintained by the server farm 600 would indicate as much. Therefore, while the illustration of FIG. 6 may depict content as being segregated by provider or subscription (A-P), in various embodiments such segregation or identification is merely logical based on metadata. In various embodiments, data storage reduction techniques such as deduplication and single instance storage will be used for the data store 640.

While the previous figures have discussed the television system in terms of conveying content for display on a television. As shown in FIG. 6, the target 660 of video content conveyed by server farm 600 may be any of various different types of targets. Exemplary targets 660 shown in FIG. 6 included a set-top box coupled to a television 661, a laptop computer 662, a desktop computer 663, a smart phone, cellular phone, wearable portable device (e.g., a wristwatch type display), other handheld mobile device 664, a television, a tablet computer, a cruise ship for distribution as part of an on-board video system, an automobile (e.g., for display on an integrated video screen), or aircraft for individual distribution to passengers or broader distribution as part of an on-board video system. Other targets capable of displaying video content are possible and are contemplated.

FIG. 6 also illustrates that targets 660 may communicate with server farm 600 via paths 692. Such communication may include requests for video content, receiving device performance related information, viewer profile related information, or otherwise. Also shown is a communication path 692 that illustrates target devices may communicate with other target devices. Such communication may be peer-to-peer based type communication or otherwise. FIG. 6 also shows targets 660 coupled via a network 670 couple to other sources 680. These other sources 680 may provide access to other sources of video content, Internet based content, or content directly provided by one or more of providers 620.

As discussed above, in various embodiments a viewer may have a primary subscription and one or more second subscriptions. For example, in FIG. 6 a viewer corresponding to one of the targets 660 may have a primary subscription to Apple TV which in the example shown corresponds to server 600 and related operations. In such an embodiment, the primary subscription may be based on monthly fee, annual fee, or other periodic fee. Alternatively, the primary subscription may be based on the purchase of a set-top box or television with integrated components to support the primary subscription service. Still further, the primary subscription may be based on a combination of a periodic fee, the purchase of equipment, per item purchases, and/or otherwise. Whichever approach is used in a given case for the subscription, the primary subscription generally provides access by the viewer to content maintained within the server farm of the primary subscription service provider (e.g., Apple TV). While content available to the viewer is maintained and provided by the primary subscription service provider, which content is available to the viewer according to the primary subscription is based upon one or more secondary subscriptions of the viewer.

As an example, a viewer may have a cable television subscription (secondary subscription). In addition, the viewer may have a subscription to Apple TV (e.g., the service provider associated with server farm 600). The cable television operator (e.g., as shown as a provider 620) broadcasts video content, such as live television and video-on-demand content, 24 hours a day. Server farm 600 is configured to record and/or otherwise capture all content broadcast/provided by the cable television operator and store the content as part of the data store 640. For example, data designated "A" in data store 640 may represent video content broadcast and/or otherwise provided or available from the cable television operator. Given the viewer's secondary subscription to the cable television operator service, the viewer's primary subscription to Apple TV (server farm 600) entitles the viewer to access all of the content in the data store 640 that corresponds to the cable operator. Consequently, the viewer may view live television broadcasts of the cable television operator which are provided by the server farm 600 rather than the cable television operator. Additionally, as the server farm 600 is constantly recording/gathering all of the cable operator content, the viewer may have access to content which was broadcast by the cable television operator a week ago, a month ago, or even a year ago, depending on how long the server farm maintains the data and has rights to convey the data.

In various embodiments, the server farm 600 is in principle generally configured to record all video data everywhere all of the time. In other words, the server farm 600 operator may seek to store all video content available for viewing globally. Such an approach may include storing all previously available video content anywhere in the world and continuously recording all newly available video content. Acquisition of video content may generally necessitate license agreements with various copyright holders and providers. As noted earlier, particular content which has been acquired and resides in the server farm 600 may be associated with multiple providers. However, while multiple providers may provide subscribers access to particular video content, it generally will not be the case that the server farm 600 operator will need agreements with all such providers in order to acquire the content. Rather, in most cases, video content will have been acquired and stored as part of the content 640. The server farm 600 operator will then form agreements with providers 620 which will entitle subscribers with primary subscriptions to the server farm service 600 and a given secondary subscription to another service 620 to access secondary subscription available content from the server farm 600. Depending on a viewer's secondary subscriptions, content within the server farm 600 that is accessible to the viewer will vary. In various embodiments, rather than subscribing to all of a secondary provider's content, viewers may be able to subscribe to a subset of the content offered by a secondary provider. For example, a viewer may subscribe to only a particular network, a particular television series, a particular night of the week (e.g., the Thursday night lineup), subscribe according to varying durations (e.g., just the next two weeks), and so on. Numerous such alternatives are possible and are contemplated.

Figure 7:
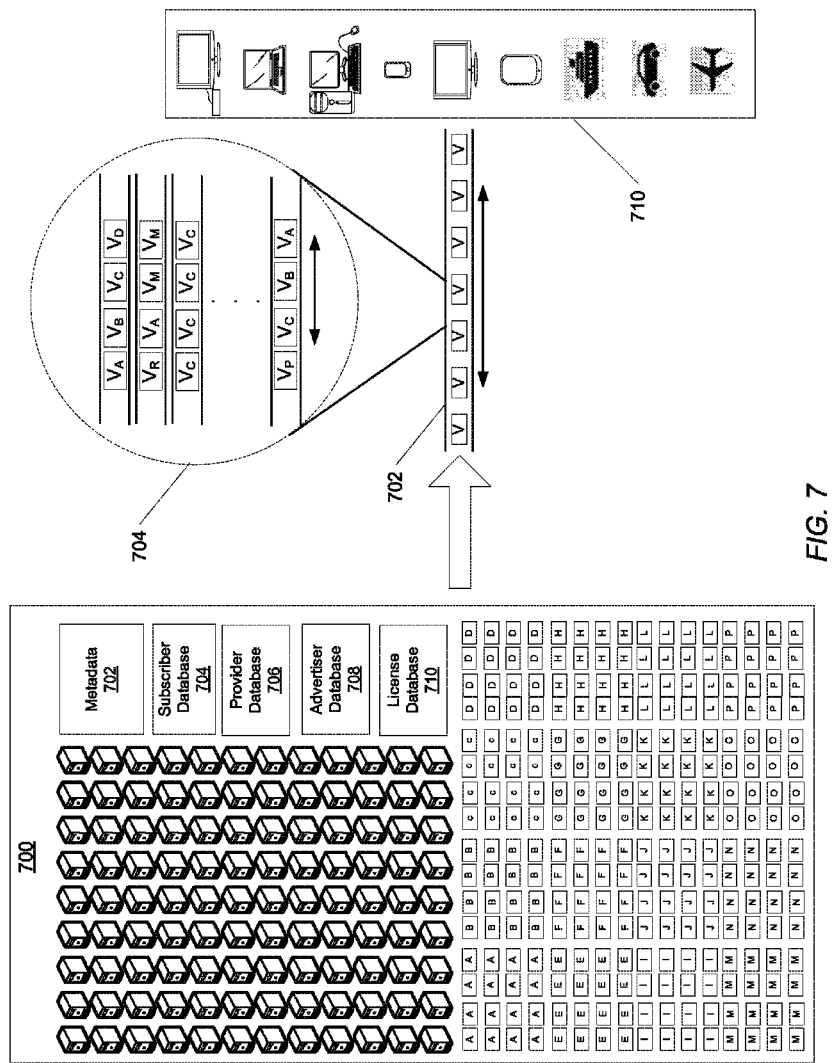
FIG. 7 depicts one embodiment of a portion of a television system.

While the embodiment of FIG. 6 contemplates a primary subscription provider and multiple secondary subscription providers 620, the viewing experience provided to the viewer is generally managed solely by the primary subscription provider. FIG. 7 illustrates a primary subscription based server farm 700 coupled to provide video content to targets 710. As previously discussed, server farm 700 stores data associated with multiple secondary subscription providers. By having a suitable secondary subscription, a viewer gains access to data in the server farm 600 that represents data also provided by the secondary subscription provider. However, the secondary subscription provider does not provide the content to the viewer. Rather, the content is provided by the primary subscription provider. In some embodiments, the viewer may be able to receive content from a secondary provider. In some embodiments, responsive to a purchase by a viewer, the primary provider may obtain content from the secondary provider (assuming the primary provider does not already have the content) and convey/forward the content to the viewer. Conveying/forwarding the content in such a case may include reformatting and/or modifying associated metadata to conform to the primary provider's system requirements.

Additionally, the video environment within which the video content is provided (e.g., via a set-top box provided by the primary subscription provider, etc.) is controlled by the primary subscription provider. Such an approach eliminates or minimizes the viewer's need to navigate or otherwise deal with disparate secondary provider environments. To further enhance the viewer's experience, complications associated with managing secondary subscriptions may be managed through the primary subscription. For example, the primary subscription provider may identify content available to a viewer via a secondary subscription. Should the viewer wish to subscribe to the secondary provider, this may be done through the primary subscription service and may even be billed as part of the primary subscription service billing. This may be accomplished via the primary subscription service interface using a consistent visual/graphical and approach. In such a manner, the system provides the viewer with a consistent interface and viewing experience.

As illustrated in FIG. 7, server farm 700 includes multiple databases configured to store data associated with the stored video content. These databases include metadata 702, subscriber databases 704, provider databases 706, advertiser databases 708, and license databases 710. Metadata 702 may generally include data that identifies the nature of video content—type, size, title, duration, cast, secondary providers, etc. Subscriber databases 704 may include information regarding primary subscriptions and perhaps secondary subscriptions. Provider databases 706 may include information regarding secondary subscription providers. Advertiser databases 708 may include information regarding advertisers, advertisements, and corresponding agreements. License databases 708 may include license data related to stored content. It is noted that these databases are exemplary only. Numerous other and/or alternative databases may be maintained. As shown, server farm 700 conveys video data to targets 710 via a path 702. As depicted, the video content and associated metadata along path is conveyed in a manner to provide a consistent viewing experience—visually illustrated as "V"—which generally seeks to eliminate viewing experience differences generally associated with different video content providers. View 704 illustrates that differences associated with the video content regarding secondary subscriptions or otherwise are subjugated (e.g., identified via the metadata) to the larger viewing presentation. In this manner, viewers can access all content they are entitled to according to secondary subscriptions with one or more providers from a single provider via a single provider interface. Additionally, as all content is stored—the viewer may access content which was at one time provide by the secondary provider but is no longer provided by that provider. In various embodiments, the viewing experience is controlled by the primary provider by providing the hardware and/or software with which subscribers access the video content, or by controlling specifications of the hardware and/or software used by the subscribers.

Figure 8:
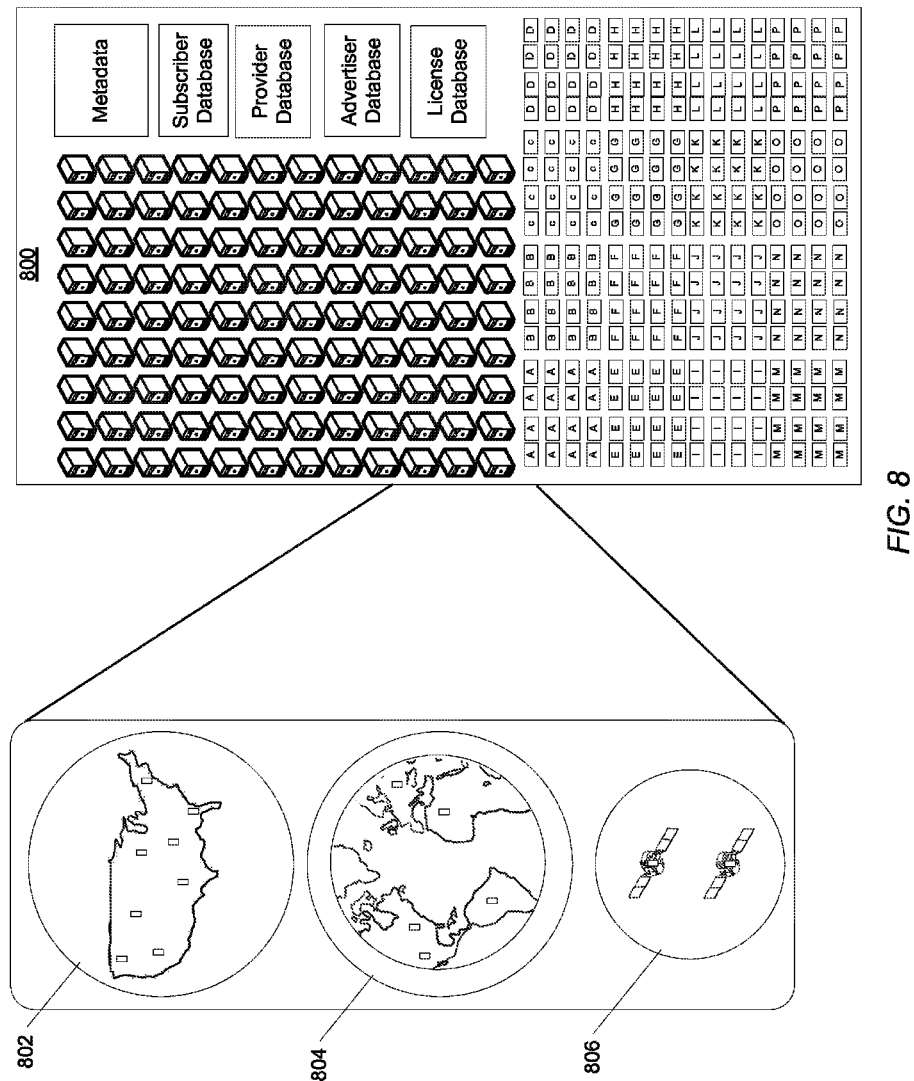
FIG. 8 depicts one embodiment of the distribution of video server farm.

Turning now to FIG. 8, one embodiment of a server farm 800 as previously discussed is shown. Generally speaking, server farm 800 is distributed throughout a particular geographic region 802, strategically distributed throughout the globe 804, and may also include distributed portions in satellite based systems. In this manner, data may be served to particular regions throughout the globe in a relatively efficient manner compared to having one or only a small number of server sites.

Figure 9:
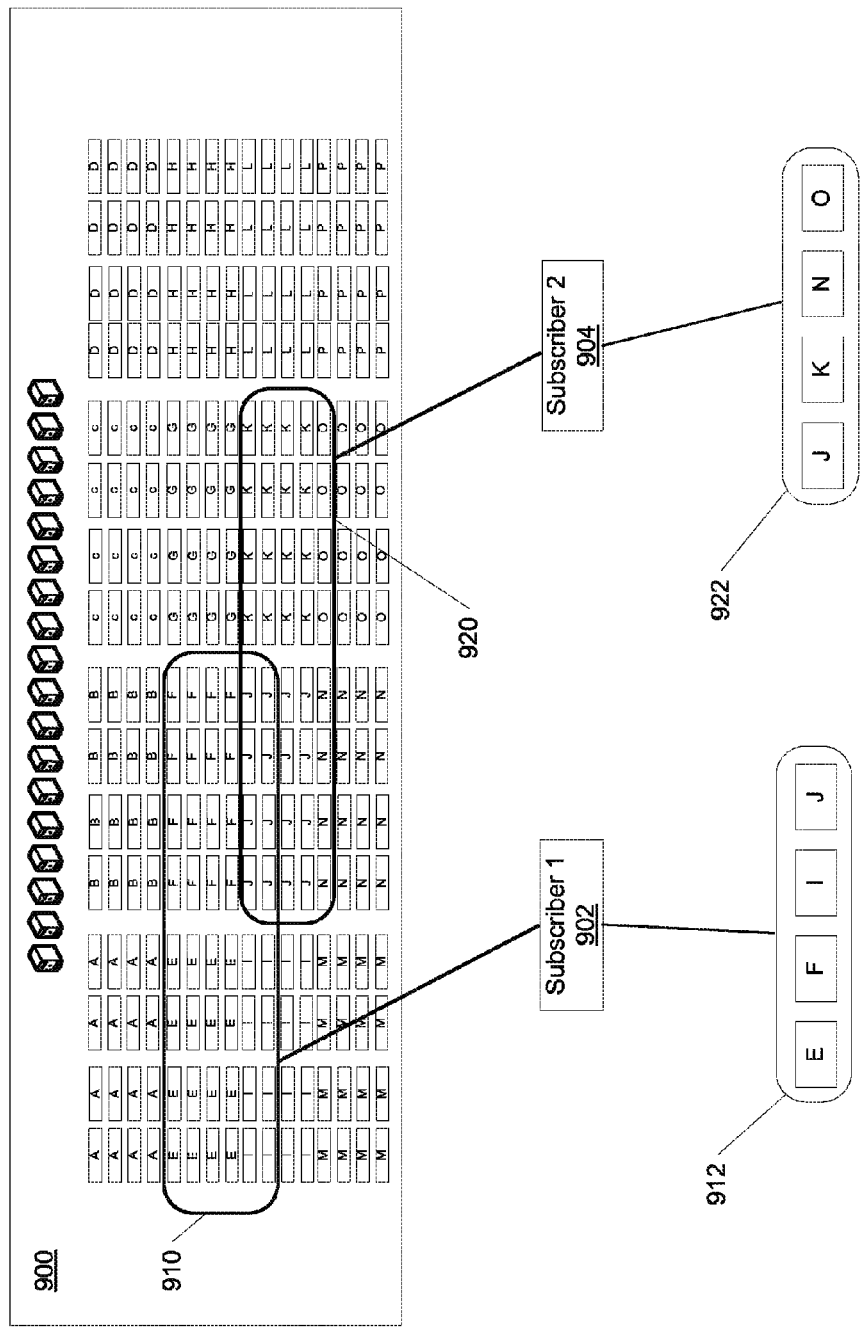
FIG. 9 depicts one embodiment of subscribers and video content.

Generally speaking in the prior art, a television subscription, such as a cable television subscription, is associated with one or more particular devices (set-top boxes). Such devices are uniquely identified by the cable television operator and communication is established with the device which enables the device to receive programming from the cable operator. In contrast, in various embodiments, primary subscriptions as described herein may be associated with particular subscribers rather than particular devices. Given such an approach, the subscriber's content may follow the subscriber wherever they may go. The following discussion illustrates these features. FIG. 9 depicts server farm 900 including video content that corresponds to multiple secondary subscriptions/providers. A first subscriber 902 has four secondary subscriptions 912 E, F, I and J. This entitles subscriber 1 902 access (e.g., viewing privileges) to the E, F, I and J content 910 stored as part of the content associated with farm 900. A second subscriber, subscriber 2 904, has secondary subscriptions 922 J, K, N and O. This entitles subscriber 2 904 access to the J, K, N and O content 920 stored as part of the content associated with farm 900. In this example, both subscribers have secondary subscriptions providing access to the content J.

Figure 10:
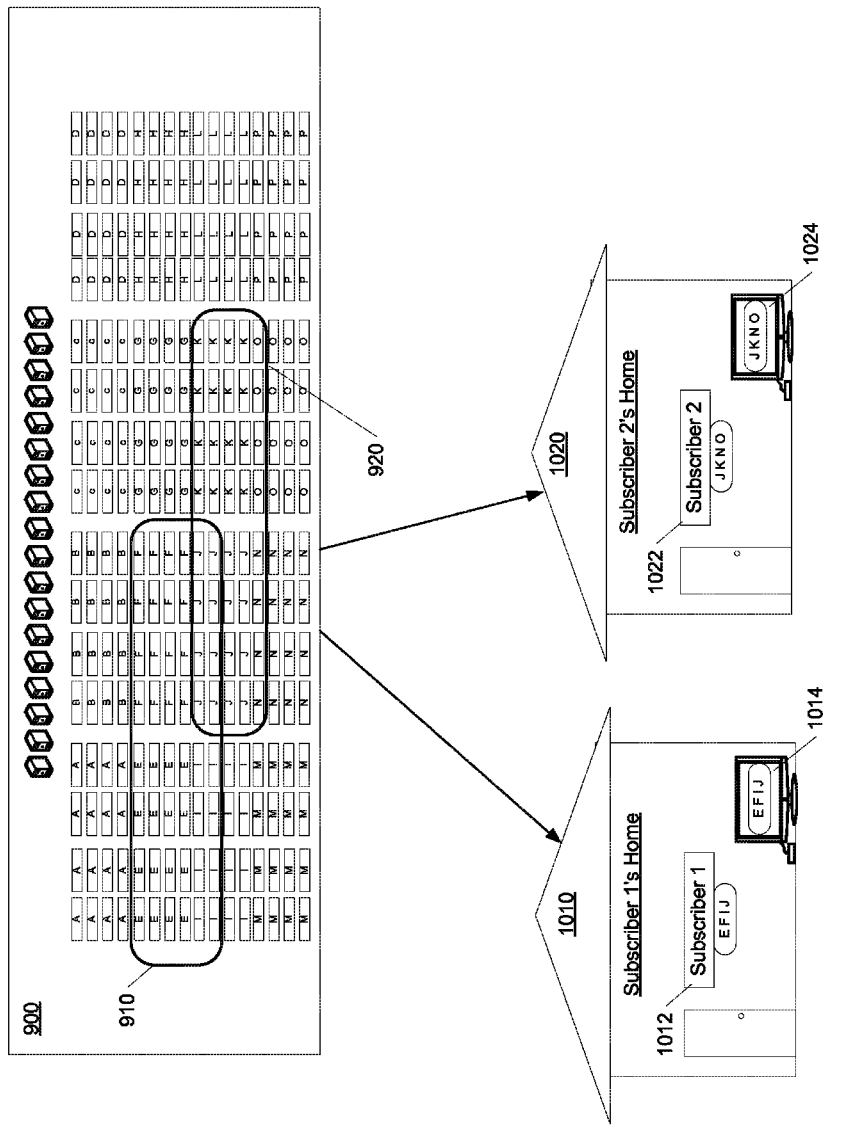
FIG. 10 depicts one embodiment of subscribers and video content.
Figure 11:
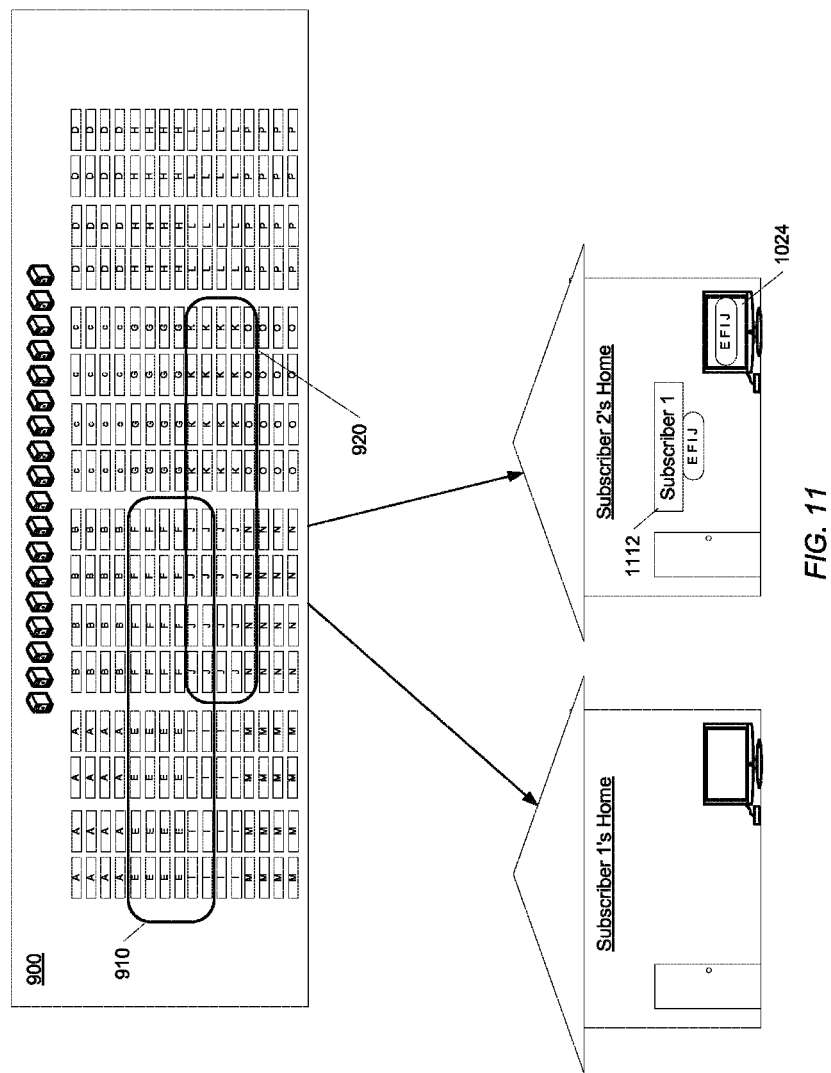
FIG. 11 depicts one embodiment of subscribers and video content.

Turning to FIG. 10, the homes of subscriber 1 1010 and the home of subscriber 2 102 are shown. Subscriber 1 1012 is shown to be present in the home 1010, and subscriber 2 1022 is shown to be present in home 1022. Subscriber 1 1012 is shown to have access to content E, F, I and J and the corresponding content is viewable on the television 1014. Subscriber 2 1022 is shown to have access to content J, K, N and O, and the corresponding content is viewable on the television 1024. FIG. 11 illustrates subscriber 1 1112 has now moved to subscriber 2's home. As subscriber 1's primary subscription is associated with subscriber 1 and is not viewable on a specific device, subscriber 1's content E, F, I and J is viewable in subscriber 2's home television 1024. Various embodiments for how subscriber 1's subscription follows the subscriber in this manner are contemplated. In one embodiment, subscriber 1's use of a remote control device in subscriber 2's home is recognized by the remote control and/or other video content display devices. For example, the remote control used with a set-top box may include biometric recognition capability to recognize a fingerprint, voice, or other characteristic of the person using the remote control. This biometric data could then be communicated to the set-top box and conveyed to the primary subscription provider for analysis. Identification of a particular subscriber may cause conveyance of particular codes or entitlement data to the set-top box which then enables it to receive subscriber 1's content.

In other embodiments, password or other login type information may be entered via a remote control device. Authorization may result in codes or entitlement data being conveyed similar to that discussed above. Still further, in other embodiments, subscribers may have particular mobile devices associated with their subscription. For example, a subscriber's smart phone may be associated with the subscription. In some cases, the smart phone itself may itself be authorized to receive and display subscription based video content. Additionally, the smart phone may be useable as a remote control for a television system. In such an embodiment, the smart phone may be configured to communicate with a television, set-top box, or other video system component. Based on such communication, the set-top box or other device may convey the smart phone data to the primary subscription service provider. If the smart phone is identified as being associated with a valid subscription, then entitlement/authorization type data may be conveyed to the set-top, television, or otherwise, which enables it to receive subscriber 1's subscription based content. Such embodiments would enable the viewing of one's own subscription content at a friend's house. Alternatively, subscription content could follow a subscriber to a hotel room during travel. Numerous such scenarios are possible and are contemplated.

Figure 12:
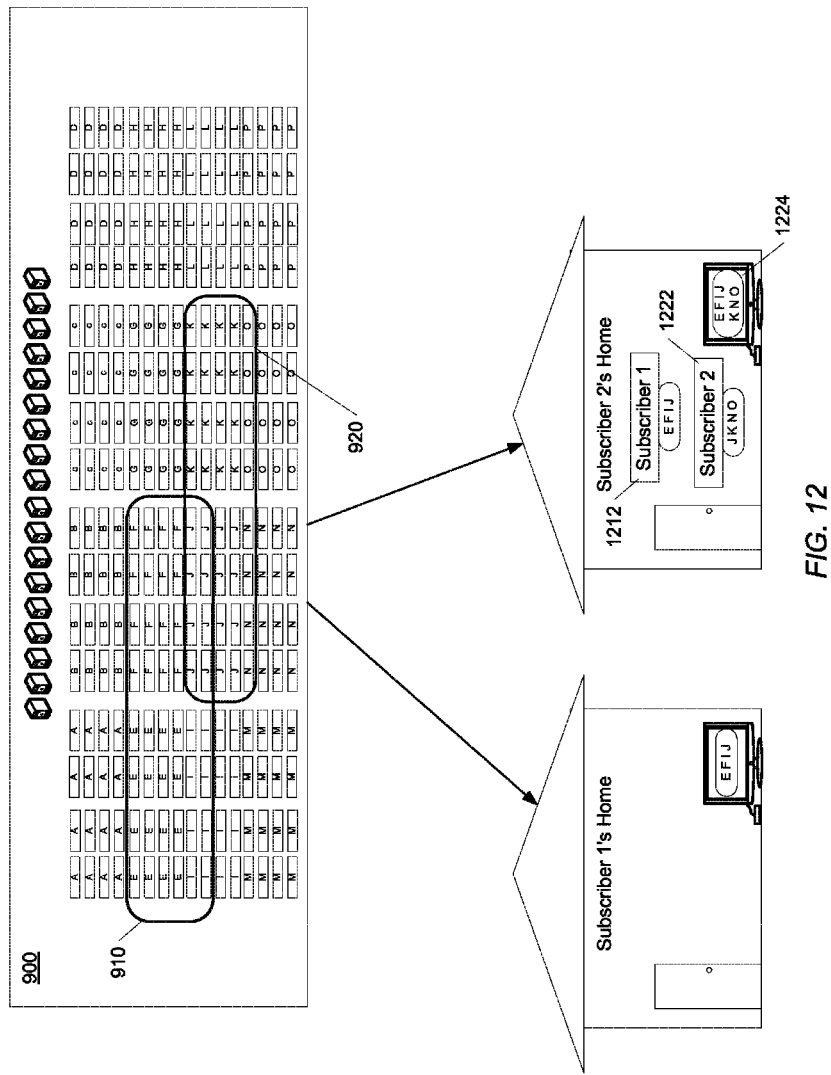
FIG. 12 depicts one embodiment of subscribers and video content.

FIG. 12 illustrates an embodiment in which subscription content for both subscriber 1 1212 and subscriber 2 1222 is concurrently available on the television 1224 in subscriber 2's home. In such an embodiment, a device such as a set-top box detects the presence of both subscribers and authorizes access to their combined content. In various embodiments, such as the smart phone embodiment described above, the detection and identification of the smart phone triggers the authorization mechanism for the subscriber content. In such an embodiment, the smart phone may have a setting which enables or disables the mechanism. For example, in one embodiment the mechanism may be enabled and have a broadcast mode in which the subscriber needn't take any action to cause the authorization to take place. The mere presence, such as walking in to the home, results in the set-top box being authorized to receive the subscription based content. In such an embodiment, simply walking into a neighbor's home may results in the same authorization. If such authorization is not desired, then the smart phone (or other mobile device) may have a setting which disables the automatic authorization mechanism.

In some embodiments, the feature of having a subscriber's content follow the subscriber and be displayed on another device (e.g., a friend's television or a hotel room television) may be a feature that is provided at an additional cost (e.g., a small monthly fee). Additionally, such a feature (which may be referred to as a "follow me" mode) may be enabled or disabled. For example, in some embodiments, when subscription content follows a subscriber to another location where it is then viewed, that content is not simultaneously viewable in the subscriber's home. In various embodiments, such a mode may be controllable by both a set-top box in the subscriber's home as well as by the subscriber while not at home. If desired, primacy be given to the set-top box at home. In this manner, content may follow the subscriber away from home, but when someone at the home wishes to access particular subscription based content it is permitted and the follow me mode is temporarily disabled. Numerous such alternatives are possible and are contemplated.

Figure 13:
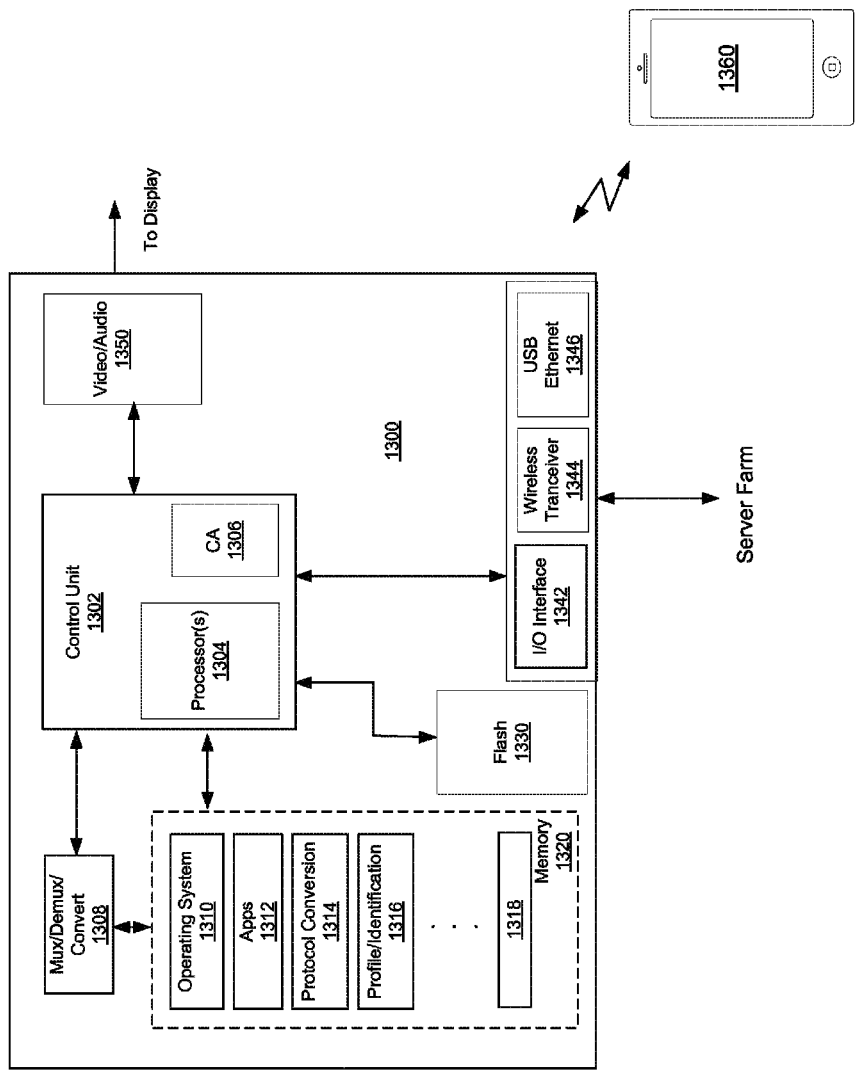
FIG. 13 depicts one embodiment of a receiver and mobile device.

Turning now to FIG. 13, a general block diagram illustrating one embodiment of a set-top box 1300 and mobile device 1360 is shown. Set-top box 1300 is shown to include a control unit 1302 including processor(s) 1304 and conditional access (CA) type unit 1306. Set-top box 1300 includes memory 1320, persistent memory (Flash) 1330, I/O interfaces 1342, wireless transceiver 1344 configured to support WiFi, Bluetooth, or any other wireless communication protocol, and USB and Ethernet interfaces 1346. A mux/demux/convert unit is included which may be configured to receive, demultiplex, and convert the formats of receive signals. A video/audio unit 1350 is included to convey audio and video data to a display device. Such audio and video data includes audio/video content received by the set-top box and also includes any overlays or other graphic elements generated by the set-top box 1300. Also included are operating system components 1310, applications (apps) 1312 executable by the processor(s) 1304, components 1314 for use in converting between communication protocols, viewer profile/identification 1316 related components, and any other 1318 suitable components. In various embodiments, the set-top box has no tuners in the conventional sense. In other words, the set-top box has no QAM or ATSC tuners. Rather, in various embodiments, the set-top box receives video content via a network interface such as an interface coupled to the Internet.

In various embodiments, set-top box does not include mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, set-top box is generally configured for video streaming and not video storage. Other embodiments could include or provide access to local mass storage. Mobile device 1360 may be a dedicated remote control device, smart phone, or other device that is configured to communicate with the set-top box 1300. As discussed above, in various embodiments the device 1360 may be identifiable as being associated with a subscriber. Responsive to such identification (e.g., using identification component 1316 and communication with a subscription service), the set-top box may be authorized to receive subscriber content. In other embodiments, biometric data may be entered to the device 1360 (e.g., a fingerprint or voice sample) which is then used for authentication/authorization. Various such embodiments are possible and are contemplated as per the discussion above.

Figure 14:
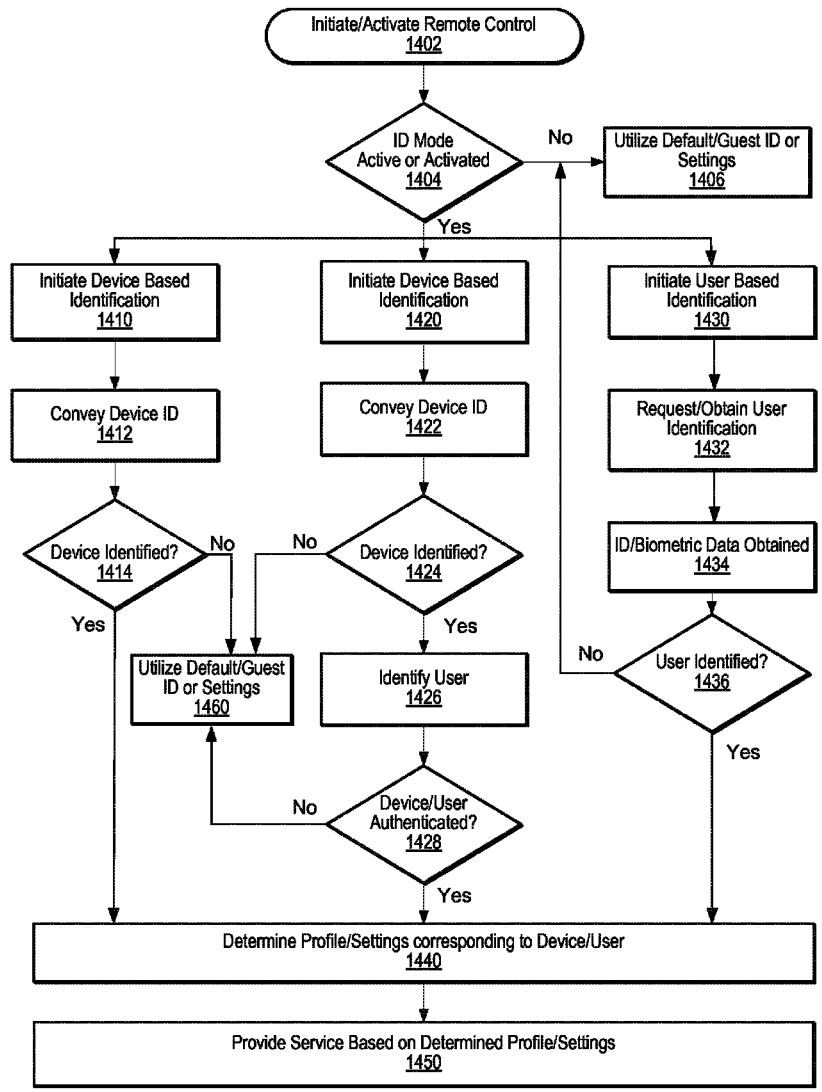
FIG. 14 depicts one embodiment of a method for identifying a subscriber.

FIG. 14 illustrates one embodiment of a method for use in identifying a subscriber and authorizing the receipt of subscriber content at a particular device. In the method shown, a remote control or other handheld device is used to initiate or activate the procedure (block 1402). In various embodiments, such activation may be initiated by starting a particular app on a smart phone, detecting movement of a remote control via an accelerometer or similar device, pushing a button on a remote control, detecting a finger resting on a touch pad of a remote control, and so on. In an embodiment in which the identification mode may be enabled and disabled, if the mode is disabled (decision block 1404), default settings or guest ID type settings (1406) may be used for the set-top box, television, or other associated video display device. For example, by default a set-top box may be configurable by a viewer to display particular content (for example, content that corresponds to the owner of the home in which the set-top box is located). If ID mode is activated (decision block 1404), the an identification/authorization procedure is initiated. For ease of discussion, three different embodiments are illustrated in FIG. 14. Block 1410 corresponds to an embodiments in which identification is based on the mobile device being used to communication with the set-top box (e.g., the smart phone based example described above). A second embodiment proceeds with block 1430 is represents a biometric or other approach that is not based on the particular mobile device being used. Finally, a third embodiment begins with block 1420 which represents a combination of device and user identification. Depending on the embodiment, one of these three paths will be chosen. In various embodiments, only one such path/embodiment is available. In other embodiments, multiple such paths/embodiments are available and may be selected as a preferred method by configuring the set-top box or other receiving device accordingly.

Beginning with block 410, device based identification is initiated. In this embodiment, an identification of the mobile device 1412 is received by the set-top box from the mobile device. While a set-top box is described as the receiving device for purposes of discussion, it is to be understood that the receiving device may be a television with supporting circuitry, a game console with supporting circuitry, or otherwise. Having received the device identifier, an effort to identify the device is undertaken (decision block 1414). Such identification may include communication with the subscription provider which accesses a subscriber database or otherwise to determine if the mobile device is associated with a subscription. In other embodiments, the set-top box may store device identifiers for a certain period of time (e.g., 24 hours) with associated authorization information. In such an embodiment, re-authorization would only be needed once per day or according to some other time interval. In such embodiments, the subscription provider may be able to invalidate such set-top box data at will in order to require re-authorization. If the device is not successfully identified, then default or guest settings 1450 may be used. If the device is successfully identified and it is associated with a valid subscription, then settings that correspond to the subscription may be obtained (e.g., settings for the set-top box environment, settings for the particular user, etc.) (block 1410), and access to the subscription based content is authorized (block 1450).

Alternatively, the path may begin with block 1430 where user based authentication is initiated. In such an embodiment, user identification may be requested by the remote control/mobile device (block 1432). In response, a viewer provides biometric or login type data (block 1432). If the user identification is successful (block 1436), then the method continues with block 1440. Otherwise, default or guest settings may be used (block 1406). User identification may include a process similar to that described in association with block 1414.

Finally, the third approach begins with block 1420 where device based identification is initiated. In this embodiment, the device is first identified (blocks 1422 and 1424). If the device is successfully identified, then an attempt to identify the user is made (block 1426). This may be used to verify that the remote control/mobile device is being used by the rightful owner or otherwise expected user. If both the device and user are properly identified as corresponding to a valid subscription (decision block 1428), then the method proceeds with block 1440. Otherwise, default or guest settings may be used (block 1406). In each of the embodiments, default settings may be configurable and may include disabling access completely, conveying a communication (email, text message, etc.) that indicates the failed attempt, or otherwise.

Figure 15:
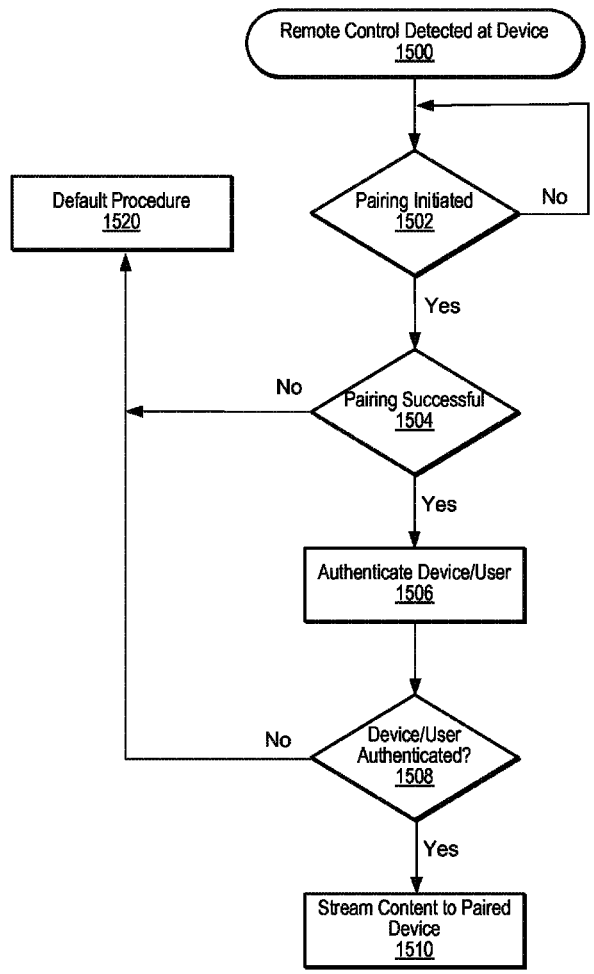
FIG. 15 depicts one embodiment of a method for pairing a television and mobile device.

Turning now to FIG. 15, one embodiment of a method for pairing a remote control or other mobile device with a set-top box or other video display device is shown. In various embodiments, a remote control or other device may use Bluetooth or any other suitable wireless communication protocol to establish communication with a set-top box or other device. In the example shown, a remote control device is detected (block 1500). This detection may be pursuant to an explicitly initiated detection procedure, or could be based on a constant broadcast and detection mechanism. Responsive to detecting a device, a pairing attempt may be initiated (decision block 1502). If pairing of the remote control with the set-top box is successful (decision block 1504), then device and/or user authentication is initiated (block 1506). This authentication may correspond to the various embodiments discussed in relation to FIG. 14. If authentication is successful (decision block 1508), then streaming of the subscription based content to the paired device (e.g., set-top box) is authorized. If authentication is not successful (decision block 1508), then a default procedure may be used (block 1520). This default procedure may include disabling access to the set-top box, using default or guest settings, or any other procedure deemed suitable.

Figure 16:
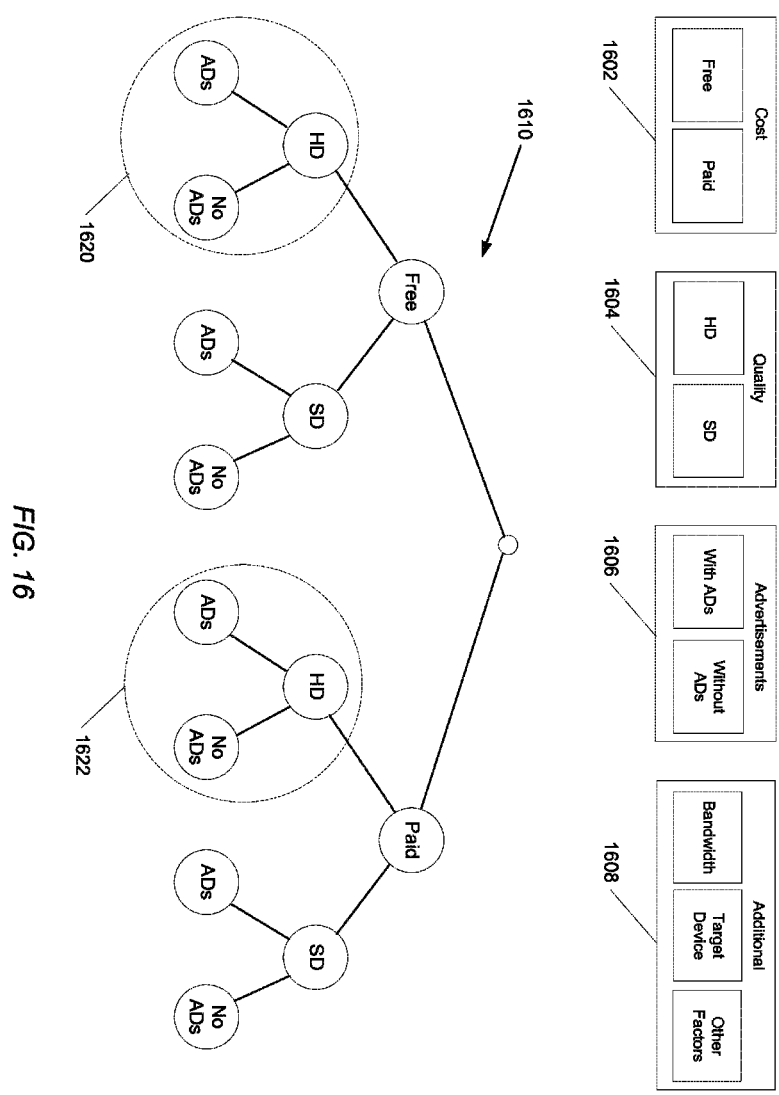
FIG. 16 depicts one embodiment of a video display.

As discussed above, the primary provider will generally have a great deal of content available for viewing by a given subscriber. The content that is available may be determined in part based on secondary subscriptions of the viewer. As noted, there may be duplication among the secondary subscriptions and/or primary subscription as to available content. Additionally, particular content may be available in many forms. FIG. 16 illustrates some of the various forms that content may take.

In the example shown, content may differ as to cost 1602 (viewable for free or viewable for payment of a fee) and quality (HD or SD) 1604. In addition, presentation of content may include presentation with advertisements (ADs) or without ADs 1606. With only these variables, given content may correspond to one of eight different forms/presentations as shown by the tree 1610. In this case, the eight possibilities are:

1. Free, HD, with ADs
2. Free, HD, without ADs
3. Free, SD, with ADs
4. Free, SD, without ADs
5. Paid, HD, with ADs
6. Paid, HD, without ADs
7. Paid, SD, with ADs
8. Paid, SD, without ADs Given these possibilities, a viewer may have various preferences regarding how the given content is prioritized when either being presented as being available or when being selected for viewing. For example, a viewer may give a higher priority to free content over paid content. Also, HD content may be given priority over SD content, and so on. Using such preferences, selections from available content may be made for presentation to the viewer or when particular content is selected for viewing. In addition to such preferences, additional factors 1608 may be used to determine which content is provided to a viewer. For example, bandwidth considerations may affect the selection of content. If it is determined that the bandwidth to the viewer's device is limited, HD content may be disfavored (at least temporarily) until the condition eases. In such a case, the options indicated by 1620 and 1622 in FIG. 16 may be eliminated. Additionally, a viewer's preferences may generally indicate a preference for HD content. However, on a particular occasion, the viewer's target device may have a very small display which may not generally reveal significant differences between SD and HD content. In such a case, SD may be preferentially conveyed.

Figure 17:
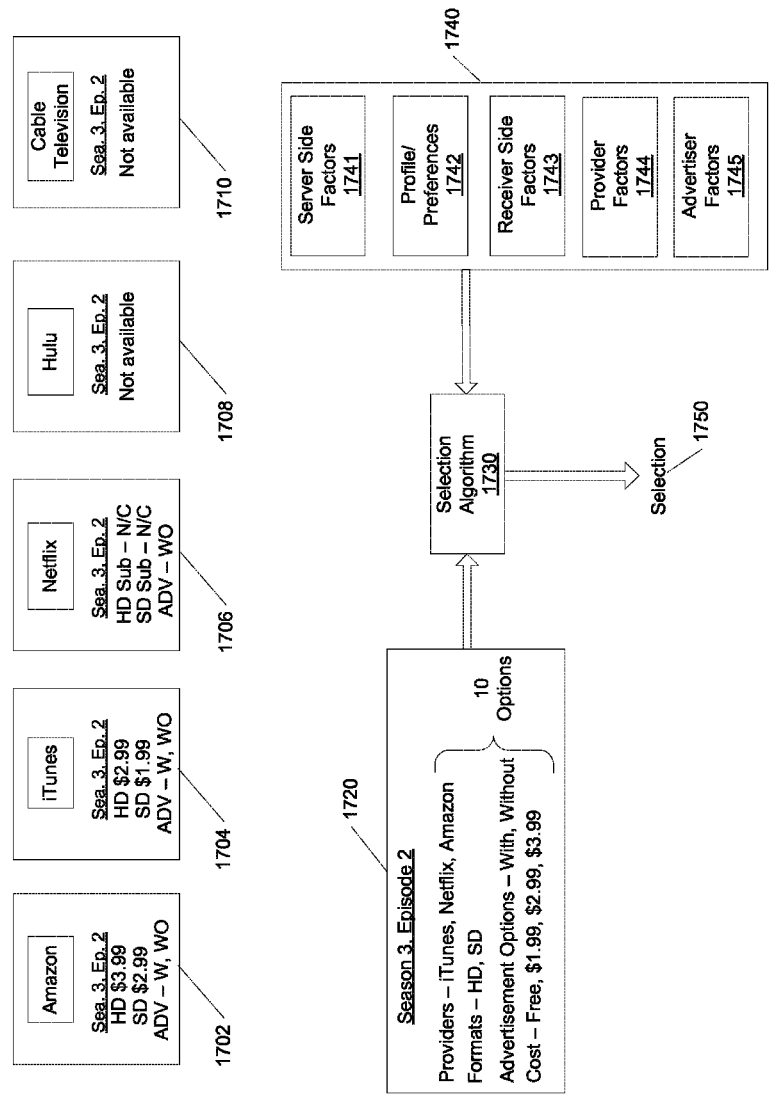
FIG. 17 depicts one embodiment of a video display.

FIG. 17 depicts one embodiment in which multiple options for content are available. In the example shown, five secondary providers 1702, 1704, 1706, 1708 and 1710 are shown. The particular content in question is Season 3, Episode 2 of a given series. For this given episode, box 1720 shows there are 10 different selections available. There are three secondary providers of the particular content available—iTunes, Netflix, and Amazon. The content is available in both HD and SD. The content is available for free (Netflix subscription—no additional charge N/C), at a cost of $1.99, $2.99, and $3.99. Finally, the content is available with or without advertisements. All 10 options serve as input to a selection algorithm 1730. Also serving as input to the selection algorithm are server side factors 1741, viewer profile/preferences 1742, receiver side factors 1743, provider factors 1744, and advertiser factors 1745 (collectively factors 1740). Viewer profile/preferences 1742 may include information based on a viewer's viewing habits and activities, explicitly entered viewer preferences or information, profile and/or preference information related to other viewers, or any combination of these. Such profile and/or preference information may generally be referred to as a viewer "profile" herein. Server side factors 1741 may include processing and bandwidth considerations. Profile/Preferences 1742 have been discussed. Receiver side factors 1743 may include information received from a target device regarding processing, memory, or other condition that may affect performance. Provider factors 1744 may include agreements with secondary providers regarding how content is to be provided. Finally, advertiser factors 1745 may include agreements with advertisers how advertisements are to be presented. As may be appreciated, many other factors are possible and are contemplated.

Given the available content options and factors 1740, the algorithm 1730 selects one or more of the options for presentation to the viewer. Such a process may be repeated as need to generate a plurality of items for presentation to a viewer (e.g., a number of episodes of a given series).

In the following discussion, various embodiments of the operation of a receiving device and interface are shown. Generally speaking, the embodiments described in the following figures are configured to operate with the embodiments in the foregoing description. It is further noted that the following described embodiments may be implemented in association with other video content delivery systems. For example, the following embodiments may be utilized in association with traditional cable or satellite television systems, special purpose set top boxes (e.g., Roku type boxes), Internet video providers, and so on. All such embodiments are contemplated.

Figure 18:
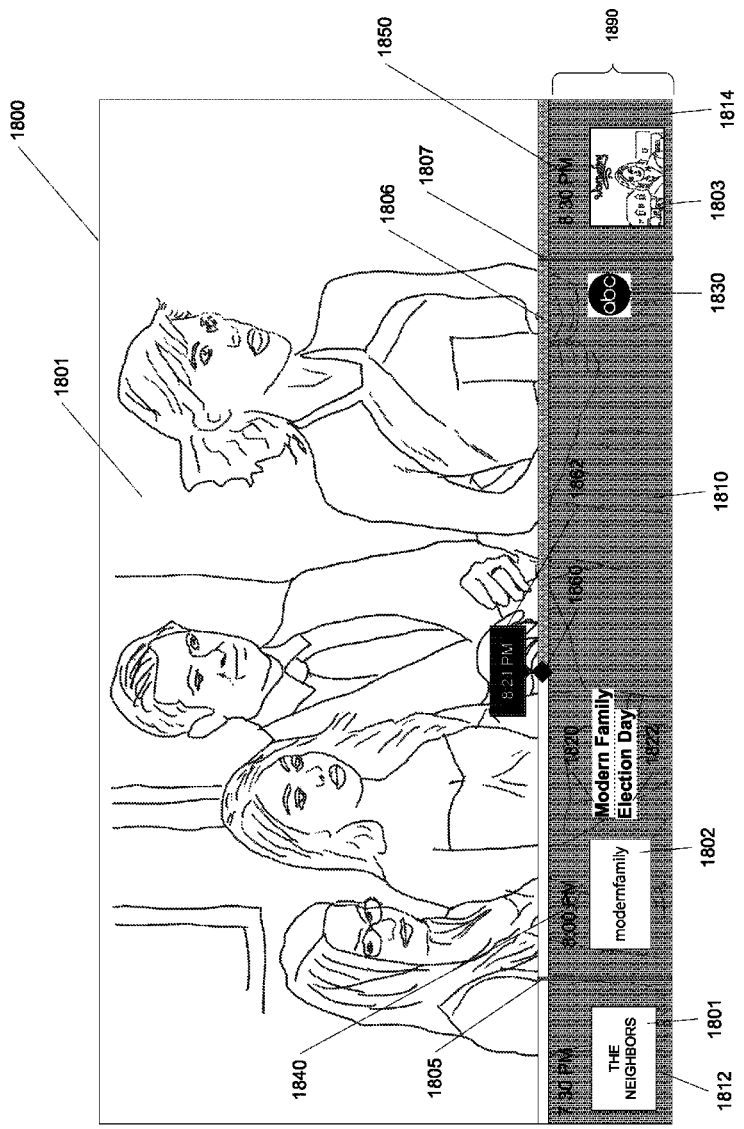
FIG. 18 depicts one embodiment of a video display and channel bar.

FIG. 18 illustrates one embodiment of a display with user interface channel bar. Display 1800 is shown displaying video content 1801 that may be streamed from a subscription based service provider (e.g., Apple TV). In various embodiments of the systems and methods described herein, a channel bar 1890 similar to that shown in FIG. 18 may be automatically displayed when a viewer turns on a television (or television and set top box) for viewing. The particular channel displayed may correspond to the last channel being watched when the television was turned off, a particular favorite channel that has been identified either explicitly or implicitly (e.g., based on viewing history), a channel with a particular program airing that is predicted to be of interest to the viewer (e.g., based on viewing history, past purchases, etc.), or otherwise.

Also shown in the lower portion of the display 1800 is a "scrubber" bar 1806 and channel bar 1890. In various embodiments, scrubber bar 1806 and channel bar 1810 are graphic overlay elements generated by a set-top box on top of the video content 1801. In the example shown, channel bar 1810 includes a central portion or element that corresponds to the currently displayed video content (an episode of the Modern Family television series). This central portion includes a title 1820 for the currently depicted television series (Modern Family), and title 1822 of the currently depicted episode (Election Day). Also included in the central portion is a small image 1802 that corresponds to the currently depicted video content. In various embodiments, this image 1802 may be a still image, video content, animation, or otherwise corresponding to the television series or the particular episode. Also shown in the central portion is a beginning time indicator 1840 (8:00 PM) for the currently depicted video content. The central portion also includes an identification 1830 of the channel to which the currently displayed channel bar corresponds.

The central portion 1810 of the channel bar is separated from a first portion 1812 by a first separator 1805, and a second portion 1814 by a second separator 1807. The first portion includes the designation "Previous" and includes an image 1801 of content that immediately preceded the currently displayed content on the channel identified by the indicator 1830 (the same channel as the currently displayed content). The second portion 1814 includes an image 1803 that corresponds to the television program that immediately follows the currently displayed content on the identified channel 1830. The second portion also includes a time indicator 1850 (8:30 PM), which indicates at what time the television program identified in the second portion 1814 begins. In general, these time indications may serve to indicate the duration of the corresponding video content. Other embodiments may include an explicit duration indication in the channel bar for each element/show depicted. The scrubber bar 1806 includes a current position indicator 1860 that is used to indicate the current position of the displayed content 1801 within the television program identified in the central portion 1890 of the channel bar. Also shown is a time indicator 1862 that corresponds to the current position indicator 1860. In the present example, the video content 1801 is that of a live television broadcaSt. As such, the scrubber bar to the left of the position indicator 1860 has a different appearance from that of the scrubber bar to the right of the position indicator 1860. The lighter colored portion to the left of the indicator 1860 indicates already broadcast content. As the content has already been broadcast, it is possible to rewind back into that content. The darker colored portion of the scrubber bar to the right of the position indicator 1860 indicates content that has not yet been broadcaSt. Consequently, it is generally not possible to fast forward to such (future) content. However, in various embodiments as will be discussed later, such "future" content may be immediately viewable.

In various embodiments, the display shown in FIG. 18 is presented as a uniform presentation to the viewer. In other words, the viewer is not provided any indication that any element of the presentation corresponds to other than a single subscription (e.g., a cable television subscription). However, in embodiments according to the primary and secondary subscriptions as discussed above, the primary subscription based provider of the content displayed in FIG. 18 has aggregated and stored video content corresponding to numerous secondary subscription based providers. Accordingly, while a viewer may perceive the content displayed in FIG. 18 as representing that corresponding to a cable television subscription (for example), in fact the primary subscription provider provides the content in a manner that is agnostic with regard to its associated source. In other words, the viewer may have a cable television subscription with a given cable television operator.

A viewer's secondary subscription entitles the viewer to access particular content stored in the primary provider's server farm that represents the cable television subscription content. The content actually provided to the viewer may not have been obtained from the cable television operator—it is of no importance to the primary provider. The content in this case is fungible as to its source. Similarly, the content depicted as the previous television program 1812 and the content depicted as the next television program 1814 are likewise fungible as to source. If the viewer rewinds into the "Previous" content 1812, the content displayed may in fact be video content that was recorded and stored in the server farm a year ago (e.g., assuming the episode was a rerun and was originally broadcast at least a year ago). From the perspective of the viewer, they had simply rewound to buffered content that was broadcast within the last hour. Additionally, the content itself may have actually been acquired from a cable television or other operator other than the one to which the viewer has a subscription. In each case, the original source of the video content is unimportant to the primary provider. All content is provided directly by the primary provider, and sources of content are relevant to the extent that they are used to identify content available according to a given secondary subscription. Similarly, the next television program 1814 may be obtained by the primary provider from a source other than the subscribed cable television operator. In the embodiment of FIG. 18, the central portion of the channel bar 1890 is made the largest portion of the channel bar. This central portion corresponds to the video content currently displayed and provides additional space for inclusion of details and information concerning the currently displayed content. In addition, the portion of the scrubber 1806 that corresponds to this central portion is likewise enlarged. The portions (1812, 1814) at either end of the channel bar 1890 are smaller in comparison to the central portion.

Figure 19:
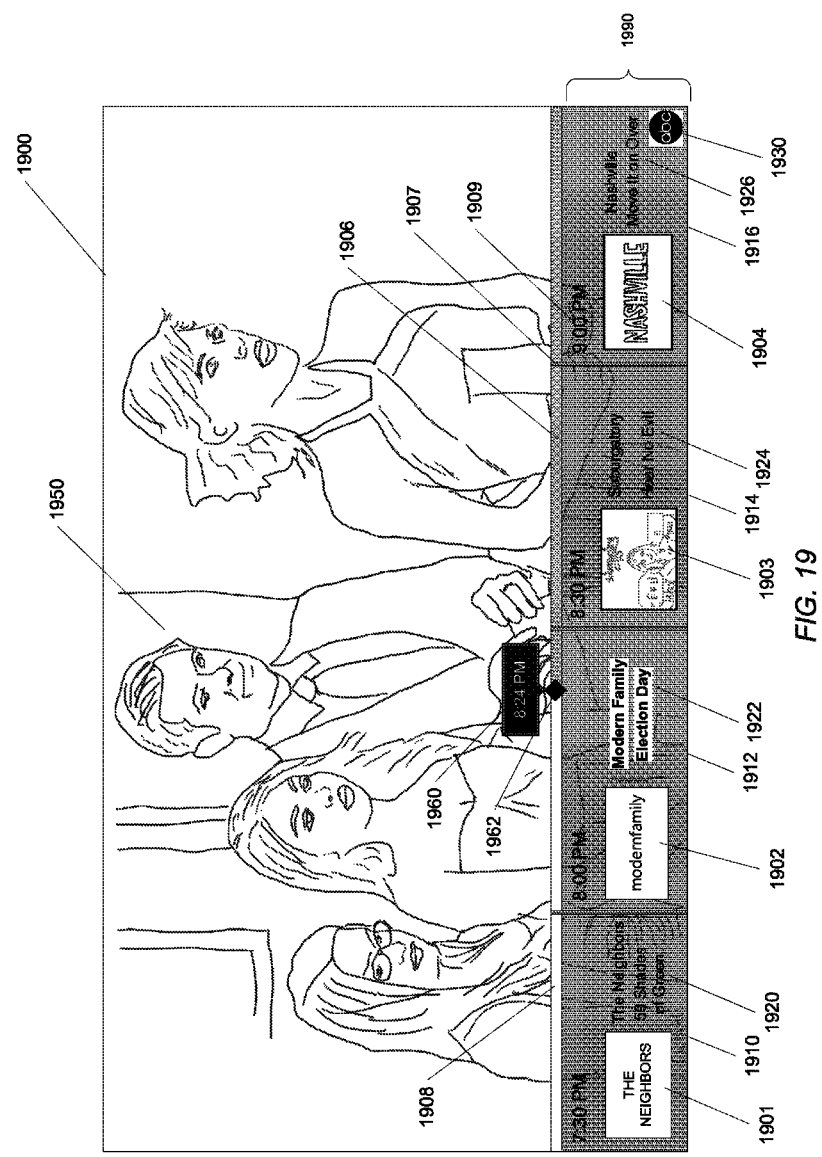
FIG. 19 depicts one embodiment of a video display and channel bar.

FIG. 19 illustrates an embodiment of a user interface channel bar 1990, which is organized differently from that of the embodiment in FIG. 19. In the example shown, a display 1900 is currently displaying video content 1950. In addition, a channel bar 1990 is shown at the lower portion of the display 1900. In the example shown, the channel bar 1990 is displaying video content that corresponds to a particular television network identified by the icon 1930.

In the example shown, the channel bar 1990 is divided into multiple portions (1910, 1912, 1914, 1916) that are approximately equal in size. In other embodiments, the portions may be divided proportionally according to content length. In contrast to the embodiment shown in FIG. 18, the portion 1912 of the channel bar 1990 that corresponds to the currently displayed content is not enlarged relative to other portions of the channel bar 1990. In this manner, it is possible to include information regarding more programs than was the case in FIG. 18. While the example of FIG. 19 depicts the channel bar 1990 as providing information regarding four programs (The Neighbors, Modern Family, Suburgatory, and Nashville), the number may be increased and decreased as desired according to user settings, user interaction via remote control, or otherwise. Accordingly, the embodiments of both FIG. 18 and FIG. 19 may be available for presentation. Similar to the embodiment of FIG. 18, the channel bar 1990 provides information such as a show title and description (1920, 1922, 1924, 1926), channel identification 1930, time indicators 1909, current play position 1962, 1960. As before, the scrubber bar includes an indication (e.g., different color or other visual indication) as to previously broadcast content (1908) and future broadcast content (1906).

Figure 20:
FIG. 20 depicts one embodiment of a video display and user interface.
Figure 21:
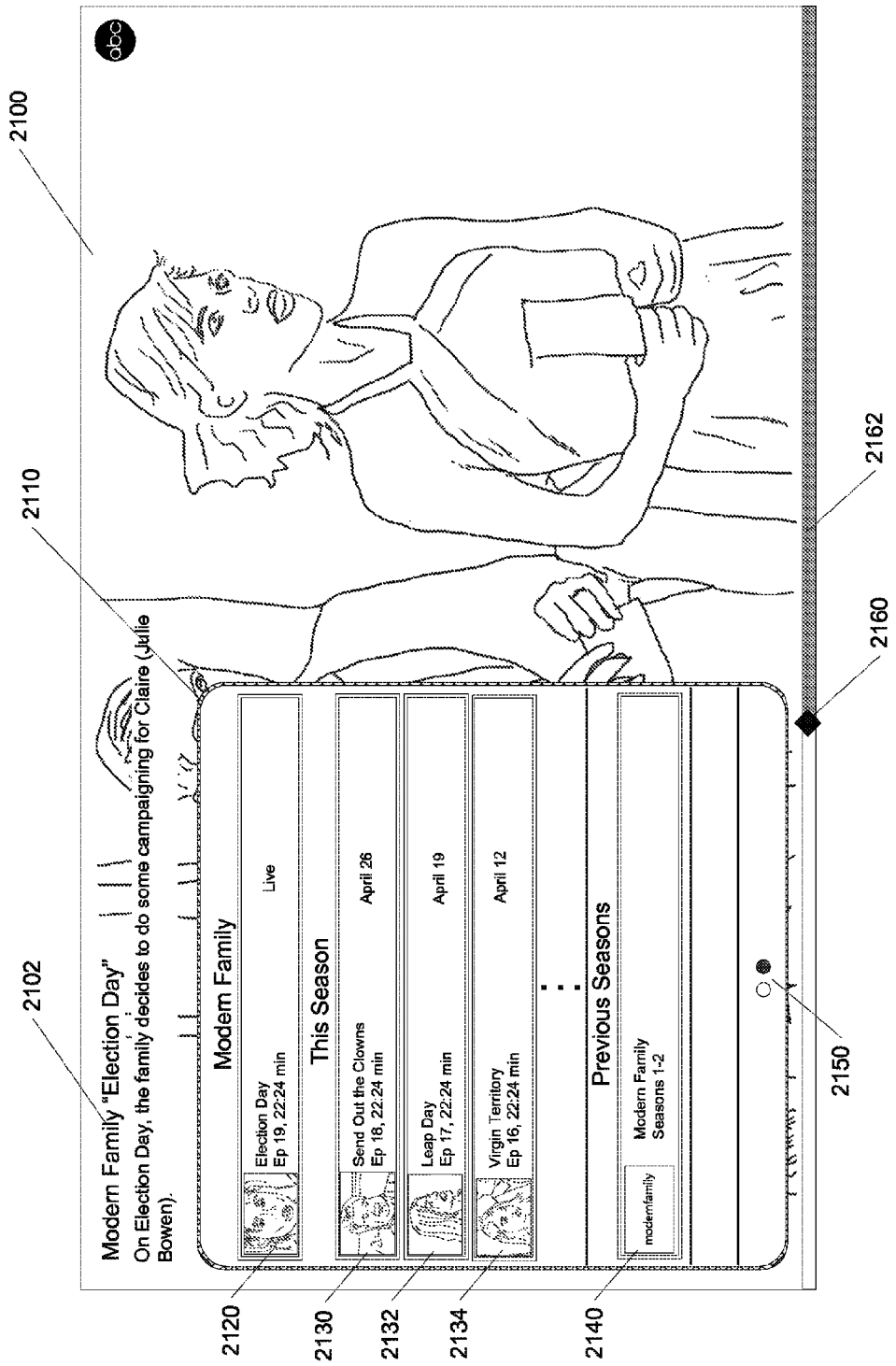
FIG. 21 depicts one embodiment of a video display and user interface.

In various embodiments, the channel bar 1990 may automatically time out and no longer be displayed if the viewer takes no action for a given period of time. Alternatively, the viewer may cause the channel bar to no longer be displayed by taking some action (e.g., a key press, swipe, etc.) with a remote control. In such a case, as illustrated in FIG. 20, the display 2000 may simply show the provided content 2001. FIG. 21 depicts a user interface embodiment wherein the viewer has requested the display of additional information related to the currently displayed content 2100. In this case, the displayed content is identified 2102 with show title, episode title, and brief description of the episode. In addition, a graphic element 2110 is displayed providing further information regarding the television series Modern Family. In various embodiments, the graphic element 2110 may be an overlay generated by a set top box or circuitry integrated within a television set, or the video content itself could be modified to include the graphic element 2110. All such embodiments are contemplated for this and other graphic elements described herein.

In the graphic element 2110 shown, the current episode 2120 is identified with information regarding the episode name, episode number, duration, and broadcast date ("Live" in this case). In addition, other episodes 2130, 2132, 2134 for the current season are shown with similar information. Still further, an indication 2140 is included for previous seasons. In various embodiments, each of the entries 2120, 2130, 2132, 2134, and 2140 are selectable by a viewer. Selection of a particular episode by a viewer may cause the selected episode to immediately begin playing. Alternatively, selection of a particular episode may cause the display of further information related to the selected episode. In the case of entry 2140, selection may cause display of particular episodes for the previous seasons similar to the presentation of the episodes in FIG. 21. Additionally, the embodiment of FIG. 21 includes an indication 2150 (page indicators) that indicate there are further pages of information available for viewing. By providing suitable input such as key press, swipe, or voice input, the next page of information may be presented. FIG. 21 also illustrates scrubber 2162 and current position indicator 2160 are displayed. Display of the scrubber and current position may or may not be displayed depending on settings or other conditions.

Figure 22:
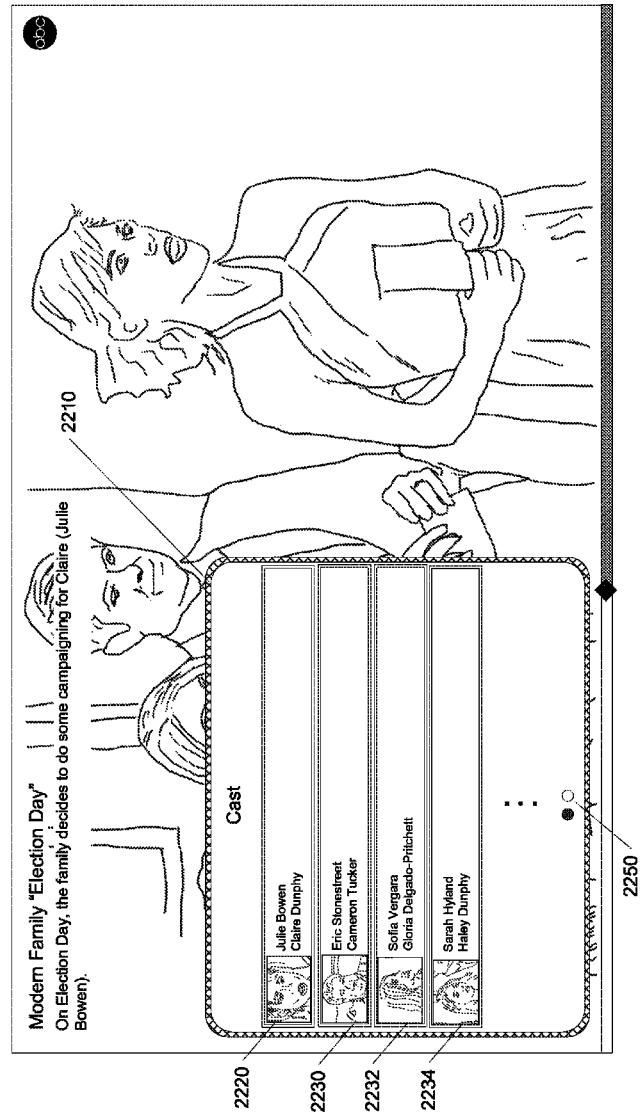
FIG. 22 depicts one embodiment of a video display and user interface.

FIG. 22 displays one embodiment of a second page of information (e.g., responsive to the viewer input discussed above). In this example, a graphic element 2210 is displayed that provides information of the cast of the currently displayed television series. In particular, selectable items 2220, 2230, 2232, and 2234 are shown for different cast members of the series. By selecting one of these cast member items, a new page or a new display may be presented corresponding to the selected cast member.

Figure 23:
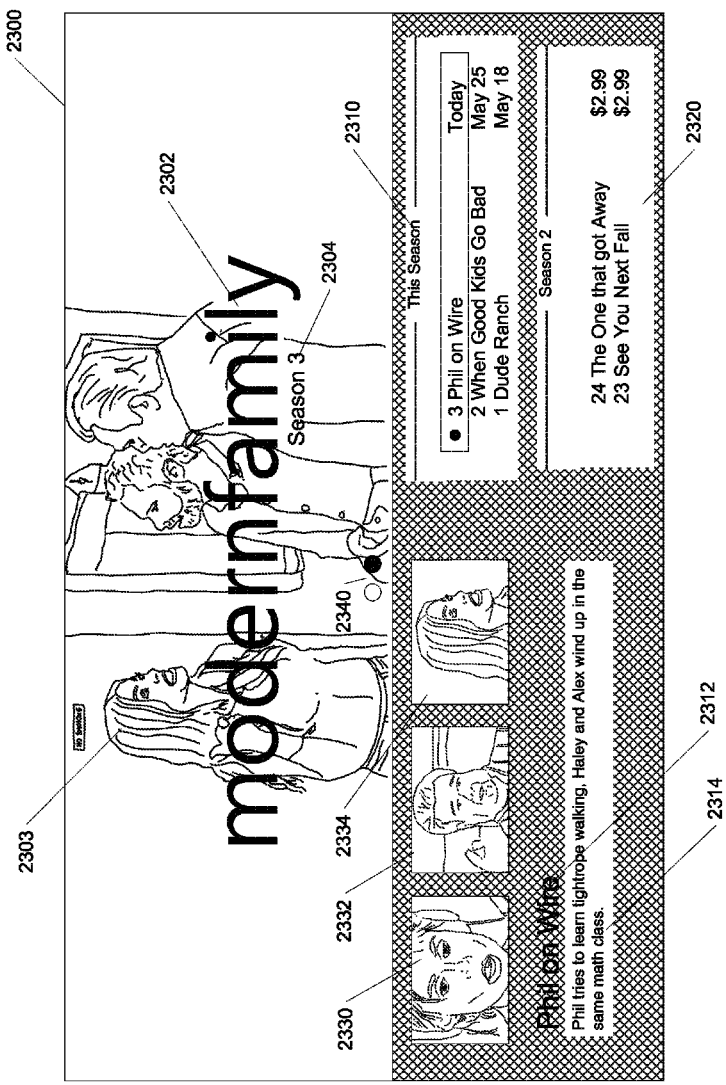
FIG. 23 depicts one embodiment of a video display and user interface.

Turning to FIG. 23, a "landing page" for a given television series is shown. Landing page in this case generally refers to a page/content dedicated to a particular series, movie, etc. In the example of FIG. 21, series information regarding currently displayed content was shown overlaying the video content itself. In this embodiment, the display 2300 depicts video content 2303, artwork, animations, or otherwise, that is more generally applicable to the series. In this embodiment, a title 2302 is displayed for the series, and an indication of season 2304 is provided as well.

In the embodiment shown, the upper portion of the display includes the described artwork and title information. The lower portion of the display includes information regarding seasons and episodes of the series. For example, the lower right portion of the display lists a number of current season episodes 2310 for the season. Also shown are previous season episodes 2320. In this example, episode 3 of the current season ("Phil on Wire") has focus. Focus is depicted here by a box around the entry and a bullet at the beginning of the entry. As may be appreciated, numerous different methods for indicating focus are possible and are contemplated. In various embodiments, information related to the items that has focus is shown in the left portion of the lower display. Here, the title 2312 of the highlighted episode is shown along with a brief description 2314 of the episode. In addition, one or more pictures 2330, 2332, 2334 from the episode are shown. In various embodiments, the pictures 2330, 2332, 2334, may be still images, video content from the episode, animations, or other content related to the series. In some embodiments, pictures of friends of the viewer who like the episode or television series could be shown, of comments from people regarding the show (e.g., Twitter or Facebook comments). Numerous such embodiments are possible and are contemplated.

Also shown in FIG. 23 for the previous season 2320 is an indication as to cost for viewing rights to the content. Here, for example, each of the two episodes 23-24 of Season 2 are shown to have a cost of $2.99. Selecting one of these episodes may the present a display that enables the viewer to authorize purchase of the content. For example, payment may simply be authorized with or through a primary subscription (e.g., an iTunes account), or the viewer may be connected to a secondary provider to effect payment for the content, which then gives the necessary viewing rights. In various embodiments, viewing rights may be stored by a content provider are verified upon attempted access, stored in a receiving device as a token, or otherwise. In contrast, selection of one of the current season 2310 episodes may immediately begin presentation of the selected episode or bring the viewer to a page with more information regarding the episodes. In some embodiments, whether the selected episode is immediately presented or a page of further information is displayed may depend on the input provided by the viewer. For example, a viewer with a remote control may be able to provide a first indication (e.g. an upward swipe on a touch pad) to indicate immediate play of the episode is desired. Alternatively, the viewer may provide a second, different, input (e.g., a rightward swipe) to indicate presentation of further information is desired. Various such alternatives are possible and are contemplated.

Figure 24:
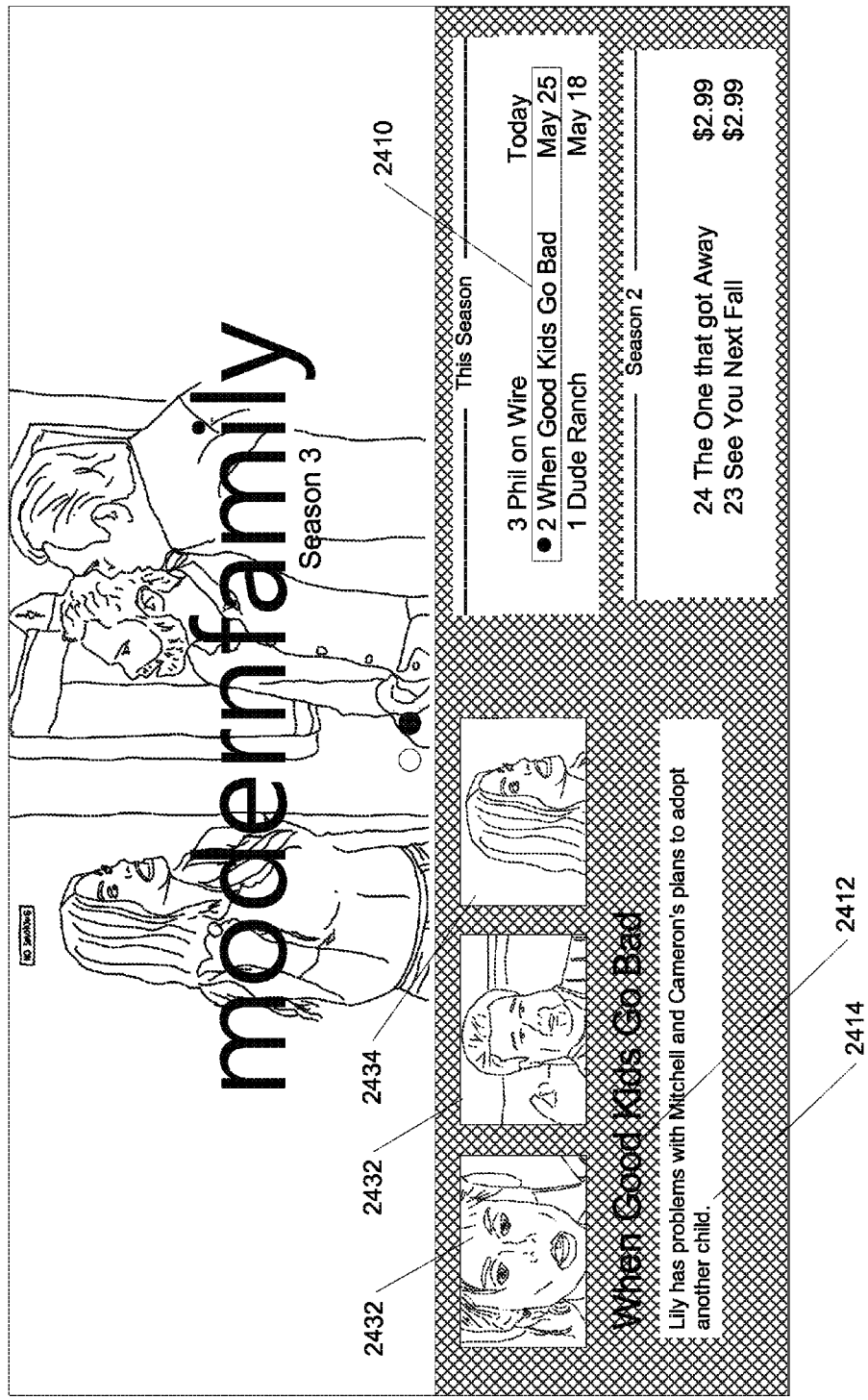
FIG. 24 depicts one embodiment of a video display and user interface.
Figure 25:
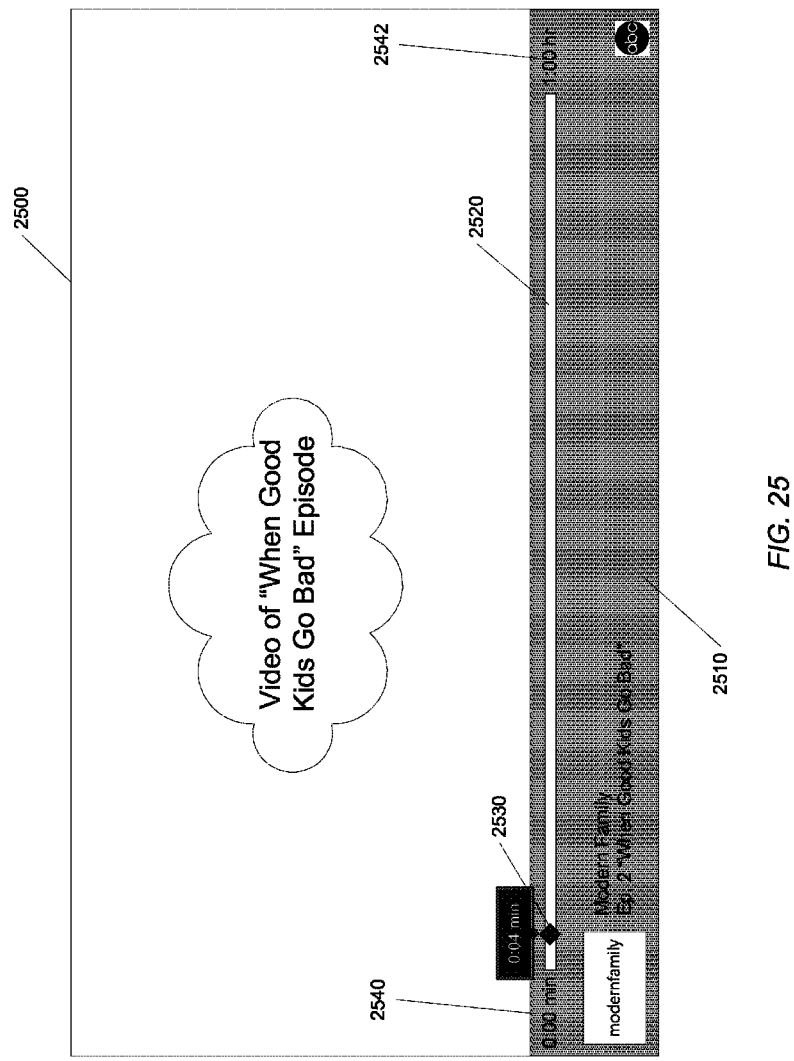
FIG. 25 depicts one embodiment of a video display and user interface.

FIG. 24 illustrates the landing page of FIG. 23 after focus has been moved to episode 2 2410 of the current season ("When Good Kids Go Bad"). Here information regarding the episode is provided in the left lower portion of the display (e.g., title 2412, description 2414, and pictures 2432, 2432, 2434). As discussed, in one embodiment, selection of episode 2410 may immediately begin presentation of the selected episode as shown in FIG. 25. FIG. 25 shows display 2500 has begun presenting the selected episode. In the lower portion of the display, a scrubber bar 2520 and program information banner 2510 is displayed. In this embodiment, time information for the single episode is provided adjacent to the scrubber bar 2520. In this example, the episode is one hour in length and the bounding time indicators are 0:00 min 2540 and 1:00 hr 2542. The current position indicator 2530 depicts the current play position and time. In various embodiments, such a banner may be displayed when presentation of the video content begins, and may time out after a brief interval, after which the banner ceases to be displayed. A viewer may cause the scrubber/banner to reappear using a remote control device.

Figure 26:
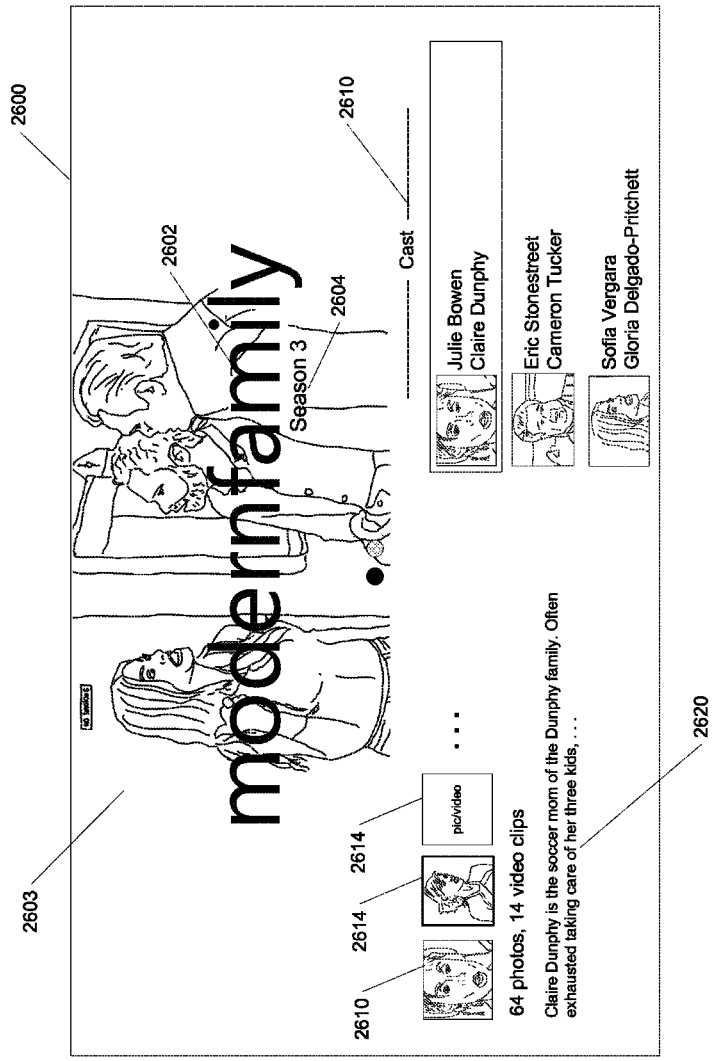
FIG. 26 depicts one embodiment of a video display and user interface.

Turning now to FIG. 26, an embodiment of a landing page is illustrated for the television series Modern Family. FIG. 26 may represent, for example, a second page of information for the landing page depicted in FIG. 23. Here the lower portion of the landing page provides information related to the cast for the television series. In the lower right portion, a listing of cast members 2610 is provided in a manner similar to episodes of FIG. 23. In this example, the first cast member (Julie Bowen) has focus, which causes display of related information in the left lower portion of the display. In this example, pictures 2610, 2614, 2614 of the highlighted cast member are provided. Also shown is an indication of a number of media elements available for viewing (64 photos, 14 video clips). A description 2620 of the cast member and/or character is also provided. Further selection of the cast member element 2610 may then cause another page of information related to the selected cast member to be provided. Such additional information may include the additional media elements indicated as being available, and any other suitable content. In various embodiments, the information provided related to cast members, television episodes, movies, series, and so on, may be provided by the primary (subscription) provider, the Internet, proprietary sources, user/viewer provided or generated content, or any combination of the foregoing.

Figure 27:
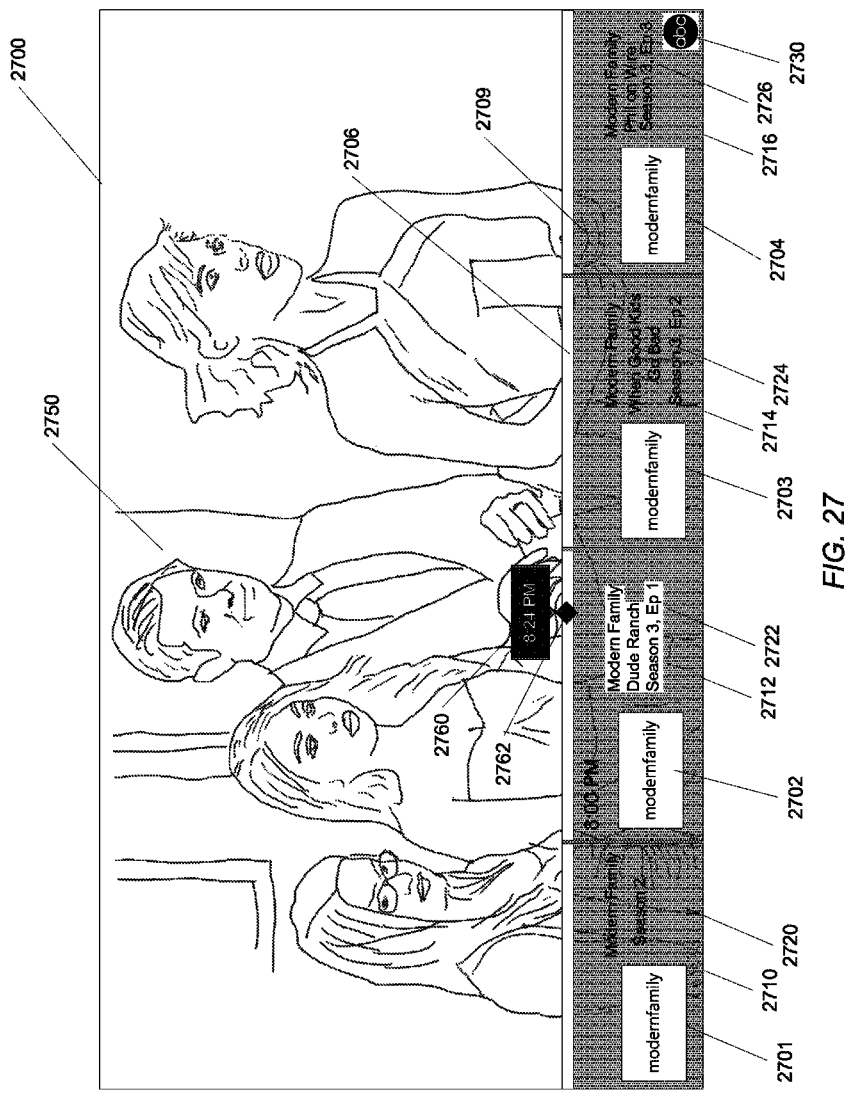
FIG. 27 depicts one embodiment of a video display and user interface.

Turning now to FIG. 27, another embodiment of a channel bar is illustrated. In this example, the channel bar is shown providing information for a single television series. This is in contrast to the channel bar of FIG. 19, which depicted a television broadcast lineup. In this example, a display 2700 is presenting video content 2750. Here, and episode of the Modern Family television series is being presented. A scrubber 2706 is shown with current position indications 2760, 2762. All episodes shown in the channel bar correspond to the Modern Family television series. In various embodiments, a channel bar with episodes for a given series may be "brought up" (caused to be displayed) by a particular indication provided by a remote control device, voice, or otherwise. For example, a particular key press or swipe on a remote control may indicate such a channel bar is desired, such as an upward swipe on a touch sensitive surface associated with the viewing device.

While four episodes are shown displayed in the channel bar of FIG. 27, more or fewer may be displayable as desired according to settings or a remote control indication. In this example, a network indication 2730 is provided. However, in other embodiments, such an indication may not be provided for the displayed channel bar. Also, while a time indication is shown for the currently displayed episode (8:00 PM), the other episodes do not include a time indication. The reason no time indication is provided for the other episodes is that the channel bar is not depicting a current broadcast lineup. Rather, the channel bar is simply identifying episodes of the television series that precede 271 and follow 2714, 2716 the current episode 2712 in chronological order. Of note is the scrubber bar 2706, which makes no visual distinction between future and past content. In the present case, all of the episodes indicated are immediately available for viewing as they are part of the primary provider's store of content. As such, a viewer using the scrubber to scrub forward or backward will cause presentation of the past or later episodes. In various embodiments, still images or video content may be displayed for each of the episode images 2701-2704.

Figure 28:
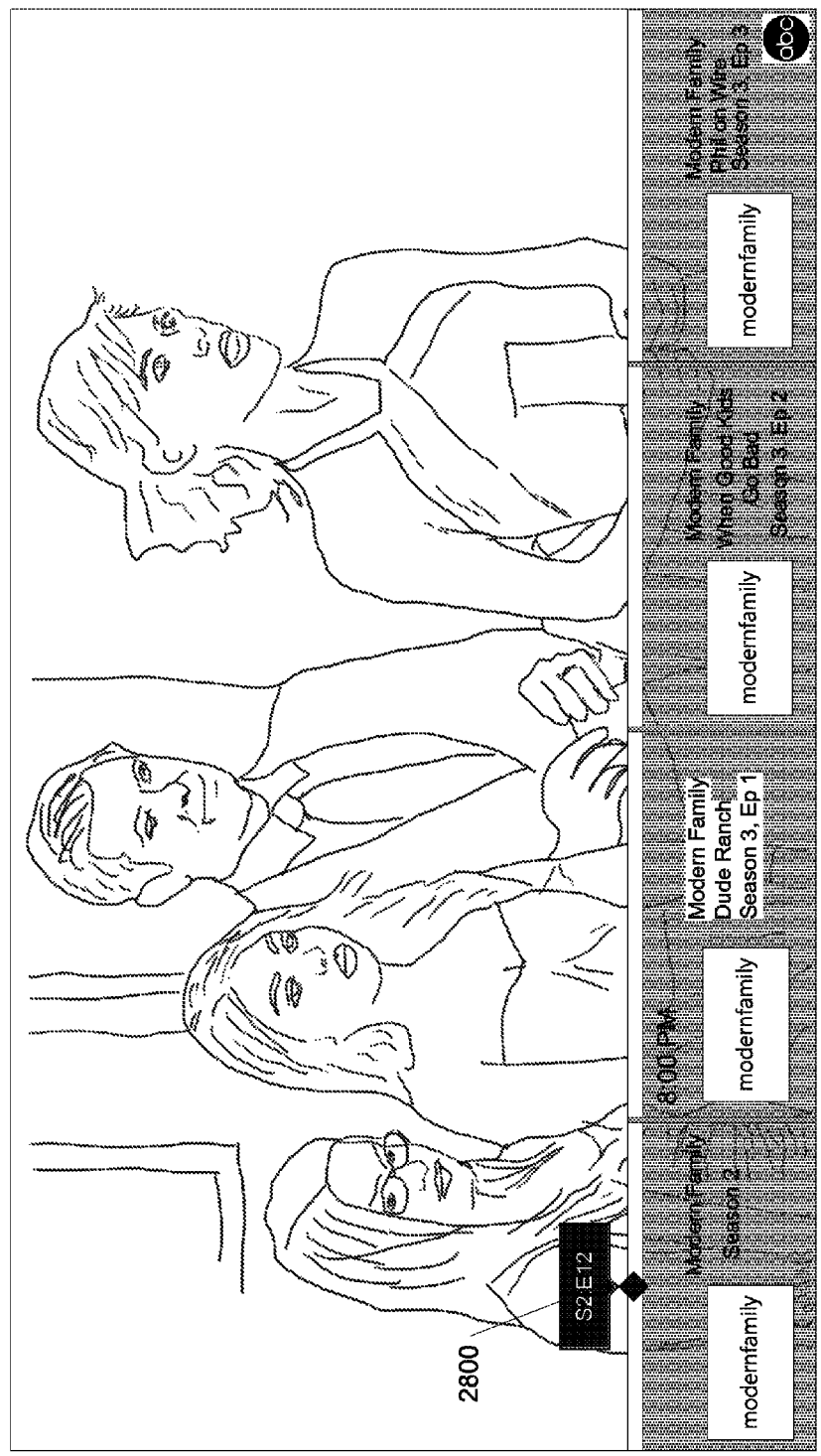
FIG. 28 depicts one embodiment of a video display and user interface.

Depending on how scrubbing is performed by a viewer, the channel bar may adapt and change its display accordingly. For example, FIG. 28 depicts the same display as that of FIG. 27. Here the viewer is scrubbing backward and has entered a portion of the channel bar indicated "Season 2" of the Modern Family television series. In one embodiment, scrubbing through the Season 2 block of the channel bar causes the current position indicator 2800 to provide an indication as to position within season 2. For example, in FIG. 28 the indicator indicates "S2:E12" which means Season 2 (S2) Episode 12 (E12). Should the scrubbing continue in that direction, the scrubber indication would progress through S2:E11, S2:E10, . . . , S2:E1, and so on into Season 1. In such an embodiment, if the viewer stops scrubbing while the indicator indicates a particular episode, presentation of that episode may be automatically initiated from the beginning of that episode. Alternatively, an information display screen for that episode may be provided which may itself provide the opportunity to present the episode.

Figure 29:
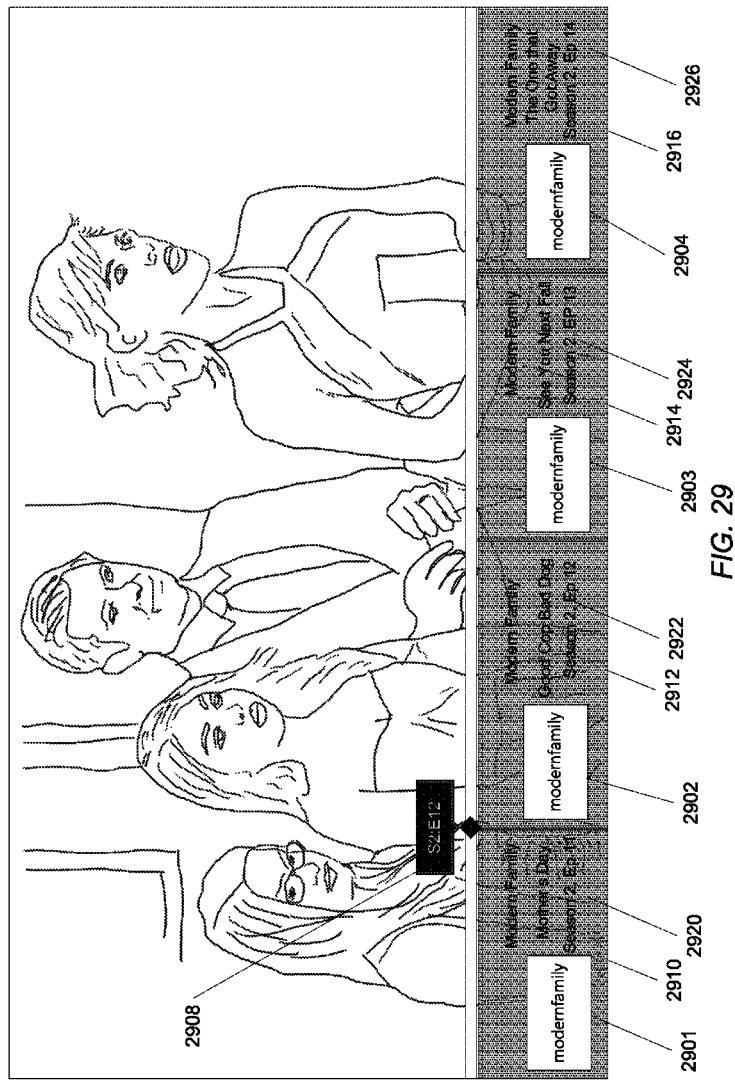
FIG. 29 depicts one embodiment of a video display and user interface.

Alternatively, rather than the embodiment shown in FIG. 28, scrubbing into the previous season (Season 2) may cause the scope (i.e., the granularity of the items displayed—hours, days, months, seasons, etc.) of the channel bar to change so that it now displays episodes of Season 2 through which the viewer may scrub. FIG. 29 illustrates one such embodiment. In this manner the granularity of the content displayed has been changed. As shown in FIG. 29, the viewer has scrubbed to position S2:E12 as shown by indicator 2908. The channel bar has changed so that it now displays episodes 11-14 of Season 2 as segmented portions 2910, 2912, 2914, 2916 of the channel bar. In various embodiments, this change to display the episodes of Season 2 may occur automatically as the viewer scrubs into Season 2. Alternatively, the embodiment of FIG. 28 may be presented, where Season 2 is a single block, and when the viewer stops scrubbing the display of FIG. 29 could be presented. Either and/or both may be used in a given embodiment. Here a brief description 2920, 2922, 2924, 2926 and image 2901-2904 is provided for each of the episodes.

In various embodiments, the scoping behavior of the channel bar may be responsive to either or both of a duration of scrubbing and/or pressure used on a remote control device during scrubbing. For example, if in FIG. 28 the viewer scrubs backward with a consistent firm pressure on a touch pad, then scrubbing may continue through a displayed single block for Season 2. However, if when the viewer reaches the indication S2:E12 the viewer continues scrubbing with a detectably lighter pressure, then this may indicate a slow down in the rate of scrubbing is desired, a finer granularity of scrubbing is desired (i.e., the viewer is nearing a desired stopping point and wishes the individual episodes to be displayed), or both. Responsive to this lighter pressure, the channel bar changes so that the individual episodes of the season are shown as in FIG. 29. In various embodiments, the video content displayed may correspond to the position of the position indicator during the scrub operation. Alternatively, the video content displayed may not be updated to correspond to the new position until scrubbing has stopped. Either or both approaches may be utilized as deemed appropriate. Pressure may be detected through known means, such as a determination that a contact patch on a touch sensitive surface has changed size, through pressure sensors, etc.

Figure 30:
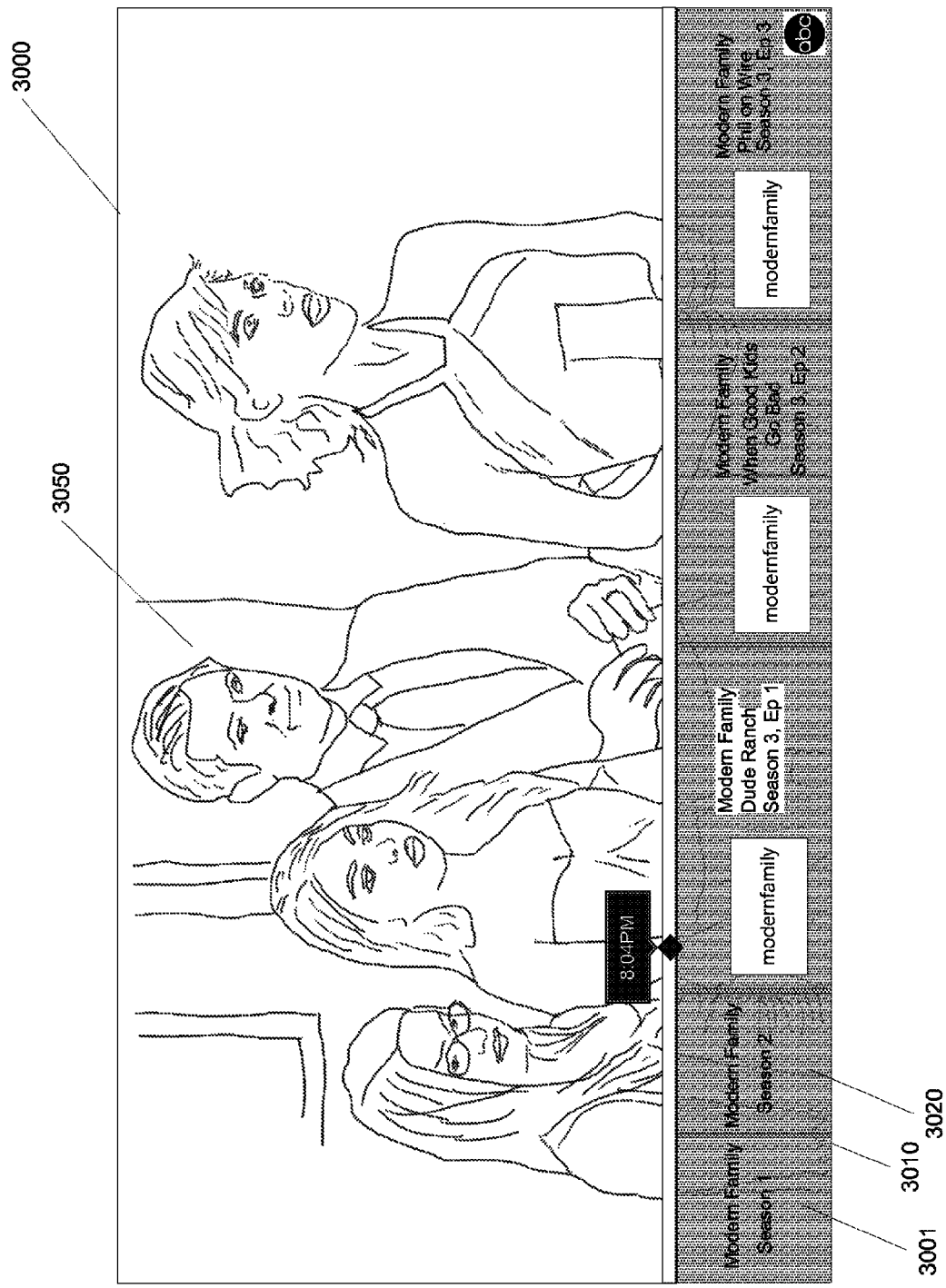
FIG. 30 depicts one embodiment of a video display and user interface.

FIG. 30 illustrates a display 3000 and video content 3050 where the channel bar depicts multiple seasons. In particular, two prior seasons 3001 and 3002 are illustrated. In various embodiments, if the viewer scrubs in a particular direction (backward in this case), additional content may be progressively displayed. For example, as backward scrubbing proceeds, the Season 1 block 3001 may be displayed. Scrubbing with a relatively consistent pressure backward through Season 2 may leave the channel bar in single block depiction mode for Season 2 and permit the viewer to scrub back into the Season 1 block. However, if the viewer stops scrubbing in Season 2, or lessens the scrub pressure while in the Season 2 block, then the channel bar may change to the mode shown in FIG. 29 with episodes of Season 2. In this manner, the channel bar adapts to the scrubbing behavior indicated by the viewer. In addition to the above described embodiments, a viewer may add media content to a queue for viewing. Items added to a queue in such a manner may then be presented as elements of a channel bar similar to that discussed above. In this manner, the viewer may quickly traverse items in the queue by scrolling, paging, rotating, or otherwise manipulating the channel bar. Adding such items to a queue may comprise selecting items from an EPG, list of movies, or any other media content desired.

Figure 31:
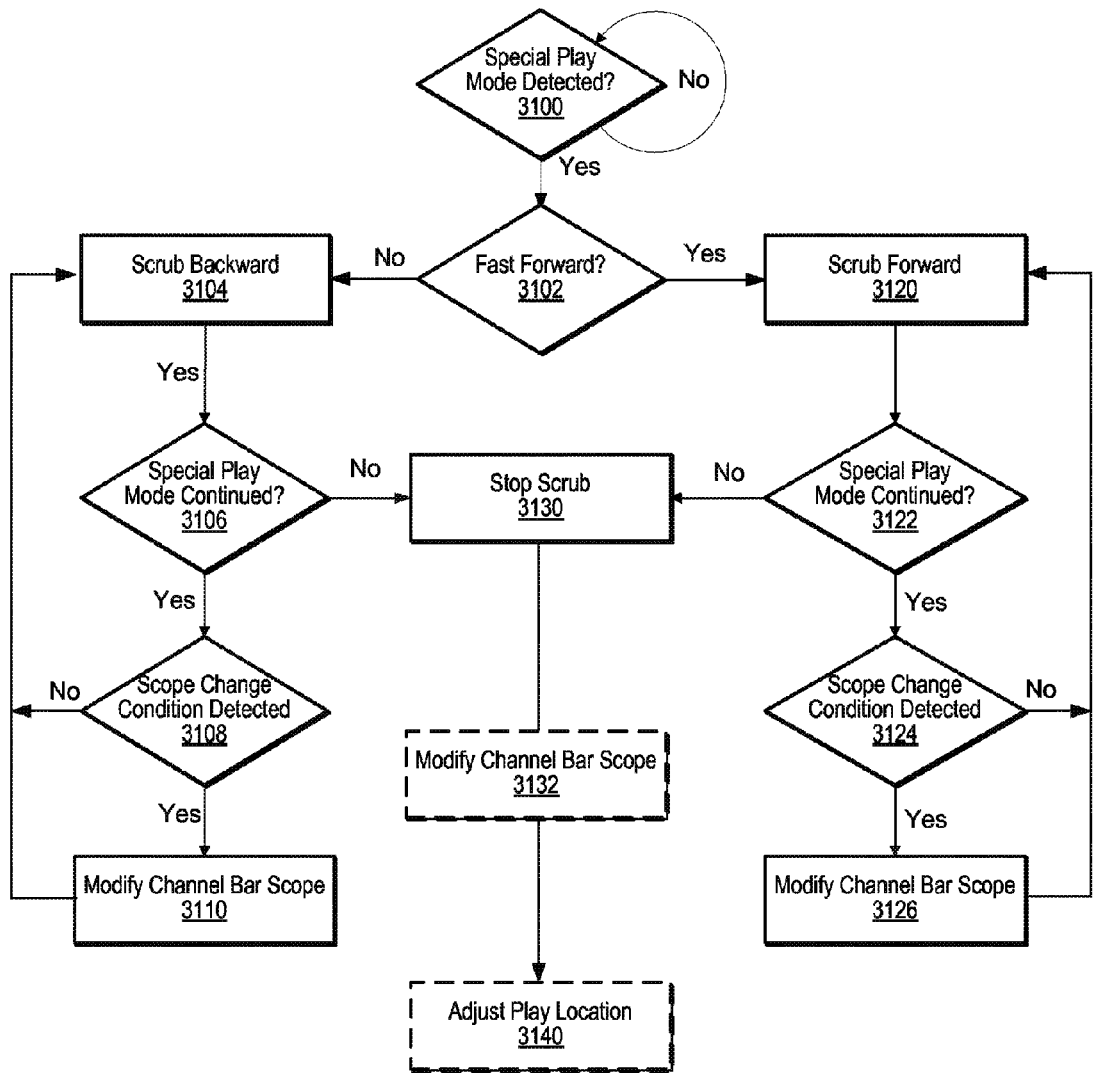
FIG. 31 depicts one embodiment of a method for scoping an interface channel bar.

FIG. 31 illustrates one embodiment of a method for dynamically adapting channel bar scoping. The method begins with the detection of a special play mode (decision block 3100). In various embodiments, a special play mode corresponds to an altered play speed for video content such as fast forward or reverse. If a special play mode is detected and it is determined the special play mode is fast forward (decision block 3102), then a scrub forward operation is initiated. Generally speaking, special play modes may be initiated by a viewer using a remote control device by a key press or by movement of a finger to the side of a touch pad to indicate the desired direction. During the scrub operation, the current play position indicator of the scrub bar will move and/or otherwise indicate the current position.

If the special play mode is continued (decision block 3122) (e.g., fast forward is continued), and a scope change condition is detected (decision block 3124), then the channel bar may modify its current scope to a new scope (block 3126). For example, such a change may be from a single block for a given season to multiple episodes of the given season. This may be the case when scrubbing persists, but is then lessened in pressure (e.g., to indicate a slower scrub speed is desired) as per the above discussion. Alternatively, the change could be from a scope that depicts individual episodes to one which depicts blocks for entire seasons. This might be the case when scrubbing persists without any indication that a slow down in scrub speed is desired. In general, higher level objects may be replaced by lower level objects (e.g., a season block may be replaced by episode blocks), or vice versa when changing the scope of the channel bar.

If on the other hand, the special play mode ceases (decision block 3122), then scrubbing is stopped (block 3130). In various embodiments, when scrubbing stops, the channel bar scope may be modified (block 3132) as discussed above. For example, a scrub into the prior season (shown by a single block) may cause the display of individual episodes for the season as in FIG. 28 when scrubbing stops. Additionally, when scrubbing stops, the current play position may be automatically adjusted (block 3140). For example, if scrubbing stops in the middle of a particular episode, then current play position may automatically adjust to the beginning of that episode, or the beginning of the following episode. Alternatively, the play position may adjust to a dynamically determined positioned based on where it is predicted the viewer wished to stop scrubbing. For example, a viewer may overshoot the target location when scrubbing. To account for such overshoot, the system may automatically adjust the play position by some number of seconds. The number of seconds or other amount of time for the adjustment could be fixed or variable. In some embodiments, a history of a viewer's scrubbing behavior may be used to arrive at an adjustment deemed suitable for the viewer. Various such techniques are possible and are contemplated.

FIG. 31 also illustrates similar functionality in the event the special play mode is not fast forward (decision block 3102). In such a case, a scrub backward (reverse) operation is initiated (block 3104). As in the previous case, if the special play mode continues (decision block 3106) and a scope change condition is detected (decision block 3108), then a modification of the channel bar scope (block 3110) may be performed.

Figure 32:
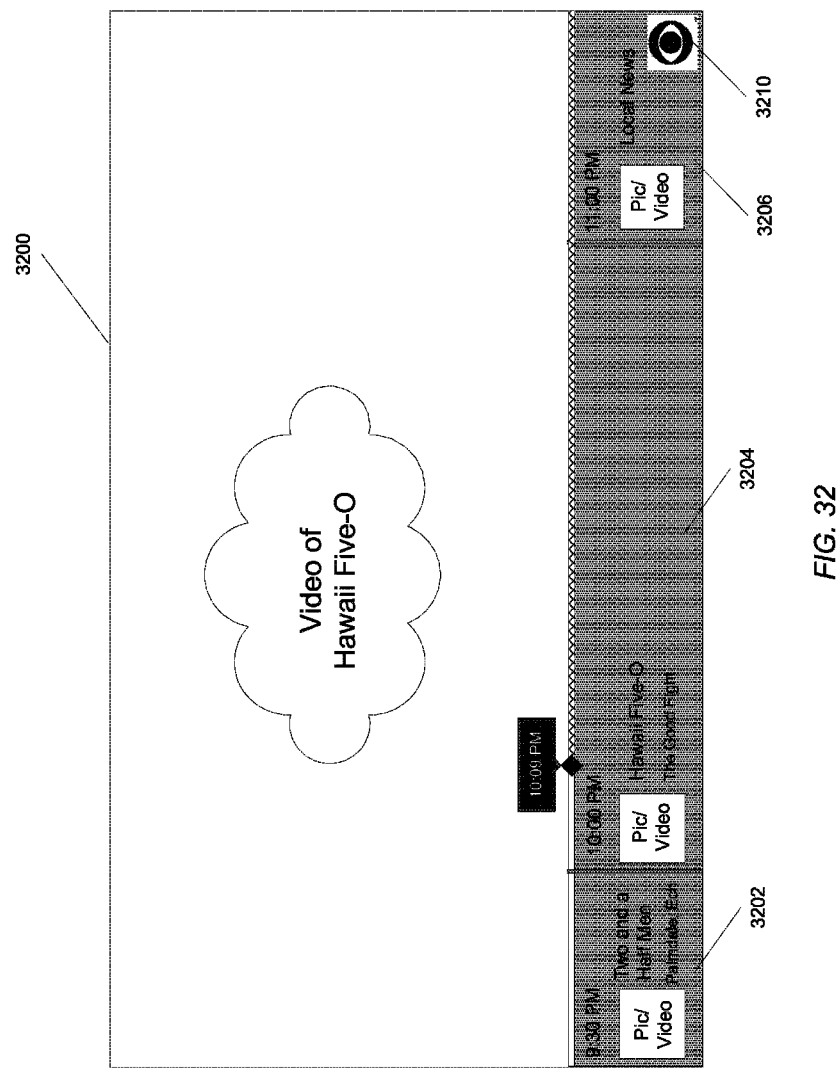
FIG. 32 depicts one embodiment of a video display and user interface.
Figure 33:
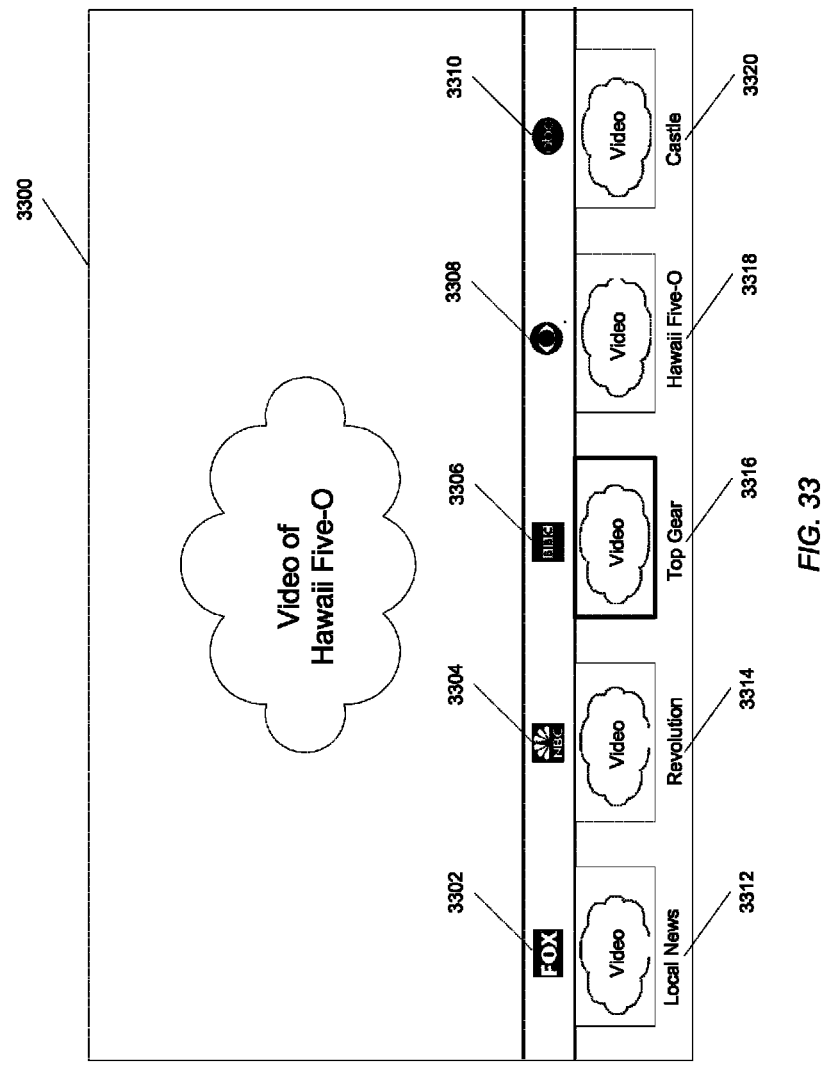
FIG. 33 depicts one embodiment of a video display and user interface.

Turning now to FIG. 32, one embodiment of a display 3200 is shown with a channel bar. In this example, the channel bar depicts a channel lineup (e.g., a broadcast lineup) for the CBS network 3210. The content being currently displayed in the Hawaii Five-O television show 3204. The current position indicator indicates a play position time of 10:09 PM. The Previous show is identified as Two and a Half Men 3202, and the following show is identified as Local News 3206. Responsive to an indication from a viewer, the channel bar may be changed to a different display mode. For example, responsive to a key press, swipe or other gesture(s) on a touchpad, or otherwise. FIG. 33 illustrates an embodiment in which the channel bar has changed to an EPG type mode.

In the example of FIG. 33, the display 330 continues showing the current content (Hawaii Five-O). However, the channel bar now depicts multiple channels that are currently airing (e.g., live broadcast television). In this example, five television channels are shown. However, in other embodiments more or fewer may be shown. Associated with each channel is an identification of the channel—Fox 3302, NBC 3304, BBC 3306, CBS 3308, and ABC 3310. Also shown for each channel is an indication of the corresponding content (Local News 3312, Revolution 3314, Top Gear 3316, Hawaii Five-O 3318, Castle 3320). In addition, live video ("Video") may be shown for each of the channels. In this manner, viewer can view what is currently airing on each of the respective channels. Using a remote control (or other indication), a viewer may cause the channel bar to scroll through other channels to provide a similar display of those channels. For example, the viewer may scroll to the right to cause the currently depicted channels to be progressively replaced with other channels. As discussed in greater detail below, channel bar content may be changed by scrolling, paging, rotating the channel bar, or other animations.

In the example shown, the Top Gear show has focus (depicted by the heavy border). By selecting the currently highlighted show (the show having focus), the set top box or television may immediately display the selected show. In some embodiments, having a particular show in focus in the channel bar may cause the audio for that show to be presented. For example, which the Hawaii Five-O video content continues in the display, having the Top Gear show highlighted may allow the viewer to hear the audio for the Top Gear show in addition to seeing its video in the channel bar presentation. In some embodiments, when focus is moved to content in the channel bar and audio for that show is presented content 3300 may be paused. In such embodiments, when focus is returned to content 3300, playback of content 3300 will be resumed with its corresponding audio.

In some embodiments, scrolling the content in the channel bar may move the channels depicted while focus always remains in the center. In other embodiments, the focus may also be movable.

Figure 34:
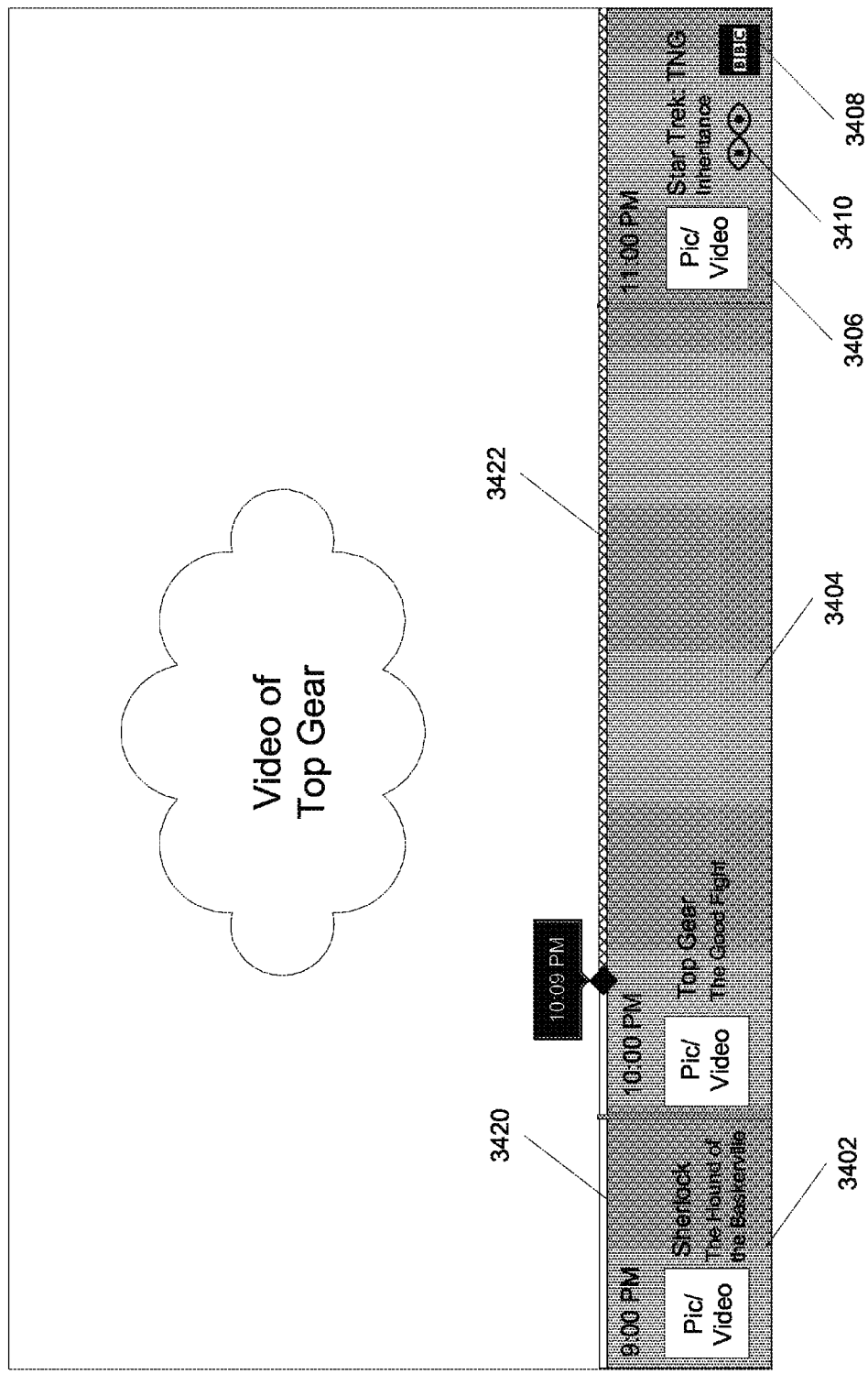
FIG. 34 depicts one embodiment of a video display and user interface.

Assuming in FIG. 33, the viewer selects the highlighted Top Gear content, then the display of FIG. 34 may be provided in one embodiment. In the example of FIG. 34, the Top Gear show is now being presented on the display. The channel bar has now changed to show the shows for the channel corresponding to the displayed content (BBC 3408). In effect, the television/set-top box has effectively tuned to the BBC channel. However, as noted above, in various embodiments the television/set-top box may have no QAM, ATSC, or similar tuners. Therefore, the set-top box doesn't "tune" to the channel in the conventional sense of a cable television box or television. Rather, in various embodiments all of the content for the channel is provided via the primary provider, which conveys the content via Internet or other future network. Nevertheless, the effect for the viewer is generally the same. As shown in FIG. 34, the current position of the broadcast is shown as 10:09 PM. The previous show 3402 is identified as having had a start time of 9:00 PM, and the next show 3406 is identified as Star Trek: TNG. A channel indicator 3408 is also shown.

As the channel bar content corresponds to a broadcast network (BBC), the scrub bar displays a previously broadcast portion 3420 and a portion that has not yet been broadcast 3422. However, as noted above, in various embodiments the system is not in fact tuning to the BBC channel in the conventional sense. Rather, the channel bar simply identifies the content lineup for the BBC channel. The content itself may come from the primary provider's server farms. One of the ways the system changes the viewer's viewing options, is that the viewer may be able to view shows that are scheduled to be broadcast in the future. For example, in FIG. 34 the show 3406 includes a further indication 3410. This indication (a pair of eyes) is exemplary only. However, in this example, the indication serves to indicate that the content is immediately available for viewing—even though the scrub bar and channel bar indicate it corresponds to a future broadcaSt. This content may be immediately available for viewing because it is content that has aired previously and was captured/stored by the primary provider at an earlier point in time. Therefore, while the BBC channel shows this as a future broadcast—the viewer may watch it immediately. In some embodiments, the scrub bar may show the content as being available as well. Given such a system, a viewer may scroll the channel bar to see the line for the BBC further into the future. Assuming the future content has previously aired and resides with the primary provider, the viewer may watch the "future" content immediately. During fast forwarding (whether scrubbing forward or backward), portions of content that is indicated as being available for viewing may be replaced with substitution content. The substitution may occur due to the portion of content is identified as having spoilers. For example, near an ending of a recorded sporting event an outcome of a game or a match may be revealed. Another example of a spoiler may be a plot point or a plot twist in a scene within a movie or a television program. The substitution content may include a text banner indicating spoilers are present in the content at the current playback position. No video content or audio content may be presented at these identified positions corresponding to spoilers. If the user ceases fast forwarding at a playback position corresponding to an identified spoiler, then fast forwarding may continue for a given period of time to avoid landing on a spoiler. A different playback position may be selected which may be a few minutes prior or after the identified spoiler position.

Figure 35:
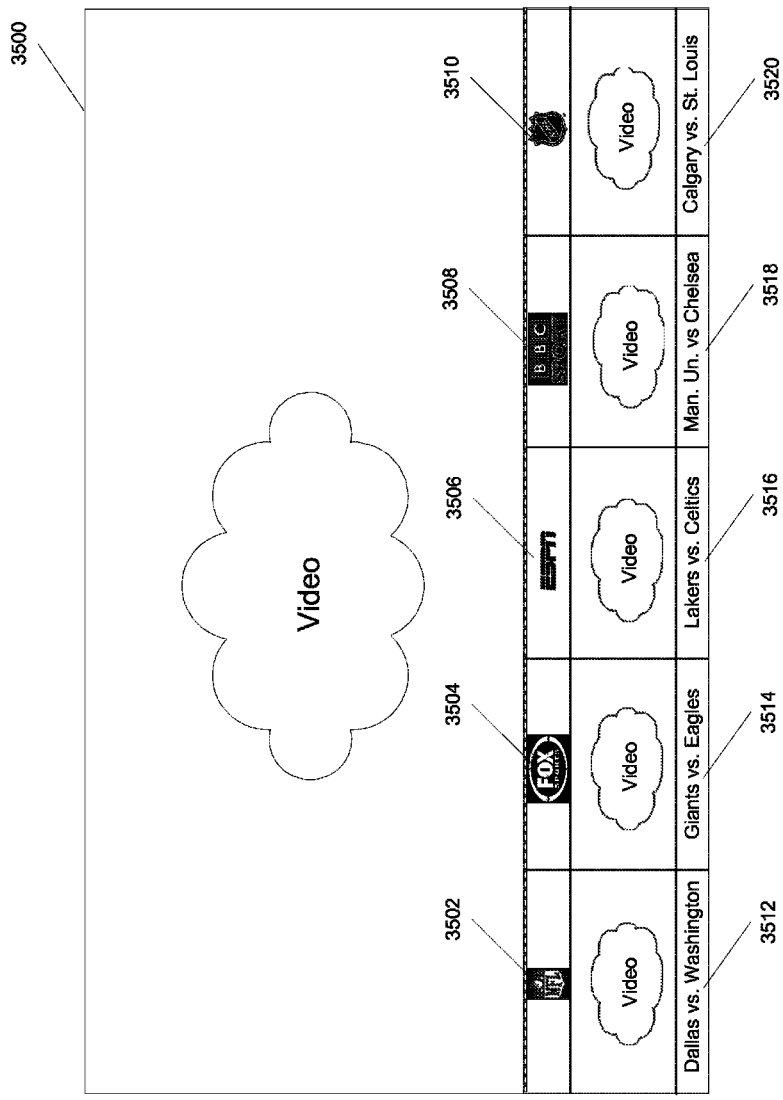
FIG. 35 depicts one embodiment of a video display and user interface.

Turning now to FIG. 35, another mode for the channel bar is shown. In this example, the display 350 is shown to include a channel bar dedicated to a particular theme—sports channels. In various embodiments, a viewer may switch between modes for the channel bar (e.g., regular channel lineup mode, epg mode, themed modes), with a key press, touchpad gesture, voice command, camera detected gesture, or otherwise). In this embodiment, the channel bar is currently displaying five channels with an identifier for each channel—NFL 3502, FOX Sports 3504, ESPN 3506, BBC SPORT 3508, and NHL 3510. Live video for each of the channels may be displayed along with a title or description for the displayed content. In the example shown, text is provided for the NFL network to indicate a game between Dallas vs. Washington 3512 is currently on, the next channel shows Giants vs. Eagles 3514, the next Lakers vs. Celtics 3516, the next Manchester United vs. Chelsea 3518, and finally Calgary vs. St. Louis 3520.

As in the example of the EPG channel bar above, the currently displayed video content of the larger display may be that of a program that was being watched when the viewer switched the channel bar mode. For example, the larger video content may be that of the Hawaii Five-O television show. As in the previous case, by moving the focus between items in the channel bar, the viewer may cause audio for the highlighted show to be presented. Therefore, the viewer may (using a remote control for example) cause focus to move to the Lakers vs. Celtics game to hear the audio for the game while also seeing its live video in the channel bar. In various embodiments, the viewer may switch the audio from the channel bar to the main content (e.g., Hawaii Five-O) via suitable button pressure, gesture, etc.

In the example above, the theme for the channel bar is sports. However, numerous themes may be configured for the channel bar by the provider, the viewer, or both. For example, popular themes for the channel bar may include sports, news, drama, comedy, kids shows, science fiction, historical, and so on. Other themes may be compilations of particular channels created by a viewer and given names by the viewers. For example, a given household with multiple viewers may have themed channel bars such as Arthur Ignatius mystery channels, Wolfgang's fine arts lineup, and so on. Additionally, themed channel bars could be created by other viewers (e.g., in the broader viewing audience—friends or otherwise) and made available for access by others. These other themed channel bars could, in effect, be uploaded by other viewers with a brief description. Others could then download and try them out. Numerous such alternatives are possible and are contemplated.

Figure 36:
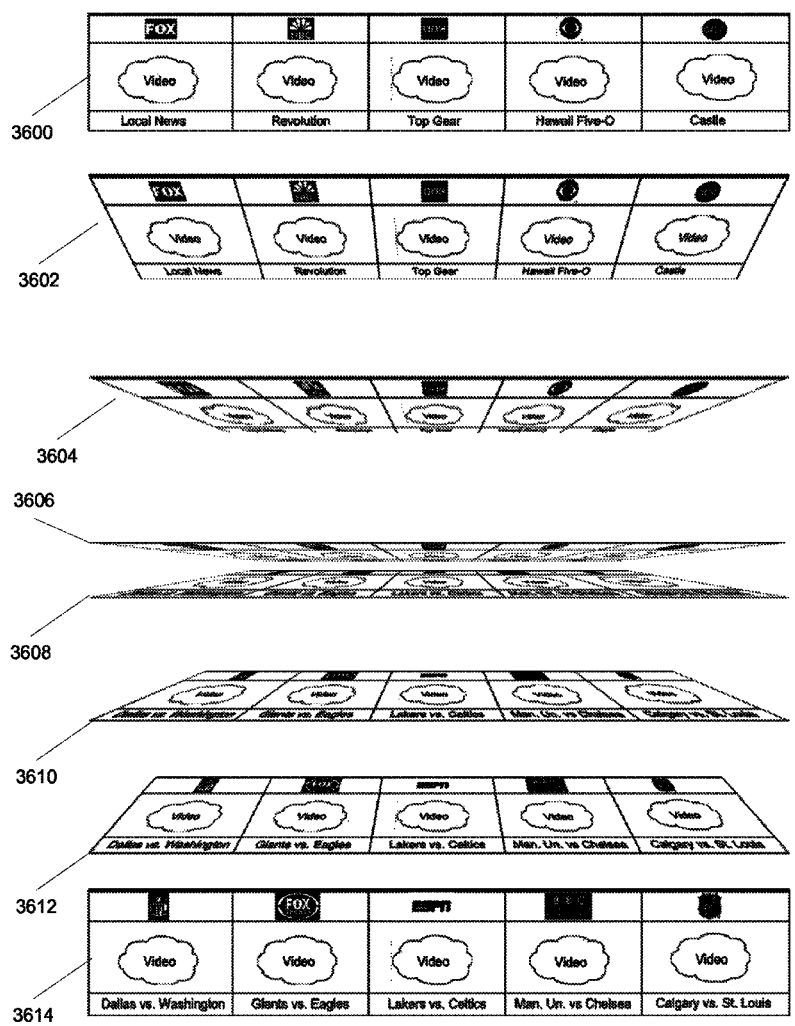
FIG. 36 depicts one embodiment of a channel bar animation.

In various embodiments, switches between channel bar modes may be animated in various ways. FIG. 36 illustrates one embodiment of an animation that may accompany a switch between the EPG channel bar of FIG. 33 and the sports channel bar of FIG. 35. In the example shown, an animation of the channel bar rotating (in place) is depicted beginning with the EPG channel bar 3600 through to final sports channel bar 3614. While a few of the intermediate rotated positions are depicted 3602, 3604, 3606, 3608, 3610, 3612, a fluid animation is contemplated in which discrete position are not identifiable as such.

Figure 37:
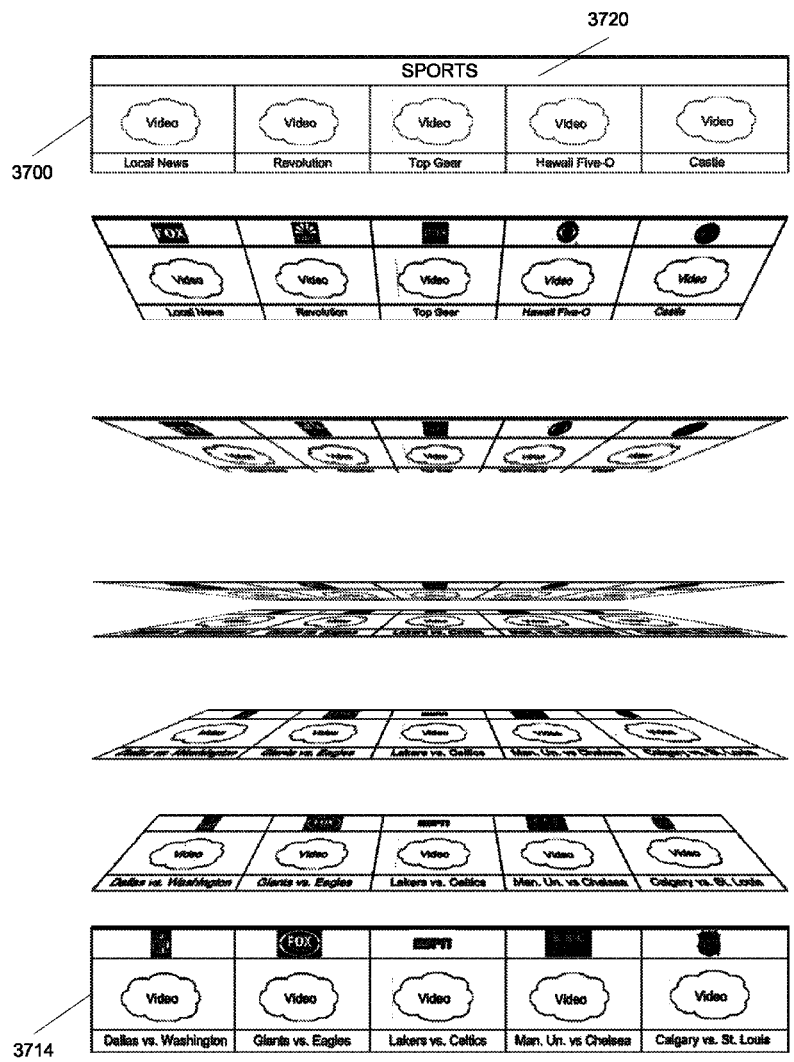
FIG. 37 depicts one embodiment of a channel bar animation.

FIG. 37 illustrates an alternative embodiment of a channel bar mode change. In this example, the initial channel bar (e.g., EPG channel bar) 3700 first has its header replaced with a new header 3720 which identifies the next channel bar mode/type. For example, while watching television and having the EPG channel bar displayed, a viewer may provide input to indicate a switch in channel bar is desired. Responsive to such input, the header, which shows an identification of the networks for each channel in the channel bar, is replaced to show "Sports" 3720 as the next channel bar. The channel bar animation may then proceed to its final state, which is the sports channel bar 3714.

In various embodiments, there may be several channel bars available according to various themes, EPG, regular channel lineup, and so on. In some embodiments, direct access to a particular channel bar may be available via a particular key press or other input. For example, while watching a broadcast television show, particular input may bring up the channel lineup channel bar for that channel by default. In some embodiments, switching among a number of channel bars may include traversing a series of channel bars. For example, given 9 different available channel bars, switching between them may be done as a forward and/or backward cycle. In the case where several channel bars are available, it may not be desirable to cycle through animations of all of the channel bars. Therefore, in various embodiments, cycling of channel bars may first only change the header of the channel bar to indicate the current channel bar in the cycle. Then when the viewer stops cycling for a given period of time (or otherwise provides an indication that cycling is done), the animation to the selected channel bar is performed and the switch made. Note that such an approach may be used even if animations are not used. In this manner, a viewer may cycle through 5 channel bars—viewing only the headers to indicate where in the cycle the viewer is at—before stopping at the fifth at which time the channel bar changes.

Figure 38:
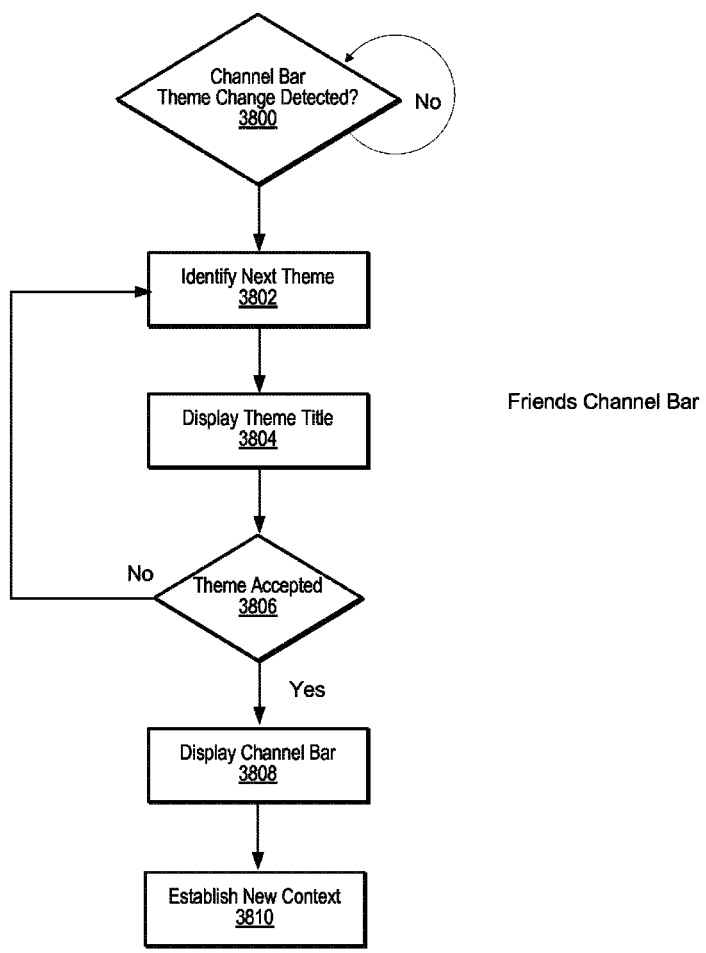
FIG. 38 depicts one embodiment of a channel bar animation.

FIG. 38 illustrates one embodiment of a method for a channel bar switch. In the example shown, a channel bar theme change (switch) may be detected (decision block 3800). One example of such a change indication is detection of an upward or downward swipe motion on a touchpad while the channel bar is displayed. In some embodiments, such swipes may have different functions. In such cases, the display of the channel bar may serve as the context for the input to determine the intended function. If such a change is detected, then the next theme or mode is identified. This identification may include accessing settings within the viewer's set-top box, which identifies particular channel themes and their order. Such settings may have been created by the viewer, provider, a combination of the two, or otherwise. Responsive to identifying the next channel bar, a title for the channel bar is displayed (3804). As described above, this title may be displayed in the header of the title bar. However, other embodiments are possible and are contemplated. If the channel bar or theme is accepted (decision block 3806), then the corresponding channel bar is displayed (block 3808) and a new context established (block 3810). Establishing a new context may entail identifying the new channel bar so that further input can be processed accordingly.

As noted above, in block 3806, a determination is made as to whether the channel bar theme is acceptable. In various embodiments, acceptance of a given channel bar theme comprises detecting that input requesting further cycling through the channel bar themes has ceased for a predetermined period of time. For example, during cycling, each new theme title may be displayed for one second in order to give the viewer time to consider the theme. If after one second, the viewer provides further input requesting cycling, then cycling continues. However, if after 2 seconds of display of a theme title (as an example), there is not further input requesting cycling, then it may be determined that the viewer has accepted the theme. In various embodiments, the durations noted above can vary and may be dynamically adjustable over time based on a viewer's history of cycling. For example, if a viewer regularly cycles more after a theme has been accepted, it may be determined that the durations given above are too short for the particular viewer and themes are erroneously being determined to be accepted. In such a case, the set-top box may lengthen the durations noted above as an adaptation to the viewer.

Figure 39:
FIG. 39 depicts one embodiment of a video display and user interface.

FIG. 39 illustrates one embodiment of an interface in which recommendations 3910 are provided to a viewer. In various embodiments, when a viewer is watching a show 3900 and reaches the end of the show, the system may provide recommendations to the viewer in a side panel 3910 as shown in FIG. 39. In other embodiments, such recommendations could be provided in a format similar to that of the channel bar discussed above, as a list of selectable items, as a series of overlay images, and so on. The recommendations portion 3910 may be at least in part an overlay generated by a set-top box with the incorporation of selected images 3920, 3920 and 3940 received via the primary provider. In various embodiments, the video content may continue playing while the overlay 3910 is presented. In other cases, the video content could be automatically paused. Additionally, the overlays may be semi-transparent to allow the underlying video to be partially visible. Numerous such alternatives are possible and are contemplated in this and other displays described herein. The display of such recommendations may be initiated directly via a remote control key press, or could be initiated automatically (e.g., at the end of the television program currently displayed). In the example shown, a variety of content is depicted as being currently available for viewing. In particular, three different television series are shown as being available—5 seasons of Mad Men, 2 seasons of Game of Thrones, and 1 season of Suburgatory. As the primary provider is generally configured to record all video data all of the time as previously discussed, all video content related to these series is available for the viewer. As previously discussed, depiction as to what is available to a viewer may be based on what the viewer currently has subscriptions to view or anything available for provision by the primary provider. In this case, anything may be displayed as available for the viewer. Additionally, the depicted items representing media content, such as items 3920-3940 shown in FIG. 39, may be selected based on multiple factors. For example, a viewing history of a given user may be used. A viewing history of friends of the given user may be used as criteria for selection. Other examples of criteria for selection of recommendation items to depict to the user may include at least one of the time of day, day of the week, month of the calendar year, purchases made by the given user, a list of items created by the given user, and a list of items created by friends of the given user. Other examples of criteria used for selection are possible and contemplated.

Figure 40:
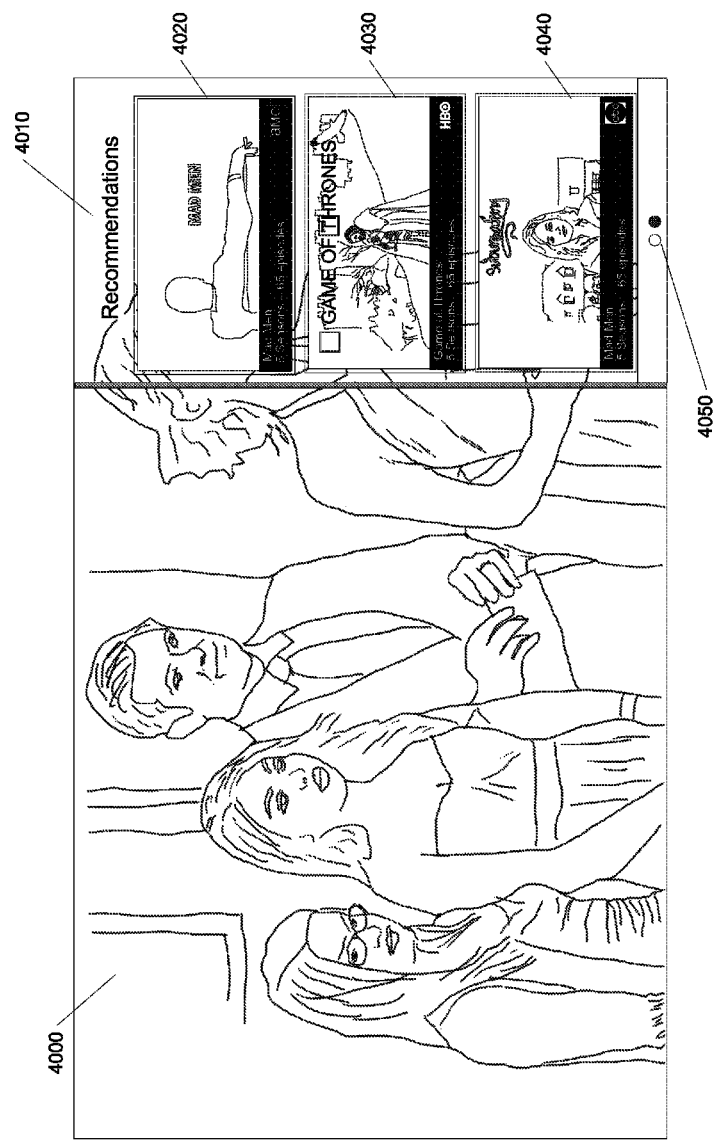
FIG. 40 depicts one embodiment of a video display and user interface.
Figure 43:
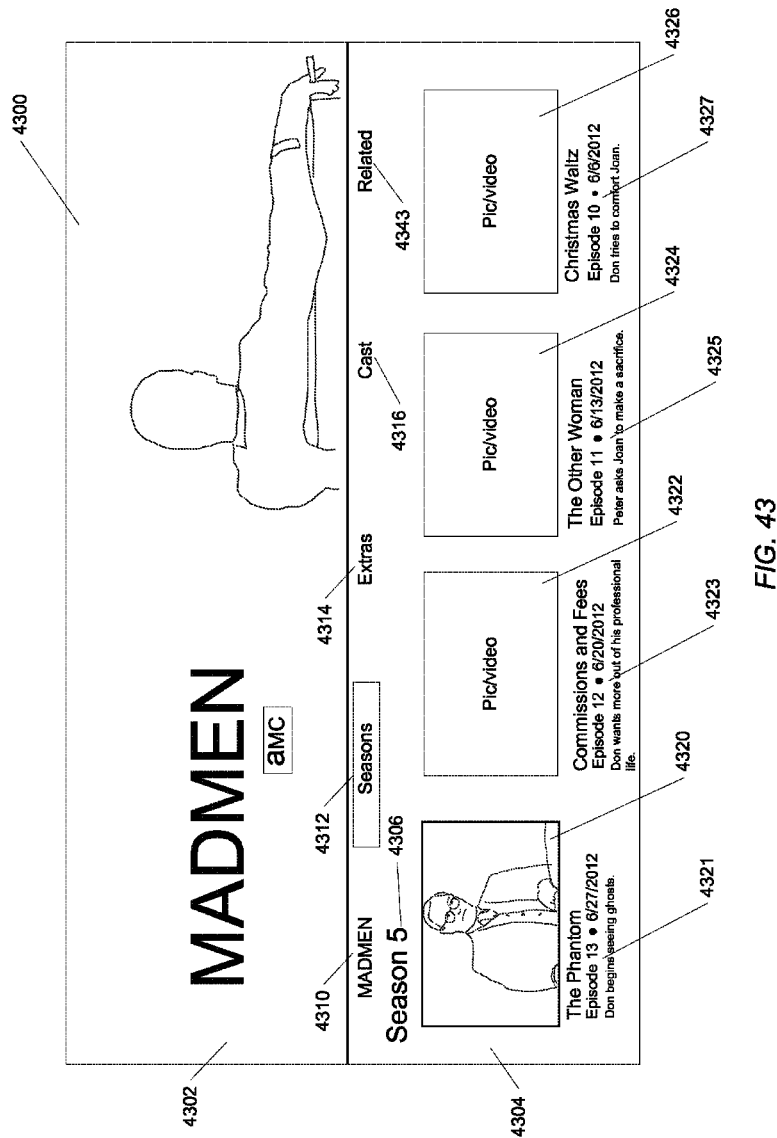
FIG. 43 depicts one embodiment of a video display and user interface.

In the embodiment shown, each of the displayed series in the recommendation portion 3910 represent selectable items by the viewer. Assuming the viewer selects the Mad Men item 3920, in one embodiment a display such as that of FIG. 43 is provided. In the embodiment of FIG. 39, the underlying video 3900 continues to fill the entire display. Also noted in FIG. 39 is the viewer may scroll down the recommendations to see further recommendations. FIG. 40 depicts an alternative embodiment. As before, a recommendations 4010 is shown as (perhaps) an overlay on the right portion of the display. Three recommendations are provided, 4020, 4030, and 4040. In this example, rather than scrolling through recommendations, the recommendations are provided on separate pages and page indicators 4050 are provided to indicate the availability of further recommendations.

Figure 41:
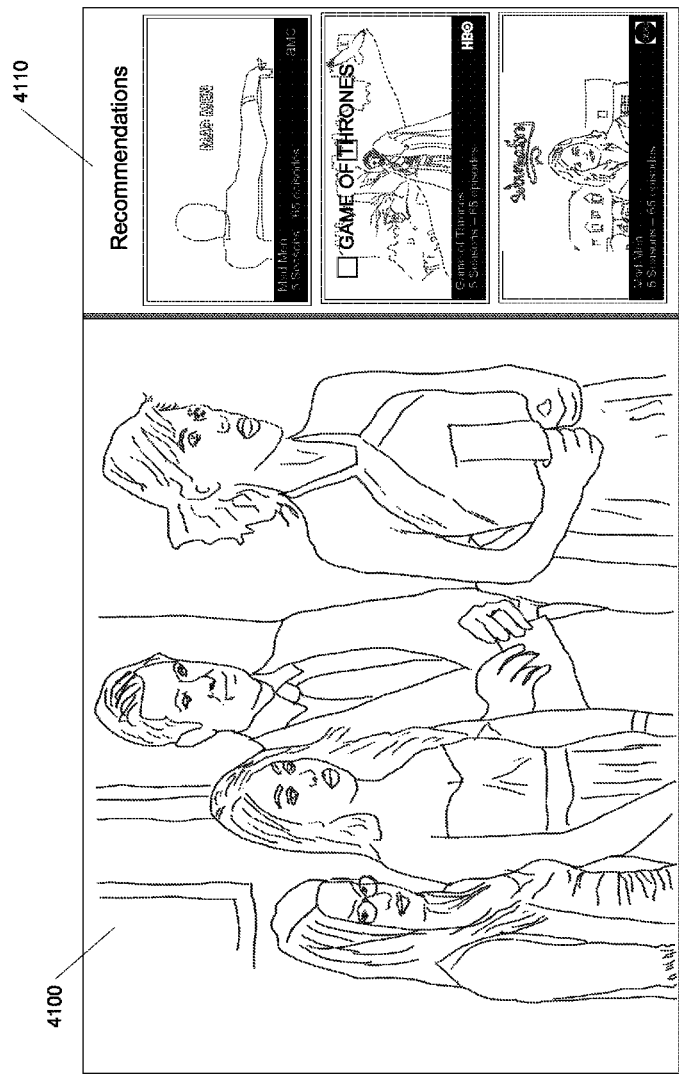
FIG. 41 depicts one embodiment of a video display and user interface.
Figure 42:
FIG. 42 depicts one embodiment of a video display and user interface.

FIG. 41 depicts another embodiment in which recommendations 4110 are presented. However, in this embodiment, the video content 4100 has been compressed so that is does not underlie the recommendations. FIG. 42 depicts an embodiment in which the video content 4200 has been compressed so that it does not underlie the recommendations 4210, but its proportions have been maintained. In this manner, there is space 4220 available underneath (in this example) the video content that may be utilized for presentation of further information.

As noted above, each of the provided recommendations are selectable by a viewer. Assuming the viewer selects the Mad Men recommendation with a remote control, the landing page depicted in FIG. 43 may be presented. Display items in FIG. 43 may be provided by a set-top box and various elements may be generated by the set-top box. FIG. 43 is a "landing page" 4300 for the Mad Men television series. In the embodiment shown, the display 4300 generally includes an upper portion 4302 and a lower portion 4304. The upper portion generally includes artwork associated with the television series, a title of the series (MADMEN), and an identification of the network (AMC) on which the series appears. The artwork may in various embodiments be video, stills, animations, or otherwise.

The middle portion of the display 4300 includes selectable elements 4310, 4312, 4314, 4316, and 4343. Selection of a given element, such as with a remote control, may cause the display of different corresponding content. In the example shown, element 4312 "Seasons" has focus and elements corresponding to season 5 are shown. Focus in this example is illustrated by a box, encompassing element 4312. Numerous other ways of indicating focus are possible and are contemplated. In this example, a title ("Season 5") 4306 corresponding to the below elements is shown. Images 4320, 4322, 4324, 4326, and descriptions 4321, 4323, 4325, and 4327 corresponding to four different episodes are depicted. The images (4320-4326) each generally correspond to the given episode and may be still, video, animations, or any combination of these. Underneath each image is a description of the corresponding episode that may include title, episode number, original air date, and brief description. In various embodiments a viewer may selected one of the images to either immediately begin display of the corresponding video or display of a page corresponding to the particular episode.

As discussed previously, the primary provider is agnostic as to the source of any of these episodes and the date of acquisition of any of these episodes. While the depicted series airs on the AMC network, the primary provider may or may not have acquired it from that network. Additionally, while four consecutive episodes are depicted in FIG. 43, the content provided to the viewer may have been acquired in an order that does not match that of their original airing. Still further, the primary provider may be able to provide the selected content in formats not originally available from the original source (the AMC network). For example, the primary provider may transcode content according to varying requirements of receiving devices. Additionally, content may be transcoded to a varying quality levels not originally available. All such alternatives are possible and are contemplated.

Figure 44:
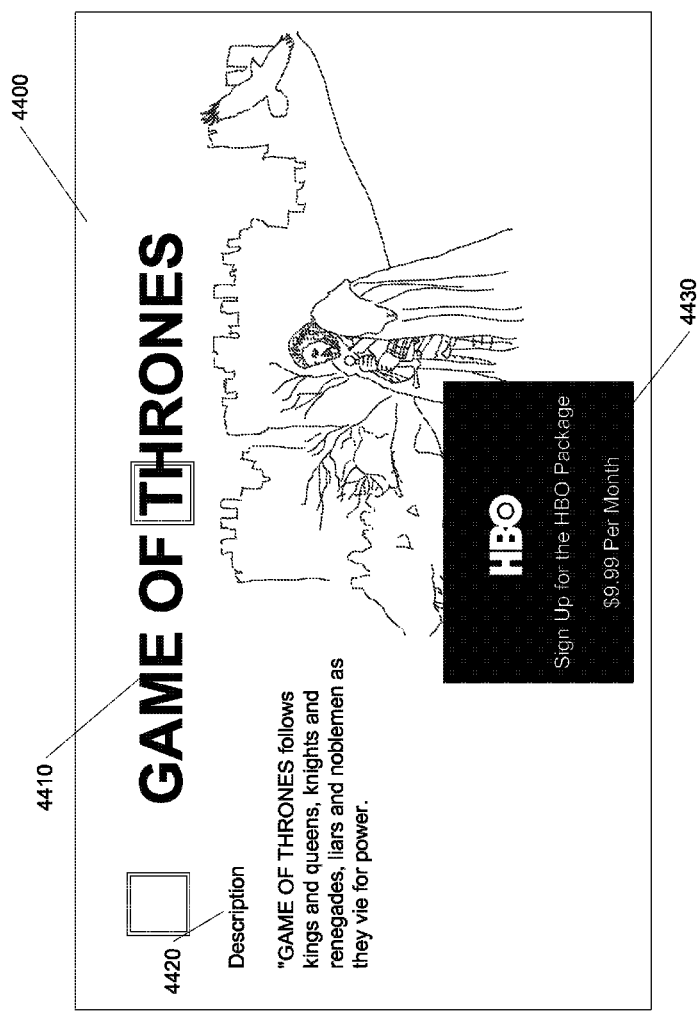
FIG. 44 depicts one embodiment of a video display and user interface.

FIG. 44 illustrates a landing page for the Game of Thrones selection of FIG. 17. In this case, the landing page 4400 provides video content (video, still, or animation), a title of the series 4410, and a description of the series 4420. In this example, the viewer does not have a subscription to the access the content (e.g., a secondary subscription to HBO). Therefore, a banner is displayed 4430 that informs the viewer that the series is not currently available according to their current subscriptions and advises that they may sign up (subscribe) for $9.99 per month. In various embodiments, a user may select the banner and immediately subscribe to HBO. In various embodiments, the viewer makes the subscription through the primary provider, which handles communications with the HBO subscription service. In some embodiments, billing for the HBO service may be included in the viewer's primary provider bill. In such embodiments, subscribing to HBO may be as simple as a couple of button presses to authorize the subscription. Following this simple subscription process, all of the HBO content held by the primary provider is immediately available to the viewer. In other embodiments, rather than subscribing through the primary provider, the viewer may be taken to an HBO subscription service site to complete the subscription process. Billing may be direct to the viewer or included with the primary provider billing as mentioned above. In various embodiments, verification of rights to subscribed content may include communication between a receiving device and content provider, transmission of authorization for storage in a receiving device. For example, authorization could be conveyed in the form of a token that is stored in a receiving device. Such authorization could further have a limited life (an expiration). During its life, authorization may be accomplished at the receiving device without having to contact a content provider. Subsequent to expiration of authorization within a receiving device, further communication with a content provided would be needed to renew or otherwise gain authorization for access to content. Various such embodiments are possible and are contemplated.

Figure 45:
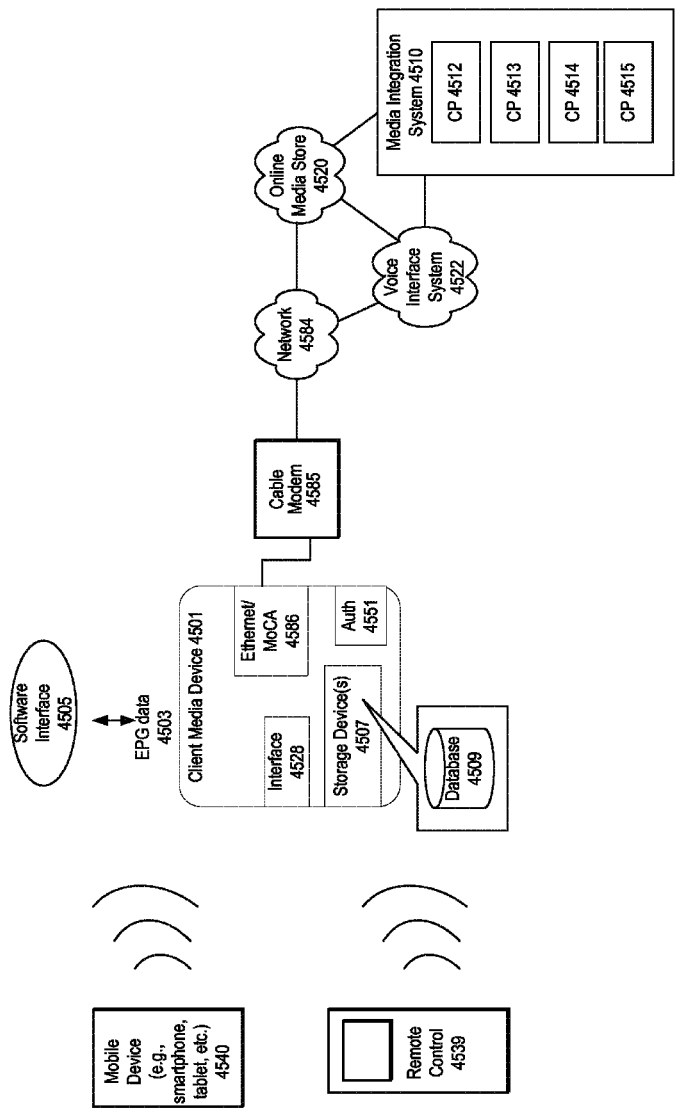
FIG. 45 depicts one embodiment of a media content delivery system.

FIG. 45 illustrates a system including a client media device 4501 configured to receive media content via a network 4584. The client media device may provide the media content to one or more display devices, audio devices, or other devices enabling a user of the client device to view, hear, or otherwise use the media content.

The client media device 4501 may communicate with an online media store 4520 through the network 4584 to receive information for displaying a user interface showing various media content available for delivery to the client media device. Each piece of media content may be referred to as a "media production." Examples of media productions include various kinds of movies and films, television programs, music videos, albums/songs, etc. In general, a given media production may include any kind of content that includes video and/or audio information.

In some embodiments the online media store may be coupled to or may include a media integration system 4510 which integrates media productions from a plurality of third-party content provider systems, such as the content providers CP 4512-4515. Each of the content provider systems may be managed by or affiliated with any kind of company or organization, such as cable or satellite television providers, television networks or channels, movie studios, sporting leagues, news organizations, music labels, online media services, etc. Thus, the user interface displayed by the client media device may aggregate the media productions available from many different content providers or sources, and may provide a convenient way for the user to see the content from different providers in an integrated view.

In various embodiments the client media device may communicate with the online media store 4520 through any kind of network 4584. The network 4584 may include any type of network or combination of networks. For example, the network 4584 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks.

In the illustrated embodiment the client media device is coupled to the network 4584 via Ethernet hardware or Multimedia over Coax Alliance (MoCA) hardware 4586, which in turn couples to a cable modem 4585. In other embodiments the client media device may be coupled to the network 4584 via any other type of wired or wireless connection medium or device. For example, wired mediums may include Ethernet, fiber channel, a modem, etc. Wireless connection mediums may include a wireless connection using a wireless communication protocol such as IEEE 802.11 (wireless Ethernet), a modem link through a cellular service, a satellite link, etc.

The client media device may include one or more storage devices 4507 configured to store data. At least one of the storage devices 4507 may include non-volatile memory configured to persistently store data. In various embodiments the storage device(s) may include one or more disk drives, solid state drives, flash memory devices, optical storage devices, or any other kinds of devices for storing data. In some embodiments the storage device(s) may also include various kinds of volatile memory, such as random access memory (RAM), e.g., synchronous dynamic RAM (SDRAM), static RAM (SRAM), etc.

Electronic Programming Guide (EPG) data 4503 may be periodically delivered to the client media device 4501 via a software interface 4505. The software interface 4505 may include any kind of programming interface or messaging interface that enables the client media device to communicate with an external system to receive the EPG data 4503 or other data. As one example, the software interface 4505 may include a JavaScript Object Notation (JSON) interface. As another example, the software interface 4505 may include a URL-based interface that enables the client media device to perform various functions or exchange information by referencing uniform resource locators (URLs) with particular parameters embedded in them.

The client media device may store the EPG data 4503 on the storage device(s) 4507. For example, one or more databases 4509 may be stored on the storage device 4507, and the EPG data 4503 may be stored in one or more of the databases. The EPG data 4503 may include information about television programming, such as the listing of programs, their scheduled times, the channel lineup, images associated with the programs, etc. The EPG data 4503 may be customized for the particular user of the client media device 4501. For example, if the user subscribes to some subscription-based content providers, but not others, then the EPG data 4503 may include information for only the programs or media productions offered by the providers to which the user subscribes.

The database(s) 4509 may also store other information, such as personalization information for the user(s) of the client media device 4501. The personalization information may include the user's favorite programs or channels, list of recently viewed content, stored play positions for various media content, watch lists, bookmarks, etc.

The client media device may be configured to receive user input from a remote control device 4539 via an interface 4528. The remote control device may use infrared communication, Bluetooth communication, or any of various other kinds of wireless or wired communication techniques to transmit signals to the client media device indicating the user input.

In some embodiments the client media device may be configured to communicate with the media integration system 4510 and/or the online media store 4520 through a voice interface system 4522. For example, in some embodiments the remote control device or the client media device may include a microphone device 4524 that receives speech from the user, e.g., where the speech includes commands, requests, questions, etc. The client media device may convert the speech into digital packets for transmission over the network 84 to the voice interface system 4522. The voice interface system may perform speech recognition to recognize the user's commands or questions. The voice interface system may communicate with the online media store 4520 and/or the media integration system 4510 to pass the user's commands or questions on to them via an interface. The online media store 4520 and/or the media integration system 4510 may then generate information in response to the user's commands or questions and return it to the client media device (or return it to the voice interface system, which may then forward it to the client media device). For example, the user may request to lookup a television program having a certain title or actor, and the system may return information that the client media device uses to display a list of programs matching the title or actor.

In various embodiments the information transmitted from the online media store or voice interface system to the client media device may include any kind of information useable by the client media device to display information regarding the media content available for delivery to the client media device. For example, in some embodiments the system may utilize Extensible Markup Language (XML) code or other markup language code which describes the information to be displayed. The client media device may parse the XML code and display a user interface based on the described information. In some embodiments the system may also transmit graphics files or video feeds which the client media device may incorporate into the user interface.

In some embodiments the client media device may also communicate with a mobile computing device 4540, e.g., where the user may hold the mobile device. For example, the mobile device 4540 may be a handheld computing device, wearable computing device, or other portable computing device. Examples of mobile devices include smartphones, tablet computers, personal digital assistants, portable music players, handheld game devices, wearable computers (e.g., glasses watches), etc. In some embodiments the user may control the client media device 4501 using the mobile device 4540, e.g., using the mobile device 4540 as a remote control. In some embodiments the client media device may also forward the media content received from the online media store 4520 or media integration system 4510 to the mobile device 4540, e.g., so that it can be displayed on a display device included in the mobile device 4540. In other embodiments the mobile device 4540 may communicate directly with the online media store 4520 and/or the media integration system 4510, e.g., without going through the client media device 4501 as an intermediate. The client media device may also be included as a component within the mobile device in some embodiments, and/or the mobile device may be configured to perform the functions described with reference to the client media device.

The client media device may be configured to utilize digital rights management (DRM) techniques to ensure that the user is authorized to receive and view selected media content. For example, the client media device may include an authorization module 4551 configured to communicate with one or more remote servers to implement the digital rights management for the media content. In various embodiments the client media device may communicate with servers associated with any of various systems or organizations in order to implement the digital rights management, such as one or more servers in the online media store 4520 or the content provider systems whose media productions are integrated by the media integration system 4510.

In the above discussion, various embodiments have been described. It is noted that these embodiments may be combined in any manner desired. In various embodiments, program instructions of a software application may be used to implement the methods and/or mechanisms previously described. The program instructions may be stored on a computer readable storage medium. Numerous types of storage media are available. The storage medium may be accessible by a computer or other processing device during use to provide the program instructions and accompanying data to the computer or device for program execution.

Therefore, according to the above, this disclosure includes subject matter directed to the following examples:

Example 1

A method comprising: displaying video content on a display device; displaying a first channel bar that overlays a portion of the video content, the first channel bar comprising a plurality of elements each of which corresponds to video content; detecting user input requesting a channel bar change; responsive to detecting said input, replacing the first channel bar with a second channel bar on the display device, wherein the second channel bar includes a plurality of elements each of which corresponds to video content according to a given theme.

Example 2

The method as recited in preceding example 1, wherein each of the plurality of elements of the first channel bar and the second channel bar displays live broadcast video.

Example 3

The method as recited in preceding example 1, wherein replacing the first channel bar with the second channel bar is in further response to determining the given theme is accepted by the viewer.

Example 4

The method as recited in preceding example 3, further comprising displaying a title for the given theme in response to detecting said user input prior to determining the given theme is accepted by the viewer.

Example 5

The method as recited in preceding example 4, wherein determining the given this is accepted by the viewer comprises detecting input requesting a channel bar change has ceased for at least a given period of time.

Example 6

The method as recited in preceding example 4, further comprising displaying a series of titles corresponding to further channel bar themes in response to detecting continued input requesting a channel bar change.

Example 7

The method as recited in preceding example 6, wherein the second channel bar corresponds to a last channel bar title displayed before detecting input requesting a channel bar change ceased for at least a given period of time.

Example 8

The method as recited in preceding example 1, wherein the second channel bar corresponds to a television network broadcast lineup including past, present, and future scheduled broadcasts.

Example 9

The method as recited in preceding example 8, wherein one or more of the future scheduled broadcasts are immediately selectable for viewing by the viewer.

Example 10

The method as recited in preceding example 1, wherein the second channel bar comprises live broadcast video for multiple channels on multiple television networks.

Example 11

The method as recited in preceding example 10, wherein the second channel bar comprises live broadcast video for multiple sports channels.

Example 12

The method as recited in preceding example 1, further comprising presenting the audio for a particular elements of the second channel bar responsive to the particular element having been selected for focus by the viewer.

Example 13

The method as recited in preceding example 1, further comprising changing a scope of the second channel bar responsive to a scrubbing operation performed by the viewer.

Example 14

The method as recited in preceding example 13, wherein change said scope comprises replacing a first element of the second channel bar with a plurality of elements which represent greater detail concerning the first element.

Example 15

The method as recited in preceding example 1, wherein the second channel bar comprises elements that correspond to multiple episodes of the video content being currently displayed on the video device.

Example 16

The method as recited in preceding example 1, wherein the display device comprises at least one of a television, a phone, a tablet computer, a portable gaming device, a wearable portable device, a display device in a motor vehicle, or a remote control.

Example 17

The method as recited in preceding example 1, wherein each element is accompanied by a description content being displayed by the element.

Example 18

A receiver for use in a television system, the receiver comprising: a first interface configured to receive a signal comprising video content; circuitry configured to: display video content on a display device; display a first channel bar that overlays a portion of the video content, the first channel bar comprising a plurality of elements each of which corresponds to video content; detect user input requesting a channel bar change; responsive to detecting said input, replace the first channel bar with a second channel bar on the display device, wherein the second channel bar includes a plurality of elements each of which corresponds to video content according to a given theme.

Example 19

The receiver as recited in preceding example 18, wherein each of the plurality of elements of the first channel bar and the second channel bar displays live broadcast video.

Example 20

The receiver as recited in preceding example 18, wherein the circuitry is further configured to display a series of titles corresponding to further channel bar themes in response to detecting continued input requesting a channel bar change.

Example 21

A television system comprising: a server farm comprising video content; a receiving device configured to receive video content conveyed from the server farm; wherein the receiving device is configured to: display video content on a display device; display a first channel bar that overlays a portion of the video content, the first channel bar comprising a plurality of elements each of which corresponds to video content; detect user input requesting a channel bar change; responsive to detecting said input, replace the first channel bar with a second channel bar on the display device, wherein the second channel bar includes a plurality of elements each of which corresponds to video content according to a given theme.

This disclosure further includes subject matter directed to the following examples:

Example 1

A method comprising: displaying video content on a display device; displaying a first channel bar that overlays a portion of the video content, the first channel bar comprising a plurality of elements each of which corresponds to video content; detecting user input requesting a channel bar change; responsive to detecting said input, replacing the first channel bar with a second channel bar on the display device, wherein the second channel bar includes a plurality of elements each of which corresponds to video content according to a given theme.

Example 2

The method as recited in preceding example 1, wherein each of the plurality of elements of the first channel bar and the second channel bar displays live broadcast video.

Example 3

The method as recited in preceding example 1, wherein replacing the first channel bar with the second channel bar is in further response to determining the given theme is accepted by the viewer.

Example 4

The method as recited in preceding example 3, further comprising displaying a title for the given theme in response to detecting said user input prior to determining the given theme is accepted by the viewer.

Example 5

The method as recited in preceding example 4, wherein determining the given this is accepted by the viewer comprises detecting input requesting a channel bar change has ceased for at least a given period of time.

Example 6

The method as recited in preceding example 4, further comprising displaying a series of titles corresponding to further channel bar themes in response to detecting continued input requesting a channel bar change.

Example 7

The method as recited in preceding example 6, wherein the second channel bar corresponds to a last channel bar title displayed before detecting input requesting a channel bar change ceased for at least a given period of time.

Example 8

The method as recited in preceding example 1, wherein the second channel bar corresponds to a television network broadcast lineup including past, present, and future scheduled broadcasts.

Example 9

The method as recited in preceding example 8, wherein one or more of the future scheduled broadcasts are immediately selectable for viewing by the viewer.

Example 10

The method as recited in preceding example 1, wherein the second channel bar comprises live broadcast video for multiple channels on multiple television networks.

Example 11

The method as recited in preceding example 10, wherein the second channel bar comprises live broadcast video for multiple sports channels.

Example 12

The method as recited in preceding example 1, further comprising presenting the audio for a particular elements of the second channel bar responsive to the particular element having been selected for focus by the viewer.

Example 13

The method as recited in preceding example 1, further comprising changing a scope of the second channel bar responsive to a scrubbing operation performed by the viewer.

Example 14

The method as recited in preceding example 13, wherein change said scope comprises replacing a first element of the second channel bar with a plurality of elements which represent greater detail concerning the first element.

Example 15

The method as recited in preceding example 1, wherein the second channel bar comprises elements that correspond to multiple episodes of the video content being currently displayed on the video device.

Example 16

The method as recited in preceding example 1, wherein the display device comprises at least one of a television, a phone, a tablet computer, a portable gaming device, a wearable portable device, a display device in a motor vehicle, or a remote control.

Example 17

The method as recited in preceding example 1, wherein each element is accompanied by a description content being displayed by the element.

Example 18

A receiver for use in a television system, the receiver comprising: a first interface configured to receive a signal comprising video content; circuitry configured to: display video content on a display device; display a first channel bar that overlays a portion of the video content, the first channel bar comprising a plurality of elements each of which corresponds to video content; detect user input requesting a channel bar change; responsive to detecting said input, replace the first channel bar with a second channel bar on the display device, wherein the second channel bar includes a plurality of elements each of which corresponds to video content according to a given theme.

Example 19

The receiver as recited in preceding example 18, wherein each of the plurality of elements of the first channel bar and the second channel bar displays live broadcast video.

Example 20

The receiver as recited in preceding example 18, wherein the circuitry is further configured to display a series of titles corresponding to further channel bar themes in response to detecting continued input requesting a channel bar change.

Example 21

A television system comprising: a server farm comprising video content; a receiving device configured to receive video content conveyed from the server farm; wherein the receiving device is configured to: display video content on a display device; display a first channel bar that overlays a portion of the video content, the first channel bar comprising a plurality of elements each of which corresponds to video content; detect user input requesting a channel bar change; responsive to detecting said input, replace the first channel bar with a second channel bar on the display device, wherein the second channel bar includes a plurality of elements each of which corresponds to video content according to a given theme.

This disclosure further includes subject matter directed to the following examples:

Example 1

A device comprising: a interface configured to receive a signal comprising media content; a second interface configured to be coupled to a display device; and circuitry configured to: convey video content to the second interface for display on a first portion of the display device; and convey a channel bar to the second interface for display on a second portion of the display device, wherein the channel bar comprises a plurality of elements indicative of a broadcast lineup corresponding to a plurality of channels.

Example 2

The device as recited in any one or more of the preceding examples, wherein the second portion overlays part of the first portion.

Example 3

The device as recited in any one or more of the preceding examples, wherein the plurality of channels are selected responsive to powering on the device.

Example 4

The device as recited in any one or more of the preceding examples, wherein the plurality of channels are selected based on vide content most recently viewed before the device was powered off.

Example 5

The device as recited in any one or more of the preceding examples, wherein the plurality of channels are selected based on video content previously identified as corresponding to favorite channels.

Example 6

The device as recited in any one or more of the preceding examples, wherein the favorite channels are determined at least in part on a viewing history of a viewer.

Example 7

The device as recited in any one or more of the preceding examples, wherein the favorite channels are determined at least in part on a viewing history of viewers identified as friends of a viewer corresponding to the device.

Example 8

The device as recited in any one or more of the preceding examples, wherein at least a title for an associated program of the lineup is overlayed on top of a respective element in the channel bar.

Example 9

The device as recited in any one or more of the preceding examples, wherein at least a visual element for an associated program of the lineup is overlayed on top of a respective element in the channel bar.

Example 10

The device as recited in any one or more of the preceding examples, wherein at least a channel identifier for a respective channel of the plurality of channels is overlayed on top of a respective element in the channel bar.

Example 11

The device as recited in any one or more of the preceding examples, wherein at least a text description for an associated program of the lineup is overlayed on top of a respective element in the channel bar.

Example 12

The device as recited in any one or more of the preceding examples, wherein a separator is used to distinguish elements in the channel bar from one another corresponding to the programs of the plurality of channels.

Example 13

The device as recited in any one or more of the preceding examples, wherein each of the plurality of elements comprises at least one of: a still image, audio content, video content, and animation.

Example 14

The device as recited in any one or more of the preceding examples, wherein the device is further configured to cease displaying the channel bar after a predetermined period of time.

Example 15

A method comprising: receiving a signal comprising media content; conveying video content for display on a portion of a display device, wherein the video content corresponds to a single program of a channel; and conveying a channel bar for display on a second portion of the display device, wherein the channel bar comprises a plurality of elements indicative of a broadcast lineup for a plurality of channels.

Example 16

The method as recited in any one or more of the preceding examples, wherein the second portion overlays part of the first portion.

Example 17

The method as recited in any one or more of the preceding examples, wherein the plurality of channels are selected upon the device being turned on.

Example 18

The method as recited in any one or more of the preceding examples, wherein the plurality of channels are selected based on last previous channels viewed before the receiving device is turned off.

Example 19

The method as recited in any one or more of the preceding examples, wherein the plurality of channels are selected based on video content previously identified as corresponding to favorite channels.

Example 20

The method as recited in any one or more of the preceding examples, wherein the favorite channels are determined from a viewing history of a viewer.

Example 21

The method as recited in any one or more of the preceding examples, wherein the favorite channels are determined at least in part on a viewing history of viewers identified as friends of a viewer corresponding to the device.

Example 22

The method as recited in any one or more of the preceding examples, wherein at least a title for an associated program of the lineup of programs is overlayed on top of a respective element in the channel bar.

Example 23

The method as recited in any one or more of the preceding examples, wherein at least media content for an associated program of the lineup of programs is overlayed on top of a respective element in the channel bar.

Example 24

The method as recited in any one or more of the preceding examples, wherein at least an identifier for a respective channel of the plurality of channels is overlayed on top of a respective element in the channel bar corresponding to the associated channel.

Example 25

The method as recited in any one or more of the preceding examples, wherein at least a text description for an associated program of the lineup of programs is overlayed on top of a respective element in the channel bar.

Example 26

The method as recited in any one or more of the preceding examples, wherein a separator is used to distinguish elements in the channel bar from one another corresponding to the programs of the plurality of channels.

Example 27

The method as recited in any one or more of the preceding examples, wherein the media content includes at least one of the following: a still image, audio content, video content from an associated program, and an animation.

Example 28

The method as recited in any one or more of the preceding examples, wherein the method further comprises ceasing to display the channel bar after a predetermined period of time without receiving additional viewer input.

Example 29

A computer readable storage medium comprising program instructions executable to: receive a signal comprising media content; convey video content for display on a first portion of a display device, wherein the media content corresponds to a single program of a channel; and convey a channel bar for display on a second portion of the display device, wherein the channel bar comprises a plurality of elements indicative of a broadcast lineup of programs for a plurality of channels.

Example 30

The computer readable storage medium as recited in any one or more of the preceding examples, wherein the second portion overlays part of the first portion.

Example 31

The computer readable storage medium as recited in any one or more of the preceding examples, wherein the plurality of channels are selected upon the receiving device being turned on.

Example 32

The computer readable storage medium as recited in any one or more of the preceding examples, wherein the plurality of channels are selected based on last previous channels viewed before the receiving device is turned off.

Example 33

The computer readable storage medium as recited in any one or more of the preceding examples, wherein the plurality of channels are selected based on given favorite channels.

Example 34

The computer readable storage medium as recited in any one or more of the preceding examples, wherein the favorite channels are determined from a viewing history of a viewer.

Example 35

The computer readable storage medium as recited in any one or more of the preceding examples, wherein the favorite channels are determined from a viewing history of friends of the viewer, wherein the history is stored on a server coupled to the circuitry.

Example 36

The computer readable storage medium as recited in any one or more of the preceding examples, wherein at least a title for an associated program of the lineup of programs is overlayed on top of a respective element in the channel bar.

Example 37

The computer readable storage medium as recited in any one or more of the preceding examples, wherein at least media content for an associated program of the lineup of programs is overlayed on top of a respective element in the channel bar.

Example 38

The computer readable storage medium as recited in any one or more of the preceding examples, wherein at least an identifier for a respective channel of the plurality of channels is overlayed on top of a respective element in the channel bar corresponding to the associated channel.

Example 39

The computer readable storage medium as recited in any one or more of the preceding examples, wherein at least a text description for an associated program of the lineup of programs is overlayed on top of a respective element in the channel bar.

Example 40

The computer readable storage medium as recited in any one or more of the preceding examples, wherein a separator is used to distinguish elements in the channel bar from one another corresponding to the programs of the plurality of channels.

Example 41

The computer readable storage medium as recited in any one or more of the preceding examples, wherein the media content includes at least one of the following: a still image, audio content, video content from an associated program, and an animation.

Example 42

The computer readable storage medium as recited in any one or more of the preceding examples, wherein the program instructions are further executable to cease displaying the channel bar after a predetermined period of time without receiving additional viewer input.

Example 43

A system comprising: a data store configured to store video content; a server coupled to communicate with the data store; and a receiving device configured to communicate with the server via a network; wherein the receiving device is configured to: convey video content to the second interface for display on a first portion of the display device, wherein the video content corresponds to a single program of a channel; and convey a channel bar to the second interface for display on a second portion of the display device, wherein the channel bar comprises a plurality of elements indicative of a broadcast lineup of programs for a plurality of channels.

Example 44

The system as recited in any one or more of the preceding examples, wherein the second portion overlays part of the first portion.

Example 45

The system as recited in any one or more of the preceding examples, wherein the plurality of channels are selected upon the receiving device being turned on.

Example 46

The system as recited in any one or more of the preceding examples, wherein the plurality of channels are selected based on last previous channels viewed before the receiving device is turned off.

Example 47

The system as recited in any one or more of the preceding examples, wherein the plurality of channels are selected based on given favorite channels.

Example 48

The system as recited in any one or more of the preceding examples, wherein the favorite channels are determined from a viewing history of a viewer.

Example 49

The system as recited in any one or more of the preceding examples, wherein the favorite channels are determined from a viewing history of friends of the viewer, wherein the history is stored on a server coupled to the circuitry.

Example 50

The system as recited in any one or more of the preceding examples, wherein at least a title for an associated program of the lineup of programs is overlayed on top of a respective element in the channel bar.

Example 51

The system as recited in any one or more of the preceding examples, wherein at least media content for an associated program of the lineup of programs is overlayed on top of a respective element in the channel bar.

Example 52

The system as recited in any one or more of the preceding examples, wherein at least an identifier for a respective channel of the plurality of channels is overlayed on top of a respective element in the channel bar corresponding to the associated channel.

Example 53

The system as recited in any one or more of the preceding examples, wherein at least a text description for an associated program of the lineup of programs is overlayed on top of a respective element in the channel bar.

Example 54

The system as recited in any one or more of the preceding examples, wherein a separator is used to distinguish elements in the channel bar from one another corresponding to the programs of the plurality of channels.

Example 55

The system as recited in any one or more of the preceding examples, wherein the media content includes at least one of the following: a still image, audio content, video content from an associated program, and an animation.

Example 56

The system as recited in any one or more of the preceding examples, wherein the receiving device is further configured to cease displaying the channel bar after a predetermined period of time without receiving additional viewer input.

Example 57

A system for providing stored video content, the system comprising: a first means configured to receive a signal comprising media content; a second means configured to: convey video content to the second interface for display on a first portion of the display device, wherein the video content corresponds to a single program of a channel; and convey a channel bar to the second interface for display on a second portion of the display device, wherein the channel bar comprises a plurality of elements indicative of a broadcast lineup of programs for a plurality of channels.

Example 58

The system as recited in any one or more of the preceding examples, wherein the second portion overlays part of the first portion.

Example 59

The system as recited in any one or more of the preceding examples, wherein the plurality of channels are selected upon the receiving device being turned on.

Example 60

The system as recited in any one or more of the preceding examples, wherein the plurality of channels are selected based on last previous channels viewed before the receiving device is turned off.

Example 61

The system as recited in any one or more of the preceding examples, wherein the plurality of channels are selected based on given favorite channels.

Example 62

The system as recited in any one or more of the preceding examples, wherein the favorite channels are determined from a viewing history of a viewer.

Example 63

The system as recited in any one or more of the preceding examples, wherein the favorite channels are determined from a viewing history of friends of the viewer, wherein the history is stored on a server coupled to the circuitry.

Example 64

The system as recited in any one or more of the preceding examples, wherein at least a title for an associated program of the lineup of programs is overlayed on top of a respective element in the channel bar.

Example 65

The system as recited in any one or more of the preceding examples, wherein at least media content for an associated program of the lineup of programs is overlayed on top of a respective element in the channel bar.

Example 66

The system as recited in any one or more of the preceding examples, wherein at least an identifier for a respective channel of the plurality of channels is overlayed on top of a respective element in the channel bar corresponding to the associated channel.

Example 67

The system as recited in any one or more of the preceding examples, wherein at least a text description for an associated program of the lineup of programs is overlayed on top of a respective element in the channel bar.

Example 68

The system as recited in any one or more of the preceding examples, wherein a separator is used to distinguish elements in the channel bar from one another corresponding to the programs of the plurality of channels.

Example 69

The system as recited in any one or more of the preceding examples, wherein the media content includes at least one of the following: a still image, audio content, video content from an associated program, and an animation.

Example 70

The system as recited in any one or more of the preceding examples, wherein the content providing means further comprising displaying the channel bar after a predetermined period of time without receiving additional viewer input.

This disclosure further includes subject matter directed to the following examples:

Example 1

A device comprising: a first interface configured to receive a signal comprising media content; a second interface configured to be coupled to a display device; and circuitry, wherein the circuitry is configured to: convey video content for display on the display device; convey a channel bar for display on the display device, wherein the channel bar includes a plurality of elements indicative of a broadcast lineup for a plurality of channels; send a request for new video content; receive the new video content; and convey the new video content for display within a new element of the channel bar.

Example 2

The receiver as recited in any one or more of the preceding examples, wherein the circuitry is further configured to: convey the video content to the second interface for display on a first portion of the display device; and convey the channel bar to the second interface for display on a second portion of the display device, wherein the second portion overlays part of the first portion.

Example 3

The receiver as recited in any one or more of the preceding examples, wherein the channel bar is conveyed responsive to detecting the device is powered on.

Example 4

The receiver as recited in any one or more of the preceding examples, wherein the channel bar is conveyed responsive to detecting viewer input requesting a change in video content.

Example 5

The receiver as recited in any one or more of the preceding examples, wherein a given element corresponding to a given program of the broadcast line up is indicated as being highlighted.

Example 6

The receiver as recited in any one or more of the preceding examples, wherein the indication as being highlighted includes at least one of the following: a bold border and an expanded border.

Example 7

The receiver as recited in any one or more of the preceding examples, wherein in response to detecting viewer input requesting a change in highlighting the given element, the circuitry is further configured to highlight another element different from the given element.

Example 8

The receiver as recited in any one or more of the preceding examples, wherein the circuitry is further configured to select an element of the channel bar for presentation based on viewer input.

Example 9

The receiver as recited in any one or more of the preceding examples, wherein the circuitry is further configured to present audio content associated with a channel corresponding to a currently highlighted element while simultaneously displaying first video content.

Example 10

The receiver as recited in any one or more of the preceding examples, wherein the circuitry is further configured to pause presenting audio content associated with the first video content.

Example 11

The receiver as recited in any one or more of the preceding examples, wherein in response to detecting viewer input to return focus of playback to the first video content, the circuitry is further configured to present audio content associated with the first video content.

Example 12

The receiver as recited in any one or more of the preceding examples, wherein the given element includes associated video content, and wherein the circuitry is further configured to display the associated video of the given element in a presentation larger than the given element while highlighted.

Example 13

The receiver as recited in any one or more of the preceding examples, wherein in response to viewer input requesting a change from the first video content to the associated video content, the circuitry is further configured to replace the first video content with the associated video content on the display device.

Example 14

A method comprising: conveying video content for display on a display device; conveying a channel bar for display on the display device, wherein the channel bar includes a plurality of elements indicative of a broadcast lineup for a plurality of channels; sending a request for new video content; the new video content; and conveying the new video content for display within a new element of the channel bar.

Example 15

The method as recited in any one or more of the preceding examples, wherein the method further comprises: conveying the video content to the second interface for display on a first portion of the display device; and conveying the channel bar to the second interface for display on a second portion of the display device, wherein the second portion overlays part of the first portion.

Example 16

The method as recited in any one or more of the preceding examples, wherein the channel bar is presented responsive to the device being turned on.

Example 17

The method as recited in any one or more of the preceding examples, wherein the channel bar is presented responsive to viewer input requesting a change in video input.

Example 18

The method as recited in any one or more of the preceding examples, wherein a given element corresponding to a given program of the broadcast line up is indicated as being highlighted.

Example 19

The method as recited in any one or more of the preceding examples, wherein the indication as being highlighted includes at least one of the following: a bold border and an expanded border.

Example 20

The method as recited in any one or more of the preceding examples, wherein in response to detecting viewer input requesting a change in highlighting the given element, the method further comprises selecting another element different from the given element as indicated as being highlighted.

Example 21

The method as recited in any one or more of the preceding examples, wherein the method further comprises selecting based on the viewer input.

Example 22

The method as recited in any one or more of the preceding examples, wherein the method further comprises presenting audio content associated with a program corresponding to a currently highlighted element while simultaneously displaying the first video content.

Example 23

The method as recited in any one or more of the preceding examples, wherein the method further comprises pausing presenting audio content associated with the first video content.

Example 24

The method as recited in any one or more of the preceding examples, wherein in response to detecting viewer input to return focus of playback on the first video content, the method further comprises presenting audio content associated with the first video content.

Example 25

The method as recited in any one or more of the preceding examples, wherein the given element includes associated video content, wherein the method further comprises displaying the associated video of the given element while indicated as being highlighted.

Example 26

The method as recited in any one or more of the preceding examples, wherein in response to viewer input requesting a change from the first video content to the associated video content, the method further comprises replacing the first video content with the associated video content on the display device.

Example 27

A computer readable storage medium comprising instructions executable to: convey video content for display on the display device; convey a channel bar for display on the display device, wherein the channel bar includes a plurality of elements indicative of a broadcast lineup for a plurality of channels; send a request for new video content; receive the new video content; and convey the new video content for display within a new element of the channel bar.

Example 28

The computer readable storage medium as recited in any one or more of the preceding examples, wherein the program instructions are further executable to: convey the video content to the second interface for display on a first portion of the display device; and convey the channel bar to the second interface for display on a second portion of the display device, wherein the second portion overlays part of the first portion.

Example 29

The computer readable storage medium as recited in any one or more of the preceding examples, wherein conveying media content is performed in response to detecting the device being turned on.

Example 30

The computer readable storage medium as recited in any one or more of the preceding examples, wherein conveying media content is performed in response to detecting viewer input requesting a change in video input.

Example 31

The computer readable storage medium as recited in any one or more of the preceding examples, wherein a given element corresponding to a given program of the broadcast line up is indicated as being highlighted.

Example 32

The computer readable storage medium as recited in any one or more of the preceding examples, wherein the indication as being highlighted includes at least one of the following: a bold border and an expanded border.

Example 33

The computer readable storage medium as recited in any one or more of the preceding examples, wherein in response to detecting viewer input requesting a change in highlighting the given element, the program instructions are further executable to select another element different from the given element as indicated as being highlighted.

Example 34

The computer readable storage medium as recited in any one or more of the preceding examples, wherein the program instructions are further executable to select based on the viewer input.

Example 35

The computer readable storage medium as recited in any one or more of the preceding examples, wherein the program instructions are further executable to present audio content associated with a program corresponding to a currently highlighted element while simultaneously displaying the first video content.

Example 36

The computer readable storage medium as recited in any one or more of the preceding examples, wherein the program instructions are further executable to pause presenting audio content associated with the first video content.

Example 37

The computer readable storage medium as recited in any one or more of the preceding examples, wherein in response to detecting viewer input to return focus of playback on the first video content, the program instructions are further executable to present audio content associated with the first video content.

Example 38

The computer readable storage medium as recited in any one or more of the preceding examples, wherein the given element includes associated video content, wherein the program instructions are further executable to display the associated video of the given element while indicated as being highlighted.

Example 39

The computer readable storage medium as recited in any one or more of the preceding examples, wherein in response to viewer input requesting a change from the first video content to the associated video content, the program instructions are further executable to replace the first video content with the associated video content on the display device.

Example 40

A system comprising: a data store configured to store video content; a server coupled to communicate with the data store; and a device configured to communicate with the server via a network; wherein the device is configured to: convey video content for display on the display device; convey a channel bar for display on the display device, wherein the channel bar includes a plurality of elements indicative of a broadcast lineup for a plurality of channels; send a request for new video content; receive the new video content; and convey the new video content for display within a new element of the channel bar.

Example 41

The system as recited in any one or more of the preceding examples, wherein the device is further configured to: convey the video content to the second interface for display on a first portion of the display device; and convey the channel bar to the second interface for display on a second portion of the display device, wherein the second portion overlays part of the first portion.

Example 42

The system as recited in any one or more of the preceding examples, wherein conveying media content is performed in response to detecting the device being turned on.

Example 43

The system as recited in any one or more of the preceding examples, wherein conveying media content is performed in response to detecting viewer input requesting a change in video input.

Example 44

The system as recited in any one or more of the preceding examples, wherein a given element corresponding to a given program of the broadcast line up is indicated as being highlighted.

Example 45

The system as recited in any one or more of the preceding examples, wherein the indication as being highlighted includes at least one of the following: a bold border and an expanded border.

Example 46

The system as recited in any one or more of the preceding examples, wherein in response to detecting viewer input requesting a change in highlighting the given element, the device is further configured to select another element different from the given element as indicated as being highlighted.

Example 47

The system as recited in any one or more of the preceding examples, wherein the device is further configured to select based on the viewer input.

Example 48

The system as recited in any one or more of the preceding examples, wherein the device is further configured to present audio content associated with a program corresponding to a currently highlighted element while simultaneously displaying the first video content.

Example 49

The system as recited in any one or more of the preceding examples, wherein the device is further configured to pause presenting audio content associated with the first video content.

Example 50

The system as recited in any one or more of the preceding examples, wherein in response to detecting viewer input to return focus of playback on the first video content, the device is further configured to present audio content associated with the first video content.

Example 51

The system as recited in any one or more of the preceding examples, wherein the given element includes associated video content, wherein the device is further configured to display the associated video of the given element while indicated as being highlighted.

Example 52

The system as recited in any one or more of the preceding examples, wherein in response to viewer input requesting a change from the first video content to the associated video content, the device is further configured to replace the first video content with the associated video content on the display device.

Example 53

A system for providing stored media content, the system comprising: a first means configured to receive a signal comprising media content; and a second means configured to: select video content for display on a display device, wherein the video content corresponds to a single program of a channel; select a channel bar for display on the display device, wherein the channel bar includes a plurality of elements indicative of a broadcast lineup for a plurality of channels; send requests for the video content and the channel bar; and receive the video content and the channel bar via the first interface.

Example 54

The system as recited in any one or more of the preceding examples, wherein the second means is further configured to: convey the video content to the second interface for display on a first portion of the display device; and convey the channel bar to the second interface for display on a second portion of the display device, wherein the second portion overlays part of the first portion.

Example 55

The system as recited in any one or more of the preceding examples, wherein conveying media content is performed in response to detecting the device being turned on.

Example 56

The system as recited in any one or more of the preceding examples, wherein conveying media content is performed in response to detecting viewer input requesting a change in video input.

Example 57

The system as recited in any one or more of the preceding examples, wherein a given element corresponding to a given program of the broadcast line up is indicated as being highlighted.

Example 58

The system as recited in any one or more of the preceding examples, wherein the indication as being highlighted includes at least one of the following: a bold border and an expanded border.

Example 59

The system as recited in any one or more of the preceding examples, wherein in response to detecting viewer input requesting a change in highlighting the given element, the second means is further configured to selecting another element different from the given element as indicated as being highlighted.

Example 60

The system as recited in any one or more of the preceding examples, wherein the second means is further configured to selecting based on the viewer input.

Example 61

The system as recited in any one or more of the preceding examples, wherein the second means is further configured to presenting audio content associated with a program corresponding to a currently highlighted element while simultaneously displaying the first video content.

Example 62

The system as recited in any one or more of the preceding examples, wherein the second means is further configured to pausing presenting audio content associated with the first video content.

Example 63

The system as recited in any one or more of the preceding examples, wherein in response to detecting viewer input to return focus of playback on the first video content, the second means is further configured to presenting audio content associated with the first video content.

Example 64

The system as recited in any one or more of the preceding examples, wherein the given element includes associated video content, wherein the second means is further configured to displaying the associated video of the given element while indicated as being highlighted.

Example 65

The system as recited in any one or more of the preceding examples, wherein in response to viewer input requesting a change from the first video content to the associated video content, the second means is further configured to replacing the first video content with the associated video content on the display device.

This disclosure further includes subject matter directed to the following examples:

Example 1

A receiver comprising: a first interface configured to receive a signal comprising media content; a second interface configured to be coupled to a display device; and circuitry; and wherein in response to detecting viewer input requesting a change in video content, the circuitry is configured to: transmit a request for first video content; receive the first video content; convey the first video content to the second interface for display on a first portion of the display device, wherein the first video content corresponds to a single program of a channel; and convey a channel bar to the second interface for display on a second portion of the display device, wherein the channel bar includes a plurality of elements indicative of a broadcast lineup of programs for a first plurality of channels.

Example 2

The receiver as recited in any one or more of the preceding examples, wherein a given element corresponding to a given program of the broadcast line up of programs is indicated as being highlighted.

Example 3

The receiver as recited in any one or more of the preceding examples, wherein in response to detecting viewer input requesting a change in video content, the circuitry is further configured to: send a request to a server for second video content corresponding to the given element; receive the second video content; convey for display on a display device the second video content; and convey for display a second channel bar that overlays a portion of the second video content, wherein the second channel bar comprises a plurality of elements indicative of a broadcast lineup of programs for a second plurality of channels.

Example 4

The receiver as recited in any one or more of the preceding examples, wherein one or more channels of the second plurality of channels are the same as channels in the first plurality of channels.

Example 5

The receiver as recited in any one or more of the preceding examples, wherein each of the channels of the second plurality of channels is different from channels in the first plurality of channels.

Example 6

The receiver as recited in any one or more of the preceding examples, wherein in response to viewer input requesting a change in the first plurality of channels, the circuitry is further configured to display in the first channel bar a plurality of elements indicative of a broadcast lineup of programs for a third plurality of channels different from the first plurality of channels.

Example 7

The receiver as recited in any one or more of the preceding examples, wherein the circuitry is further configured to replace the first plurality of channels with the third plurality of channels.

Example 8

The receiver as recited in any one or more of the preceding examples, wherein the circuitry is further configured to change a rate of the replacing based on viewer input.

Example 9

The receiver as recited in any one or more of the preceding examples, wherein the circuitry is further configured to display the replacing as a scrolling action.

Example 10

The receiver as recited in any one or more of the preceding examples, wherein the circuitry is further configured to display the replacing as a rotation-in-place of the first channel bar.

Example 11

A method comprising: receiving a signal comprising media content; in response to detecting viewer input requesting a change in video content: transmitting a request for first video content; receiving the first video content; conveying the first video content to the second interface for display on a first portion of the display device, wherein the first video content corresponds to a single program of a channel; and conveying a channel bar to the second interface for display on a second portion of the display device, wherein the channel bar includes a plurality of elements indicative of a broadcast lineup of programs for a first plurality of channels.

Example 12

The method as recited in any one or more of the preceding examples, wherein a given element corresponding to a given program of the broadcast line up of programs is indicated as being highlighted.

Example 13

The method as recited in any one or more of the preceding examples, wherein in response to detecting viewer input requesting a change in video content, the method further comprises: sending a request to a server for second video content corresponding to the given element; receiving the second video content; conveying for display on a display device the second video content; and conveying for display a second channel bar that overlays a portion of the second video content, wherein the second channel bar comprises a plurality of elements indicative of a broadcast lineup of programs for a second plurality of channels.

Example 14

The method as recited in any one or more of the preceding examples, wherein one or more channels of the second plurality of channels are the same as channels in the first plurality of channels.

Example 15

The method as recited in any one or more of the preceding examples, wherein each of the channels of the second plurality of channels is different from channels in the first plurality of channels.

Example 16

The method as recited in any one or more of the preceding examples, wherein in response to viewer input requesting a change in the first plurality of channels, the method further comprises displaying in the first channel bar a plurality of elements indicative of a broadcast lineup of programs for a third plurality of channels different from the first plurality of channels.

Example 17

The method as recited in any one or more of the preceding examples, wherein the method further comprises replacing the first plurality of channels with the third plurality of channels.

Example 18

The method as recited in any one or more of the preceding examples, wherein the method further comprises changing a rate of the replacing based on viewer input.

Example 19

The method as recited in any one or more of the preceding examples, wherein the method further comprises displaying the replacing as a scrolling action.

Example 20

The method as recited in any one or more of the preceding examples, wherein the method further comprises displaying the replacing as a rotation-in-place of the first channel bar.

Example 21

A computer readable medium comprising program instructions executable to: receive a signal comprising media content; in response to detecting viewer input requesting a change in video content: transmit a request for first video content; receive the first video content; convey the first video content to the second interface for display on a first portion of the display device, wherein the first video content corresponds to a single program of a channel; and convey a channel bar to the second interface for display on a second portion of the display device, wherein the channel bar includes a plurality of elements indicative of a broadcast lineup of programs for a first plurality of channels.

Example 22

The medium as recited in any one or more of the preceding examples, wherein a given element corresponding to a given program of the broadcast line up of programs is indicated as being highlighted.

Example 23

The medium as recited in any one or more of the preceding examples, wherein in response to detecting viewer input requesting a change in video content, the program instructions are further executable to: send a request to the server for video content corresponding to the given program associated with the given element indicated as highlighted; receive second video content corresponding to the requested content from a data store; display on a display device the second video content; and display a second channel bar that overlays a portion of the second video content, wherein the second channel bar comprises a plurality of elements indicative of a broadcast lineup of programs for a second plurality of channels.

Example 24

The medium as recited in any one or more of the preceding examples, wherein one or more channels of the second plurality of channels are the same as channels in the first plurality of channels.

Example 25

The medium as recited in any one or more of the preceding examples, wherein each of the channels of the second plurality of channels is different from channels in the first plurality of channels.

Example 26

The medium as recited in any one or more of the preceding examples, wherein in response to viewer input requesting a change in the first plurality of channels, the program instructions are further executable to display in the first channel bar a plurality of elements indicative of a broadcast lineup of programs for a third plurality of channels different from the first plurality of channels.

Example 27

The medium as recited in any one or more of the preceding examples, wherein the program instructions are further executable to replace the first plurality of channels with the third plurality of channels.

Example 28

The medium as recited in any one or more of the preceding examples, wherein the program instructions are further executable to change a rate of the replacing based on viewer input.

Example 29

The medium as recited in any one or more of the preceding examples, wherein the program instructions are further executable to display the replacing as a scrolling action.

Example 30

The medium as recited in any one or more of the preceding examples, wherein the program instructions are further executable to display the replacing as a rotation-in-place of the first channel bar.

Example 31

A system comprising: a data store configured to store video content; a server coupled to communicate with the data store; and a receiving device configured to communicate with the server via a network; wherein in response to detecting viewer input requesting a change in video content, the receiving device is configured to: transmit a request for first video content; receive the first video content; convey the first video content to the second interface for display on a first portion of the display device, wherein the first video content corresponds to a single program of a channel; and convey a channel bar to the second interface for display on a second portion of the display device, wherein the channel bar includes a plurality of elements indicative of a broadcast lineup of programs for a first plurality of channels.

Example 32

The system as recited in any one or more of the preceding examples, wherein a given element corresponding to a given program of the broadcast line up of programs is indicated as being highlighted.

Example 33

The system as recited in any one or more of the preceding examples, wherein in response to detecting viewer input requesting a change in video content, the receiving device is further configured to: send a request to the server for video content corresponding to the given program associated with the given element indicated as highlighted; receive second video content corresponding to the requested content from a data store; display on a display device the second video content; and display a second channel bar that overlays a portion of the second video content, wherein the second channel bar comprises a plurality of elements indicative of a broadcast lineup of programs for a second plurality of channels.

Example 34

The system as recited in any one or more of the preceding examples, wherein one or more channels of the second plurality of channels are the same as channels in the first plurality of channels.

Example 35

The system as recited in any one or more of the preceding examples, wherein each of the channels of the second plurality of channels is different from channels in the first plurality of channels.

Example 36

The system as recited in any one or more of the preceding examples, wherein in response to viewer input requesting a change in the first plurality of channels, the receiving device is further configured to display in the first channel bar a plurality of elements indicative of a broadcast lineup of programs for a third plurality of channels different from the first plurality of channels.

Example 37

The system as recited in any one or more of the preceding examples, wherein the receiving device is further configured to replace the first plurality of channels with the third plurality of channels.

Example 38

The system as recited in any one or more of the preceding examples, wherein the receiving device is further configured to change a rate of the replacing based on viewer input.

Example 39

The system as recited in any one or more of the preceding examples, wherein the receiving device is further configured to display the replacing as a scrolling action.

Example 40

The system as recited in any one or more of the preceding examples, wherein the receiving device is further configured to display the replacing as a rotation-in-place of the first channel bar.

Example 41

A system for providing stored media content, the system comprising: a first means configured to receive a signal comprising media content; a second means, wherein in response to detecting viewer input requesting a change in video content, the second means is configured to: transmit a request for first video content; receive the first video content; convey the first video content to the second interface for display on a first portion of the display device, wherein the first video content corresponds to a single program of a channel; and convey a channel bar to the second interface for display on a second portion of the display device, wherein the channel bar includes a plurality of elements indicative of a broadcast lineup of programs for a first plurality of channels.

Example 42

The system as recited in any one or more of the preceding examples, wherein a given element corresponding to a given program of the broadcast line up of programs is indicated as being highlighted.

Example 43

The system as recited in any one or more of the preceding examples, wherein in response to detecting viewer input requesting a change in video content, the second means is further configured to: sending a request to the server for video content corresponding to the given program associated with the given element indicated as highlighted; receiving second video content corresponding to the requested content from a data store; displaying on a display device the second video content; and displaying a second channel bar that overlays a portion of the second video content, wherein the second channel bar comprises a plurality of elements indicative of a broadcast lineup of programs for a second plurality of channels.

Example 44

The system as recited in any one or more of the preceding examples, wherein one or more channels of the second plurality of channels are the same as channels in the first plurality of channels.

Example 45

The system as recited in any one or more of the preceding examples, wherein each of the channels of the second plurality of channels is different from channels in the first plurality of channels.

Example 46

The system as recited in any one or more of the preceding examples, wherein in response to viewer input requesting a change in the first plurality of channels, the second means is configured to convey for display in the first channel bar a plurality of elements indicative of a broadcast lineup of programs for a third plurality of channels different from the first plurality of channels.

Example 47

The system as recited in any one or more of the preceding examples, wherein the second means is further configured to replace the first plurality of channels with the third plurality of channels.

Example 48

The system as recited in any one or more of the preceding examples, wherein the second means is further configured to change a rate of the replacing based on viewer input.

Example 49

The system as recited in any one or more of the preceding examples, wherein the second means is further configured to display the replacing as a scrolling action.

Example 50

The system as recited in any one or more of the preceding examples, wherein the second means is further configured to display the replacing as a rotation-in-place of the first channel bar.

This disclosure further includes subject matter directed to the following examples:

Example 1

A system comprising: a first interface configured to receive requests for video content; a second interface coupled to a data store configured to store video content; and circuitry; wherein in response to detecting a request to change video content, the circuitry is configured to: send a request to the data store for first video content; and send a request to the data store for a first channel bar for display on a second portion of the display device, wherein the first channel bar includes a plurality of elements indicative of a broadcast lineup of programs for a plurality of channels.

Example 2

The system as recited in any one or more of the preceding examples, wherein each of the first video content and the first channel bar is conveyed from the data store to the television receiver via the circuitry and a network.

Example 3

The system as recited in any one or more of the preceding examples, wherein in response to detecting a request from the television receiver for additional information, the circuitry is further configured to send a request to the data store for a graphic element to overlay on top of the first video content, wherein the graphic element includes at least a text description corresponding to the requested additional information.

Example 4

The system as recited in any one or more of the preceding examples, wherein the additional information includes at least one of the following: cast information, season and episode information, production team information, and production filming information.

Example 5

The system as recited in any one or more of the preceding examples, wherein the graphic element includes at least media content corresponding to the requested additional information.

Example 6

The system as recited in any one or more of the preceding examples, wherein the overlayed graphic element includes a list of a plurality of entries, each entry corresponding to different information of the requested additional information.

Example 7

The system as recited in any one or more of the preceding examples, wherein the overlayed graphic element includes page indicators that indicate one or more additional pages of information are available for viewing.

Example 8

The system as recited in any one or more of the preceding examples, wherein in response to detecting a viewer input request for additional information, the circuitry is further configured to convey for display data corresponding to a graphic element to be overlayed on top of the first video content, wherein the graphic element includes at least a text description corresponding to the requested additional information.

Example 9

The system as recited in any one or more of the preceding examples, wherein the additional information includes at least one of the following: cast information, season and episode information, production team information, and production filming information.

Example 10

The system as recited in any one or more of the preceding examples, wherein each one of the plurality of channels is at least one of the following: a television broadcast network, an internet-based provider, a cable network provider, and a satellite network provider.

Example 11

A method comprising: receiving from a television receiver requests for video content; in response to detecting a request from the television receiver to change video content: sending a request to the data store for first video content for display on a first portion of a display device, wherein the video content corresponds to a single program of a channel; and sending a request to the data store for a first channel bar for display on a second portion of the display device, wherein the first channel bar includes a plurality of elements indicative of a broadcast lineup of programs for a plurality of channels.

Example 12

The method as recited in any one or more of the preceding examples, wherein each of the first video content and the first channel bar is conveyed from the data store to the television receiver via the circuitry and a network.

Example 13

The method as recited in any one or more of the preceding examples, wherein in response to detecting a request from the television receiver for additional information, the method further comprises sending a request to the data store for a graphic element to overlay on top of the first video content, wherein the graphic element includes at least a text description corresponding to the requested additional information.

Example 14

The method as recited in any one or more of the preceding examples, wherein the additional information includes at least one of the following: cast information, season and episode information, production team information, and production filming information.

Example 15

The method as recited in any one or more of the preceding examples, wherein the graphic element includes at least media content corresponding to the requested additional information.

Example 16

The method as recited in any one or more of the preceding examples, wherein the overlayed graphic element includes a list of a plurality of entries, each entry corresponding to different information of the requested additional information.

Example 17

The method as recited in any one or more of the preceding examples, wherein the overlayed graphic element includes page indicators that indicate one or more additional pages of information are available for viewing.

Example 18

The method as recited in any one or more of the preceding examples, wherein in response to detecting a viewer input request for additional information, the method further comprises conveying for display data corresponding to a graphic element to be overlayed on top of the first video content, wherein the graphic element includes at least a text description corresponding to the requested additional information.

Example 19

The method as recited in any one or more of the preceding examples, wherein the additional information includes at least one of the following: cast information, season and episode information, production team information, and production filming information.

Example 20

The method as recited in any one or more of the preceding examples, wherein each one of the plurality of channels is at least one of the following: a television broadcast network, an internet-based provider, a cable network provider, and a satellite network provider.

Example 21

A computer readable storage medium comprising instructions executable to: receive from a television receiver requests for video content; in response to detecting a request from the television receiver to change video content: send a request to the data store for first video content for display on a first portion of a display device, wherein the video content corresponds to a single program of a channel; and send a request to the data store for a first channel bar for display on a second portion of the display device, wherein the first channel bar includes a plurality of elements indicative of a broadcast lineup of programs for a plurality of channels.

Example 22

The computer readable storage medium as recited in any one or more of the preceding examples, wherein each of the first video content and the first channel bar is conveyed from the data store to the television receiver via the circuitry and a network.

Example 23

The computer readable storage medium as recited in any one or more of the preceding examples, wherein in response to detecting a request from the television receiver for additional information, the program instructions are further executable to send a request to the data store for a graphic element to overlay on top of the first video content, wherein the graphic element includes at least a text description corresponding to the requested additional information.

Example 24

The computer readable storage medium as recited in any one or more of the preceding examples, wherein the additional information includes at least one of the following: cast information, season and episode information, production team information, and production filming information.

Example 25

The computer readable storage medium as recited in any one or more of the preceding examples, wherein the graphic element includes at least media content corresponding to the requested additional information.

Example 26

The computer readable storage medium as recited in any one or more of the preceding examples, wherein the overlayed graphic element includes a list of a plurality of entries, each entry corresponding to different information of the requested additional information.

Example 27

The computer readable storage medium as recited in any one or more of the preceding examples, wherein the overlayed graphic element includes page indicators that indicate one or more additional pages of information are available for viewing.

Example 28

The computer readable storage medium as recited in any one or more of the preceding examples, wherein in response to detecting a viewer input request for additional information, the program instructions are further executable to convey for display data corresponding to a graphic element to be overlayed on top of the first video content, wherein the graphic element includes at least a text description corresponding to the requested additional information.

Example 29

The computer readable storage medium as recited in any one or more of the preceding examples, wherein the additional information includes at least one of the following: cast information, season and episode information, production team information, and production filming information.

Example 30

The computer readable storage medium as recited in any one or more of the preceding examples, wherein each one of the plurality of channels is at least one of the following: a television broadcast network, an internet-based provider, a cable network provider, and a satellite network provider.

Example 31

A system comprising: a data store configured to store video content; a server coupled to communicate with the data store; and a receiving device configured to communicate with the server via a network; wherein in response to detecting a request from the television receiver to change video content, the server is configured to: send a request to the data store for first video content for display on a first portion of a display device, wherein the video content corresponds to a single program of a channel; and send a request to the data store for a first channel bar for display on a second portion of the display device, wherein the first channel bar includes a plurality of elements indicative of a broadcast lineup of programs for a plurality of channels.

Example 32

The system as recited in any one or more of the preceding examples, wherein each of the first video content and the first channel bar is conveyed from the data store to the television receiver via the circuitry and a network.

Example 33

The system as recited in any one or more of the preceding examples, wherein in response to detecting a request from the television receiver for additional information, the server is further configured to send a request to the data store for a graphic element to overlay on top of the first video content, wherein the graphic element includes at least a text description corresponding to the requested additional information.

Example 34

The system as recited in any one or more of the preceding examples, wherein the additional information includes at least one of the following: cast information, season and episode information, production team information, and production filming information.

Example 35

The system as recited in any one or more of the preceding examples, wherein the graphic element includes at least media content corresponding to the requested additional information.

Example 36

The system as recited in any one or more of the preceding examples, wherein the overlayed graphic element includes a list of a plurality of entries, each entry corresponding to different information of the requested additional information.

Example 37

The system as recited in any one or more of the preceding examples, wherein the overlayed graphic element includes page indicators that indicate one or more additional pages of information are available for viewing.

Example 38

The system as recited in any one or more of the preceding examples, wherein in response to detecting a viewer input request for additional information, the server is further configured to convey for display data corresponding to a graphic element to be overlayed on top of the first video content, wherein the graphic element includes at least a text description corresponding to the requested additional information.

Example 39

The system as recited in any one or more of the preceding examples, wherein the additional information includes at least one of the following: cast information, season and episode information, production team information, and production filming information.

Example 40

The system as recited in any one or more of the preceding examples, wherein each one of the plurality of channels is at least one of the following: a television broadcast network, an internet-based provider, a cable network provider, and a satellite network provider.

Example 41

A system for providing stored media content, the system comprising: a first means configured to receive a signal comprising media content; and a second means configured to: in response to detecting a request from the television receiver to change video content: send a request to the data store for first video content for display on a first portion of a display device, wherein the video content corresponds to a single program of a channel; and send a request to the data store for a first channel bar for display on a second portion of the display device, wherein the first channel bar includes a plurality of elements indicative of a broadcast lineup of programs for a plurality of channels.

Example 42

The system as recited in any one or more of the preceding examples, wherein each of the first video content and the first channel bar is conveyed from the data store to the television receiver via the circuitry and a network.

Example 43

The system as recited in any one or more of the preceding examples, wherein in response to detecting a request from the television receiver for additional information, the second means is further configured to sending a request to the data store for a graphic element to overlay on top of the first video content, wherein the graphic element includes at least a text description corresponding to the requested additional information.

Example 44

The system as recited in any one or more of the preceding examples, wherein the additional information includes at least one of the following: cast information, season and episode information, production team information, and production filming information.

Example 45

The system as recited in any one or more of the preceding examples, wherein the graphic element includes at least media content corresponding to the requested additional information.

Example 46

The system as recited in any one or more of the preceding examples, wherein the overlayed graphic element includes a list of a plurality of entries, each entry corresponding to different information of the requested additional information.

Example 47

The system as recited in any one or more of the preceding examples, wherein the overlayed graphic element includes page indicators that indicate one or more additional pages of information are available for viewing.

Example 48

The system as recited in any one or more of the preceding examples, wherein in response to detecting a viewer input request for additional information, the second means is further configured to conveying for display data corresponding to a graphic element to be overlayed on top of the first video content, wherein the graphic element includes at least a text description corresponding to the requested additional information.

Example 49

The system as recited in any one or more of the preceding examples, wherein the additional information includes at least one of the following: cast information, season and episode information, production team information, and production filming information.

Example 50

The system as recited in any one or more of the preceding examples, wherein each one of the plurality of channels is at least one of the following: a television broadcast network, an internet-based provider, a cable network provider, and a satellite network provider.

This disclosure further includes subject matter directed to the following examples:

Example 1

A method comprising: displaying video content on a display device; displaying an electronic program guide on the display device, wherein the electronic program guide comprises a plurality of elements, each of the elements comprising video content corresponding to a different channel.

Example 2

The method as recited in any one or more of the preceding examples, wherein the electronic program guide being responsive to viewer input presents the plurality of elements as a single row of elements.

Example 3

The method as recited in any one or more of the preceding examples, wherein the electronic program guide is displayed as an overlay on the video content, wherein the overlay is presented in a semi-transparent manner such that the video content is partially visible beneath the overlay.

Example 4

The method as recited in any one or more of the preceding examples, further comprising changing the plurality of elements presented in the electronic program guide responsive to viewer input.

Example 5

The method as recited in any one or more of the preceding examples, further comprising replacing the single row of elements in the electronic program guide with a new single row of elements responsive to viewer input.

Example 6

The method as recited in any one or more of the preceding examples, wherein said replacing comprises an animation.

Example 7

The method as recited in any one or more of the preceding examples, wherein said animation comprises rotating the single row of elements to reveal the new single row of elements.

Example 8

The method as recited in any one or more of the preceding examples, wherein each of the plurality of elements comprises video content.

Example 9

The method as recited in any one or more of the preceding examples, wherein each of the plurality of elements comprises video content currently being broadcast by a video content broadcaster.

Example 10

The method as recited in any one or more of the preceding examples, wherein each of the plurality of elements includes an identification of a corresponding broadcast network.

Example 11

A device comprising: a interface configured to receive a signal comprising media content; a second interface configured to be coupled to a display device; and circuitry configured to: display video content on a display device; display an electronic program guide on the display device, wherein the electronic program guide comprises a plurality of elements, each of the elements comprising video content corresponding to a different channel.

Example 12

The device as recited in any one or more of the preceding examples, wherein the electronic program guide being responsive to viewer input presents the plurality of elements as a single row of elements.

Example 13

The device as recited in any one or more of the preceding examples, wherein the electronic program guide is displayed as an overlay on the video content, wherein the overlay is presented in a semi-transparent manner such that the video content is partially visible beneath the overlay.

Example 14

The device as recited in any one or more of the preceding examples, wherein the circuitry is further configured to change the plurality of elements presented in the electronic program guide responsive to viewer input.

Example 15

The device as recited in any one or more of the preceding examples, wherein the circuitry is further configured to replace the single row of elements in the electronic program guide with a new single row of elements responsive to viewer input.

Example 16

The device as recited in any one or more of the preceding examples, wherein said replacing comprises an animation.

Example 17

The device as recited in any one or more of the preceding examples, wherein said animation comprises rotating the single row of elements to reveal the new single row of elements.

Example 18

The device as recited in any one or more of the preceding examples, wherein each of the plurality of elements comprises video content.

Example 19

The device as recited in any one or more of the preceding examples, wherein each of the plurality of elements comprises video content currently being broadcast by a video content broadcaster.

Example 20

The device as recited in any one or more of the preceding examples, wherein each of the plurality of elements includes an identification of a corresponding broadcast network.

Example 21

A computer readable medium comprising program instructions executable to: receive a signal comprising media content; display video content on a display device; and display an electronic program guide on the display device, wherein the electronic program guide comprises a plurality of elements, each of the elements comprising video content corresponding to a different channel.

Example 22

The computer readable medium as recited in any one or more of the preceding examples, wherein the electronic program guide being responsive to viewer input presents the plurality of elements as a single row of elements.

Example 23

The computer readable medium as recited in any one or more of the preceding examples, wherein the electronic program guide is displayed as an overlay on the video content, wherein the overlay is presented in a semi-transparent manner such that the video content is partially visible beneath the overlay.

Example 24

The computer readable medium as recited in any one or more of the preceding examples, wherein the program instructions are further executable to change the plurality of elements presented in the electronic program guide responsive to viewer input.

Example 25

The computer readable medium as recited in any one or more of the preceding examples, wherein the program instructions are further executable to replace the single row of elements in the electronic program guide with a new single row of elements responsive to viewer input.

Example 26

The computer readable medium as recited in any one or more of the preceding examples, wherein said replacing comprises an animation.

Example 27

The computer readable medium as recited in any one or more of the preceding examples, wherein said animation comprises rotating the single row of elements to reveal the new single row of elements.

Example 28

The computer readable medium as recited in any one or more of the preceding examples, wherein each of the plurality of elements comprises video content.

Example 29

The computer readable medium as recited in any one or more of the preceding examples, wherein each of the plurality of elements comprises video content currently being broadcast by a video content broadcaster.

Example 30

The computer readable medium as recited in any one or more of the preceding examples, wherein each of the plurality of elements includes an identification of a corresponding broadcast network.

Example 31

A system comprising: a data store configured to store video content; a server coupled to communicate with the data store; and a receiving device configured to communicate with the server via a network; wherein the receiving device is configured to: display video content on a display device; display an electronic program guide on the display device, wherein the electronic program guide comprises a plurality of elements, each of the elements comprising video content corresponding to a different channel.

Example 32

The system as recited in any one or more of the preceding examples, wherein the electronic program guide being responsive to viewer input presents the plurality of elements as a single row of elements.

Example 33

The system as recited in any one or more of the preceding examples, wherein the electronic program guide is displayed as an overlay on the video content, wherein the overlay is presented in a semi-transparent manner such that the video content is partially visible beneath the overlay.

Example 34

The system as recited in any one or more of the preceding examples, wherein the receiving device is further configured to change the plurality of elements presented in the electronic program guide responsive to viewer input.

Example 35

The system as recited in any one or more of the preceding examples, wherein the receiving device is further configured to replace the single row of elements in the electronic program guide with a new single row of elements responsive to viewer input.

Example 36

The system as recited in any one or more of the preceding examples, wherein said replacing comprises an animation.

Example 37

The system as recited in any one or more of the preceding examples, wherein said animation comprises rotating the single row of elements to reveal the new single row of elements.

Example 38

The system as recited in any one or more of the preceding examples, wherein each of the plurality of elements comprises video content.

Example 39

The system as recited in any one or more of the preceding examples, wherein each of the plurality of elements comprises video content currently being broadcast by a video content broadcaster.

Example 40

The system as recited in any one or more of the preceding examples, wherein each of the plurality of elements includes an identification of a corresponding broadcast network.

Example 41

A system for providing stored media content, the system comprising: a first means configured to receive a signal comprising video content; and a second means configured to: display video content on a display device; display an electronic program guide on the display device, wherein the electronic program guide comprises a plurality of elements, each of the elements comprising video content corresponding to a different channel.

Example 42

The system as recited in any one or more of the preceding examples, wherein the electronic program guide being responsive to viewer input presents the plurality of elements as a single row of elements.

Example 43

The system as recited in any one or more of the preceding examples, wherein the electronic program guide is displayed as an overlay on the video content, wherein the overlay is presented in a semi-transparent manner such that the video content is partially visible beneath the overlay.

Example 44

The system as recited in any one or more of the preceding examples, wherein the second means is further configured to change the plurality of elements presented in the electronic program guide responsive to viewer input.

Example 45

The system as recited in any one or more of the preceding examples, wherein the second means is further configured to replace the single row of elements in the electronic program guide with a new single row of elements responsive to viewer input.

Example 46

The system as recited in any one or more of the preceding examples, wherein said replacing comprises an animation.

Example 47

The system as recited in any one or more of the preceding examples, wherein said animation comprises rotating the single row of elements to reveal the new single row of elements.

Example 48

The system as recited in any one or more of the preceding examples, wherein each of the plurality of elements comprises video content.

Example 49

The system as recited in any one or more of the preceding examples, wherein each of the plurality of elements comprises video content currently being broadcast by a video content broadcaster.

Example 50

The system as recited in any one or more of the preceding examples, wherein each of the plurality of elements includes an identification of a corresponding broadcast network.

This disclosure further includes subject matter directed to the following examples:

Example 1

A method comprising: displaying video content on a display device; displaying an electronic program guide on the display device, wherein the electronic program guide comprises a plurality of elements, each of the elements comprising video content corresponding to a different channel; presenting audio corresponding to a given element of the plurality of elements, responsive to the given element being highlighted.

Example 2

The method as recited in any one or more of the preceding examples, wherein the electronic program guide presents the plurality of elements as a single row of elements.

Example 3

The method as recited in any one or more of the preceding examples, wherein the electronic program guide is displayed as an overlay on the video content.

Example 4

The method as recited in any one or more of the preceding examples, wherein the video content corresponds to one element of the plurality of elements.

Example 5

The method as recited in any one or more of the preceding examples, wherein the video content does not correspond to any elements of the plurality of elements.

Example 6

The method as recited in any one or more of the preceding examples, further comprising automatically changing the video content to correspond to a given element of the plurality of elements, responsive to the given element being highlighted.

Example 7

The method as recited in any one or more of the preceding examples, further comprising automatically changing the video content to correspond to a given element of the plurality of elements, responsive to the given element being selected.

Example 8

The method as recited in any one or more of the preceding examples, further comprising automatically ceasing display of the electronic program guide after a given period of time has elapsed.

Example 9

The method as recited in any one or more of the preceding examples, wherein each of the plurality of elements further comprises a text description corresponding to associated video content.

Example 10

The method as recited in any one or more of the preceding examples, wherein each of the plurality of elements further comprises a title corresponding to associated video content.

Example 11

A device comprising: a interface configured to receive a signal comprising media content; a second interface configured to be coupled to a display device; and circuitry configured to: display video content on a display device; display an electronic program guide on the display device, wherein the electronic program guide comprises a plurality of elements, each of the elements comprising video content corresponding to a different channel; present audio corresponding to a given element of the plurality of elements, responsive to the given element being highlighted.

Example 12

The device as recited in any one or more of the preceding examples, wherein the electronic program guide presents the plurality of elements as a single row of elements.

Example 13

The device as recited in any one or more of the preceding examples, wherein the electronic program guide is displayed as an overlay on the video content.

Example 14

The device as recited in any one or more of the preceding examples, wherein the video content corresponds to one element of the plurality of elements.

Example 15

The device as recited in any one or more of the preceding examples, wherein the video content does not correspond to any elements of the plurality of elements.

Example 16

The device as recited in any one or more of the preceding examples, wherein the circuitry is further configured to automatically change the video content to correspond to a given element of the plurality of elements, responsive to the given element being highlighted.

Example 17

The device as recited in any one or more of the preceding examples, wherein the circuitry is further configured to automatically change the video content to correspond to a given element of the plurality of elements, responsive to the given element being selected.

Example 18

The device as recited in any one or more of the preceding examples, wherein the circuitry is further configured to automatically cease display of the electronic program guide after a given period of time has elapsed.

Example 19

The device as recited in any one or more of the preceding examples, wherein each of the plurality of elements further comprises a text description corresponding to associated video content.

Example 20

The device as recited in any one or more of the preceding examples, wherein each of the plurality of elements further comprises a title corresponding to associated video content.

Example 21

A computer readable medium comprising program instructions executable to: display video content on a display device; display an electronic program guide on the display device, wherein the electronic program guide comprises a plurality of elements, each of the elements comprising video content corresponding to a different channel; present audio corresponding to a given element of the plurality of elements, responsive to the given element being highlighted.

Example 22

The computer readable medium as recited in any one or more of the preceding examples, wherein the electronic program guide presents the plurality of elements as a single row of elements.

Example 23

The computer readable medium as recited in any one or more of the preceding examples, wherein the electronic program guide is displayed as an overlay on the video content.

Example 24

The computer readable medium as recited in any one or more of the preceding examples, wherein the video content corresponds to one element of the plurality of elements.

Example 25

The computer readable medium as recited in any one or more of the preceding examples, wherein the video content does not correspond to any elements of the plurality of elements.

Example 26

The computer readable medium as recited in any one or more of the preceding examples, wherein the program instructions are further executable to automatically change the video content to correspond to a given element of the plurality of elements, responsive to the given element being highlighted.

Example 27

The computer readable medium as recited in any one or more of the preceding examples, wherein the program instructions are further executable to automatically change the video content to correspond to a given element of the plurality of elements, responsive to the given element being selected.

Example 28

The computer readable medium as recited in any one or more of the preceding examples, wherein the program instructions are further executable to automatically cease display of the electronic program guide after a given period of time has elapsed.

Example 29

The computer readable medium as recited in any one or more of the preceding examples, wherein each of the plurality of elements further comprises a text description corresponding to associated video content.

Example 30

The computer readable medium as recited in any one or more of the preceding examples, wherein each of the plurality of elements further comprises a title corresponding to associated video content.

Example 31

A system comprising: a data store configured to store video content; a server coupled to communicate with the data store; and a receiving device configured to communicate with the server via a network; wherein the receiving device is configured to: display video content on a display device; display an electronic program guide on the display device, wherein the electronic program guide comprises a plurality of elements, each of the elements comprising video content corresponding to a different channel; present audio corresponding to a given element of the plurality of elements, responsive to the given element being highlighted.

Example 32

The system as recited in any one or more of the preceding examples, wherein the electronic program guide presents the plurality of elements as a single row of elements.

Example 33

The system as recited in any one or more of the preceding examples, wherein the electronic program guide is displayed as an overlay on the video content.

Example 34

The system as recited in any one or more of the preceding examples, wherein the video content corresponds to one element of the plurality of elements.

Example 35

The system as recited in any one or more of the preceding examples, wherein the video content does not correspond to any elements of the plurality of elements.

Example 36

The system as recited in any one or more of the preceding examples, wherein the receiving device is further configured to automatically change the video content to correspond to a given element of the plurality of elements, responsive to the given element being highlighted.

Example 37

The system as recited in any one or more of the preceding examples, wherein the receiving device is further configured to automatically change the video content to correspond to a given element of the plurality of elements, responsive to the given element being selected.

Example 38

The system as recited in any one or more of the preceding examples, wherein the receiving device is further configured to automatically cease display of the electronic program guide after a given period of time has elapsed.

Example 39

The system as recited in any one or more of the preceding examples, wherein each of the plurality of elements further comprises a text description corresponding to associated video content.

Example 40

The system as recited in any one or more of the preceding examples, wherein each of the plurality of elements further comprises a title corresponding to associated video content.

Example 41

A system for providing stored media content, the system comprising: a first means configured to receive a signal comprising video content; and a second means configured to: display video content on a display device; display an electronic program guide on the display device, wherein the electronic program guide comprises a plurality of elements, each of the elements comprising video content corresponding to a different channel; present audio corresponding to a given element of the plurality of elements, responsive to the given element being highlighted.

Example 42

The system as recited in any one or more of the preceding examples, wherein the electronic program guide presents the plurality of elements as a single row of elements.

Example 43

The system as recited in any one or more of the preceding examples, wherein the electronic program guide is displayed as an overlay on the video content.

Example 44

The system as recited in any one or more of the preceding examples, wherein the video content corresponds to one element of the plurality of elements.

Example 45

The system as recited in any one or more of the preceding examples, wherein the video content does not correspond to any elements of the plurality of elements.

Example 46

The system as recited in any one or more of the preceding examples, wherein the second means is further configured to automatically change the video content to correspond to a given element of the plurality of elements, responsive to the given element being highlighted.

Example 47

The system as recited in any one or more of the preceding examples, wherein the second means is further configured to automatically change the video content to correspond to a given element of the plurality of elements, responsive to the given element being selected.

Example 48

The system as recited in any one or more of the preceding examples, wherein the second means is further configured to automatically cease display of the electronic program guide after a given period of time has elapsed.

Example 49

The system as recited in any one or more of the preceding examples, wherein each of the plurality of elements further comprises a text description corresponding to associated video content.

Example 50

The system as recited in any one or more of the preceding examples, wherein each of the plurality of elements further comprises a title corresponding to associated video content.

This disclosure further includes subject matter directed to the following examples:

Example 1

A receiver comprising: a first interface configured to receive a signal comprising video content; a second interface coupled to a display device; and circuitry; and wherein the circuitry is configured to: convey first media content to the second interface for display on a first portion of the display device, wherein the first media content corresponds to a single program of a channel; and convey second media content to the second interface for display on a second portion of the display device, wherein the second media content includes at least a first list of a plurality of entries, each entry corresponding to a current season episode for the single program.

Example 2

The receiver as recited in any one or more of the preceding examples, wherein the second portion is different from the first portion and non-overlapping of the first portion.

Example 3

The receiver as recited in any one or more of the preceding examples, wherein conveying media content is performed in response to detecting viewer input requesting a change in video content.

Example 4

The receiver as recited in any one or more of the preceding examples, wherein the second media content includes a second list of a plurality of entries, each entry corresponding to a previous season episode for the single program.

Example 5

The receiver as recited in any one or more of the preceding examples, wherein each entry in the first list and the second list includes at least one of the following: an episode number, a title, a cost for viewing, and a date of an associated episode first being provided.

Example 6

The receiver as recited in any one or more of the preceding examples, wherein a given entry in the first list or the second list is indicated as being highlighted.

Example 7

The receiver as recited in any one or more of the preceding examples, wherein indicating the given entry as being highlighted includes at least one of the following: a box around the given entry and a bullet or symbol located next to the given entry.

Example 8

The receiver as recited in any one or more of the preceding examples, wherein the second media content further includes a plurality of elements corresponding to the given entry.

Example 9

The receiver as recited in any one or more of the preceding examples, wherein the plurality of elements corresponding to the given entry includes at least one of the following: a title of the given entry, a text description of a synopsis of the given entry, and media content.

Example 10

The receiver as recited in any one or more of the preceding examples, wherein said media content includes at least one of the following: a still image, audio content, video content from the episode, and an animation.

Example 11

The receiver as recited in any one or more of the preceding examples, wherein the second media content further includes page indicators that indicate one or more additional pages of information are available for viewing.

Example 12

The receiver as recited in any one or more of the preceding examples, wherein in response to detecting viewer input requesting a given page of the one or more additional pages be available for viewing, the receiving device is further configured to display on the second media content a third list of a plurality of entries, each entry corresponding to at least one of the following: cast information, production team information, and production filming information for the single program.

Example 13

A method comprising: receiving a signal comprising video content; conveying first media content for display on a first portion of a display device, wherein the first media content corresponds to a single program of a channel; and conveying second media content for display on a second portion of the display device, wherein the second media content includes at least a first list of a plurality of entries, each entry corresponding to a current season episode for the single program.

Example 14

The method as recited in any one or more of the preceding examples, wherein the second portion is different from the first portion and non-overlapping of the first portion.

Example 15

The method as recited in any one or more of the preceding examples, wherein conveying media content is performed in response to detecting viewer input requesting a change in video content.

Example 16

The method as recited in any one or more of the preceding examples, wherein the second media content includes a second list of a plurality of entries, each entry corresponding to a previous season episode for the single program.

Example 17

The method as recited in any one or more of the preceding examples, wherein each entry in the first list and the second list includes at least one of the following: an episode number, a title, a cost for viewing, and a date of an associated episode first being provided.

Example 18

The method as recited in any one or more of the preceding examples, wherein a given entry in the first list or the second list is indicated as being highlighted.

Example 19

The method as recited in any one or more of the preceding examples, wherein indicating the given entry as being highlighted includes at least one of the following: a box around the given entry and a bullet or symbol located next to the given entry.

Example 20

The method as recited in any one or more of the preceding examples, wherein the second media content further includes a plurality of elements corresponding to the given entry.

Example 21

The method as recited in any one or more of the preceding examples, wherein the plurality of elements corresponding to the given entry includes at least one of the following: a title of the given entry, a text description of a synopsis of the given entry, and media content.

Example 22

The method as recited in any one or more of the preceding examples, wherein said media content includes at least one of the following: a still image, audio content, video content from the episode, and an animation.

Example 23

The method as recited in any one or more of the preceding examples, wherein the second media content further includes page indicators that indicate one or more additional pages of information are available for viewing.

Example 24

The method as recited in any one or more of the preceding examples, wherein in response to detecting viewer input requesting a given page of the one or more additional pages be available for viewing, the method further comprises displaying on the second media content a third list of a plurality of entries, each entry corresponding to at least one of the following: cast information, production team information, and production filming information for the single program.

Example 25

A computer readable medium comprising program instructions executable to: receive a signal comprising video content; convey first media content for display on a first portion of a display device, wherein the first media content corresponds to a single program of a channel; and convey second media content for display on a second portion of the display device, wherein the second media content includes at least a first list of a plurality of entries, each entry corresponding to a current season episode for the single program.

Example 26

The computer readable medium as recited in any one or more of the preceding examples, wherein the second portion is different from the first portion and non-overlapping of the first portion.

Example 27

The computer readable medium as recited in any one or more of the preceding examples, wherein conveying media content is performed in response to detecting viewer input requesting a change in video content.

Example 28

The computer readable medium as recited in any one or more of the preceding examples, wherein the second media content includes a second list of a plurality of entries, each entry corresponding to a previous season episode for the single program.

Example 29

The computer readable medium as recited in any one or more of the preceding examples, wherein each entry in the first list and the second list includes at least one of the following: an episode number, a title, a cost for viewing, and a date of an associated episode first being provided.

Example 30

The computer readable medium as recited in any one or more of the preceding examples, wherein a given entry in the first list or the second list is indicated as being highlighted.

Example 31

The computer readable medium as recited in any one or more of the preceding examples, wherein indicating the given entry as being highlighted includes at least one of the following: a box around the given entry and a bullet or symbol located next to the given entry.

Example 32

The computer readable medium as recited in any one or more of the preceding examples, wherein the second media content further includes a plurality of elements corresponding to the given entry.

Example 33

The computer readable medium as recited in any one or more of the preceding examples, wherein the plurality of elements corresponding to the given entry includes at least one of the following: a title of the given entry, a text description of a synopsis of the given entry, and media content.

Example 34

The computer readable medium as recited in any one or more of the preceding examples, wherein said media content includes at least one of the following: a still image, audio content, video content from the episode, and an animation.

Example 35

The computer readable medium as recited in any one or more of the preceding examples, wherein the second media content further includes page indicators that indicate one or more additional pages of information are available for viewing.

Example 36

The computer readable medium as recited in any one or more of the preceding examples, wherein in response to detecting viewer input requesting a given page of the one or more additional pages be available for viewing, the program instructions are further executable to display on the second media content a third list of a plurality of entries, each entry corresponding to at least one of the following: cast information, production team information, and production filming information for the single program.

Example 37

A system comprising: a data store configured to store video content; a server coupled to communicate with the data store; and a receiving device configured to communicate with the server via a network; wherein the receiving device is configured to: convey first media content for display on a first portion of the display device, wherein the first media content corresponds to a single program of a channel; and convey second media content for display on a second portion of the display device, wherein the second media content includes at least a first list of a plurality of entries, each entry corresponding to a current season episode for the single program.

Example 38

The system as recited in any one or more of the preceding examples, wherein the second portion is different from the first portion and non-overlapping of the first portion.

Example 39

The system as recited in any one or more of the preceding examples, wherein conveying media content is performed in response to detecting viewer input requesting a change in video content.

Example 40

The system as recited in any one or more of the preceding examples, wherein the second media content includes a second list of a plurality of entries, each entry corresponding to a previous season episode for the single program.

Example 41

The system as recited in any one or more of the preceding examples, wherein each entry in the first list and the second list includes at least one of the following: an episode number, a title, a cost for viewing, and a date of an associated episode first being provided.

Example 42

The system as recited in any one or more of the preceding examples, wherein a given entry in the first list or the second list is indicated as being highlighted.

Example 43

The system as recited in any one or more of the preceding examples, wherein indicating the given entry as being highlighted includes at least one of the following: a box around the given entry and a bullet or symbol located next to the given entry.

Example 44

The system as recited in any one or more of the preceding examples, wherein the second media content further includes a plurality of elements corresponding to the given entry.

Example 45

The system as recited in any one or more of the preceding examples, wherein the plurality of elements corresponding to the given entry includes at least one of the following: a title of the given entry, a text description of a synopsis of the given entry, and media content.

Example 46

The system as recited in any one or more of the preceding examples, wherein said media content includes at least one of the following: a still image, audio content, video content from the episode, and an animation.

Example 47

The system as recited in any one or more of the preceding examples, wherein the second media content further includes page indicators that indicate one or more additional pages of information are available for viewing.

Example 48

The system as recited in any one or more of the preceding examples, wherein in response to detecting viewer input requesting a given page of the one or more additional pages be available for viewing, the receiving device is further configured to display on the second media content a third list of a plurality of entries, each entry corresponding to at least one of the following: cast information, production team information, and production filming information for the single program.

Example 49

A system for providing stored media content, the system comprising: a first means configured to receive a signal comprising video content; and a second means configured to: convey first media content for display on a first portion of a display device, wherein the first media content corresponds to a single program of a channel; and convey second media content for display on a second portion of the display device, wherein the second media content includes at least a first list of a plurality of entries, each entry corresponding to a current season episode for the single program.

Example 50

The system as recited in any one or more of the preceding examples, wherein the second portion is different from the first portion and non-overlapping of the first portion.

Example 51

The system as recited in any one or more of the preceding examples, wherein conveying media content is performed in response to detecting viewer input requesting a change in video content.

Example 52

The system as recited in any one or more of the preceding examples, wherein the second media content includes a second list of a plurality of entries, each entry corresponding to a previous season episode for the single program.

Example 53

The system as recited in any one or more of the preceding examples, wherein each entry in the first list and the second list includes at least one of the following: an episode number, a title, a cost for viewing, and a date of an associated episode first being provided.

Example 54

The system as recited in any one or more of the preceding examples, wherein a given entry in the first list or the second list is indicated as being highlighted.

Example 55

The system as recited in any one or more of the preceding examples, wherein indicating the given entry as being highlighted includes at least one of the following: a box around the given entry and a bullet or symbol located next to the given entry.

Example 56

The system as recited in any one or more of the preceding examples, wherein the second media content further includes a plurality of elements corresponding to the given entry.

Example 57

The system as recited in any one or more of the preceding examples, wherein the plurality of elements corresponding to the given entry includes at least one of the following: a title of the given entry, a text description of a synopsis of the given entry, and media content.

Example 58

The system as recited in any one or more of the preceding examples, wherein said media content includes at least one of the following: a still image, audio content, video content from the episode, and an animation.

Example 59

The system as recited in any one or more of the preceding examples, wherein the second media content further includes page indicators that indicate one or more additional pages of information are available for viewing.

Example 60

The system as recited in any one or more of the preceding examples, wherein in response to detecting viewer input requesting a given page of the one or more additional pages be available for viewing, the second means is further configured to displaying on the second media content a third list of a plurality of entries, each entry corresponding to at least one of the following: cast information, production team information, and production filming information for the single program.

This disclosure further includes subject matter directed to the following examples:

Example 1

A receiver comprising: a first interface configured to receive a signal comprising media content; a second interface configured to be coupled to a display device; and circuitry; and wherein the circuitry is configured to: select first media content for display on the display device, wherein the first media content corresponds to a single program of a channel; select second media content for display on the display device, wherein the second media content includes a plurality of elements indicative of cast information for the single program; send requests for the first media content and the second media content; and receive the first media content and the second media content via the first interface.

Example 2

The receiver as recited in any one or more of the preceding examples, wherein the circuitry is further configured to: convey the first media content to the second interface for display on a first portion of the display device; and convey the second media content to the second interface for display on a second portion of the display device, wherein the second portion is different from the first portion and non-overlapping of the first portion.

Example 3

The receiver as recited in any one or more of the preceding examples, wherein conveying media content is performed in response to detecting the receiving device being turned on.

Example 4

The receiver as recited in any one or more of the preceding examples, wherein the first media content is non-video artwork corresponding to the single program.

Example 5

The receiver as recited in any one or more of the preceding examples, wherein each of the first media content and the second media content is selected based on a last previous channel viewed before the receiving device is turned off.

Example 6

The receiver as recited in any one or more of the preceding examples, wherein the channel is selected based on a given favorite channel.

Example 7

The receiver as recited in any one or more of the preceding examples, wherein the given favorite channel is determined from a viewing history.

Example 8

The receiver as recited in any one or more of the preceding examples, wherein at least a title for the single program is overlayed on top of the first media content in the first portion of the display device.

Example 9

The receiver as recited in any one or more of the preceding examples, wherein at least a season indicator for the single program is overlayed on top of the first media content in the first portion of the display device.

Example 10

The receiver as recited in any one or more of the preceding examples, wherein at least an indication of a channel providing the single program is overlayed on top of the first media content in the first portion of the display device.

Example 11

The receiver as recited in any one or more of the preceding examples, wherein at least an animation corresponding to the single program is overlayed on top of the first media content in the first portion of the display device.

Example 12

The receiver as recited in any one or more of the preceding examples, wherein at least a text description corresponding to a synopsis of the single program is overlayed on top of the first media content in the first portion of the display device.

Example 13

The receiver as recited in any one or more of the preceding examples, wherein the plurality of elements includes at least one of the following: cast member names and first media content of the cast member.

Example 14

The receiver as recited in any one or more of the preceding examples, wherein the circuitry is further configured to: collect statistics on viewer activity; and convey the statistics to the server via the network.

Example 15

A method comprising: receiving a signal comprising media content; selecting first media content for display on a display device, wherein the first media content corresponds to a single program of a channel; selecting second media content for display on the display device, wherein the second media content includes a plurality of elements indicative of cast information for the single program; sending requests for the first media content and the second media content; and receiving the first media content and the second media content via the first interface.

Example 16

The method as recited in any one or more of the preceding examples, wherein the method further comprises: conveying the first media content to the second interface for display on a first portion of the display device; and conveying the second media content to the second interface for display on a second portion of the display device, wherein the second portion is different from the first portion and non-overlapping of the first portion.

Example 17

The method as recited in any one or more of the preceding examples, wherein conveying media content is performed in response to detecting the receiving device being turned on.

Example 18

The method as recited in any one or more of the preceding examples, wherein the first media content is non-video artwork corresponding to the single program.

Example 19

The method as recited in any one or more of the preceding examples, wherein each of the first media content and the second media content is selected based on a last previous channel viewed before the receiving device is turned off.

Example 20

The method as recited in any one or more of the preceding examples, wherein the channel is selected based on a given favorite channel.

Example 21

The method as recited in any one or more of the preceding examples, wherein the given favorite channel is determined from a viewing history.

Example 22

The method as recited in any one or more of the preceding examples, wherein at least a title for the single program is overlayed on top of the first media content in the first portion of the display device.

Example 23

The method as recited in any one or more of the preceding examples, wherein at least a season indicator for the single program is overlayed on top of the first media content in the first portion of the display device.

Example 24

The method as recited in any one or more of the preceding examples, wherein at least an indication of a channel providing the single program is overlayed on top of the first media content in the first portion of the display device.

Example 25

The method as recited in any one or more of the preceding examples, wherein at least an animation corresponding to the single program is overlayed on top of the first media content in the first portion of the display device.

Example 26

The method as recited in any one or more of the preceding examples, wherein at least a text description corresponding to a synopsis of the single program is overlayed on top of the first media content in the first portion of the display device.

Example 27

The method as recited in any one or more of the preceding examples, wherein the plurality of elements includes at least one of the following: cast member names and first media content of the cast member.

Example 28

The method as recited in any one or more of the preceding examples, wherein the method further comprises: collecting statistics on viewer activity; and conveying the statistics to the server via the network.

Example 29

A computer readable medium comprising program instructions executable to: receive a signal comprising media content; select first media content for display on the display device, wherein the first media content corresponds to a single program of a channel; select second media content for display on the display device, wherein the second media content includes a plurality of elements indicative of cast information for the single program; send requests for the first media content and the second media content; and receive the first media content and the second media content via the first interface.

Example 30

The computer readable storage medium as recited in any one or more of the preceding examples, wherein the program instructions are further executable to: convey the first media content to the second interface for display on a first portion of the display device; and convey the second media content to the second interface for display on a second portion of the display device, wherein the second portion is different from the first portion and non-overlapping of the first portion.

Example 31

The computer readable storage medium as recited in any one or more of the preceding examples, wherein conveying media content is performed in response to detecting the receiving device being turned on.

Example 32

The computer readable storage medium as recited in any one or more of the preceding examples, wherein the first media content is non-video artwork corresponding to the single program.

Example 33

The computer readable storage medium as recited in any one or more of the preceding examples, wherein each of the first media content and the second media content is selected based on a last previous channel viewed before the receiving device is turned off.

Example 34

The computer readable storage medium as recited in any one or more of the preceding examples, wherein the channel is selected based on a given favorite channel.

Example 35

The computer readable storage medium as recited in any one or more of the preceding examples, wherein the given favorite channel is determined from a viewing history.

Example 36

The computer readable storage medium as recited in any one or more of the preceding examples, wherein at least a title for the single program is overlayed on top of the first media content in the first portion of the display device.

Example 37

The computer readable storage medium as recited in any one or more of the preceding examples, wherein at least a season indicator for the single program is overlayed on top of the first media content in the first portion of the display device.

Example 38

The computer readable storage medium as recited in any one or more of the preceding examples, wherein at least an indication of a channel providing the single program is overlayed on top of the first media content in the first portion of the display device.

Example 39

The computer readable storage medium as recited in any one or more of the preceding examples, wherein at least an animation corresponding to the single program is overlayed on top of the first media content in the first portion of the display device.

Example 40

The computer readable storage medium as recited in any one or more of the preceding examples, wherein at least a text description corresponding to a synopsis of the single program is overlayed on top of the first media content in the first portion of the display device.

Example 41

The computer readable storage medium as recited in any one or more of the preceding examples, wherein the plurality of elements includes at least one of the following: cast member names and first media content of the cast member.

Example 42

The computer readable storage medium as recited in any one or more of the preceding examples, wherein the program instructions are further executable to: collect statistics on viewer activity; and convey the statistics to the server via the network.

Example 43

A system comprising: a data store configured to store video content; a server coupled to communicate with the data store; and a receiving device configured to communicate with the server via a network; wherein the receiving device is configured to: select first media content for display on the display device, wherein the first media content corresponds to a single program of a channel; select second media content for display on the display device, wherein the second media content includes a plurality of elements indicative of cast information for the single program; send requests for the first media content and the second media content; and receive the first media content and the second media content via the first interface.

Example 44

The system as recited in any one or more of the preceding examples, wherein the receiving device is further configured to: convey the first media content to the second interface for display on a first portion of the display device; and convey the second media content to the second interface for display on a second portion of the display device, wherein the second portion is different from the first portion and non-overlapping of the first portion.

Example 45

The system as recited in any one or more of the preceding examples, wherein conveying media content is performed in response to detecting the receiving device being turned on.

Example 46

The system as recited in any one or more of the preceding examples, wherein the first media content is non-video artwork corresponding to the single program.

Example 47

The system as recited in any one or more of the preceding examples, wherein each of the first media content and the second media content is selected based on a last previous channel viewed before the receiving device is turned off.

Example 48

The system as recited in any one or more of the preceding examples, wherein the channel is selected based on a given favorite channel.

Example 49

The system as recited in any one or more of the preceding examples, wherein the given favorite channel is determined from a viewing history.

Example 50

The system as recited in any one or more of the preceding examples, wherein at least a title for the single program is overlayed on top of the first media content in the first portion of the display device.

Example 51

The system as recited in any one or more of the preceding examples, wherein at least a season indicator for the single program is overlayed on top of the first media content in the first portion of the display device.

Example 52

The system as recited in any one or more of the preceding examples, wherein at least an indication of a channel providing the single program is overlayed on top of the first media content in the first portion of the display device.

Example 53

The system as recited in any one or more of the preceding examples, wherein at least an animation corresponding to the single program is overlayed on top of the first media content in the first portion of the display device.

Example 54

The system as recited in any one or more of the preceding examples, wherein at least a text description corresponding to a synopsis of the single program is overlayed on top of the first media content in the first portion of the display device.

Example 55

The system as recited in any one or more of the preceding examples, wherein the plurality of elements includes at least one of the following: cast member names and first media content of the cast member.

Example 56

The system as recited in any one or more of the preceding examples, wherein the receiving device is further configured to: collect statistics on viewer activity; and convey the statistics to the server via the network.

Example 57

A system for providing stored media content, the system comprising: a first means configured to receive a signal comprising media content; and a second means configured to: select first media content for display on a display device, wherein the first media content corresponds to a single program of a channel; select second media content for display on the display device, wherein the second media content includes a plurality of elements indicative of cast information for the single program; send requests for the first media content and the second media content; and receive the first media content and the second media content via the first interface.

Example 58

The system as recited in any one or more of the preceding examples, wherein the second means is further configured to: convey the first media content to the second interface for display on a first portion of the display device; and convey the second media content to the second interface for display on a second portion of the display device, wherein the second portion is different from the first portion and non-overlapping of the first portion.

Example 59

The system as recited in any one or more of the preceding examples, wherein conveying media content is performed in response to detecting the receiving device being turned on.

Example 60

The system as recited in any one or more of the preceding examples, wherein the first media content is non-video artwork corresponding to the single program.

Example 61

The system as recited in any one or more of the preceding examples, wherein each of the first media content and the second media content is selected based on a last previous channel viewed before the receiving device is turned off.

Example 62

The system as recited in any one or more of the preceding examples, wherein the channel is selected based on a given favorite channel.

Example 63

The system as recited in any one or more of the preceding examples, wherein the given favorite channel is determined from a viewing history.

Example 64

The system as recited in any one or more of the preceding examples, wherein at least a title for the single program is overlayed on top of the first media content in the first portion of the display device.

Example 65

The system as recited in any one or more of the preceding examples, wherein at least a season indicator for the single program is overlayed on top of the first media content in the first portion of the display device.

Example 66

The system as recited in any one or more of the preceding examples, wherein at least an indication of a channel providing the single program is overlayed on top of the first media content in the first portion of the display device.

Example 67

The system as recited in any one or more of the preceding examples, wherein at least an animation corresponding to the single program is overlayed on top of the first media content in the first portion of the display device.

Example 68

The system as recited in any one or more of the preceding examples, wherein at least a text description corresponding to a synopsis of the single program is overlayed on top of the first media content in the first portion of the display device.

Example 69

The system as recited in any one or more of the preceding examples, wherein the plurality of elements includes at least one of the following: cast member names and first media content of the cast member.

Example 70

The system as recited in any one or more of the preceding examples, wherein the second means is further configured to: collect statistics on viewer activity; and convey the statistics to the server via the network.

This disclosure further includes subject matter directed to the following examples:

Example 1

A receiver comprising: a first interface configured to receive a signal comprising information corresponding to one or more programs of a plurality of channels; a second interface configured to be coupled to a display device; and circuitry; and wherein the circuitry is configured to: convey first media content to the second interface for display on the display device, wherein the first media content corresponds to a single program of a channel; and convey second media content to the second interface for display on the display device, wherein the second media content includes additional information corresponding to the single program not indicated in the first media content.

Example 2

The receiver as recited in any one or more of the preceding examples, wherein the second media content includes at least a text banner informing the single program of the channel is not currently available according to a current subscription.

Example 3

The receiver as recited in any one or more of the preceding examples, wherein said text banner further informs the viewer the current subscription may be updated for a fee.

Example 4

The receiver as recited in any one or more of the preceding examples, wherein in response to viewer input requesting to update the current subscription, the circuitry is further configured to send a request for updating the current subscription to a server via a network.

Example 5

The receiver as recited in any one or more of the preceding examples, wherein the second media content is overlayed on top of the first media content.

Example 6

The receiver as recited in any one or more of the preceding examples, wherein the second media content is non-overlapping with the first media content.

Example 7

The receiver as recited in any one or more of the preceding examples, wherein the first media content is at least one of the following: a still image, audio content, video content from an episode of a television series corresponding to the single program, and an animation.

Example 8

The receiver as recited in any one or more of the preceding examples, wherein at least a title for the first content is overlayed on top of the first media content on the display device.

Example 9

The receiver as recited in any one or more of the preceding examples, wherein at least a text description corresponding to a synopsis of the single program is overlayed on top of the first media content on the display device.

Example 10

The receiver as recited in any one or more of the preceding examples, wherein at least an indication of the channel providing the single program is overlayed on top of the first media content on the display device.

Example 11

The receiver as recited in any one or more of the preceding examples, wherein conveying media content is performed in response to detecting viewer input requesting a change in video content.

Example 12

The receiver as recited in any one or more of the preceding examples, wherein conveying media content is performed in response to detecting the receiving device being turned on.

Example 13

The receiver as recited in any one or more of the preceding examples, wherein conveying media content is performed in response to detecting reaching an end of a previous program.

Example 14

A method comprising: receiving a signal comprising media content; conveying first media content to the second interface for display on a display device, wherein the first media content corresponds to a single program of a channel; and conveying second media content to the second interface for display on the display device, wherein the second media content includes additional information corresponding to the single program not indicated in the first media content.

Example 15

The method as recited in any one or more of the preceding examples, wherein the second media content includes at least a text banner informing the single program of the channel is not currently available according to a current subscription.

Example 16

The method as recited in any one or more of the preceding examples, wherein said text banner further informs the viewer the current subscription may be updated for a fee.

Example 17

The method as recited in any one or more of the preceding examples, wherein in response to viewer input requesting to update the current subscription, the method further comprises sending a request for updating the current subscription to a server via a network.

Example 18

The method as recited in any one or more of the preceding examples, wherein the second media content is overlayed on top of the first media content.

Example 19

The method as recited in any one or more of the preceding examples, wherein the second media content is non-overlapping with the first media content.

Example 20

The method as recited in any one or more of the preceding examples, wherein the first media content is at least one of the following: a still image, audio content, video content from an episode of a television series corresponding to the single program, and an animation.

Example 21

The method as recited in any one or more of the preceding examples, wherein at least a title for the first content is overlayed on top of the first media content on the display device.

Example 22

The method as recited in any one or more of the preceding examples, wherein at least a text description corresponding to a synopsis of the single program is overlayed on top of the first media content on the display device.

Example 23

The method as recited in any one or more of the preceding examples, wherein at least an indication of the channel providing the single program is overlayed on top of the first media content on the display device.

Example 24

The method as recited in any one or more of the preceding examples, wherein conveying media content is performed in response to detecting viewer input requesting a change in video content.

Example 25

The method as recited in any one or more of the preceding examples, wherein conveying media content is performed in response to detecting the receiving device being turned on.

Example 26

The method as recited in any one or more of the preceding examples, wherein conveying media content is performed in response to detecting reaching an end of a previous program.

Example 27

A computer readable storage medium comprising instructions executable to: receive a signal comprising media content; convey first media content to the second interface for display on a display device, wherein the first media content corresponds to a single program of a channel; and convey second media content to the second interface for display on the display device, wherein the second media content includes additional information corresponding to the single program not indicated in the first media content.

Example 28

The computer readable storage medium as recited in any one or more of the preceding examples, wherein the second media content includes at least a text banner informing the single program of the channel is not currently available according to a current subscription.

Example 29

The computer readable storage medium as recited in any one or more of the preceding examples, wherein said text banner further informs the viewer the current subscription may be updated for a fee.

Example 30

The computer readable storage medium as recited in any one or more of the preceding examples, wherein in response to viewer input requesting to update the current subscription, the program instructions are further configured to send a request for updating the current subscription to a server via a network.

Example 31

The computer readable storage medium as recited in any one or more of the preceding examples, wherein the second media content is overlayed on top of the first media content.

Example 32

The computer readable storage medium as recited in any one or more of the preceding examples, wherein the second media content is non-overlapping with the first media content.

Example 33

The computer readable storage medium as recited in any one or more of the preceding examples, wherein the first media content is at least one of the following: a still image, audio content, video content from an episode of a television series corresponding to the single program, and an animation.

Example 34

The computer readable storage medium as recited in any one or more of the preceding examples, wherein at least a title for the first content is overlayed on top of the first media content on the display device.

Example 35

The computer readable storage medium as recited in any one or more of the preceding examples, wherein at least a text description corresponding to a synopsis of the single program is overlayed on top of the first media content on the display device.

Example 36

The computer readable storage medium as recited in any one or more of the preceding examples, wherein at least an indication of the channel providing the single program is overlayed on top of the first media content on the display device.

Example 37

The computer readable storage medium as recited in any one or more of the preceding examples, wherein conveying media content is performed in response to detecting viewer input requesting a change in video content.

Example 38

The computer readable storage medium as recited in any one or more of the preceding examples, wherein conveying media content is performed in response to detecting the receiving device being turned on.

Example 39

The computer readable storage medium as recited in any one or more of the preceding examples, wherein conveying media content is performed in response to detecting reaching an end of a previous program.

Example 40

A system comprising: a data store configured to store video content; a server coupled to communicate with the data store; and a receiving device configured to communicate with the server via a network; wherein the receiving device is configured to: convey first media content to the second interface for display on a display device, wherein the first media content corresponds to a single program of a channel; and convey second media content to the second interface for display on the display device, wherein the second media content includes additional information corresponding to the single program not indicated in the first media content.

Example 41

The system as recited in any one or more of the preceding examples, wherein the second media content includes at least a text banner informing the single program of the channel is not currently available according to a current subscription.

Example 42

The system as recited in any one or more of the preceding examples, wherein said text banner further informs the viewer the current subscription may be updated for a fee.

Example 43

The system as recited in any one or more of the preceding examples, wherein in response to viewer input requesting to update the current subscription, the receiving device is further configured to send a request for updating the current subscription to a server via a network.

Example 44

The system as recited in any one or more of the preceding examples, wherein the second media content is overlayed on top of the first media content.

Example 45

The system as recited in any one or more of the preceding examples, wherein the second media content is non-overlapping with the first media content.

Example 46

The system as recited in any one or more of the preceding examples, wherein the first media content is at least one of the following: a still image, audio content, video content from an episode of a television series corresponding to the single program, and an animation.

Example 47

The system as recited in any one or more of the preceding examples, wherein at least a title for the first content is overlayed on top of the first media content on the display device.

Example 48

The system as recited in any one or more of the preceding examples, wherein at least a text description corresponding to a synopsis of the single program is overlayed on top of the first media content on the display device.

Example 49

The system as recited in any one or more of the preceding examples, wherein at least an indication of the channel providing the single program is overlayed on top of the first media content on the display device.

Example 50

The system as recited in any one or more of the preceding examples, wherein conveying media content is performed in response to detecting viewer input requesting a change in video content.

Example 51

The system as recited in any one or more of the preceding examples, wherein conveying media content is performed in response to detecting the receiving device being turned on.

Example 52

The system as recited in any one or more of the preceding examples, wherein conveying media content is performed in response to detecting reaching an end of a previous program.

Example 53

A system for providing stored media content, the system comprising: a first means configured to receive a signal comprising video content; and a second means configured to: convey first media content to the second interface for display on a display device, wherein the first media content corresponds to a single program of a channel; and convey second media content to the second interface for display on the display device, wherein the second media content includes additional information corresponding to the single program not indicated in the first media content.

Example 54

The system as recited in any one or more of the preceding examples, wherein the second media content includes at least a text banner informing the single program of the channel is not currently available according to a current subscription.

Example 55

The system as recited in any one or more of the preceding examples, wherein said text banner further informs the viewer the current subscription may be updated for a fee.

Example 56

The system as recited in any one or more of the preceding examples, wherein in response to viewer input requesting to update the current subscription, the second means is further configured to sending a request for updating the current subscription to a server via a network.

Example 57

The system as recited in any one or more of the preceding examples, wherein the second media content is overlayed on top of the first media content.

Example 58

The system as recited in any one or more of the preceding examples, wherein the second media content is non-overlapping with the first media content.

Example 59

The system as recited in any one or more of the preceding examples, wherein the first media content is at least one of the following: a still image, audio content, video content from an episode of a television series corresponding to the single program, and an animation.

Example 60

The system as recited in any one or more of the preceding examples, wherein at least a title for the first content is overlayed on top of the first media content on the display device.

Example 61

The system as recited in any one or more of the preceding examples, wherein at least a text description corresponding to a synopsis of the single program is overlayed on top of the first media content on the display device.

Example 62

The system as recited in any one or more of the preceding examples, wherein at least an indication of the channel providing the single program is overlayed on top of the first media content on the display device.

Example 63

The system as recited in any one or more of the preceding examples, wherein conveying media content is performed in response to detecting viewer input requesting a change in video content.

Example 64

The system as recited in any one or more of the preceding examples, wherein conveying media content is performed in response to detecting the receiving device being turned on.

Example 65

The system as recited in any one or more of the preceding examples, wherein conveying media content is performed in response to detecting reaching an end of a previous program.

This disclosure further includes subject matter directed to the following examples:

Example 1

A server for use in a television system, the server comprising: a first interface configured to receive from a television receiver requests for video content; a second interface coupled to a data store configured to store video content; and circuitry; and wherein in response to detecting a request from the television receiver to change video content, the circuitry is configured to: send a request to the data store for a still image for display on a first portion of a display device, wherein the still image corresponds to a single program of a channel; and send a request to the data store for a first channel bar for display on a second portion of the display device, wherein the second media content includes a plurality of pictures indicative of the single program, each picture corresponding to season and episode information for the single program.

Example 2

The server as recited in any one or more of the preceding examples, wherein the still image is non-video artwork corresponding to the single program.

Example 3

The server as recited in any one or more of the preceding examples, wherein each of the plurality of pictures includes at least one of the following: a still image, audio content, video content corresponding to a given episode of the single program, and an animation.

Example 4

The server as recited in any one or more of the preceding examples, wherein the second media content further includes indicators of categories corresponding to the single program.

Example 5

The server as recited in any one or more of the preceding examples, wherein the indicators of categories in the second media content is associated with at least one of the following: cast, seasons, producing team, film production details, and extra features.

Example 6

The server as recited in any one or more of the preceding examples, wherein a given indicator of the indicators is indicated as being highlighted based on viewer input.

Example 7

The server as recited in any one or more of the preceding examples, wherein the second media content further includes for each of the plurality of pictures a title of an associated episode of the single program.

Example 8

The server as recited in any one or more of the preceding examples, wherein the second media content further includes for each of the plurality of pictures a text description corresponding to a synopsis of an associated episode of the single program.

Example 9

The server as recited in any one or more of the preceding examples, wherein the circuitry is further configured to receive and store statistics collected on the television receiver.

Example 10

A method comprising: receiving from a television receiver requests for video content; in response to detecting a request from the television receiver to change video content: sending a request to the data store for a still image for display on a first portion of a display device, wherein the still image corresponds to a single program of a channel; and sending a request to the data store for a first channel bar for display on a second portion of the display device, wherein the second media content includes a plurality of pictures indicative of the single program, each picture corresponding to season and episode information for the single program.

Example 11

The method as recited in any one or more of the preceding examples, wherein the still image is non-video artwork corresponding to the single program.

Example 12

The method as recited in any one or more of the preceding examples, wherein each of the plurality of pictures includes at least one of the following: a still image, audio content, video content corresponding to a given episode of the single program, and an animation.

Example 13

The method as recited in any one or more of the preceding examples, wherein the second media content further includes indicators of categories corresponding to the single program.

Example 14

The method as recited in any one or more of the preceding examples, wherein the indicators of categories in the second media content is associated with at least one of the following: cast, seasons, producing team, film production details, and extra features.

Example 15

The method as recited in any one or more of the preceding examples, wherein a given indicator of the indicators is indicated as being highlighted based on viewer input.

Example 16

The method as recited in any one or more of the preceding examples, wherein the second media content further includes for each of the plurality of pictures a title of an associated episode of the single program.

Example 17

The method as recited in any one or more of the preceding examples, wherein the second media content further includes for each of the plurality of pictures a text description corresponding to a synopsis of an associated episode of the single program.

Example 18

The method as recited in any one or more of the preceding examples, wherein the method further comprises receiving and storing statistics collected on the television receiver.

Example 19

A computer readable storage medium comprising instructions executable to: receive from a television receiver requests for video content; in response to detecting a request from the television receiver to change video content: send a request to the data store for a still image for display on a first portion of a display device, wherein the still image corresponds to a single program of a channel; and send a request to the data store for a first channel bar for display on a second portion of the display device, wherein the second media content includes a plurality of pictures indicative of the single program, each picture corresponding to season and episode information for the single program.

Example 20

The computer readable storage medium as recited in any one or more of the preceding examples, wherein the still image is non-video artwork corresponding to the single program.

Example 21

The computer readable storage medium as recited in any one or more of the preceding examples, wherein each of the plurality of pictures includes at least one of the following: a still image, audio content, video content corresponding to a given episode of the single program, and an animation.

Example 22

The computer readable storage medium as recited in any one or more of the preceding examples, wherein the second media content further includes indicators of categories corresponding to the single program.

Example 23

The computer readable storage medium as recited in any one or more of the preceding examples, wherein the indicators of categories in the second media content is associated with at least one of the following: cast, seasons, producing team, film production details, and extra features.

Example 24

The computer readable storage medium as recited in any one or more of the preceding examples, wherein a given indicator of the indicators is indicated as being highlighted based on viewer input.

Example 25

The computer readable storage medium as recited in any one or more of the preceding examples, wherein the second media content further includes for each of the plurality of pictures a title of an associated episode of the single program.

Example 26

The computer readable storage medium as recited in any one or more of the preceding examples, wherein the second media content further includes for each of the plurality of pictures a text description corresponding to a synopsis of an associated episode of the single program.

Example 27

The computer readable storage medium as recited in any one or more of the preceding examples, wherein the circuitry is further configured to receive and store statistics collected on the television receiver.

Example 28

A system comprising: a data store configured to store video content; a server coupled to communicate with the data store; and a receiving device configured to communicate with the server via a network; wherein in response to detecting a request from the television receiver to change video content, the server is configured to: send a request to the data store for a still image for display on a first portion of a display device, wherein the still image corresponds to a single program of a channel; and send a request to the data store for a first channel bar for display on a second portion of the display device, wherein the second media content includes a plurality of pictures indicative of the single program, each picture corresponding to season and episode information for the single program.

Example 29

The system as recited in any one or more of the preceding examples, wherein the still image is non-video artwork corresponding to the single program.

Example 30

The system as recited in any one or more of the preceding examples, wherein each of the plurality of pictures includes at least one of the following: a still image, audio content, video content corresponding to a given episode of the single program, and an animation.

Example 31

The system as recited in any one or more of the preceding examples, wherein the second media content further includes indicators of categories corresponding to the single program.

Example 32

The system as recited in any one or more of the preceding examples, wherein the indicators of categories in the second media content is associated with at least one of the following: cast, seasons, producing team, film production details, and extra features.

Example 33

The system as recited in any one or more of the preceding examples, wherein a given indicator of the indicators is indicated as being highlighted based on viewer input.

Example 34

The system as recited in any one or more of the preceding examples, wherein the second media content further includes for each of the plurality of pictures a title of an associated episode of the single program.

Example 35

The system as recited in any one or more of the preceding examples, wherein the second media content further includes for each of the plurality of pictures a text description corresponding to a synopsis of an associated episode of the single program.

Example 36

The system as recited in any one or more of the preceding examples, wherein the server is further configured to receive and store statistics collected on the television receiver.

Example 37

A system for providing stored media content, the system comprising: a first means configured to receive a signal comprising media content; and a second means configured to: in response to detecting a request from the television receiver to change video content: send a request to the data store for a still image for display on a first portion of a display device, wherein the still image corresponds to a single program of a channel; and send a request to the data store for a first channel bar for display on a second portion of the display device, wherein the second media content includes a plurality of pictures indicative of the single program, each picture corresponding to season and episode information for the single program.

Example 38

The system as recited in any one or more of the preceding examples, wherein the still image is non-video artwork corresponding to the single program.

Example 39

The system as recited in any one or more of the preceding examples, wherein each of the plurality of pictures includes at least one of the following: a still image, audio content, video content corresponding to a given episode of the single program, and an animation.

Example 40

The system as recited in any one or more of the preceding examples, wherein the second media content further includes indicators of categories corresponding to the single program.

Example 41

The system as recited in any one or more of the preceding examples, wherein the indicators of categories in the second media content is associated with at least one of the following: cast, seasons, producing team, film production details, and extra features.

Example 42

The system as recited in any one or more of the preceding examples, wherein a given indicator of the indicators is indicated as being highlighted based on viewer input.

Example 43

The system as recited in any one or more of the preceding examples, wherein the second media content further includes for each of the plurality of pictures a title of an associated episode of the single program.

Example 44

The system as recited in any one or more of the preceding examples, wherein the second media content further includes for each of the plurality of pictures a text description corresponding to a synopsis of an associated episode of the single program.

Example 45

The system as recited in any one or more of the preceding examples, wherein the second means is further configured to receiving and storing statistics collected on a television receiver.

This disclosure further includes subject matter directed to the following examples:

Example 1

A device comprising: a first interface configured to receive a signal comprising video content; a second interface configured to be coupled to a display device; and circuitry; and wherein the circuitry is configured to: convey media content for display on the display device, said media content including: a first portion which identifies a subject matter of the media content; and a second portion including one or more selectable items to obtain additional information related to the subject matter.

Example 2

The device as recited in any one or more of the preceding examples, wherein the subject matter corresponds to one of an episodic series or a movie.

Example 3

The device as recited in any one or more of the preceding examples, wherein the one or more selectable items correspond to different categories of information.

Example 4

The device as recited in any one or more of the preceding examples, wherein said categories correspond to one or more of seasons of a series, episodes of a series, cast members corresponding to the subject matter, additional media content related to the subject matter, and related content.

Example 5

The device as recited in any one or more of the preceding examples, wherein the circuitry is further configured to convey for display one or more media elements corresponding to a selected item of the selectable items.

Example 6

The device as recited in any one or more of the preceding examples, wherein the one or more media elements comprise one or more of still images, video content, audio, and animations related to the selected item.

Example 7

The device as recited in any one or more of the preceding examples, wherein the first portion comprises one or more of still images, video content, audio, and animations related to the subject matter.

Example 8

The device as recited in any one or more of the preceding examples, wherein the circuitry is further configured to select the subject matter based on user input.

Example 9

The device as recited in any one or more of the preceding examples, wherein the circuitry is further configured to select the subject matter based on viewing history of a user.

Example 10

The device as recited in any one or more of the preceding examples, wherein the circuitry is further configured to select the subject matter based on a favorite theme identified for a user.

Example 11

A method comprising: receiving a signal comprising video content; conveying media content for display on the display device, said media content including: a first portion which identifies a subject matter of the media content; and a second portion including one or more selectable items to obtain additional information related to the subject matter.

Example 12

The method as recited in any one or more of the preceding examples, wherein the subject matter corresponds to one of an episodic series or a movie.

Example 13

The method as recited in any one or more of the preceding examples, wherein the one or more selectable items correspond to different categories of information.

Example 14

The method as recited in any one or more of the preceding examples, wherein said categories correspond to one or more of seasons of a series, episodes of a series, cast members corresponding to the subject matter, additional media content related to the subject matter, and related content.

Example 15

The method as recited in any one or more of the preceding examples, wherein the method further comprises conveying for display one or more media elements corresponding to a selected item of the selectable items.

Example 16

The method as recited in any one or more of the preceding examples, wherein the one or more media elements comprise one or more of still images, video content, audio, and animations related to the selected item.

Example 17

The method as recited in any one or more of the preceding examples, wherein the first portion comprises one or more of still images, video content, audio, and animations related to the subject matter.

Example 18

The method as recited in any one or more of the preceding examples, wherein the method further comprises selecting the subject matter based on user input.

Example 19

The method as recited in any one or more of the preceding examples, wherein the method further comprises selecting the subject matter based on viewing history of a user.

Example 20

The method as recited in any one or more of the preceding examples, wherein the method further comprises selecting the subject matter based on a favorite theme identified for a user.

Example 21

A computer readable medium comprising program instructions executable to: receive a signal comprising media content; convey media content for display on the display device, said media content including: a first portion which identifies a subject matter of the media content; and a second portion including one or more selectable items to obtain additional information related to the subject matter.

Example 22

The computer readable medium as recited in any one or more of the preceding examples, wherein the subject matter corresponds to one of an episodic series or a movie.

Example 23

The computer readable medium as recited in any one or more of the preceding examples, wherein the one or more selectable items correspond to different categories of information.

Example 24

The computer readable medium as recited in any one or more of the preceding examples, wherein said categories correspond to one or more of seasons of a series, episodes of a series, cast members corresponding to the subject matter, additional media content related to the subject matter, and related content.

Example 25

The computer readable medium as recited in any one or more of the preceding examples, wherein the program instructions are further executable to convey for display one or more media elements corresponding to a selected item of the selectable items.

Example 26

The computer readable medium as recited in any one or more of the preceding examples, wherein the one or more media elements comprise one or more of still images, video content, audio, and animations related to the selected item.

Example 27

The computer readable medium as recited in any one or more of the preceding examples, wherein the first portion comprises one or more of still images, video content, audio, and animations related to the subject matter.

Example 28

The computer readable medium as recited in any one or more of the preceding examples, wherein the program instructions are further executable to select the subject matter based on user input.

Example 29

The computer readable medium as recited in any one or more of the preceding examples, wherein the program instructions are further executable to select the subject matter based on viewing history of a user.

Example 30

The computer readable medium as recited in any one or more of the preceding examples, wherein the program instructions are further executable to select the subject matter based on a favorite theme identified for a user.

Example 31

A system comprising: a data store configured to store video content; a server coupled to communicate with the data store; and a receiving device configured to communicate with the server via a network; wherein the receiving device is configured to: convey media content for display on the display device, said media content including: a first portion which identifies a subject matter of the media content; and a second portion including one or more selectable items to obtain additional information related to the subject matter.

Example 32

The system as recited in any one or more of the preceding examples, wherein the subject matter corresponds to one of an episodic series or a movie.

Example 33

The system as recited in any one or more of the preceding examples, wherein the one or more selectable items correspond to different categories of information.

Example 34

The system as recited in any one or more of the preceding examples, wherein said categories correspond to one or more of seasons of a series, episodes of a series, cast members corresponding to the subject matter, additional media content related to the subject matter, and related content.

Example 35

The system as recited in any one or more of the preceding examples, wherein the receiving device is further configured to convey for display one or more media elements corresponding to a selected item of the selectable items.

Example 36

The system as recited in any one or more of the preceding examples, wherein the one or more media elements comprise one or more of still images, video content, audio, and animations related to the selected item.

Example 37

The system as recited in any one or more of the preceding examples, wherein the first portion comprises one or more of still images, video content, audio, and animations related to the subject matter.

Example 38

The system as recited in any one or more of the preceding examples, wherein the receiving device is further configured to select the subject matter based on user input.

Example 39

The system as recited in any one or more of the preceding examples, wherein the receiving device is further configured to select the subject matter based on viewing history of a user.

Example 40

The system as recited in any one or more of the preceding examples, wherein the receiving device is further configured to select the subject matter based on a favorite theme identified for a user.

Example 41

A system for providing stored media content, the system comprising: a first means configured to receive a signal comprising video content; and a second means configured to: convey media content for display on the display device, said media content including: a first portion which identifies a subject matter of the media content; and a second portion including one or more selectable items to obtain additional information related to the subject matter.

Example 42

The system as recited in any one or more of the preceding examples, wherein the subject matter corresponds to one of an episodic series or a movie.

Example 43

The system as recited in any one or more of the preceding examples, wherein the one or more selectable items correspond to different categories of information.

Example 44

The system as recited in any one or more of the preceding examples, wherein said categories correspond to one or more of seasons of a series, episodes of a series, cast members corresponding to the subject matter, additional media content related to the subject matter, and related content.

Example 45

The system as recited in any one or more of the preceding examples, wherein the second means is further configured to conveying for display one or more media elements corresponding to a selected item of the selectable items.

Example 46

The system as recited in any one or more of the preceding examples, wherein the one or more media elements comprise one or more of still images, video content, audio, and animations related to the selected item.

Example 47

The system as recited in any one or more of the preceding examples, wherein the first portion comprises one or more of still images, video content, audio, and animations related to the subject matter.

Example 48

The system as recited in any one or more of the preceding examples, wherein the second means is further configured to selecting the subject matter based on user input.

Example 49

The system as recited in any one or more of the preceding examples, wherein the second means is further configured to selecting the subject matter based on viewing history of a user.

Example 50

The system as recited in any one or more of the preceding examples, wherein the second means is further configured to selecting the subject matter based on a favorite theme identified for a user.

This disclosure further includes subject matter directed to the following examples:

Example 1

A receiver comprising: a first interface configured to receive a signal comprising media content; a second interface configured to be coupled to a display device; and circuitry; and wherein the circuitry is configured to: display on a display device first video content received from the data store via the server, wherein the first video content corresponds to a single program of a channel; and select a lineup of programs corresponding to recommendations; and display a panel that overlays a portion of the first video content, wherein the panel comprises a plurality of elements indicative of the lineup of programs corresponding to recommendations.

Example 2

The receiver as recited in any one or more of the preceding examples, wherein selecting the lineup of programs corresponding to recommendations is based on last previous channels viewed before the receiving device is turned off.

Example 3

The receiver as recited in any one or more of the preceding examples, wherein selecting the lineup of programs corresponding to recommendations is based on last previous channels viewed before detecting the qualified condition.

Example 4

The receiver as recited in any one or more of the preceding examples, wherein selecting the lineup of programs corresponding to recommendations is based on predetermined favorite channels.

Example 5

The receiver as recited in any one or more of the preceding examples, wherein the favorite channels are determined from a viewing history of a viewer.

Example 6

The receiver as recited in any one or more of the preceding examples, wherein the receiving device is further configured to cease displaying the panel after a predetermined period of time without receiving additional viewer input.

Example 7

The receiver as recited in any one or more of the preceding examples, wherein a given element corresponding to a given program of the lineup of programs corresponding to recommendations is indicated as being highlighted.

Example 8

The receiver as recited in any one or more of the preceding examples, wherein in response to detecting viewer input requesting a change in highlighting the given element, the receiving device is further configured to display another element different from the given element as indicated as being highlighted in the panel.

Example 9

The receiver as recited in any one or more of the preceding examples, wherein the receiving device is further configured to present audio content associated with a program corresponding to a currently highlighted element while simultaneously displaying the first video content.

Example 10

The receiver as recited in any one or more of the preceding examples, wherein the receiving device is further configured to cease presenting audio content associated with the first video content.

Example 11

A method comprising: receiving a signal comprising media content; displaying on a display device first video content received from the data store via the server, wherein the first video content corresponds to a single program of a channel; and selecting a lineup of programs corresponding to recommendations; and displaying a panel that overlays a portion of the first video content, wherein the panel comprises a plurality of elements indicative of the lineup of programs corresponding to recommendations.

Example 12

The method as recited in any one or more of the preceding examples, wherein selecting the lineup of programs corresponding to recommendations is based on last previous channels viewed before the receiving device is turned off.

Example 13

The method as recited in any one or more of the preceding examples, wherein selecting the lineup of programs corresponding to recommendations is based on last previous channels viewed before detecting the qualified condition.

Example 14

The method as recited in any one or more of the preceding examples, wherein selecting the lineup of programs corresponding to recommendations is based on predetermined favorite channels.

Example 15

The method as recited in any one or more of the preceding examples, wherein the favorite channels are determined from a viewing history of a viewer.

Example 16

The method as recited in any one or more of the preceding examples, wherein the receiving device is further configured to cease displaying the panel after a predetermined period of time without receiving additional viewer input.

Example 17

The method as recited in any one or more of the preceding examples, wherein a given element corresponding to a given program of the lineup of programs corresponding to recommendations is indicated as being highlighted.

Example 18

The method as recited in any one or more of the preceding examples, wherein in response to detecting viewer input requesting a change in highlighting the given element, the receiving device is further configured to display another element different from the given element as indicated as being highlighted in the panel.

Example 19

The method as recited in any one or more of the preceding examples, wherein the receiving device is further configured to present audio content associated with a program corresponding to a currently highlighted element while simultaneously displaying the first video content.

Example 20

The method as recited in any one or more of the preceding examples, wherein the receiving device is further configured to cease presenting audio content associated with the first video content.

Example 21

A computer readable storage medium comprising program instructions executable to: receive a signal comprising media content; display on a display device first video content received from the data store via the server, wherein the first video content corresponds to a single program of a channel; select a lineup of programs corresponding to recommendations; and display a panel that overlays a portion of the first video content, wherein the panel comprises a plurality of elements indicative of the lineup of programs corresponding to recommendations.

Example 22

The computer readable storage medium as recited in any one or more of the preceding examples, wherein selecting the lineup of programs corresponding to recommendations is based on last previous channels viewed before the receiving device is turned off.

Example 23

The computer readable storage medium as recited in any one or more of the preceding examples, wherein selecting the lineup of programs corresponding to recommendations is based on last previous channels viewed before detecting the qualified condition.

Example 24

The computer readable storage medium as recited in any one or more of the preceding examples, wherein selecting the lineup of programs corresponding to recommendations is based on predetermined favorite channels.

Example 25

The computer readable storage medium as recited in any one or more of the preceding examples, wherein the favorite channels are determined from a viewing history of a viewer.

Example 26

The computer readable storage medium as recited in any one or more of the preceding examples, wherein the program instructions are further executable to cease displaying the panel after a predetermined period of time without receiving additional viewer input.

Example 27

The computer readable storage medium as recited in any one or more of the preceding examples, wherein a given element corresponding to a given program of the lineup of programs corresponding to recommendations is indicated as being highlighted.

Example 28

The computer readable storage medium as recited in any one or more of the preceding examples, wherein in response to detecting viewer input requesting a change in highlighting the given element, the program instructions are further executable to display another element different from the given element as indicated as being highlighted in the panel.

Example 29

The computer readable storage medium as recited in any one or more of the preceding examples, wherein the program instructions are further executable to present audio content associated with a program corresponding to a currently highlighted element while simultaneously displaying the first video content.

Example 30

The computer readable storage medium as recited in any one or more of the preceding examples, wherein the program instructions are further executable to cease presenting audio content associated with the first video content.

Example 31

A system comprising: a data store configured to store video content; a server coupled to communicate with the data store; and a receiving device configured to communicate with the server via a network; wherein the receiving device is configured to: display on a display device first video content received from the data store via the server, wherein the first video content corresponds to a single program of a channel; and select a lineup of programs corresponding to recommendations; and display a panel that overlays a portion of the first video content, wherein the panel comprises a plurality of elements indicative of the lineup of programs corresponding to recommendations.

Example 32

The system as recited in any one or more of the preceding examples, wherein selecting the lineup of programs corresponding to recommendations is based on last previous channels viewed before the receiving device is turned off.

Example 33

The system as recited in any one or more of the preceding examples, wherein selecting the lineup of programs corresponding to recommendations is based on last previous channels viewed before detecting the qualified condition.

Example 34

The system as recited in any one or more of the preceding examples, wherein selecting the lineup of programs corresponding to recommendations is based on predetermined favorite channels.

Example 35

The system as recited in any one or more of the preceding examples, wherein the favorite channels are determined from a viewing history of a viewer.

Example 36

The system as recited in any one or more of the preceding examples, wherein the receiving device is further configured to cease displaying the panel after a predetermined period of time without receiving additional viewer input.

Example 37

The system as recited in any one or more of the preceding examples, wherein a given element corresponding to a given program of the lineup of programs corresponding to recommendations is indicated as being highlighted.

Example 38

The system as recited in any one or more of the preceding examples, wherein in response to detecting viewer input requesting a change in highlighting the given element, the receiving device is further configured to display another element different from the given element as indicated as being highlighted in the panel.

Example 39

The system as recited in any one or more of the preceding examples, wherein the receiving device is further configured to present audio content associated with a program corresponding to a currently highlighted element while simultaneously displaying the first video content.

Example 40

The system as recited in any one or more of the preceding examples, wherein the receiving device is further configured to cease presenting audio content associated with the first video content.

Example 41

A system for providing stored media content, the system comprising: a first means configured to receive a signal comprising media content; and a second means configured to: display on a display device first video content received from the data store via the server, wherein the first video content corresponds to a single program of a channel; and select a lineup of programs corresponding to recommendations; and displaying a panel that overlays a portion of the first video content, wherein the panel comprises a plurality of elements indicative of the lineup of programs corresponding to recommendations.

Example 42

The system as recited in any one or more of the preceding examples, wherein selecting the lineup of programs corresponding to recommendations is based on last previous channels viewed before the receiving device is turned off.

Example 43

The system as recited in any one or more of the preceding examples, wherein selecting the lineup of programs corresponding to recommendations is based on last previous channels viewed before detecting the qualified condition.

Example 44

The system as recited in any one or more of the preceding examples, wherein selecting the lineup of programs corresponding to recommendations is based on predetermined favorite channels.

Example 45

The system as recited in any one or more of the preceding examples, wherein the favorite channels are determined from a viewing history of a viewer.

Example 46

The system as recited in any one or more of the preceding examples, wherein the receiving device is further configured to cease displaying the panel after a predetermined period of time without receiving additional viewer input.

Example 47

The system as recited in any one or more of the preceding examples, wherein a given element corresponding to a given program of the lineup of programs corresponding to recommendations is indicated as being highlighted.

Example 48

The system as recited in any one or more of the preceding examples, wherein in response to detecting viewer input requesting a change in highlighting the given element, the receiving device is further configured to display another element different from the given element as indicated as being highlighted in the panel.

Example 49

The system as recited in any one or more of the preceding examples, wherein the receiving device is further configured to present audio content associated with a program corresponding to a currently highlighted element while simultaneously displaying the first video content.

Example 50

The system as recited in any one or more of the preceding examples, wherein the receiving device is further configured to cease presenting audio content associated with the first video content.

This disclosure further includes subject matter directed to the following examples:

Example 1

A receiver comprising: a first interface configured to receive a signal comprising media content; a second interface configured to be coupled to a display device; and circuitry; and wherein the circuitry is configured to: display on a display device first video content received from the data store via the server, wherein the first video content corresponds to a single program of a channel; and display a panel that overlays a portion of the first video content, wherein the panel comprises a plurality of elements indicative of a lineup of programs corresponding to recommendations, wherein a given element corresponding to a given program of the lineup of programs is indicated as being highlighted.

Example 2

The receiver as recited in any one or more of the preceding examples, wherein conveying media content is performed in response to detecting reaching an end of the first video content.

Example 3

The receiver as recited in any one or more of the preceding examples, wherein selecting the lineup of programs corresponding to recommendations is based on a viewer-defined list of programs.

Example 4

The receiver as recited in any one or more of the preceding examples, wherein conveying media content is performed in response to detecting viewer input including at least one of the following: a key press on a keyboard or remote control, a swipe of a pointing device or a swipe on a touch screen, or a voice command.

Example 5

The system as recited in any one or more of the preceding examples, wherein conveying media content is performed in response to detecting reaching a predetermined time from an end of the currently broadcast first video content.

Example 6

The receiver as recited in any one or more of the preceding examples, wherein in response to detecting viewer input requesting a change in video content, the circuitry is further configured to: send a request to the server for video content corresponding to a program associated with an element indicated as currently being highlighted; receive second video content corresponding to the requested content from the data store via the server; and display on a display device the second video content.

Example 7

The receiver as recited in any one or more of the preceding examples, wherein the panel includes page indicators that indicate one or more additional pages of recommendations are available for viewing.

Example 8

The receiver as recited in any one or more of the preceding examples, wherein the panel overlays a portion of the first video content.

Example 9

The receiver as recited in any one or more of the preceding examples, wherein the circuitry is further configured to compress the first video content in order to not underlie the lineup of programs corresponding to recommendations.

Example 10

The receiver as recited in any one or more of the preceding examples, wherein the receiving device is further configured to maintain proportions for the first video content.

Example 11

A method comprising: receiving a signal comprising media content; displaying on a display device first video content received from the data store via the server, wherein the first video content corresponds to a single program of a channel; and displaying a panel that overlays a portion of the first video content, wherein the panel comprises a plurality of elements indicative of a lineup of programs corresponding to recommendations, wherein a given element corresponding to a given program of the lineup of programs is indicated as being highlighted.

Example 12

The method as recited in any one or more of the preceding examples, wherein conveying media content is performed in response to detecting reaching an end of the first video content.

Example 13

The method as recited in any one or more of the preceding examples, wherein selecting the lineup of programs corresponding to recommendations is based on a viewer-defined list of programs.

Example 14

The method as recited in any one or more of the preceding examples, wherein conveying media content is performed in response to detecting viewer input including at least one of the following: a key press on a keyboard or remote control, a swipe of a pointing device or a swipe on a touch screen, or a voice command.

Example 15

The system as recited in any one or more of the preceding examples, wherein conveying media content is performed in response to detecting reaching a predetermined time from an end of the currently broadcast first video content.

Example 16

The method as recited in any one or more of the preceding examples, wherein in response to detecting viewer input requesting a change in video content, the method further comprises: sending a request to the server for video content corresponding to a program associated with an element indicated as currently being highlighted; receiving second video content corresponding to the requested content from the data store via the server; and displaying on a display device the second video content.

Example 17

The method as recited in any one or more of the preceding examples, wherein the panel includes page indicators that indicate one or more additional pages of recommendations are available for viewing.

Example 18

The method as recited in any one or more of the preceding examples, wherein the panel overlays a portion of the first video content.

Example 19

The method as recited in any one or more of the preceding examples, wherein the method further comprises compressing the first video content in order to not underlie the lineup of programs corresponding to recommendations.

Example 20

The method as recited in any one or more of the preceding examples, wherein the receiving device is further configured to maintain proportions for the first video content.

Example 21

A computer readable storage medium comprising program instructions executable to: receive a signal comprising media content; display on a display device first video content received from the data store via the server, wherein the first video content corresponds to a single program of a channel; and display a panel that overlays a portion of the first video content, wherein the panel comprises a plurality of elements indicative of a lineup of programs corresponding to recommendations, wherein a given element corresponding to a given program of the lineup of programs is indicated as being highlighted.

Example 22

The computer readable storage medium as recited in any one or more of the preceding examples, wherein conveying media content is performed in response to detecting reaching an end of the first video content.

Example 23

The computer readable storage medium as recited in any one or more of the preceding examples, wherein selecting the lineup of programs corresponding to recommendations is based on a viewer-defined list of programs.

Example 24

The computer readable storage medium as recited in any one or more of the preceding examples, wherein conveying media content is performed in response to detecting viewer input including at least one of the following: a key press on a keyboard or remote control, a swipe of a pointing device or a swipe on a touch screen, or a voice command.

Example 25

The system as recited in any one or more of the preceding examples, wherein conveying media content is performed in response to detecting reaching a predetermined time from an end of the currently broadcast first video content.

Example 26

The computer readable storage medium as recited in any one or more of the preceding examples, wherein in response to detecting viewer input requesting a change in video content, the program instructions are further executable to: send a request to the server for video content corresponding to a program associated with an element indicated as currently being highlighted; receive second video content corresponding to the requested content from the data store via the server; and display on a display device the second video content.

Example 27

The computer readable storage medium as recited in any one or more of the preceding examples, wherein the panel includes page indicators that indicate one or more additional pages of recommendations are available for viewing.

Example 28

The computer readable storage medium as recited in any one or more of the preceding examples, wherein the panel overlays a portion of the first video content.

Example 29

The computer readable storage medium as recited in any one or more of the preceding examples, wherein the program instructions are further executable to compress the first video content in order to not underlie the lineup of programs corresponding to recommendations.

Example 30

The computer readable storage medium as recited in any one or more of the preceding examples, wherein the receiving device is further configured to maintain proportions for the first video content.

Example 31

A system comprising: a data store configured to store video content; a server coupled to communicate with the data store; and a receiving device configured to communicate with the server via a network; wherein the receiving device is configured to: display on a display device first video content received from the data store via the server, wherein the first video content corresponds to a single program of a channel; and display a panel that overlays a portion of the first video content, wherein the panel comprises a plurality of elements indicative of a lineup of programs corresponding to recommendations, wherein a given element corresponding to a given program of the lineup of programs is indicated as being highlighted.

Example 32

The system as recited in any one or more of the preceding examples, wherein conveying media content is performed in response to detecting reaching an end of the first video content.

Example 33

The system as recited in any one or more of the preceding examples, wherein selecting the lineup of programs corresponding to recommendations is based on a viewer-defined list of programs.

Example 34

The system as recited in any one or more of the preceding examples, wherein conveying media content is performed in response to detecting viewer input including at least one of the following: a key press on a keyboard or remote control, a swipe of a pointing device or a swipe on a touch screen, or a voice command.

Example 35

The system as recited in any one or more of the preceding examples, wherein conveying media content is performed in response to detecting reaching a predetermined time from an end of the currently broadcast first video content.

Example 36

The system as recited in any one or more of the preceding examples, wherein in response to detecting viewer input requesting a change in video content, the receiving device is further configured to: send a request to the server for video content corresponding to a program associated with an element indicated as currently being highlighted; receive second video content corresponding to the requested content from the data store via the server; and display on a display device the second video content.

Example 37

The system as recited in any one or more of the preceding examples, wherein the panel includes page indicators that indicate one or more additional pages of recommendations are available for viewing.

Example 38

The system as recited in any one or more of the preceding examples, wherein the panel overlays a portion of the first video content.

Example 39

The system as recited in any one or more of the preceding examples, wherein the receiving device is further configured to compress the first video content in order to not underlie the lineup of programs corresponding to recommendations.

Example 40

The system as recited in any one or more of the preceding examples, wherein the receiving device is further configured to maintain proportions for the first video content.

Example 41

A system for providing stored media content, the system comprising: a first means configured to receive a signal comprising media content; and a second means configured to: display on a display device first video content received from the data store via the server, wherein the first video content corresponds to a single program of a channel; and display a panel that overlays a portion of the first video content, wherein the panel comprises a plurality of elements indicative of a lineup of programs corresponding to recommendations, wherein a given element corresponding to a given program of the lineup of programs is indicated as being highlighted.

Example 42

The system as recited in any one or more of the preceding examples, wherein conveying media content is performed in response to detecting reaching an end of the first video content.

Example 43

The system as recited in any one or more of the preceding examples, wherein selecting the lineup of programs corresponding to recommendations is based on a viewer-defined list of programs.

Example 44

The system as recited in any one or more of the preceding examples, wherein conveying media content is performed in response to detecting viewer input including at least one of the following: a key press on a keyboard or remote control, a swipe of a pointing device or a swipe on a touch screen, or a voice command.

Example 45

The system as recited in any one or more of the preceding examples, wherein conveying media content is performed in response to detecting reaching a predetermined time from an end of the currently broadcast first video content.

Example 46

The system as recited in any one or more of the preceding examples, wherein in response to detecting viewer input requesting a change in video content, the second means is further configured to: send a request to the server for video content corresponding to a program associated with an element indicated as currently being highlighted; receive second video content corresponding to the requested content from the data store via the server; and display on a display device the second video content.

Example 47

The system as recited in any one or more of the preceding examples, wherein the panel includes page indicators that indicate one or more additional pages of recommendations are available for viewing.

Example 48

The system as recited in any one or more of the preceding examples, wherein the panel overlays a portion of the first video content.

Example 49

The system as recited in any one or more of the preceding examples, wherein the second means is further configured to compressing the first video content in order to not underlie the lineup of programs corresponding to recommendations.

Example 50

The system as recited in any one or more of the preceding examples, wherein the receiving device is further configured to maintain proportions for the first video content.

This disclosure further includes subject matter directed to the following examples:

Example 1

A receiver comprising: a first interface configured to receive a signal comprising video content; a second interface configured to be coupled to a display device; and circuitry; and wherein the circuitry is configured to: display on a display device first video content received from the data store via the server, wherein the first video content corresponds to a single program of a channel; and display one or more recommendations for media content.

Example 2

The receiver as recited in any one or more of the preceding examples, wherein said recommendations are determined based at least in part on media content previously presented to a viewer associated with the device.

Example 3

The receiver as recited in any one or more of the preceding examples, wherein said recommendations are determined based at least in part on a viewing history of other viewers who viewed the video content, the other viewers being different from a viewer associated with the receiver.

Example 4

The receiver as recited in any one or more of the preceding examples, wherein said recommendations are determined based at least in part on content previously identified by a viewer.

Example 5

The receiver as recited in any one or more of the preceding examples, wherein said recommendations are determined based at least in part on content previously identified by a viewer as favorite content.

Example 6

The receiver as recited in any one or more of the preceding examples, wherein said recommendations are determined based at least in part on content viewed by friends of a viewer associated with the receiver.

Example 7

The receiver as recited in any one or more of the preceding examples, wherein said video content is automatically paused while said recommendations are presented.

Example 8

The receiver as recited in any one or more of the preceding examples, wherein the circuitry is further configured to present audio content of a given one of said recommendations while ceasing to present audio content of the first video content.

Example 9

The receiver as recited in any one or more of the preceding examples, wherein the circuitry is further configured to present the audio content of the given one of said recommendations responsive to detecting an end of playback of the first video content.

Example 10

The receiver as recited in any one or more of the preceding examples, wherein the circuitry is further configured to cease displaying the recommendations after a given period of time without receiving additional viewer input.

Example 11

A method comprising: receiving a signal comprising media content; displaying on a display device first video content received from the data store via the server, wherein the first video content corresponds to a single program of a channel; and displaying one or more recommendations for media content.

Example 12

The method as recited in any one or more of the preceding examples, wherein said recommendations are determined based at least in part on media content previously presented to a viewer associated with the device.

Example 13

The method as recited in any one or more of the preceding examples, wherein said recommendations are determined based at least in part on a viewing history of other viewers who viewed the video content, the other viewers being different from a viewer associated with the receiver.

Example 14

The method as recited in any one or more of the preceding examples, wherein said recommendations are determined based at least in part on content previously identified by a viewer.

Example 15

The method as recited in any one or more of the preceding examples, wherein said recommendations are determined based at least in part on content previously identified by a viewer as favorite content.

Example 16

The method as recited in any one or more of the preceding examples, wherein said recommendations are determined based at least in part on content viewed by friends of a viewer associated with the receiver.

Example 17

The method as recited in any one or more of the preceding examples, wherein said video content is automatically paused while said recommendations are presented.

Example 18

The method as recited in any one or more of the preceding examples, wherein the method further comprises presenting audio content of a given one of said recommendations while ceasing to present audio content of the first video content.

Example 19

The method as recited in any one or more of the preceding examples, wherein the method further comprises presenting the audio content of the given one of said recommendations responsive to detecting an end of playback of the first video content.

Example 20

The method as recited in any one or more of the preceding examples, wherein the method further comprises ceasing to display the recommendations after a given period of time without receiving additional viewer input.

Example 21

A computer readable medium comprising program instructions executable to: receive a signal comprising media content; display on a display device first video content received from the data store via the server, wherein the first video content corresponds to a single program of a channel; and display one or more recommendations for media content.

Example 22

The computer readable medium as recited in any one or more of the preceding examples, wherein said recommendations are determined based at least in part on media content previously presented to a viewer associated with the device.

Example 23

The computer readable medium as recited in any one or more of the preceding examples, wherein said recommendations are determined based at least in part on a viewing history of other viewers who viewed the video content, the other viewers being different from a viewer associated with the receiver.

Example 24

The computer readable medium as recited in any one or more of the preceding examples, wherein said recommendations are determined based at least in part on content previously identified by a viewer.

Example 25

The computer readable medium as recited in any one or more of the preceding examples, wherein said recommendations are determined based at least in part on content previously identified by a viewer as favorite content.

Example 26

The computer readable medium as recited in any one or more of the preceding examples, wherein said recommendations are determined based at least in part on content viewed by friends of a viewer associated with the receiver.

Example 27

The computer readable medium as recited in any one or more of the preceding examples, wherein said video content is automatically paused while said recommendations are presented.

Example 28

The computer readable medium as recited in any one or more of the preceding examples, wherein the program instructions are further executable to present audio content of a given one of said recommendations while ceasing to present audio content of the first video content.

Example 29

The computer readable medium as recited in any one or more of the preceding examples, wherein the program instructions are further executable to present the audio content of the given one of said recommendations responsive to detecting an end of playback of the first video content.

Example 30

The computer readable medium as recited in any one or more of the preceding examples, wherein the program instructions are further executable to cease displaying the recommendations after a given period of time without receiving additional viewer input.

Example 31

A system comprising: a data store configured to store video content; a server coupled to communicate with the data store; and a receiving device configured to communicate with the server via a network; wherein the receiving device is configured to: display on a display device first video content received from the data store via the server, wherein the first video content corresponds to a single program of a channel; and display one or more recommendations for media content.

Example 32

The system as recited in any one or more of the preceding examples, wherein said recommendations are determined based at least in part on media content previously presented to a viewer associated with the device.

Example 33

The system as recited in any one or more of the preceding examples, wherein said recommendations are determined based at least in part on a viewing history of other viewers who viewed the video content, the other viewers being different from a viewer associated with the receiver.

Example 34

The system as recited in any one or more of the preceding examples, wherein said recommendations are determined based at least in part on content previously identified by a viewer.

Example 35

The system as recited in any one or more of the preceding examples, wherein said recommendations are determined based at least in part on content previously identified by a viewer as favorite content.

Example 36

The system as recited in any one or more of the preceding examples, wherein said recommendations are determined based at least in part on content viewed by friends of a viewer associated with the receiver.

Example 37

The system as recited in any one or more of the preceding examples, wherein said video content is automatically paused while said recommendations are presented.

Example 38

The system as recited in any one or more of the preceding examples, wherein the receiving device is further configured to present audio content of a given one of said recommendations while ceasing to present audio content of the first video content.

Example 39

The system as recited in any one or more of the preceding examples, wherein the receiving device is further configured to present the audio content of the given one of said recommendations responsive to detecting an end of playback of the first video content.

Example 40

The system as recited in any one or more of the preceding examples, wherein the receiving device is further configured to cease displaying the recommendations after a given period of time without receiving additional viewer input.

Example 41

A system for providing stored media content, the system comprising: a first means configured to receive a signal comprising video content; and a second means configured to: display on a display device first video content received from the data store via the server, wherein the first video content corresponds to a single program of a channel; and display one or more recommendations for media content.

Example 42

The system as recited in any one or more of the preceding examples, wherein said recommendations are determined based at least in part on media content previously presented to a viewer associated with the device.

Example 43

The system as recited in any one or more of the preceding examples, wherein said recommendations are determined based at least in part on a viewing history of other viewers who viewed the video content, the other viewers being different from a viewer associated with the receiver.

Example 44

The system as recited in any one or more of the preceding examples, wherein said recommendations are determined based at least in part on content previously identified by a viewer.

Example 45

The system as recited in any one or more of the preceding examples, wherein said recommendations are determined based at least in part on content previously identified by a viewer as favorite content.

Example 46

The system as recited in any one or more of the preceding examples, wherein said recommendations are determined based at least in part on content viewed by friends of a viewer associated with the receiver.

Example 47

The system as recited in any one or more of the preceding examples, wherein said video content is automatically paused while said recommendations are presented.

Example 48

The system as recited in any one or more of the preceding examples, wherein the second means is further configured to presenting audio content of a given one of said recommendations while ceasing to present audio content of the first video content.

Example 49

The system as recited in any one or more of the preceding examples, wherein the second means is further configured to presenting the audio content of the given one of said recommendations responsive to detecting an end of playback of the first video content.

Example 50

The system as recited in any one or more of the preceding examples, wherein the second means is further configured to cease displaying the recommendations after a given period of time without receiving additional viewer input.

This disclosure further includes subject matter directed to the following examples:

Example 1

A server comprising: a first interface configured to receive requests from receiving devices; a second interface configured to convey media content to receiving devices; circuitry; wherein in response to receiving a request from a first receiving device for video content via the first interface, the circuitry is configured to: identify one or more recommendations for media content; and convey the one or more recommendations to the first receiving device.

Example 2

The server as recited in any one or more of the preceding examples, wherein the one or more recommendations are based at least in part on one or more of a viewing history of a viewer associated with the receiving device and the video content corresponding to the request.

Example 3

The server as recited in any one or more of the preceding examples, wherein the one or more recommendations are based at least in part on one or more of media content associated with friends of the viewer and crowd-sourced data.

Example 4

The server as recited in any one or more of the preceding examples, wherein the circuitry is further configured to maintain metadata associated with a plurality of subscribers, and utilizing said metadata when identifying said one or more recommendations.

Example 5

The server as recited in any one or more of the preceding examples, wherein said metadata comprises statistics based on at least one of viewing history and requests for additional information during viewing.

Example 6

A device comprising: a first interface configured to receive media content; and circuitry; wherein the circuitry is configured to: convey video content for display on a display device; and convey one or more recommendations for media content of then the video content for display on the display device.

Example 7

The device as recited in any one or more of the preceding examples, wherein the circuitry is configured to convey a

131 request for the one or more recommendations via a communication network to a remote server.

Example 8

The device as recited in any one or more of the preceding examples, wherein the circuitry is configured to convey said request responsive to detecting presentation of the video content has reached a given location.

Example 9

The device as recited in any one or more of the preceding examples, wherein the given location corresponds to a predetermined time from an end of the video content.

Example 10

The device as recited in any one or more of the preceding examples, wherein the circuitry is configured to convey said request responsive to detecting viewer input requesting said recommendations, wherein the viewer input includes at least one of a voice command, a key press, and a hand gesture.

Example 11

A method comprising: receiving requests from receiving receivers; conveying media content to receiving receivers; in response to receiving a request from a first receiving receiver for video content via the first interface: identifying one or more recommendations for media content; and conveying the one or more recommendations to the first receiving receiver.

Example 12

The method as recited in any one or more of the preceding examples, wherein the one or more recommendations are based at least in part on one or more of a viewing history of a viewer associated with the receiving receiver and the video content corresponding to the request.

Example 13

The method as recited in any one or more of the preceding examples, wherein the one or more recommendations are based at least in part on one or more of media content associated with friends of the viewer and crowd-sourced data.

Example 14

The method as recited in any one or more of the preceding examples, wherein the method further comprises maintaining metadata associated with a plurality of subscribers, and utilizing said metadata when identifying said one or more recommendations.

Example 15

The method as recited in any one or more of the preceding examples, wherein said metadata comprises statistics based on at least one of viewing history and requests for additional information during viewing.

Example 16

A method comprising: receiving media content; conveying video content for display on a display device; and

132 conveying one or more recommendations for media content of then the video content for display on the display device.

Example 17

The method as recited in any one or more of the preceding examples, wherein the method further comprises conveying a request for the one or more recommendations via a communication network to a remote receiver.

Example 18

The method as recited in any one or more of the preceding examples, wherein the method further comprises conveying said request responsive to detecting presentation of the video content has reached a given location.

Example 19

The method as recited in any one or more of the preceding examples, wherein the given location corresponds to a predetermined time from an end of the video content.

Example 20

The method as recited in any one or more of the preceding examples, wherein the method further comprises conveying said request responsive to detecting viewer input requesting said recommendations, wherein the viewer input includes at least one of a voice command, a key press, and a hand gesture.

Example 21

A computer readable medium comprising program instructions executable to: receive requests from receiving receivers; convey media content to receiving receivers; in response to receiving a request from a first receiving receiver for video content via the first interface: identify one or more recommendations for media content; and convey the one or more recommendations to the first receiving receiver.

Example 22

The computer readable medium as recited in any one or more of the preceding examples, wherein the one or more recommendations are based at least in part on one or more of a viewing history of a viewer associated with the receiving receiver and the video content corresponding to the request.

Example 23

The computer readable medium as recited in any one or more of the preceding examples, wherein the one or more recommendations are based at least in part on one or more of media content associated with friends of the viewer and crowd-sourced data.

Example 24

The computer readable medium as recited in any one or more of the preceding examples, wherein the program instructions are further executable to maintain metadata associated with a plurality of subscribers, and utilizing said metadata when identifying said one or more recommendations.

Example 25

The computer readable medium as recited in any one or more of the preceding examples, wherein said metadata comprises statistics based on at least one of viewing history and requests for additional information during viewing.

Example 26

A computer readable medium comprising program instructions executable to: receive media content; convey video content for display on a display device; and convey one or more recommendations for media content of then the video content for display on the display device.

Example 27

The computer readable medium as recited in any one or more of the preceding examples, wherein the program instructions are further executable to convey a request for the one or more recommendations via a communication network to a remote receiver.

Example 28

The computer readable medium as recited in any one or more of the preceding examples, wherein the program instructions are further executable to convey said request responsive to detecting presentation of the video content has reached a given location.

Example 29

The computer readable medium as recited in any one or more of the preceding examples, wherein the given location corresponds to a predetermined time from an end of the video content.

Example 30

The computer readable medium as recited in any one or more of the preceding examples, wherein the program instructions are further executable to convey said request responsive to detecting viewer input requesting said recommendations, wherein the viewer input includes at least one of a voice command, a key press, and a hand gesture.

Example 31

A system comprising: a data store configured to store video content; a server coupled to communicate with the data store; and a receiving device configured to communicate with the server via a network; wherein the server is configured to: identify one or more recommendations for media content; and convey the one or more recommendations to the first receiving receiver.

Example 32

The system as recited in any one or more of the preceding examples, wherein the one or more recommendations are based at least in part on one or more of a viewing history of a viewer associated with the receiving receiver and the video content corresponding to the request.

Example 33

The system as recited in any one or more of the preceding examples, wherein the one or more recommendations are based at least in part on one or more of media content associated with friends of the viewer and crowd-sourced data.

Example 34

The system as recited in any one or more of the preceding examples, wherein the server is further configured to maintain metadata associated with a plurality of subscribers, and utilizing said metadata when identifying said one or more recommendations.

Example 35

The system as recited in any one or more of the preceding examples, wherein said metadata comprises statistics based on at least one of viewing history and requests for additional information during viewing.

Example 36

A system comprising: a data store configured to store video content; a server coupled to communicate with the data store; and a receiving device configured to communicate with the server via a network; wherein the receiving device is configured to: convey video content for display on a display device; and convey one or more recommendations for media content of then the video content for display on the display device.

Example 37

The system as recited in any one or more of the preceding examples, wherein the receiving device is further configured to convey a request for the one or more recommendations via a communication network to a remote receiver.

Example 38

The system as recited in any one or more of the preceding examples, wherein the receiving device is further configured to convey said request responsive to detecting presentation of the video content has reached a given location.

Example 39

The system as recited in any one or more of the preceding examples, wherein the given location corresponds to a predetermined time from an end of the video content.

Example 40

The system as recited in any one or more of the preceding examples, wherein the receiving device is further configured to convey said request responsive to detecting viewer input requesting said recommendations, wherein the viewer input includes at least one of a voice command, a key press, and a hand gesture.

Example 41

A system for providing stored media content, the system comprising: a first means configured to receive a signal comprising video content; and a second means configured to: wherein in response to receiving a request from a first receiving receiver for video content via the first interface, the second means is configured to: identify one or more recommendations for media content; and convey the one or more recommendations to the first receiving receiver.

Example 42

The system as recited in any one or more of the preceding examples, wherein the one or more recommendations are based at least in part on one or more of a viewing history of a viewer associated with the receiving receiver and the video content corresponding to the request.

Example 43

The system as recited in any one or more of the preceding examples, wherein the one or more recommendations are based at least in part on one or more of media content associated with friends of the viewer and crowd-sourced data.

Example 44

The system as recited in any one or more of the preceding examples, wherein the second means is further configured to maintain metadata associated with a plurality of subscribers, and utilizing said metadata when identifying said one or more recommendations.

Example 45

The system as recited in any one or more of the preceding examples, wherein said metadata comprises statistics based on at least one of viewing history and requests for additional information during viewing.

Example 46

A system for providing stored media content, the system comprising: a first means configured to receive a signal comprising video content; and a second means configured to: convey video content for display on a display device; and convey one or more recommendations for media content of then the video content for display on the display device.

Example 47

The system as recited in any one or more of the preceding examples, wherein the second means is further configured to conveying a request for the one or more recommendations via a communication network to a remote receiver.

Example 48

The system as recited in any one or more of the preceding examples, wherein the second means is further configured to convey said request responsive to detecting presentation of the video content has reached a given location.

Example 49

The system as recited in any one or more of the preceding examples, wherein the given location corresponds to a predetermined time from an end of the video content.

Example 50

The system as recited in any one or more of the preceding examples, wherein the second means is further configured to convey said request responsive to detecting viewer input requesting said recommendations, wherein the viewer input includes at least one of a voice command, a key press, and a hand gesture.

This disclosure further includes subject matter directed to the following examples:

Example 1

A receiver comprising: a first interface configured to receive a signal comprising media content; a second interface configured to be coupled to a display device; and circuitry; and wherein the circuitry is configured to: convey video content to the second interface for display on a first portion of the display device, wherein the video content corresponds to a single program of a channel; and convey a channel bar to the second interface for display on a second portion of the display device, wherein the channel bar comprises a plurality of elements indicative of a first broadcast lineup of programs associated with a first theme.

Example 2

The receiver as recited in any one or more of the preceding examples, wherein the first theme is selected based upon a previous viewer input request to change video content.

Example 3

The receiver as recited in any one or more of the preceding examples, wherein the first theme is selected based on one or more last previous channels viewed before the receiving device is turned off.

Example 4

The receiver as recited in any one or more of the preceding examples, wherein the first theme is selected based on given favorite channels determined from a viewing history of at least one of the following: a viewer and friends of the viewer.

Example 5

The receiver as recited in any one or more of the preceding examples, wherein the first theme includes channels corresponding to at least one of the following subjects: news, movies, sports, music, television series, variety shows, talk shows, finance, instructional how-to, reality, science and technology, and kids cartoons.

Example 6

The receiver as recited in any one or more of the preceding examples, wherein in response to viewer input requesting a change in the first broadcast lineup of programs associated with the first theme, the circuitry is further configured to display in the first channel bar a plurality of elements indicative of a second broadcast lineup of programs associated with the first theme different from the first broadcast lineup of programs associated with the first theme.

Example 7

The receiver as recited in any one or more of the preceding examples, wherein the circuitry is further configured to replace each of the plurality of elements indicative of the first broadcast lineup of programs with the plurality of elements indicative of the second broadcast lineup of programs.

Example 8

The receiver as recited in any one or more of the preceding examples, wherein the circuitry is further configured to change a rate of replacing based on viewer input.

Example 9

The receiver as recited in any one or more of the preceding examples, wherein the circuitry is further configured to display replacing as a scrolling action.

Example 10

The receiver as recited in any one or more of the preceding examples, wherein the circuitry is further configured to display replacing as a rotation-in-place of the first channel bar.

Example 11

A method comprising: receiving a signal comprising media content; conveying video content to the second interface for display on a first portion of the display device, wherein the video content corresponds to a single program of a channel; and conveying a channel bar to the second interface for display on a second portion of the display device, wherein the channel bar comprises a plurality of elements indicative of a first broadcast lineup of programs associated with a first theme.

Example 12

The method as recited in any one or more of the preceding examples, wherein the first theme is selected based upon a previous viewer input request to change video content.

Example 13

The method as recited in any one or more of the preceding examples, wherein the first theme is selected based on one or more last previous channels viewed before the receiving device is turned off.

Example 14

The method as recited in any one or more of the preceding examples, wherein the first theme is selected based on given favorite channels determined from a viewing history of at least one of the following: a viewer and friends of the viewer.

Example 15

The method as recited in any one or more of the preceding examples, wherein the first theme includes channels corresponding to at least one of the following subjects: news, movies, sports, music, television series, variety shows, talk shows, finance, instructional how-to, reality, science and technology, and kids cartoons.

Example 16

The method as recited in any one or more of the preceding examples, wherein in response to viewer input requesting a change in the first broadcast lineup of programs associated with the first theme, the method further comprises displaying in the first channel bar a plurality of elements indicative of a second broadcast lineup of programs associated with the first theme different from the first broadcast lineup of programs associated with the first theme.

Example 17

The method as recited in any one or more of the preceding examples, wherein the method further comprises replacing each of the plurality of elements indicative of the first broadcast lineup of programs with the plurality of elements indicative of the second broadcast lineup of programs.

Example 18

The method as recited in any one or more of the preceding examples, wherein the method further comprises changing a rate of replacing based on viewer input.

Example 19

The method as recited in any one or more of the preceding examples, wherein the method further comprises displaying replacing as a scrolling action.

Example 20

The method as recited in any one or more of the preceding examples, wherein the method further comprises displaying replacing as a rotation-in-place of the first channel bar.

Example 21

A computer readable storage medium comprising instructions executable to: receive a signal comprising media content; convey video content to the second interface for display on a first portion of the display device, wherein the video content corresponds to a single program of a channel; and convey a channel bar to the second interface for display on a second portion of the display device, wherein the channel bar comprises a plurality of elements indicative of a first broadcast lineup of programs associated with a first theme.

Example 22

The computer readable storage medium as recited in any one or more of the preceding examples, wherein the first theme is selected based upon a previous viewer input request to change video content.

Example 23

The computer readable storage medium as recited in any one or more of the preceding examples, wherein the first theme is selected based on one or more last previous channels viewed before the receiving device is turned off.

Example 24

The computer readable storage medium as recited in any one or more of the preceding examples, wherein the first theme is selected based on given favorite channels determined from a viewing history of at least one of the following: a viewer and friends of the viewer.

Example 25

The computer readable storage medium as recited in any one or more of the preceding examples, wherein the first theme includes channels corresponding to at least one of the following subjects: news, movies, sports, music, television series, variety shows, talk shows, finance, instructional how-to, reality, science and technology, and kids cartoons.

Example 26

The computer readable storage medium as recited in any one or more of the preceding examples, wherein in response to viewer input requesting a change in the first broadcast lineup of programs associated with the first theme, the program instructions are further executable to display in the first channel bar a plurality of elements indicative of a second broadcast lineup of programs associated with the first theme different from the first broadcast lineup of programs associated with the first theme.

Example 27

The computer readable storage medium as recited in any one or more of the preceding examples, wherein the program instructions are further executable to replace each of the plurality of elements indicative of the first broadcast lineup of programs with the plurality of elements indicative of the second broadcast lineup of programs.

Example 28

The computer readable storage medium as recited in any one or more of the preceding examples, wherein the program instructions are further executable to change a rate of replacing based on viewer input.

Example 29

The computer readable storage medium as recited in any one or more of the preceding examples, wherein the program instructions are further executable to display replacing as a scrolling action.

Example 30

The computer readable storage medium as recited in any one or more of the preceding examples, wherein the program instructions are further executable to display replacing as a rotation-in-place of the first channel bar.

Example 31

A system comprising: a data store configured to store video content; a server coupled to communicate with the data store; and a receiving device configured to communicate with the server via a network; wherein the receiving device is configured to: convey video content to the second interface for display on a first portion of the display device, wherein the video content corresponds to a single program of a channel; and convey a channel bar to the second interface for display on a second portion of the display device, wherein the channel bar comprises a plurality of elements indicative of a first broadcast lineup of programs associated with a first theme.

Example 32

The system as recited in any one or more of the preceding examples, wherein the first theme is selected based upon a previous viewer input request to change video content.

Example 33

The system as recited in any one or more of the preceding examples, wherein the first theme is selected based on one or more last previous channels viewed before the receiving device is turned off.

Example 34

The system as recited in any one or more of the preceding examples, wherein the first theme is selected based on given favorite channels determined from a viewing history of at least one of the following: a viewer and friends of the viewer.

Example 35

The system as recited in any one or more of the preceding examples, wherein the first theme includes channels corresponding to at least one of the following subjects: news, movies, sports, music, television series, variety shows, talk shows, finance, instructional how-to, reality, science and technology, and kids cartoons.

Example 36

The system as recited in any one or more of the preceding examples, wherein in response to viewer input requesting a change in the first broadcast lineup of programs associated with the first theme, the receiving device is further configured to display in the first channel bar a plurality of elements indicative of a second broadcast lineup of programs associated with the first theme different from the first broadcast lineup of programs associated with the first theme.

Example 37

The system as recited in any one or more of the preceding examples, wherein the receiving device is further configured to replace each of the plurality of elements indicative of the first broadcast lineup of programs with the plurality of elements indicative of the second broadcast lineup of programs.

Example 38

The system as recited in any one or more of the preceding examples, wherein the receiving device is further configured to change a rate of replacing based on viewer input.

Example 39

The system as recited in any one or more of the preceding examples, wherein the receiving device is further configured to display replacing as a scrolling action.

Example 40

The system as recited in any one or more of the preceding examples, wherein the receiving device is further configured to display replacing as a rotation-in-place of the first channel bar.

Example 41

A system for providing stored media content, the system comprising: a first means configured to receive a signal comprising media content; and a second means configured to: convey video content to the second interface for display on a first portion of the display device, wherein the video content corresponds to a single program of a channel; and convey a channel bar to the second interface for display on a second portion of the display device, wherein the channel bar comprises a plurality of elements indicative of a first broadcast lineup of programs associated with a first theme.

Example 42

The system as recited in any one or more of the preceding examples, wherein the first theme is selected based upon a previous viewer input request to change video content.

Example 43

The system as recited in any one or more of the preceding examples, wherein the first theme is selected based on one or more last previous channels viewed before the receiving device is turned off.

Example 44

The system as recited in any one or more of the preceding examples, wherein the first theme is selected based on given favorite channels determined from a viewing history of at least one of the following: a viewer and friends of the viewer.

Example 45

The system as recited in any one or more of the preceding examples, wherein the first theme includes channels corresponding to at least one of the following subjects: news, movies, sports, music, television series, variety shows, talk shows, finance, instructional how-to, reality, science and technology, and kids cartoons.

Example 46

The system as recited in any one or more of the preceding examples, wherein in response to viewer input requesting a change in the first broadcast lineup of programs associated with the first theme, the second means is further configured to displaying in the first channel bar a plurality of elements indicative of a second broadcast lineup of programs associated with the first theme different from the first broadcast lineup of programs associated with the first theme.

Example 47

The system as recited in any one or more of the preceding examples, wherein the second means is further configured to replacing each of the plurality of elements indicative of the first broadcast lineup of programs with the plurality of elements indicative of the second broadcast lineup of programs.

Example 48

The system as recited in any one or more of the preceding examples, wherein the second means is further configured to changing a rate of replacing based on viewer input.

Example 49

The system as recited in any one or more of the preceding examples, wherein the second means is further configured to displaying replacing as a scrolling action.

Example 50

The system as recited in any one or more of the preceding examples, wherein the second means is further configured to displaying replacing as a rotation-in-place of the first channel bar.

This disclosure further includes subject matter directed to the following examples:

Example 1

A receiver comprising: a first interface configured to receive a signal comprising media content; a second interface configured to be coupled to a display device; and circuitry; and wherein the circuitry is configured to: select video content for display on the display device, wherein the video content corresponds to a single program of a channel; select a channel bar for display on the display device, wherein the channel bar includes a plurality of elements indicative of a first broadcast lineup of programs associated with a first theme; send requests for the video content and the channel bar; and receive the video content and the channel bar via the first interface.

Example 2

The receiver as recited in any one or more of the preceding examples, wherein the circuitry is further configured to: convey the video content to the second interface for display on a first portion of the display device; and convey the channel bar to the second interface for display on a second portion of the display device, wherein the second portion overlays part of the first portion.

Example 3

The receiver as recited in any one or more of the preceding examples, wherein conveying media content is performed in response to detecting the receiving device being turned on.

Example 4

The receiver as recited in any one or more of the preceding examples, wherein conveying media content is performed in response to detecting viewer input requesting a change in video input.

Example 5

The receiver as recited in any one or more of the preceding examples, wherein the first theme corresponds to a plurality of channels.

Example 6

The receiver as recited in any one or more of the preceding examples, wherein a given element corresponding to a given program of the broadcast line up of programs is indicated as being highlighted.

Example 7

The receiver as recited in any one or more of the preceding examples, wherein in response to detecting viewer input requesting a change in highlighting the given element, the circuitry is further configured to display another element different from the given element as indicated as being highlighted in the first channel bar.

Example 8

The receiver as recited in any one or more of the preceding examples, wherein the circuitry is further configured to present audio content associated with a program corresponding to a currently highlighted element while simultaneously displaying the first video content.

Example 9

The receiver as recited in any one or more of the preceding examples, wherein the circuitry is further configured to cease presenting audio content associated with the first video content.

Example 10

The receiver as recited in any one or more of the preceding examples, wherein in response to detecting viewer input to return focus of playback on the first video content, the circuitry is further configured to change presenting audio content from being associated with the currently highlighted element to being associated with the first video content.

Example 11

A method comprising: receiving a signal comprising media content; selecting video content for display on the display device, wherein the video content corresponds to a single program of a channel; selecting a channel bar for display on the display device, wherein the channel bar includes a plurality of elements indicative of a first broadcast lineup of programs associated with a first theme; sending requests for the video content and the channel bar; and receiving the video content and the channel bar via the first interface.

Example 12

The method as recited in any one or more of the preceding examples, wherein the method further comprises: conveying the video content to the second interface for display on a first portion of the display device; and conveying the channel bar to the second interface for display on a second portion of the display device, wherein the second portion overlays part of the first portion.

Example 13

The method as recited in any one or more of the preceding examples, wherein conveying media content is performed in response to detecting the receiving device being turned on.

Example 14

The method as recited in any one or more of the preceding examples, wherein conveying media content is performed in response to detecting viewer input requesting a change in video input.

Example 15

The method as recited in any one or more of the preceding examples, wherein the first theme corresponds to a plurality of channels.

Example 16

The method as recited in any one or more of the preceding examples, wherein a given element corresponding to a given program of the broadcast line up of programs is indicated as being highlighted.

Example 17

The method as recited in any one or more of the preceding examples, wherein in response to detecting viewer input requesting a change in highlighting the given element, the method further comprises displaying another element different from the given element as indicated as being highlighted in the first channel bar.

Example 18

The method as recited in any one or more of the preceding examples, wherein the method further comprises presenting audio content associated with a program corresponding to a currently highlighted element while simultaneously displaying the first video content.

Example 19

The method as recited in any one or more of the preceding examples, wherein the method further comprises ceasing to present audio content associated with the first video content.

Example 20

The method as recited in any one or more of the preceding examples, wherein in response to detecting viewer input to return focus of playback on the first video content, the method further comprises changing presenting audio content from being associated with the currently highlighted element to being associated with the first video content.

Example 21

A computer readable storage medium comprising instructions executable to: receive a signal comprising media content; select video content for display on the display

145 device, wherein the video content corresponds to a single program of a channel; select a channel bar for display on the display device, wherein the channel bar includes a plurality of elements indicative of a first broadcast lineup of programs associated with a first theme; send requests for the video content and the channel bar; and receive the video content and the channel bar via the first interface.

Example 22

The computer readable storage medium as recited in any one or more of the preceding examples, wherein the program instructions are further executable to: convey the video content to the second interface for display on a first portion of the display device; and convey the channel bar to the second interface for display on a second portion of the display device, wherein the second portion overlays part of the first portion.

Example 23

The computer readable storage medium as recited in any one or more of the preceding examples, wherein conveying media content is performed in response to detecting the receiving device being turned on.

Example 24

The computer readable storage medium as recited in any one or more of the preceding examples, wherein conveying media content is performed in response to detecting viewer input requesting a change in video input.

Example 25

The computer readable storage medium as recited in any one or more of the preceding examples, wherein the first theme corresponds to a plurality of channels.

Example 26

The computer readable storage medium as recited in any one or more of the preceding examples, wherein a given element corresponding to a given program of the broadcast line up of programs is indicated as being highlighted.

Example 27

The computer readable storage medium as recited in any one or more of the preceding examples, wherein in response to detecting viewer input requesting a change in highlighting the given element, the program instructions are further executable to display another element different from the given element as indicated as being highlighted in the first channel bar.

Example 28

The computer readable storage medium as recited in any one or more of the preceding examples, wherein the program instructions are further executable to present audio content associated with a program corresponding to a currently highlighted element while simultaneously displaying the first video content.

Example 29

The computer readable storage medium as recited in any one or more of the preceding examples, wherein the program instructions are further executable to cease presenting audio content associated with the first video content.

Example 30

The computer readable storage medium as recited in any one or more of the preceding examples, wherein in response to detecting viewer input to return focus of playback on the first video content, the program instructions are further executable to change presenting audio content from being associated with the currently highlighted element to being associated with the first video content.

Example 31

A system comprising: a data store configured to store video content; a server coupled to communicate with the data store; and a receiving device configured to communicate with the server via a network; wherein the receiving device is configured to: select video content for display on the display device, wherein the video content corresponds to a single program of a channel; select a channel bar for display on the display device, wherein the channel bar includes a plurality of elements indicative of a first broadcast lineup of programs associated with a first theme; send requests for the video content and the channel bar; and receive the video content and the channel bar via the first interface.

Example 32

The system as recited in any one or more of the preceding examples, wherein the receiving device is further configured to: convey the video content to the second interface for display on a first portion of the display device; and convey the channel bar to the second interface for display on a second portion of the display device, wherein the second portion overlays part of the first portion.

Example 33

The system as recited in any one or more of the preceding examples, wherein conveying media content is performed in response to detecting the receiving device being turned on.

Example 34

The system as recited in any one or more of the preceding examples, wherein conveying media content is performed in response to detecting viewer input requesting a change in video input.

Example 35

The system as recited in any one or more of the preceding examples, wherein the first theme corresponds to a plurality of channels.

Example 36

The system as recited in any one or more of the preceding examples, wherein a given element corresponding to a given program of the broadcast line up of programs is indicated as being highlighted.

Example 37

The system as recited in any one or more of the preceding examples, wherein in response to detecting viewer input requesting a change in highlighting the given element, the receiving device is further configured to display another element different from the given element as indicated as being highlighted in the first channel bar.

Example 38

The system as recited in any one or more of the preceding examples, wherein the receiving device is further configured to present audio content associated with a program corresponding to a currently highlighted element while simultaneously displaying the first video content.

Example 39

The system as recited in any one or more of the preceding examples, wherein the receiving device is further configured to cease presenting audio content associated with the first video content.

Example 40

The system as recited in any one or more of the preceding examples, wherein in response to detecting viewer input to return focus of playback on the first video content, the receiving device is further configured to change presenting audio content from being associated with the currently highlighted element to being associated with the first video content.

Example 41

A system for providing stored media content, the system comprising: a first means configured to receive a signal comprising media content; and a second means configured to: select video content for display on the display device, wherein the video content corresponds to a single program of a channel; select a channel bar for display on the display device, wherein the channel bar includes a plurality of elements indicative of a first broadcast lineup of programs associated with a first theme; send requests for the video content and the channel bar; and receive the video content and the channel bar via the first interface.

Example 42

The system as recited in any one or more of the preceding examples, wherein the second means is further configured to: convey the video content to the second interface for display on a first portion of the display device; and convey the channel bar to the second interface for display on a second portion of the display device, wherein the second portion overlays part of the first portion.

Example 43

The system as recited in any one or more of the preceding examples, wherein conveying media content is performed in response to detecting the receiving device being turned on.

Example 44

The system as recited in any one or more of the preceding examples, wherein conveying media content is performed in response to detecting viewer input requesting a change in video input.

Example 45

The system as recited in any one or more of the preceding examples, wherein the first theme corresponds to a plurality of channels.

Example 46

The system as recited in any one or more of the preceding examples, wherein a given element corresponding to a given program of the broadcast line up of programs is indicated as being highlighted.

Example 47

The system as recited in any one or more of the preceding examples, wherein in response to detecting viewer input requesting a change in highlighting the given element, the second means is further configured to displaying another element different from the given element as indicated as being highlighted in the first channel bar.

Example 48

The system as recited in any one or more of the preceding examples, wherein the second means is further configured to presenting audio content associated with a program corresponding to a currently highlighted element while simultaneously displaying the first video content.

Example 49

The system as recited in any one or more of the preceding examples, wherein the second means is further configured to ceasing to present audio content associated with the first video content.

Example 50

The system as recited in any one or more of the preceding examples, wherein in response to detecting viewer input to return focus of playback on the first video content, the second means is further configured to changing presenting audio content from being associated with the currently highlighted element to being associated with the first video content.

This disclosure further includes subject matter directed to the following examples:

Example 1

A receiver comprising: a first interface configured to receive a signal comprising media content; a second interface configured to be coupled to a display device; and circuitry; and wherein in response to detecting viewer input requesting a change in video content, the circuitry is configured to: send a request for first video content and a first channel bar; receive the requested first video content and the first channel bar; convey the first video content to the second interface for display on a first portion of the display device, wherein the first video content corresponds to a single program of a channel; and convey the first channel bar to the second interface for display on a second portion of the display device, wherein the channel bar includes a plurality of elements indicative of a first broadcast lineup of programs associated with a first theme.

Example 2

The receiver as recited in any one or more of the preceding examples, wherein each one of the plurality of channels is at least one of the following: a television broadcast network, an internet-based provider, a cable network provider, and a satellite network provider.

Example 3

The receiver as recited in any one or more of the preceding examples, wherein the first channel bar includes at least a respective title for a program overlayed on top of an element corresponding to the program.

Example 4

The receiver as recited in any one or more of the preceding examples, wherein the first channel bar includes at least an identifier for a respective channel for a program overlayed on top of an element corresponding to the program.

Example 5

The receiver as recited in any one or more of the preceding examples, wherein the first channel bar includes at least a respective text description for a program overlayed on top of an element corresponding to the program.

Example 6

The receiver as recited in any one or more of the preceding examples, wherein the first channel bar includes at least a respective picture for a program overlayed on top of a respective element corresponding to the program.

Example 7

The receiver as recited in any one or more of the preceding examples, wherein the media content includes at least one of the following: a still image, audio content, video content from an associated program, and an animation.

Example 8

The receiver as recited in any one or more of the preceding examples, wherein in response to detecting viewer input requesting a change in video content, the circuitry is further configured to: send a request to the server for video content corresponding to a program associated with an element indicated as currently being highlighted; receive second video content corresponding to the requested content from the data store via the server; display on a display device the second video content; and display a second channel bar that overlays a portion of the second video content, wherein the second channel bar comprises a plurality of elements indicative of a first broadcast lineup of programs associated with a second theme.

Example 9

The receiver as recited in any one or more of the preceding examples, wherein the second theme is different from the first theme.

Example 10

The receiver as recited in any one or more of the preceding examples, wherein the display device is at least one of the following: a television, a phone, a tablet computer, a portable gaming device, a wearable portable device, a display device in a motor vehicle, or a remote control.

Example 11

A method comprising: receiving a signal comprising media content; in response to detecting viewer input requesting a change in video content: sending a request for first video content and a first channel bar; receiving the requested first video content and the first channel bar; conveying the first video content to the second interface for display on a first portion of the display device, wherein the first video content corresponds to a single program of a channel; and conveying the first channel bar to the second interface for display on a second portion of the display device, wherein the channel bar includes a plurality of elements indicative of a first broadcast lineup of programs associated with a first theme.

Example 12

The method as recited in any one or more of the preceding examples, wherein each one of the plurality of channels is at least one of the following: a television broadcast network, an internet-based provider, a cable network provider, and a satellite network provider.

Example 13

The method as recited in any one or more of the preceding examples, wherein the first channel bar includes at least a respective title for a program overlayed on top of an element corresponding to the program.

Example 14

The method as recited in any one or more of the preceding examples, wherein the first channel bar includes at least an identifier for a respective channel for a program overlayed on top of an element corresponding to the program.

Example 15

The method as recited in any one or more of the preceding examples, wherein the first channel bar includes at least a respective text description for a program overlayed on top of an element corresponding to the program.

Example 16

The method as recited in any one or more of the preceding examples, wherein the first channel bar includes at least a respective picture for a program overlayed on top of a respective element corresponding to the program.

Example 17

The method as recited in any one or more of the preceding examples, wherein the media content includes at least one of the following: a still image, audio content, video content from an associated program, and an animation.

Example 18

The method as recited in any one or more of the preceding examples, wherein in response to detecting viewer input requesting a change in video content, the method further comprises: send a request to the server for video content corresponding to a program associated with an element indicated as currently being highlighted; receive second video content corresponding to the requested content from the data store via the server; display on a display device the second video content; and display a second channel bar that overlays a portion of the second video content, wherein the second channel bar comprises a plurality of elements indicative of a first broadcast lineup of programs associated with a second theme.

Example 19

The method as recited in any one or more of the preceding examples, wherein the second theme is different from the first theme.

Example 20

The method as recited in any one or more of the preceding examples, wherein the display device is at least one of the following: a television, a phone, a tablet computer, a portable gaming device, a wearable portable device, a display device in a motor vehicle, or a remote control.

Example 21

A computer readable storage medium comprising instructions executable to: receive a signal comprising media content; in response to detecting viewer input requesting a change in video content: send a request for first video content and a first channel bar; receive the requested first video content and the first channel bar; convey the first video content to the second interface for display on a first portion of the display device, wherein the first video content corresponds to a single program of a channel; and convey the first channel bar to the second interface for display on a second portion of the display device, wherein the channel bar includes a plurality of elements indicative of a first broadcast lineup of programs associated with a first theme.

Example 22

The computer readable storage medium as recited in any one or more of the preceding examples, wherein each one of the plurality of channels is at least one of the following: a television broadcast network, an internet-based provider, a cable network provider, and a satellite network provider.

Example 23

The computer readable storage medium as recited in any one or more of the preceding examples, wherein the first channel bar includes at least a respective title for a program overlayed on top of an element corresponding to the program.

Example 24

The computer readable storage medium as recited in any one or more of the preceding examples, wherein the first channel bar includes at least an identifier for a respective channel for a program overlayed on top of an element corresponding to the program.

Example 25

The computer readable storage medium as recited in any one or more of the preceding examples, wherein the first channel bar includes at least a respective text description for a program overlayed on top of an element corresponding to the program.

Example 26

The computer readable storage medium as recited in any one or more of the preceding examples, wherein the first channel bar includes at least a respective picture for a program overlayed on top of a respective element corresponding to the program.

Example 27

The computer readable storage medium as recited in any one or more of the preceding examples, wherein the media content includes at least one of the following: a still image, audio content, video content from an associated program, and an animation.

Example 28

The computer readable storage medium as recited in any one or more of the preceding examples, wherein in response to detecting viewer input requesting a change in video content, the program instructions are further executable to: send a request to the server for video content corresponding to a program associated with an element indicated as currently being highlighted; receive second video content corresponding to the requested content from the data store via the server; display on a display device the second video content; and display a second channel bar that overlays a portion of the second video content, wherein the second channel bar comprises a plurality of elements indicative of a first broadcast lineup of programs associated with a second theme.

Example 29

The computer readable storage medium as recited in any one or more of the preceding examples, wherein the second theme is different from the first theme.

Example 30

The computer readable storage medium as recited in any one or more of the preceding examples, wherein the display device is at least one of the following: a television, a phone, a tablet computer, a portable gaming device, a wearable portable device, a display device in a motor vehicle, or a remote control.

Example 31

A system comprising: a data store configured to store video content; a server coupled to communicate with the data store; and a receiving device configured to communicate with the server via a network; wherein in response to detecting viewer input requesting a change in video content, the receiving device is configured to: send a request for first video content and a first channel bar; receive the requested first video content and the first channel bar; convey the first video content to the second interface for display on a first portion of the display device, wherein the first video content corresponds to a single program of a channel; and convey the first channel bar to the second interface for display on a second portion of the display device, wherein the channel bar includes a plurality of elements indicative of a first broadcast lineup of programs associated with a first theme.

Example 32

The system as recited in any one or more of the preceding examples, wherein each one of the plurality of channels is at least one of the following: a television broadcast network, an internet-based provider, a cable network provider, and a satellite network provider.

Example 33

The system as recited in any one or more of the preceding examples, wherein the first channel bar includes at least a respective title for a program overlayed on top of an element corresponding to the program.

Example 34

The system as recited in any one or more of the preceding examples, wherein the first channel bar includes at least an identifier for a respective channel for a program overlayed on top of an element corresponding to the program.

Example 35

The system as recited in any one or more of the preceding examples, wherein the first channel bar includes at least a respective text description for a program overlayed on top of an element corresponding to the program.

Example 36

The system as recited in any one or more of the preceding examples, wherein the first channel bar includes at least a respective picture for a program overlayed on top of a respective element corresponding to the program.

Example 37

The system as recited in any one or more of the preceding examples, wherein the media content includes at least one of the following: a still image, audio content, video content from an associated program, and an animation.

Example 38

The system as recited in any one or more of the preceding examples, wherein in response to detecting viewer input requesting a change in video content, the receiving device is further configured to: send a request to the server for video content corresponding to a program associated with an element indicated as currently being highlighted; receive second video content corresponding to the requested content from the data store via the server; display on a display device the second video content; and display a second channel bar that overlays a portion of the second video content, wherein the second channel bar comprises a plurality of elements indicative of a first broadcast lineup of programs associated with a second theme.

Example 39

The system as recited in any one or more of the preceding examples, wherein the second theme is different from the first theme.

Example 40

The system as recited in any one or more of the preceding examples, wherein the display device is at least one of the following: a television, a phone, a tablet computer, a portable gaming device, a wearable portable device, a display device in a motor vehicle, or a remote control.

Example 41

A system for providing stored media content, the system comprising: a first means configured to receive a signal comprising media content; and a second means configured to: in response to detecting viewer input requesting a change in video content: send a request for first video content and a first channel bar; receive the requested first video content and the first channel bar; convey the first video content to the second interface for display on a first portion of the display device, wherein the first video content corresponds to a single program of a channel; and convey the first channel bar to the second interface for display on a second portion of the display device, wherein the channel bar includes a plurality of elements indicative of a first broadcast lineup of programs associated with a first theme.

Example 42

The system as recited in any one or more of the preceding examples, wherein each one of the plurality of channels is at least one of the following: a television broadcast network, an internet-based provider, a cable network provider, and a satellite network provider.

Example 43

The system as recited in any one or more of the preceding examples, wherein the first channel bar includes at least a respective title for a program overlayed on top of an element corresponding to the program.

Example 44

The system as recited in any one or more of the preceding examples, wherein the first channel bar includes at least an identifier for a respective channel for a program overlayed on top of an element corresponding to the program.

Example 45

The system as recited in any one or more of the preceding examples, wherein the first channel bar includes at least a respective text description for a program overlayed on top of an element corresponding to the program.

Example 46

The system as recited in any one or more of the preceding examples, wherein the first channel bar includes at least a respective picture for a program overlayed on top of a respective element corresponding to the program.

Example 47

The system as recited in any one or more of the preceding examples, wherein the media content includes at least one of the following: a still image, audio content, video content from an associated program, and an animation.

Example 48

The system as recited in any one or more of the preceding examples, wherein in response to detecting viewer input requesting a change in video content, the second means is further configured to: send a request to the server for video content corresponding to a program associated with an element indicated as currently being highlighted; receive second video content corresponding to the requested content from the data store via the server; display on a display device the second video content; and display a second channel bar that overlays a portion of the second video content, wherein the second channel bar comprises a plurality of elements indicative of a first broadcast lineup of programs associated with a second theme.

Example 49

The system as recited in any one or more of the preceding examples, wherein the second theme is different from the first theme.

Example 50

The system as recited in any one or more of the preceding examples, wherein the display device is at least one of the following: a television, a phone, a tablet computer, a portable gaming device, a wearable portable device, a display device in a motor vehicle, or a remote control.

This disclosure further includes subject matter directed to the following examples:

Example 1

A receiver comprising: a first interface configured to receive a signal comprising media content; a second interface configured to be coupled to a display device; and circuitry configured to: convey first video content to the second interface for display on a first portion of the display device, wherein the first video content corresponds to a single program of a channel; and convey a first channel bar to the second interface for display on a second portion of the display device, wherein the channel bar includes a plurality of elements indicative of a broadcast lineup of programs for a first plurality of channels; in response to detecting viewer input requesting a change in theme: select a second theme different from the first theme; and display at least a title of the second theme in the first channel bar.

Example 2

The receiver as recited in any one or more of the preceding examples, wherein the circuitry is further configured to select the second theme based on last previous channels viewed before the receiving device is turned off.

Example 3

The receiver as recited in any one or more of the preceding examples, wherein the circuitry is further configured to select the second theme based on predetermined favorite channels.

Example 4

The receiver as recited in any one or more of the preceding examples, wherein the favorite channels are determined from a viewing history of a viewer.

Example 5

The receiver as recited in any one or more of the preceding examples, wherein the favorite channels are determined from a viewing history of friends of a viewer, wherein the history is stored on the server.

Example 6

The receiver as recited in any one or more of the preceding examples, wherein in response to detecting viewer input accepting the second theme, the circuitry is further configured to: send a request to the server for video content corresponding to a second broadcast lineup of programs associated with the second theme; receive video content corresponding to the request from the data store via the server; and display a second channel bar that overlays a portion of the first video content, wherein the second channel bar comprises a plurality of elements indicative of the second broadcast lineup of programs associated with the second theme.

Example 7

The receiver as recited in any one or more of the preceding examples, wherein the circuitry is further configured to replace each of the plurality of elements indicative of the first broadcast lineup of programs with the plurality of elements indicative of the second broadcast lineup of programs.

Example 8

The receiver as recited in any one or more of the preceding examples, wherein the circuitry is further configured to display replacing as a scrolling action.

Example 9

The receiver as recited in any one or more of the preceding examples, wherein the circuitry is further configured to display replacing as a rotation-in-place of the first channel bar.

Example 10

The receiver as recited in any one or more of the preceding examples, wherein the favorite channels are determined from a recommendation list created by the viewer.

Example 11

A method comprising: receiving a signal comprising media content; conveying first video content to the second interface for display on a first portion of the display device, wherein the first video content corresponds to a single program of a channel; and conveying a first channel bar to the second interface for display on a second portion of the display device, wherein the channel bar includes a plurality of elements indicative of a broadcast lineup of programs for a first plurality of channels; in response to detecting viewer input requesting a change in theme: selecting a second theme different from the first theme; and displaying at least a title of the second theme in the first channel bar.

Example 12

The method as recited in any one or more of the preceding examples, wherein the method further comprises selecting the second theme based on last previous channels viewed before the receiving device is turned off.

Example 13

The method as recited in any one or more of the preceding examples, wherein the method further comprises selecting the second theme based on predetermined favorite channels.

Example 14

The method as recited in any one or more of the preceding examples, wherein the favorite channels are determined from a viewing history of a viewer.

Example 15

The method as recited in any one or more of the preceding examples, wherein the favorite channels are determined from a viewing history of friends of a viewer, wherein the history is stored on the server.

Example 16

The method as recited in any one or more of the preceding examples, wherein in response to detecting viewer input accepting the second theme, the method further comprises: sending a request to the server for video content corresponding to a second broadcast lineup of programs associated with the second theme; receiving video content corresponding to the request from the data store via the server; and displaying a second channel bar that overlays a portion of the first video content, wherein the second channel bar comprises a plurality of elements indicative of the second broadcast lineup of programs associated with the second theme.

Example 17

The method as recited in any one or more of the preceding examples, wherein the method further comprises replacing each of the plurality of elements indicative of the first broadcast lineup of programs with the plurality of elements indicative of the second broadcast lineup of programs.

Example 18

The method as recited in any one or more of the preceding examples, wherein the method further comprises displaying replacing as a scrolling action.

Example 19

The method as recited in any one or more of the preceding examples, wherein the method further comprises displaying replacing as a rotation-in-place of the first channel bar.

Example 20

The method as recited in any one or more of the preceding examples, wherein the favorite channels are determined from a recommendation list created by the viewer.

Example 21

A computer readable storage medium comprising instructions executable to: receive a signal comprising media content; convey first video content to the second interface for display on a first portion of the display device, wherein the first video content corresponds to a single program of a channel; and convey a first channel bar to the second interface for display on a second portion of the display device, wherein the channel bar includes a plurality of elements indicative of a broadcast lineup of programs for a first plurality of channels; in response to detecting viewer input requesting a change in theme: select a second theme different from the first theme; and display at least a title of the second theme in the first channel bar.

Example 22

The computer readable storage medium as recited in any one or more of the preceding examples, wherein the program instructions are further executable to select the second theme based on last previous channels viewed before the receiving device is turned off.

Example 23

The computer readable storage medium as recited in any one or more of the preceding examples, wherein the program instructions are further executable to select the second theme based on predetermined favorite channels.

Example 24

The computer readable storage medium as recited in any one or more of the preceding examples, wherein the favorite channels are determined from a viewing history of a viewer.

Example 25

The computer readable storage medium as recited in any one or more of the preceding examples, wherein the favorite channels are determined from a viewing history of friends of a viewer, wherein the history is stored on the server.

Example 26

The computer readable storage medium as recited in any one or more of the preceding examples, wherein in response to detecting viewer input accepting the second theme, the program instructions are further executable to: send a request to the server for video content corresponding to a second broadcast lineup of programs associated with the second theme; receive video content corresponding to the request from the data store via the server; and display a second channel bar that overlays a portion of the first video content, wherein the second channel bar comprises a plurality of elements indicative of the second broadcast lineup of programs associated with the second theme.

Example 27

The computer readable storage medium as recited in any one or more of the preceding examples, wherein the program instructions are further executable to replace each of the plurality of elements indicative of the first broadcast lineup of programs with the plurality of elements indicative of the second broadcast lineup of programs.

Example 28

The computer readable storage medium as recited in any one or more of the preceding examples, wherein the program instructions are further executable to display replacing as a scrolling action.

Example 29

The computer readable storage medium as recited in any one or more of the preceding examples, wherein the program instructions are further executable to display replacing as a rotation-in-place of the first channel bar.

Example 30

The computer readable storage medium as recited in any one or more of the preceding examples, wherein the favorite channels are determined from a recommendation list created by the viewer.

Example 31

A system comprising: a data store configured to store video content; a server coupled to communicate with the data store; and a receiving device configured to: communicate with the server via a network convey first video content to the second interface for display on a first portion of the display device, wherein the first video content corresponds to a single program of a channel; and convey a first channel bar to the second interface for display on a second portion of the display device, wherein the channel bar includes a plurality of elements indicative of a broadcast lineup of programs for a first plurality of channels; in response to detecting viewer input requesting a change in theme: select a second theme different from the first theme; and display at least a title of the second theme in the first channel bar.

Example 32

The system as recited in any one or more of the preceding examples, wherein the receiving device is further configured to select the second theme based on last previous channels viewed before the receiving device is turned off.

Example 33

The system as recited in any one or more of the preceding examples, wherein the receiving device is further configured to select the second theme based on predetermined favorite channels.

Example 34

The system as recited in any one or more of the preceding examples, wherein the favorite channels are determined from a viewing history of a viewer.

Example 35

The system as recited in any one or more of the preceding examples, wherein the favorite channels are determined from a viewing history of friends of a viewer, wherein the history is stored on the server.

Example 36

The system as recited in any one or more of the preceding examples, wherein in response to detecting viewer input accepting the second theme, the receiving device is further configured to: send a request to the server for video content corresponding to a second broadcast lineup of programs associated with the second theme; receive video content corresponding to the request from the data store via the server; and display a second channel bar that overlays a portion of the first video content, wherein the second channel bar comprises a plurality of elements indicative of the second broadcast lineup of programs associated with the second theme.

Example 37

The system as recited in any one or more of the preceding examples, wherein the receiving device is further configured to replace each of the plurality of elements indicative of the first broadcast lineup of programs with the plurality of elements indicative of the second broadcast lineup of programs.

Example 38

The system as recited in any one or more of the preceding examples, wherein the receiving device is further configured to display replacing as a scrolling action.

Example 39

The system as recited in any one or more of the preceding examples, wherein the receiving device is further configured to display replacing as a rotation-in-place of the first channel bar.

Example 40

The system as recited in any one or more of the preceding examples, wherein the favorite channels are determined from a recommendation list created by the viewer.

Example 41

A system for providing stored media content, the system comprising: a first means configured to receive a signal comprising media content; and a second means configured to: convey first video content to the second interface for display on a first portion of the display device, wherein the first video content corresponds to a single program of a channel; and convey a first channel bar to the second interface for display on a second portion of the display device, wherein the channel bar includes a plurality of elements indicative of a broadcast lineup of programs for a first plurality of channels; in response to detecting viewer input requesting a change in theme: select a second theme different from the first theme; and display at least a title of the second theme in the first channel bar.

Example 42

The system as recited in any one or more of the preceding examples, wherein the second means is further configured to selecting the second theme based on last previous channels viewed before the receiving device is turned off.

Example 43

The system as recited in any one or more of the preceding examples, wherein the second means is further configured to selecting the second theme based on predetermined favorite channels.

Example 44

The system as recited in any one or more of the preceding examples, wherein the favorite channels are determined from a viewing history of a viewer.

Example 45

The system as recited in any one or more of the preceding examples, wherein the favorite channels are determined from a viewing history of friends of a viewer, wherein the history is stored on the server.

Example 46

The system as recited in any one or more of the preceding examples, wherein in response to detecting viewer input accepting the second theme, the second means is further configured to: send a request to the server for video content corresponding to a second broadcast lineup of programs associated with the second theme; receive video content corresponding to the request from the data store via the server; and display a second channel bar that overlays a portion of the first video content, wherein the second channel bar comprises a plurality of elements indicative of the second broadcast lineup of programs associated with the second theme.

Example 47

The system as recited in any one or more of the preceding examples, wherein the second means is further configured to replacing each of the plurality of elements indicative of the first broadcast lineup of programs with the plurality of elements indicative of the second broadcast lineup of programs.

Example 48

The system as recited in any one or more of the preceding examples, wherein the second means is further configured to displaying replacing as a scrolling action.

Example 49

The system as recited in any one or more of the preceding examples, wherein the second means is further configured to displaying replacing as a rotation-in-place of the first channel bar.

Example 50

The system as recited in any one or more of the preceding examples, wherein the favorite channels are determined from a recommendation list created by the viewer.

This disclosure further includes subject matter directed to the following examples:

Example 1

A device comprising: a first interface configured to receive video content; and a second interface configured to be coupled to a display device; circuitry; and wherein said circuitry is configured to convey a channel bar via the second interface for display on a display device, wherein said channel bar comprises a plurality of elements corresponding to a given theme of media content.

Example 2

The device as recited in any one or more of the preceding examples, wherein the circuitry is configured to convey said channel bar responsive to detecting viewer input.

Example 3

The device as recited in any one or more of the preceding examples, wherein only elements corresponding to the given theme are included in the channel bar.

Example 4

The device as recited in any one or more of the preceding examples, wherein the theme is defined by at least one of a content provider, a viewer associated with the device, and a viewer not associated with the device.

Example 5

The device as recited in any one or more of the preceding examples, wherein said theme corresponds to one of sports, news, content directed to children, content directed to adults, and particular genres of fictional or non-fictional content.

Example 6

The device as recited in any one or more of the preceding examples, wherein said genres include an arbitrarily created and named by a viewer.

Example 7

The device as recited in any one or more of the preceding examples, wherein the circuitry is further configured to: detect a request for a change to the channel bar; identify a new theme; and convey for display a channel bar with a new plurality of elements corresponding to the new theme.

Example 8

The device as recited in any one or more of the preceding examples, wherein the circuitry is configured to convey for display the channel bar with the new plurality of elements responsive to detecting the new theme is accepted.

Example 9

The device as recited in any one or more of the preceding examples, wherein the circuitry is configured to convey for display an identification of the new theme.

Example 10

The device as recited in any one or more of the preceding examples, wherein the circuitry is configured to convey for display the identification of the new theme prior to conveying for display the channel bar with the new plurality of elements corresponding to the new theme.

Example 11

A method comprising: receiving a signal comprising media content; conveying a channel bar for display on a display device, wherein said channel bar comprises a plurality of elements corresponding to a given theme of media content.

Example 12

The method as recited in any one or more of the preceding examples, further comprising conveying said channel bar responsive to detecting viewer input.

Example 13

The method as recited in any one or more of the preceding examples, wherein only elements corresponding to the given theme are included in the channel bar.

Example 14

The method as recited in any one or more of the preceding examples, wherein the theme is defined by at least one of a content provider, a viewer associated with the device, and a viewer not associated with the device.

Example 15

The method as recited in any one or more of the preceding examples, wherein said theme corresponds to one of sports, news, content directed to children, content directed to adults, and particular genres of fictional or non-fictional content.

Example 16

The method as recited in any one or more of the preceding examples, wherein said genres include an arbitrarily created and named by a viewer.

Example 17

The method as recited in any one or more of the preceding examples, wherein the method further comprises: detecting a request for a change to the channel bar; identifying a new theme; and conveying for display a channel bar with a new plurality of elements corresponding to the new theme.

Example 18

The method as recited in any one or more of the preceding examples, further comprising conveying for display the channel bar with the new plurality of elements responsive to detecting the new theme is accepted.

Example 19

The method as recited in any one or more of the preceding examples, wherein the circuitry is configured to convey for display an identification of the new theme.

Example 20

The method as recited in any one or more of the preceding examples, wherein the method further comprises conveying for display the identification of the new theme prior to conveying for display the channel bar with the new plurality of elements corresponding to the new theme.

Example 21

A receiver comprising: a first interface configured to receive video content; and a second interface configured to be coupled to a display device; circuitry; and wherein said circuitry is configured to convey a channel bar via the second interface for display on a display device, wherein said channel bar comprises a plurality of elements corresponding to a given theme of media content.

Example 22

The receiver as recited in any one or more of the preceding examples, wherein the circuitry is further configured to convey said channel bar responsive to detecting viewer input.

Example 23

The receiver as recited in any one or more of the preceding examples, wherein only elements corresponding to the given theme are included in the channel bar.

Example 24

The receiver as recited in any one or more of the preceding examples, wherein the theme is defined by at least one of a content provider, a viewer associated with the device, and a viewer not associated with the device.

Example 25

The receiver as recited in any one or more of the preceding examples, wherein said theme corresponds to one of sports, news, content directed to children, content directed to adults, and particular genres of fictional or non-fictional content.

Example 26

The receiver as recited in any one or more of the preceding examples, wherein said genres include an arbitrarily created and named by a viewer.

Example 27

The receiver as recited in any one or more of the preceding examples, wherein the circuitry is further configured to: detect a request for a change to the channel bar; identify a new theme; and convey for display a channel bar with a new plurality of elements corresponding to the new theme.

Example 28

The receiver as recited in any one or more of the preceding examples, wherein the circuitry is further configured to convey for display the channel bar with the new plurality of elements responsive to detecting the new theme is accepted.

Example 29

The receiver as recited in any one or more of the preceding examples, wherein the circuitry is configured to convey for display an identification of the new theme.

Example 30

The receiver as recited in any one or more of the preceding examples, wherein the circuitry is further configured to convey for display the identification of the new theme prior to conveying for display the channel bar with the new plurality of elements corresponding to the new theme.

Example 31

A system comprising: a data store configured to store video content; a server coupled to communicate with the data store; and a receiving device configured to communicate with the server via a network; wherein the receiving device is configured to convey a channel bar via the second interface for display on a display device, wherein said channel bar comprises a plurality of elements corresponding to a given theme of media content.

Example 32

The system as recited in any one or more of the preceding examples, wherein the receiving device is further configured to convey said channel bar responsive to detecting viewer input.

Example 33

The system as recited in any one or more of the preceding examples, wherein only elements corresponding to the given theme are included in the channel bar.

Example 34

The system as recited in any one or more of the preceding examples, wherein the theme is defined by at least one of a content provider, a viewer associated with the device, and a viewer not associated with the device.

Example 35

The system as recited in any one or more of the preceding examples, wherein said theme corresponds to one of sports, news, content directed to children, content directed to adults, and particular genres of fictional or non-fictional content.

Example 36

The system as recited in any one or more of the preceding examples, wherein said genres include an arbitrarily created and named by a viewer.

Example 37

The system as recited in any one or more of the preceding examples, wherein the receiving device is further configured to: detect a request for a change to the channel bar; identify a new theme; and convey for display a channel bar with a new plurality of elements corresponding to the new theme.

Example 38

The system as recited in any one or more of the preceding examples, wherein the receiving device is further configured to convey for display the channel bar with the new plurality of elements responsive to detecting the new theme is accepted.

Example 39

The system as recited in any one or more of the preceding examples, wherein the circuitry is configured to convey for display an identification of the new theme.

Example 40

The system as recited in any one or more of the preceding examples, wherein the receiving device is further configured to convey for display the identification of the new theme prior to conveying for display the channel bar with the new plurality of elements corresponding to the new theme.

Example 41

A system for providing stored media content, the system comprising: a first means configured to receive a signal comprising media content; and a second means configured to convey a channel bar via the second interface for display on a display device, wherein said channel bar comprises a plurality of elements corresponding to a given theme of media content.

Example 42

The system as recited in any one or more of the preceding examples, wherein the second means is further configured to convey said channel bar responsive to detecting viewer input.

Example 43

The system as recited in any one or more of the preceding examples, wherein only elements corresponding to the given theme are included in the channel bar.

Example 44

The system as recited in any one or more of the preceding examples, wherein the theme is defined by at least one of a content provider, a viewer associated with the device, and a viewer not associated with the device.

Example 45

The system as recited in any one or more of the preceding examples, wherein said theme corresponds to one of sports, news, content directed to children, content directed to adults, and particular genres of fictional or non-fictional content.

Example 46

The system as recited in any one or more of the preceding examples, wherein said genres include an arbitrarily created and named by a viewer.

Example 47

The system as recited in any one or more of the preceding examples, wherein the second means is further configured to: detect a request for a change to the channel bar; identify a new theme; and convey for display a channel bar with a new plurality of elements corresponding to the new theme.

Example 48

The system as recited in any one or more of the preceding examples, wherein the second means is further configured to conveying for display the channel bar with the new plurality of elements responsive to detecting the new theme is accepted.

Example 49

The system as recited in any one or more of the preceding examples, wherein the circuitry is configured to convey for display an identification of the new theme.

Example 50

The system as recited in any one or more of the preceding examples, wherein the second means is further configured to convey for display the identification of the new theme prior to conveying for display the channel bar with the new plurality of elements corresponding to the new theme.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer readable storage medium comprising program instructions executable to:
   at an electronic device in communication with a display device and one or more input devices:
   receive a signal comprising media content;
   display video content on a first portion of the display device, wherein the video content corresponds to a single program of a first channel; and
   display a channel bar on a second portion of the display device, wherein the channel bar comprises a plurality of representations of a plurality of channels that identify content available on the plurality of channels, including:
      a representation of a second channel, the representation of the second channel including a visual indication identifying first content available on the second channel at a current time; and
      a representation of a third channel, different from the second channel, the representation of the third channel including a visual indication identifying second content available on the third channel at the current time;
   while concurrently displaying the channel bar and the video content, detect, via the one or more input devices, selection of the representation of the second channel in the channel bar; and
   in response to detecting the selection of the representation of the second channel in the channel bar while concurrently displaying the channel bar and the video content, replace the display of the representation of the second channel and the representation of the third channel with:
      a representation of the first content available on the second channel at the current time, and
      a representation of third content available on the second channel at a future time.

2. The non-transitory computer readable storage medium of claim 1, wherein the second portion overlays part of the first portion.

3. The non-transitory computer readable storage medium of claim 1, wherein the plurality of channels are selected upon the receiving device being turned on.

4. The non-transitory computer readable storage medium of claim 1, wherein the plurality of channels are selected based on previous channels viewed before the receiving device is turned off.

5. The non-transitory computer readable storage medium of claim 1, wherein the plurality of channels are selected based on given favorite channels.

6. The non-transitory computer readable storage medium of claim 5, wherein the favorite channels are determined from a viewing history of a viewer.

7. The non-transitory computer readable storage medium of claim 5, wherein the favorite channels are selected by a viewer.

8. The non-transitory computer readable storage medium of claim 5, wherein the favorite channels are determined from a viewing history of friends of the viewer, wherein the history is stored on a server.

9. The non-transitory computer readable storage medium of claim 1, wherein the visual indication identifying the first content comprises a title of the first content, and the visual indication identifying the second content comprises a title of the second content.

10. The non-transitory computer readable storage medium of claim 1, wherein the visual indication identifying the first content comprises an image or video from the first content, and the visual indication identifying the second content comprises an image or video from the second content.

11. The non-transitory computer readable storage medium of claim 1, wherein the representation of the second channel includes a visual identifier of the second channel, and the representation of the third channel includes a visual identifier of the third channel.

12. The non-transitory computer readable storage medium of claim 1, wherein the representation of the second channel includes a text description of the first content, and the representation of the third channel includes a text description of the second content.

13. The non-transitory computer readable storage medium of claim 1, wherein the media content includes a still image.

14. The non-transitory computer readable storage medium of claim 1, wherein the media content includes audio content.

15. The non-transitory computer readable storage medium of claim 1, wherein the media content includes video content from an associated program.

16. The non-transitory computer readable storage medium of claim 1, wherein the media content includes an animation.

17. The non-transitory computer readable storage medium of claim 1, wherein the program instructions are further executable to cease displaying the channel bar after a predetermined period of time without receiving viewer input.

18. The non-transitory computer readable storage medium of claim 1, wherein the program instructions are further executable to:
   receive, via the one or more input devices, user input requesting display of a channel bar of a first category of channels; and
   responsive to receiving the user input, replace the channel bar with a second channel bar comprising a second plurality of representations of a second plurality of channels, different than the first plurality of channels, that identify content available on the second plurality of channels, wherein each channel of the second plurality of channels is a channel of the first category of channels.

19. The non-transitory computer readable storage medium of claim 18, wherein the channel bar and the second channel bar extend along a first direction on the display device, and replacing the channel bar with the second channel bar includes a three-dimensional rotation of a user interface object including the channel bar and the second channel bar in a direction that is orthogonal to the first direction, the channel bar being a first face of the user interface object and the second channel bar being a second face of the user interface object.

20. The non-transitory computer readable storage medium of claim 18, wherein the program instructions are further executable to:
while displaying the second channel bar of the first category of channels, receive, via the one or more input devices, user input requesting to change from the second channel bar of the first category of channels to another channel bar of another category of channels; and
responsive to receiving the user input, replace the second channel bar with a third channel bar comprising a third plurality of representations of a third plurality of channels, different from the first plurality of channels and the second plurality of channels, that identify content available on the third plurality of channels, wherein each channel of the third plurality of channels is a channel of a second category of channels, different than the first category of channels.

21. The non-transitory computer readable storage medium of claim 1, wherein one or more of the plurality of representations of the channel bar display live broadcast video.

22. The non-transitory computer readable storage medium of claim 1, wherein the program instructions are further executable to:
convey audio content for a particular channel of a particular representation of the channel bar, responsive to the particular representation having been selected for focus by a viewer.

23. The non-transitory computer readable storage medium of claim 1, wherein the program instructions are further executable to:
replace a respective representation of the channel bar with a plurality of representations each corresponding to an episode of the video content associated with the respective representation.

24. The non-transitory computer readable storage medium of claim 1, wherein replacing the display of the representation of the second channel and the representation of the third channel comprises replacing the display of all of the plurality of representations of the plurality of channels in the channel bar with:
the representation of the first content available on the second channel at the current time, and
the representation of the third content available on the second channel at the future time.

25. The non-transitory computer readable storage medium of claim 1, wherein replacing the display of the representation of the second channel and the representation of the third channel comprises replacing the display of the representation of the second channel and the representation of the third channel with:

the representation of the first content available on the second channel at the current time,
the representation of the third content available on the second channel at the future time, and
a representation of fourth content that was available on the second channel prior to the current time.

26. The non-transitory computer readable storage medium of claim 1, wherein the instructions are further executable to:
after replacing the display of the representation of the second channel and the representation of the third channel with the representation of the first content available on the second channel and the representation of the third content available on the second channel, concurrently display:
the representation of the first content available on the second channel;
the representation of the third content available on the second channel; and
a visual indication of progress through the first content available on the second channel.

27. The non-transitory computer readable storage medium of claim 1, wherein the instructions are further executable to:
in response to detecting the selection of the first representation of the second channel in the channel bar while concurrently displaying the channel bar and the video content, replace the video content corresponding to the single program of the first channel in the first portion of the display device with the first content available on the second channel at the current time.

28. The non-transitory computer readable storage medium of claim 1, wherein the instructions are further executable to:
after replacing the display of the representation of the second channel and the representation of the third channel with the representation of the first content available on the second channel and the representation of the third content available on the second channel, receive, via the one or more input devices, an input scrolling through the channel bar; and
in response to receiving the input scrolling through the channel bar, display, in the channel bar, a representation of fourth content available on the second channel at a second future time after the future time.

29. The non-transitory computer readable storage medium of claim 1, wherein after replacing the display of the representation of the second channel and the representation of the third channel with the representation of the first content available on the second channel and the representation of the third content available on the second channel, the channel bar includes a representation of on-demand content associated with the second channel.

30. An electronic device comprising:
a first interface configured to receive a signal comprising media content;
a second interface configured to be coupled to a display device; and
circuitry configured to:
display video content on a first portion of the display device, wherein the video content corresponds to a single program of a first channel; and
display a channel bar on a second portion of the display device, wherein the channel bar comprises a plurality of representations of a plurality of channels that identify content available on the plurality of channels, including:
a representation of a second channel, the representation of the second channel including a visual indication identifying first content available on the second channel at a current time; and a representation of a third channel, different from the second channel, the representation of the third channel including a visual indication identifying second content available on the third channel at the current time;

while concurrently displaying the channel bar and the video content, detect, via the one or more input devices, selection of the representation of the second channel in the channel bar; and in response to detecting the selection of the representation of the second channel in the channel bar while concurrently displaying the channel bar and the video content, replace the display of the representation of the second channel and the representation of the third channel with:

a representation of the first content available on the second channel at the current time, and a representation of third content available on the second channel at a future time.

31. The electronic device of claim 30, wherein the visual indication identifying the first content comprises a title of the first content, and the visual indication identifying the second content comprises a title of the second content.

32. The electronic device of claim 30, wherein the visual indication identifying the first content comprises an image or video from the first content, and the visual indication identifying the second content comprises an image or video from the second content.

33. The electronic device of claim 30, wherein the representation of the second channel includes a text description of the first content, and the representation of the third channel includes a text description of the second content.

34. The electronic device of claim 30, wherein the circuitry is further configured to:

receive user input requesting display of a channel bar of a first category of channels; and responsive to receiving the user input, replace the channel bar with a second channel bar comprising a second plurality of representations of a second plurality of channels, different than the first plurality of channels, that identify content available on the second plurality of channels, wherein each channel of the second plurality of channels is a channel of the first category of channels.

35. The electronic device of claim 34, wherein the circuitry is further configured to:

while displaying the second channel bar of the first category of channels, receive user input requesting to change from the second channel bar of the first category of channels to another channel bar of another category of channels; and responsive to receiving the user input, replace the second channel bar with a third channel bar comprising a third plurality of representations of a third plurality of channels, different from the first plurality of channels and the second plurality of channels, that identify content available on the third plurality of channels, wherein each channel of the third plurality of channels is a channel of a second category of channels, different than the first category of channels.

36. The electronic device of claim 30, wherein one or more of the plurality of representations of the channel bar display live broadcast video.

37. The electronic device of claim 30, wherein replacing the display of the representation of the second channel and the representation of the third channel comprises replacing the display of all of the plurality of representations of the plurality of channels in the channel bar with:

the representation of the first content available on the second channel at the current time, and the representation of the third content available on the second channel at the future time.

38. The electronic device of claim 30, wherein replacing the display of the representation of the second channel and the representation of the third channel comprises replacing the display of the representation of the second channel and the representation of the third channel with:

the representation of the first content available on the second channel at the current time, the representation of the third content available on the second channel at the future time, and a representation of fourth content that was available on the second channel prior to the current time.

39. The electronic device of claim 30, wherein the circuitry is further configured to:

after replacing the display of the representation of the second channel and the representation of the third channel with the representation of the first content available on the second channel and the representation of the third content available on the second channel, concurrently display:

the representation of the first content available on the second channel;

the representation of the third content available on the second channel; and a visual indication of progress through the first content available on the second channel.

40. The electronic device of claim 30, wherein the circuitry is further configured to:

in response to detecting the selection of the first representation of the second channel in the channel bar while concurrently displaying the channel bar and the video content, replace the video content corresponding to the single program of the first channel in the first portion of the display device with the first content available on the second channel at the current time.

41. The electronic device of claim 30, wherein the circuitry is further configured to:

after replacing the display of the representation of the second channel and the representation of the third channel with the representation of the first content available on the second channel and the representation of the third content available on the second channel, receive, via the one or more input devices, an input scrolling through the channel bar; and in response to receiving the input scrolling through the channel bar, display, in the channel bar, a representation of fourth content available on the second channel at a second future time after the future time.

42. The electronic device of claim 30, wherein after replacing the display of the representation of the second channel and the representation of the third channel with the representation of the first content available on the second channel and the representation of the third content available on the second channel, the channel bar includes a representation of on-demand content associated with the second channel.

43. A method comprising:

at an electronic device in communication with a display device and one or more input devices:

receiving a signal comprising media content;

displaying video content on a first portion of the display device, wherein the video content corresponds to a single program of a first channel; and displaying a channel bar on a second portion of the display device, wherein the channel bar comprises a plurality of representations of a plurality of channels that identify content available on the plurality of channels, including:

a representation of a second channel, the representation of the second channel including a visual indication identifying first content available on the second channel at a current time; and a representation of a third channel, different from the second channel, the representation of the third channel including a visual indication identifying second content available on the third channel at the current time;

while concurrently displaying the channel bar and the video content, detecting, via the one or more input devices, selection of the representation of the second channel in the channel bar; and in response to detecting the selection of the representation of the second channel in the channel bar while concurrently displaying the channel bar and the video content, replacing the display of the representation of the second channel and the representation of the third channel with:

a representation of the first content available on the second channel at the current time, and a representation of third content available on the second channel at a future time.

44. The method of claim 43, wherein the visual indication identifying the first content comprises a title of the first content, and the visual indication identifying the second content comprises a title of the second content.

45. The method of claim 43, wherein the visual indication identifying the first content comprises an image or video from the first content, and the visual indication identifying the second content comprises an image or video from the second content.

46. The method of claim 43, wherein the representation of the second channel includes a text description of the first content, and the representation of the third channel includes a text description of the second content.

47. The method of claim 43, further comprising:
receiving user input requesting display of a channel bar of a first category of channels; and
responsive to receiving the user input, replacing the channel bar with a second channel bar comprising a second plurality of representations of a second plurality of channels, different than the first plurality of channels, that identify content available on the second plurality of channels, wherein each channel of the second plurality of channels is a channel of the first category of channels.

48. The method of claim 47, further comprising:
while displaying the second channel bar of the first category of channels, receiving, via the one or more input devices, user input requesting to change from the second channel bar of the first category of channels to another channel bar of another category of channels; and
responsive to receiving the user input, replacing the second channel bar with a third channel bar comprising a third plurality of representations of a third plurality of channels, different from the first plurality of channels and the second plurality of channels, that identify content available on the third plurality of channels, wherein each channel of the third plurality of channels is a channel of a second category of channels, different than the first category of channels.

49. The method of claim 43, wherein one or more of the plurality of representations of the channel bar display live broadcast video.

50. The method of claim 43, wherein replacing the display of the representation of the second channel and the representation of the third channel comprises replacing the display of all of the plurality of representations of the plurality of channels in the channel bar with:
the representation of the first content available on the second channel at the current time, and
the representation of the third content available on the second channel at the future time.

51. The method of claim 43, wherein replacing the display of the representation of the second channel and the representation of the third channel comprises replacing the display of the representation of the second channel and the representation of the third channel with:
the representation of the first content available on the second channel at the current time,
the representation of the third content available on the second channel at the future time, and
a representation of fourth content that was available on the second channel prior to the current time.

52. The method of claim 43, further comprising:
after replacing the display of the representation of the second channel and the representation of the third channel with the representation of the first content available on the second channel and the representation of the third content available on the second channel, concurrently displaying:
the representation of the first content available on the second channel;
the representation of the third content available on the second channel; and
a visual indication of progress through the first content available on the second channel.

53. The method of claim 43, further comprising:
in response to detecting the selection of the first representation of the second channel in the channel bar while concurrently displaying the channel bar and the video content, replacing the video content corresponding to the single program of the first channel in the first portion of the display device with the first content available on the second channel at the current time.

54. The method of claim 43, further comprising:
after replacing the display of the representation of the second channel and the representation of the third channel with the representation of the first content available on the second channel and the representation of the third content available on the second channel, receiving, via the one or more input devices, an input scrolling through the channel bar; and
in response to receiving the input scrolling through the channel bar, displaying, in the channel bar, a representation of fourth content available on the second channel at a second future time after the future time.

55. The method of claim 43, wherein after replacing the display of the representation of the second channel and the representation of the third channel with the representation of the first content available on the second channel and the representation of the third content available on the second channel, the channel bar includes a representation of on-demand content associated with the second channel.

\* \* \* \* \*